United States Patent
Ku et al.

(10) Patent No.: US 12,479,821 B2
(45) Date of Patent: Nov. 25, 2025

(54) QUINOLINE COMPOUND AND USE THEREOF

(71) Applicant: MBD CO., LTD., Suwon-si (KR)

(72) Inventors: Bosung Ku, Yongin-si (KR); Gun Hwa Kim, Daejeon (KR); Sin Hyoung Hong, Daejeon (KR); Min Ji Lee, Daejeon (KR); Ji Hoon Lee, Daegu (KR); Sang-Hyun Lee, Gyeonggi-do (KR)

(73) Assignee: MBD CO., LTD., Suwon-si (KR)

( * ) Notice: Subject to any disclaimer, the term of this patent is extended or adjusted under 35 U.S.C. 154(b) by 856 days.

(21) Appl. No.: 17/775,773

(22) PCT Filed: Nov. 11, 2020

(86) PCT No.: PCT/KR2020/095140
§ 371 (c)(1),
(2) Date: May 10, 2022

(87) PCT Pub. No.: WO2021/096335
PCT Pub. Date: May 20, 2021

(65) Prior Publication Data
US 2022/0402890 A1     Dec. 22, 2022

(30) Foreign Application Priority Data

Nov. 11, 2019  (KR) .................. 10-2019-0143590

(51) Int. Cl.
*C07D 401/12* (2006.01)
*A23L 33/10* (2016.01)
*A61P 1/16* (2006.01)
*A61P 3/10* (2006.01)
*C07D 401/14* (2006.01)

(52) U.S. Cl.
CPC ............ *C07D 401/12* (2013.01); *A23L 33/10* (2016.08); *A61P 1/16* (2018.01); *A61P 3/10* (2018.01); *C07D 401/14* (2013.01); *A23V 2002/00* (2013.01)

(58) Field of Classification Search
CPC .................. C07D 401/12; C07D 401/14
See application file for complete search history.

(56) References Cited

U.S. PATENT DOCUMENTS

2024/0287032 A1* 8/2024 Ku ................... A61K 31/506

FOREIGN PATENT DOCUMENTS

| KR | 10-1235811 | 2/2013 |
|---|---|---|
| KR | 10-1886118 | 9/2018 |
| WO | WO 03/080608 | 10/2003 |
| WO | WO 2011/073277 | 6/2011 |
| WO | WO 2016/032569 | 3/2016 |
| WO | WO 2019/072785 | 4/2019 |

OTHER PUBLICATIONS

International Search Report and Written Opinion for PCT/KR2020/095140. Mailed Feb. 23, 2021. 14 pages.
Ansari et al., New antiprotozoal agents: Synthesis and biological evaluation of different 4-(7-chloroquinolin-4-yl) piperazin-1-yl)pyrrolidin-2-yl)methanone derivatives. Bioorg Med Chem Lett. Feb. 1, 2017;27(3):460-465.
Eizirik et al., The role for endoplasmic reticulum stress in diabetes mellitus. Endocr Rev. Feb. 2008;29(1):42-61.
Haukeland et al., Metformin in patients with non-alcoholic fatty liver disease: a randomized, controlled trial. Scand J Gastroenterol. 2009;44(7):853-60.
Mayerson et al., The effects of rosiglitazone on insulin sensitivity, lipolysis, and hepatic and skeletal muscle triglyceride content in patients with type 2 diabetes. Diabetes. Mar. 2002;51(3):797-802.
Nakatani et al., Involvement of endoplasmic reticulum stress in insulin resistance and diabetes. J Biol Chem. Jan. 7, 2005;280(1):847-51.
Ozcan et al., Endoplasmic reticulum stress links obesity, insulin action, and type 2 diabetes. Science. Oct. 15, 2004;306(5695):457-61.
Park et al., Inhibition of CYP4A Reduces Hepatic Endoplasmic Reticulum Stress and Features of Diabetes in Mice. Gastroenterology, 2014;147;860-869.
Petersen et al., Reversal of nonalcoholic hepatic steatosis, hepatic insulin resistance, and hyperglycemia by moderate weight reduction in patients with type 2 diabetes. Diabetes. Mar. 2005;54(3):603-8.
Sanyal et al., Pioglitazone, vitamin E, or placebo for nonalcoholic steatohepatitis. N Engl J Med. May 6, 2010;362(18):1675-85.
Van Der Kallen et al., Endoplasmic reticulum stress-induced apoptosis in the development of diabetes: is there a role for adipose tissue and liver? Apoptosis. Dec. 2009;14(12):1424-34.

\* cited by examiner

Primary Examiner — Laura L Stockton
(74) Attorney, Agent, or Firm — Casimir Jones, SC Jeffrey W. Childers

(57) ABSTRACT

The present invention relates to a novel quinoline compound and a use thereof and to a novel quinoline compound exhibiting CYP4A inhibition activity and a use thereof for preventing, alleviating, treating a metabolic disease. The compound disclosed in the present invention has a remarkable effect of inhibiting CYP4A and exhibits the activities of promoting the absorption of glucose into hepatocytes, inhibiting fat accumulation in hepatocytes, suppressing endoplasmic reticulum-induced reactive oxygen species, and treating steatohepatitis, and thus can be very advantageously used for developing therapeutics for metabolic diseases such as diabetes mellitus and fatty liver.

13 Claims, 2 Drawing Sheets

QUINOLINE COMPOUND AND USE THEREOF

TECHNICAL FIELD

This application claims priority to Korean Patent Application No. 10-2019-0143590 filed on Nov. 11, 2019, and the entire specifications of which are incorporated herein by reference in their entireties.

The present invention relates to a novel quinoline compound, a method for preparing the same, and a use thereof, and to a novel quinoline compound exhibiting CYP4A inhibitory activity and a use for preventing, improving, and treating metabolic diseases thereof.

BACKGROUND OF THE INVENTION

The prevalence of diabetes mellitus, fatty liver, dyslipidemia, and hypertension, which are classified as metabolic diseases (metabolic syndrome), along with the increase in the obese population, is continuously increasing. Although the cause of metabolic disease (metabolic syndrome) is not clear, it is assumed that insulin resistance is the underlying problem. Insulin resistance decreases the body's response to insulin, a hormone that lowers blood sugar, making it difficult for muscle and fat cells to absorb glucose, to solve this problem, more insulin is secreted, increasing the risk of diseases such as diabetes and fatty liver (Korean J Fam Pract. 2015; 5; 375-420). Although the underlying mechanism of insulin resistance is unclear, it has been proposed that endoplasmic reticulum (ER) stress is a novel mechanism for the development of insulin resistance in obese individuals (Science 2004; 306; 457-461, J Biol Chem 2005; 280; 847-851). It has been reported that ER stress is caused by disruption of $Ca^{2+}$ homeostasis, overload of protein/lipid biosynthesis, and oxidative stress, recently, ER stress and UPR (Unfolded Protein Response) pathways have been shown to play a role in the pathogenesis of diabetes (Apoptosis 2009; 14; 1424-1434, Endocr Rev 2008; 29; 42-61). However, the exact mechanism directly regulating the UPR pathway has not yet been elucidated.

Diabetes mellitus, one of the major metabolic diseases (metabolic syndrome), is a disease in which insulin secreted by the pancreas is insufficient or insulin does not work properly in our body. Therefore, the blood sugar in the blood cannot be used as energy and accumulates in the blood, resulting in symptoms of hyperglycemia. There are two main types of diabetes. Type 1 diabetes mellitus is a disease in which insulin-secreting beta cells of the pancreas are gradually destroyed, eventually resulting in loss of insulin secretion. It mainly affects children, but can also occur in adults. Treatment for type 1 diabetes mainly consists of injecting insulin several times a day, and blood glucose levels are tested several times to control the insulin dosage. This is because excess insulin can lead to hypoglycemia and damage to the brain or other functions.

Type 2 diabetes is a disease caused by insulin resistance and insufficient insulin secretion. These two etiologies are necessarily present in all diabetic patients, and they may be divided into a case in which insulin resistance predominates (accompanied by obesity) and a case in which insulin secretion deficiency (underweight) predominates. Long-term blood sugar management is possible only when the complex etiology is considered and treated.

In treatment of type 2 diabetes, 1) insulin-releasing agents that directly stimulate insulin secretion but have the risk of causing hypoglycemia, 2) meal insulin-releasing agents that enhance glucose-induced insulin secretion but must be taken before each meal, 3) biguaniad with metformin, which inhibits hepatic gluconeogenesis (which is greatly elevated in diabetes), 4) insulin sensitizers such as ciglitazone and pioglitazone as a thiazolidinedione derivative that improves peripheral reactivity to insulin but has side effects such as weight gain, edema and hepatotoxicity, 5) insulin injection, which is often required at the end of diabetes, when pancreatic islets fail under chronic hyperstimulation, are used (Korean Academy of Medical Sciences, 2014).

Fatty liver, which is another major metabolic disease (metabolic syndrome), refers to the accumulation of fat in hepatocytes due to excessive intake of fat or endogenously increasing or decreasing hepatic liposynthesis or excretion. Fatty liver can be divided into alcoholic fatty liver and non-alcoholic fatty liver. Alcoholic fatty liver may be affected by alcohol intake, genetic alcohol metabolism, and nutritional status. Alcoholic fatty liver may progress to alcoholic hepatitis or cirrhosis, which may eventually lead to liver cancer or end-stage liver failure. Non-alcoholic fatty liver disease (NAFLD) refers to a disease in which triglycerides are accumulated in the liver regardless of alcohol consumption, and includes simple fatty liver (steatosis) and non-alcoholic steatohepatitis (NASH). Simple fatty liver is considered a benign disease with a good clinical prognosis, but NASH is a progressive liver disease and is recognized as a precursor disease that causes cirrhosis or liver cancer (Korean Journal of Medicine, 2009; 76; 6; 677-679).

On the other hand, as described above, many cases of non-alcoholic fatty liver disease (NAFLD)/fatty liver, steatohepatitis, steatohepatitis-related (associated cirrhosis, etc.) occurring due to insulin resistance, diabetes, etc. are reported, so the treatment mechanisms and strategies of the above diseases may be fundamentally similar, but substantially, depending on specific therapeutic substances, it is controversial how much effective level of therapeutic efficacy can be shown for liver diseases, such as steatohepatitis, apart from the effect of reducing insulin resistance. So far, there is no drug approved for the treatment of nonalcoholic fatty liver disease. A treatment for steatohepatitis or nonalcoholic fatty liver-associated cirrhosis is absolutely necessary. However, to date, there are no effective and safe approved drugs for ameliorating fibrosis. Currently, many studies are being conducted, and some effects are observed, but there are still limitations in clinical application. For example, in the case of Metformin used for the treatment of type 2 diabetes, it was reported that there was no histological improvement effect of steatohepatitis in studies of adult and pediatric NASH (nonalcoholic steatohepatitis) patients (Non-Patent Reference 1, Non-Patent Reference 2). It was also reported that liver fibrosis was not improved by administration of pioglitazone (Non-Patent Reference 3).

Therefore, there is a demand for the development of a therapeutic agent that exhibits effective effects in various ways for metabolic diseases (metabolic syndrome) such as diabetes and fatty liver disease.

On the other hand, the present inventors have confirmed that the expression of CYP4A (cytochrome P450 4A), which is localized in the endoplasmic reticulum (ER) membrane in the mammalian liver, is increased in a mouse model of metabolic disease (diabetes, fatty liver) compared to normal mice through a previous study, when the activity or expression of CYP4A is suppressed, the effect of improving the hepatic insulin resistance and fat accumulation induced by ER stress, as well as the production of reactive oxygen species and hepatocellular death, has been observed, confirming that it is a target for prevention or treatment of diabetes and fatty liver (Korean Patent Registration Nos. 10-1235811, 10-1886118, Gastroenterology, 2014; 147; 860-869).

PRIOR ART LITERATURE

Non-Patent Literature (Non-Patent Reference 1) Gap-Jin Cheon, Young-Don Kim, Drug Treatment of Nonalcoholic Fatty Liver Disease: Limitations, Proceedings of the Korean Society of Internal Medicine Spring Proceedings 2018, 251-256.
(Non-Patent Reference 2) Haukeland J W et al., Metformin in patients with nonalcoholic fatty liver disease: a randomized, controlled trial. Scand J Gastroenterol 2009; 44:853-860.
(Non-Patent Reference 3) Arun J. Sanyal et al., Pioglitazone, Vitamin E, or Placebo for Nonalcoholic Steatohepatitis, N Engl J Med 2010; 362:1675-1685.

DETAILED DESCRIPTION OF THE INVENTION

Technical Problem

Accordingly, the present inventors have made diligent efforts to find a substance that exhibits excellent efficacy against metabolic diseases of disease groups such as diabetes and fatty liver disease, and it was confirmed that the novel quinoline compound of Formula I disclosed in the present invention has a remarkable CYP4A inhibitory effect, promotes glucose uptake into hepatocytes, inhibits fat accumulation in liver cells, in addition to exhibiting the activity of inhibiting the production of reactive oxygen species due to ER stress, the therapeutic effect on steatohepatitis was confirmed, and the present invention was completed.

Accordingly, it is an object of the present invention to provide a quinolone compound represented by the following Formula (I), a racemic compound, a diastereomer, a geometric isomer, a stereoisomer, a hydrate or a salt thereof:

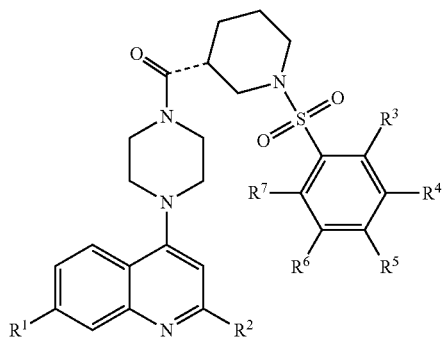

<Formula I> wherein $R^1$ and $R^2$ are each independently selected from the group consisting of hydrogen, halo, haloalkane, hydroxy, carboxyl, carbonyl, amino, amide, cyano, nitro, alkyl, alkenyl, alkynyl and alkoxy,
wherein $R^3$, $R^4$, $R^5$, $R^6$ and $R^7$ are each independently selected from the group consisting of hydrogen, halo, haloalkane, hydroxy, carboxyl, carbonyl, amino, amide, sulfonyl, cyano, nitro, alkyl, alkenyl, alkynyl, alkoxy, phenoxy, substituted or unsubstituted phenyl, and substituted or unsubstituted heteroaryl.

Another object of the present invention is to provide a method for preparing the compound of Formula (I).

Another object of the present invention is to provide a pharmaceutical composition for preventing or treating a metabolic disease comprising a quinolone compound represented by the Formula (I), a racemic compound, a diastereomer, a geometric isomer, a stereoisomer, a hydrate, or a pharmaceutically acceptable salt thereof as an active ingredient.

Another object of the present invention is to provide a pharmaceutical composition for preventing or treating a metabolic disease consisting of a quinolone compound represented by the Formula (I), a racemic compound, a diastereomer, a geometric isomer, a stereoisomer, a hydrate, or a pharmaceutically acceptable salt thereof.

Another object of the present invention is to provide a pharmaceutical composition for preventing or treating a metabolic disease consisting essentially of a quinolone compound represented by the Formula (I), a racemic compound, a diastereomer, a geometric isomer, a stereoisomer, a hydrate, or a pharmaceutically acceptable salt thereof.

Another object of the present invention is to provide a food composition for preventing or improving metabolic diseases comprising a quinolone compound represented by the Formula (I), a racemic compound, a diastereomer, a geometric isomer, a stereoisomer, a hydrate, or a salt thereof as an active ingredient.

Another object of the present invention is to provide a food composition for preventing or improving metabolic diseases consisting of a quinolone compound represented by the Formula (I), a racemic compound, a diastereomer, a geometric isomer, a stereoisomer, a hydrate, or a salt thereof.

Another object of the present invention is to provide a food composition for preventing or improving metabolic diseases consisting essentially of a quinolone compound represented by the Formula (I), a racemic compound, a diastereomer, a geometric isomer, a stereoisomer, a hydrate, or a salt thereof.

Another object of the present invention is to provide a use of a quinolone compound represented by the Formula (I), a racemic compound, a diastereomer, a geometric isomer, a stereoisomer, a hydrate, or a pharmaceutically acceptable salt thereof for preparing an agent for the prevention or treatment of metabolic diseases.

Another object of the present invention is to provide a method of treating a metabolic disease comprising administering to a subject in need thereof an effective amount of a composition comprising a quinolone compound represented by the Formula (I), a racemic compound, a diastereomer, a geometric isomer, a stereoisomer, a hydrate, or a pharmaceutically acceptable salt thereof as an active ingredient.

Technical Solution

In order to achieve the above object of the present invention, the present invention provides a quinolone compound represented by the following Formula (I), a racemic compound, a diastereomer, a geometric isomer, a stereoisomer, a hydrate or a salt thereof:

<Formula I>

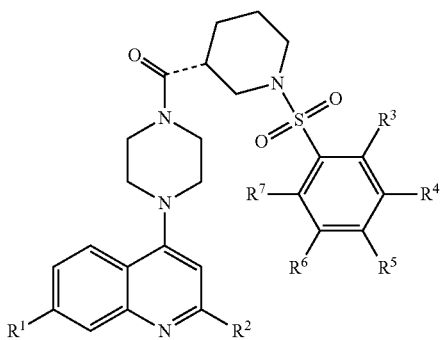

wherein R¹ and R² are each independently selected from the group consisting of hydrogen, halo, haloalkane, hydroxy, carboxyl, carbonyl, amino, amide, cyano, nitro, alkyl, alkenyl, alkynyl and alkoxy, wherein R³, R⁴, R⁵, R⁶ and R⁷ are each independently selected from the group consisting of hydrogen, halo, haloalkane, hydroxy, carboxyl, carbonyl, amino, amide, sulfonyl, cyano, nitro, alkyl, alkenyl, alkynyl, alkoxy, phenoxy, substituted or unsubstituted phenyl, and substituted or unsubstituted heteroaryl.

In order to achieve the above object of the present invention, the present invention provides a use of a quinolone compound represented by the Formula (I), a racemic compound, a diastereomer, a geometric isomer, a stereoisomer, a hydrate, or a pharmaceutically acceptable salt thereof for preparing an agent for the prevention or treatment of metabolic diseases.

In order to achieve the above object of the present invention, the present invention provides A method of treating a metabolic disease comprising administering to a subject in need thereof an effective amount of a composition comprising a quinolone compound represented by the Formula (I), a racemic compound, a diastereomer, a geometric isomer, a stereoisomer, a hydrate, or a pharmaceutically acceptable salt thereof as an active ingredient:

Hereinafter, the present invention will be described in more detail.

In the present invention, the following terms have the meanings set forth below unless otherwise indicated. Any terms not defined have the meanings understood in the art.

In the present invention, the term 'halo' or 'halogen' refers to fluorine (F), chlorine (Cl), bromine (Br), and iodine (I).

In the present invention, the term 'cyano' group means-CN.

In the present invention, the term 'amino', alone or in combination, may mean a primary, secondary or tertiary amino group bonded through a nitrogen atom. In the present invention, the secondary amino group may mean having an alkyl substituent, and the tertiary amino group may mean having two similar or different alkyl substituents. Although not limited thereto, it may be, for example, —NH₂, methylamino, ethylamino, dimethylamino, diethylamino, or methyl-ethylamino. Preferably, it may be one selected from the group consisting of primary amino and C1-C6 alkylamino (more preferably C1-C4 alkylamino, even more preferably C1-C3 alkylamino), and alkyl is understood by reference to the description that follows.

In the present invention, the term 'alkylamino' is understood to have the same meaning as 'aminoalkyl'. Here, there may be one or two or more alkyl groups attached to the amino group.

In the present invention, the term 'amide' group means

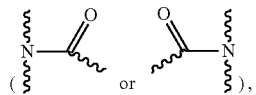

and may be N-methylformamide, N,N-dimethylformamide, N,N-diethylformamide, acetamide, N-methylacetamide, N,N-Dimethylacetamide or N-methylpropionamide, but is not limited thereto.

In the present invention, the term 'nitro' group means —NO₂.

In the present invention, the term 'hydroxy' group means-OH.

In the present invention, unless otherwise specified, the term 'substituted' means that at least one substituent, for example, includes one or two or more halogen atom, C1-C10 alkyl group, nitro, hydroxy, cyano, amino, thiol, carboxyl, amide, nitrile, sulfide, disulfide, sulfenyl, formyl, formyloxy or formylamino. Unless otherwise specified, when the structure obtained by such substitution does not significantly adversely affect the properties of the compound represented by the Formula 1 of the present invention (especially activity related to the intended use in the present invention), any group or structure described for the compound represented by Formula 1 of the present invention may be substituted.

In the present invention, the term 'alkyl' refers to a monovalent group formed by the loss of one hydrogen atom in an aliphatic saturated hydrocarbon. In the present invention, the alkyl may preferably mean an unsubstituted or substituted linear (straight-chain) or branched (including branched-chain) alkyl type having 1 to 6 carbon atoms (C1, C2, C3, C4, C5 or C6). C1-C6 linear or branched alkyl includes, but is not limited to, methyl, ethyl, n-propyl, isopropyl, n-butyl, sec-butyl, tert-butyl, n-pentyl, isopentyl, neo pentyl, tert-pentyl, n-hexyl, isohexyl, and the like. More preferably, alkyl in the present invention may be unsubstituted or substituted C1-C4 linear or branched alkyl, and even more preferably unsubstituted or substituted C1-C3 linear or branched alkyl.

In the present invention, the term 'haloalkane' refers to a compound in which a hydrogen atom of an aliphatic saturated hydrocarbon is substituted with a halogen atom. For example, the haloalkane may include, but is not limited to, chloromethyl dichloromethyl, bromoethyl, 1-iodopropyl, trifluoromethyl, trichloromethyl and the like.

The term 'alkenyl' refers to an aliphatic unsaturated hydrocarbon group having at least one (ie, one or more) double bonds. In the present invention, alkenyl may preferably mean an unsubstituted or substituted linear or branched alkenyl type having 1 to 6 carbon atoms (C1, C2, C3, C4, C5 or C6). C1-C6 linear or branched alkenyl can be, for example, but not limited to, vinyl (—CH=CH₂), allyl (—CH₂CH=CH₂), —CH=CH (CH₃), —CH=C (CH₃))₂, —C(CH₃)=CH₂, —C(CH₃)=CH (CH₃), —C(CH₂CH₃) =CH₂, 1,3-butadienyl (—CH=CH—CH=CH₂) and hepta-1,6-dien-4-yl (—CH₂—(CH₂CH=CH₂)₂) and the like. More preferably, alkenyl in the present invention may be unsubstituted or substituted C1-C4 linear or branched alkenyl, and even more preferably unsubstituted or substituted C1-C3 linear or branched alkenyl.

The term 'alkynyl' refers to an aliphatic unsaturated hydrocarbon group having at least one (ie, one or more) triple bonds. In the present invention, the alkynyl may preferably mean an unsubstituted or substituted linear or branched alkynyl type having 1 to 6 carbon atoms (C1, C2, C3, C4, C5 or C6). C1-C6 linear or branched alkynyl includes, but is not limited to, for example, ethynyl (—C≡CH), —C≡CH (CH$_3$), —C≡C (CH$_2$CH$_3$), —CH$_2$C≡CH$_2$, —CH$_2$C≡C (CH$_3$) and —CH$_2$C≡C (CH$_2$CH$_3$) and the like. More preferably, alkynyl in the present invention may be unsubstituted or substituted C1-C4 linear or branched alkynyl, and even more preferably unsubstituted or substituted C1-C3 linear or branched alkynyl.

The term 'alkoxy' means '—O-alkyl group', and alkyl is as described above. In the present invention, alkoxy may preferably mean an unsubstituted or substituted linear or branched alkoxy substituent type having 1 to 6 carbon atoms (C1, C2, C3, C4, C5 or C6). C1-C6 linear or branched alkoxy includes, but is not limited to, for example, methoxy, trifluoromethoxy, ethoxy, n-propoxy, isopropoxy, n-butoxy, t-butoxy, sec-butoxy, n-pentoxy and the like. More preferably, alkoxy in the present invention may be unsubstituted or substituted C1-C4 linear or branched alkoxy, and even more preferably unsubstituted or substituted C1-C3 linear or branched alkoxy.

In the present invention, the term 'phenoxy' means '—O-phenyl', and the phenoxy means unsubstituted phenoxy or substituted phenoxy. Non-limiting examples thereof include phenoxy, 4-halophenoxy, 4-hydroxyphenoxy, 4-methoxyphenoxy, 4-aminophenoxy, 4-nitrophenoxy, 4-alkylphenoxy, 4-methylsulfonylphenoxy and the like may be included.

In the present invention, the term 'sulfonyl' preferably means C1-C10 alkyl sulfonyl, and non-limiting examples thereof may include methylsulfonyl, ethylsulfonyl, and tert-butylsulfonyl.

In the present invention, the term 'heteroaryl' contains 1 to 4 heteroatoms selected from nitrogen, oxygen or sulfur, and denotes a monovalent aromatic radical having 5-, 6- or 7-membered rings, including fused ring systems (at least one of which is aromatic) having 5 to 15 atoms. Examples of heteroaryl groups include pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, pteri Dinyl, purinyl, oxadiazolyl, triazolyl, thiadiazolyl, thiadiazolyl, furazanyl, benzofurazanyl, benzothiophenyl, benzothiazolyl, benzoxazolyl, quinazolinyl, quinoxalinyl, naphthyridinyl and furopyridinyl. Spiro moieties are also included within the scope of this definition. The heteroaryl group may be mono-, di- or tri-substituted with any substituent.

In one aspect of the present invention, the $R^1$ and $R^2$ may each independently be selected from the group consisting of hydrogen, halo, C1-C6 haloalkane, hydroxy, substituted or unsubstituted C1-C6 carboxyl, substituted or unsubstituted C1-C6 carbonyl, substituted or unsubstituted amino, substituted or unsubstituted C1-C6 amide, cyano, substituted or unsubstituted nitro, substituted or unsubstituted C1-C10 alkyl, substituted or unsubstituted C1-C10 alkenyl, substituted or unsubstituted C1-C10 alkynyl and substituted or unsubstituted C1-C10 alkoxy.

In another aspect of the present invention, $R^1$ and $R^2$ may be each independently selected from the group consisting of hydrogen; halo; substituted or unsubstituted linear or branched C1-C6 alkyl; C1-C6 haloalkane; and substituted or unsubstituted linear or branched C1-C6 alkoxy.

In another aspect of the present invention, $R^1$ and $R^2$ may each independently be selected from the group consisting of hydrogen, halo, trifluoromethyl, unsubstituted linear C1-C6 alkyl and unsubstituted linear C1-C6 alkoxy.

In another aspect of the present invention, $R^1$ and $R^2$ may each independently be selected from the group consisting of hydrogen, chlorine (Cl), fluorine (F), trifluoromethyl, methyl and methoxy In one aspect of the present invention, $R^3$, $R^4$, $R^5$, $R^6$ and $R^7$ may each independently be selected from the group consisting of hydrogen; halo; C1-C6 haloalkane; hydroxy; substituted or unsubstituted C1-C6 carboxyl; substituted or unsubstituted C1-C6 carbonyl; substituted or unsubstituted amino; substituted or unsubstituted C1-C6 amides; sulfonyl; cyano; nitro; substituted or unsubstituted C1-C6 alkyl; substituted or unsubstituted C1-C6 alkenyl; substituted or unsubstituted C1-C6 alkynyl; substituted or unsubstituted C1-C6 alkoxy; substituted or unsubstituted C6-C10 phenoxy; substituted or unsubstituted C6-C10 phenyl; and substituted or unsubstituted C3-C10 heteroaryl.

In another aspect of the present invention, $R^3$, $R^4$, $R^5$, $R^6$ and $R^7$ may each independently be selected from the group consisting of hydrogen; halo; trifluoromethyl; hydroxy; carboxyl; C1-C6 alkylcarbonyl; C1-C6 alkoxycarbonyl; dimethylaminocarbonyl; amino; dimethylamino; diethylamino; methylcarbonylamino; sulfonyl; cyano; nitro; unsubstituted linear C1-C6 alkyl; unsubstituted linear C1-C6 alkoxy; substituted or unsubstituted C6-C10 phenoxy; substituted or unsubstituted C6-C10 phenyl; substituted or unsubstituted C5-C10 pyridine; and substituted or unsubstituted C4-C10 pyrimidines.

In another aspect of the present invention, $R^3$, $R^4$, $R^5$, $R^6$ and $R^7$ may each independently be selected from the group consisting of hydrogen, methyl, ethyl, fluorine, chlorine, bromine, amine, N,N-dimethylamine, N,N-diethylamine, hydroxy, nitro, trifluoromethyl, phenoxy, cyano, methylsulfonyl, methoxy Carbonyl, phenyl, methoxy, methylcarbonylamine, methylcarbonyl, carboxyl, N,N-dimethylaminocarbonyl, pyridine and pyrimidine.

In one aspect of the present invention, the compound may be selected from the group consisting of (4-(7-chloroquinolin-4-yl) piperazin-1-yl) (1-(phenylsulfonyl)piperidin-3-yl) methanone,
(4-(7-chloroquinolin-4-yl) piperazin-1-yl) (1-tosylpiperidin-3-yl) methanone,
(4-(7-chloroquinolin-4-yl) piperazin-1-yl) (1-((4-fluorophenyl) sulfonyl)piperidin-3-yl) methanone,
(4-(7-chloroquinolin-4-yl) piperazin-1-yl) (1-((4-(dimethylamino)phenyl) sulfonyl)piperidin-3-yl) methanone,
(4-(7-chloroquinolin-4-yl) piperazin-1-yl) (1-((4-hydroxyphenyl) sulfonyl)piperidin-3-yl) methanone,
(4-(7-chloroquinolin-4-yl) piperazin-1-yl) (1-((3-nitrophenyl) sulfonyl)piperidin-3-yl) methanone,
(4-(7-chloroquinolin-4-yl) piperazin-1-yl) (1-((4-(trifluoromethyl)phenyl) sulfonyl)piperidin-3-yl) methanone,
(4-(7-chloroquinolin-4-yl) piperazin-1-yl) (1-((3-fluorophenyl) sulfonyl)piperidin-3-yl) methanone,
(4-(7-chloroquinolin-4-yl) piperazin-1-yl) (1-((4-phenoxyphenyl) sulfonyl)piperidin-3-yl) methanone, 4-(3-(1-7-chloroquinolin-4-yl) piperazine-4-carbonyl)piperidin-1-ylsulfonyl)benzonitrile,
(4-(7-chloroquinolin-4-yl) piperazin-1-yl) (1-(4-methylsulfonyl)phenylsulfonyl)piperidin-3-yl) methanone,
methyl 4-(3-(1-(7-chloroquinolin-4-yl) piperazine-1-carbonyl)piperidin-1-yl) sulfonyl)benzoate,
(4-(7-chloroquinolin-4-yl) piperazin-1-yl) (1-(4-phenylbenzenesulfonyl)piperidin-3-yl) methanone,
(4-(7-chloroquinolin-4-yl) piperazin-1-yl) (1-(3-methoxyphenylsulfonyl)piperidin-3-yl) methanone, N-(4-((3-(4-(2-methylquinolin-4-yl) piperazin-1-carbonyl) piperidin-1-yl) sulfonyl)phenyl) acetamide,
(R)—N-(4-((3-(4-(2-methylquinolin-4-yl) piperazin-1-carbonyl)piperidin-1-yl) sulfonyl)phenyl) acetamide,
(S)—N-(4-((3-(4-(2-methylquinolin-4-yl) piperazin-1-carbonyl)piperidin-1-yl) sulfonyl)phenyl) acetamide,
(4-(2-methylquinolin-4-yl) piperazin-1-yl) (1-((4-nitrophenyl) sulfonyl)piperidin-3-yl) methanone,
(4-(2-methylquinolin-4-yl) piperazin-1-yl) (1-(phenylsulfonyl)piperidin-3-yl) methanone,
(4-(2-methylquinolin-4-yl) piperazin-1-yl) (1-tosylpiperidin-3-yl) methanone,
(4-(2-methylquinolin-4-yl) piperazin-1-yl) (1-(m-tosylsulfonyl)piperidin-3-yl) methanone,
(1-((3,4-dimethylphenyl) sulfonyl)piperidin-3-yl) (4-(2-methylquinolin-4-yl) piperazin-1-yl) methanone,
(1-(4-ethylphenylsulfonyl)piperidin-3-yl) (4-(2-methylquinolin-4-yl) piperazin-1-yl) methanone,
(1-((4-fluorophenyl) sulfonyl)piperidin-3-yl) (4-(2-methylquinolin-4-yl) piperazin-1-yl) methanone,
(1-((4-chlorophenyl) sulfonyl)piperidin-3-yl) (4-(2-methylquinolin-4-yl) piperazin-1-yl) methanone,
(4-2-methylquinolin-4-yl) piperazin-1-yl) (1-(4-(trifluorophenyl)phenylsulfonyl)piperidin-3-yl) methanone,
(1-(3-fluorophenylsulfonyl)piperidin-3-yl) (4-(2-methylquinolin-4-yl) piperazin-1-yl) methanone,
(4-(2-methylquinolin-4-yl) piperazin-1-yl) (1-(3-nitrophenylsulfonyl)piperidin-3-yl) methanone,
(1-(4-methoxyphenylsulfonyl)piperidin-3-yl) (4-(2-methylquinolin-4-yl) piperazin-1-yl) methanone,
(4-(2-methylquinolin-4-yl) piperazin-1-yl) (1-(pearlfluorophenylsulfonyl)piperidin-3-yl) methanone,
(1-(4-(dimethylamino)phenylsulfonyl)piperidin-3-yl) (4-(2-methylquinolin-4-yl) piperazin-1-yl) methanone,
(1-(4-hydroxyphenylsulfonyl)piperidin-3-yl) (4-(2-methylquinolin-4-yl) piperazin-1-yl) methanone,
(1-(2-fluorophenylsulfonyl)piperidin-3-yl) (4-(2-methylquinolin-4-yl) piperazin-1-yl) methanone,
(4-(2-methylquinolin-4-yl) piperazin-1-yl) (1-(4-phenoxyphenylsulfonyl)piperidin-3-yl) methanone, 4-(3-1-(2-methylquinolin-4-yl) piperazin-4-carbonyl)piperidin-1-ylsulfonyl)benzonitrile,
(4-(2-methylquinolin-4-yl) pyrezin-1-yl) (1-(4-(methylsulfonyl)phenylsulfonyl)piperidin-3-yl) methanone,
methyl 4-(3-(1-(2-methylquinolin-4-yl) piperazine-4-carbonyl)piperidin-1-ylsulfonyl)benzoate,
(4-(2-methylquinolin-4-yl) pyrezin-1-yl) (1-(4-phenylbenzenesulfonyl)piperidin-3-yl) methanone,
(1-(3-methoxyphenylsulfonyl)piperidin-3-yl) (4-(2-methylquinolin-4-yl) piperazin-1-yl) methanone,
(1-((4-bromophenyl) sulfonyl)piperidin-3-yl) (4-(2-methylquinolin-4-yl) piperazin-1-yl) methanone,
(4-(7-fluoroquinolin-4-yl) piperazin-1-yl) (1-(phenylsulfonyl)piperidin-3-yl) methanone,
(1-((4-fluorophenyl) sulfonyl)piperidin-3-yl) (4-(7-fluoroquinolin-4-yl) piperazin-1-yl) methanone,
(4-(7-fluoroquinolin-4-yl) piperazin-1-yl) (1-((4-hydroxyphenyl) sulfonyl)piperidin-3-yl) methanone,
(1-((4-(dimethylamino)phenyl) sulfonyl)piperidin-3-yl) (4-(7-fluoroquinolin-4-yl) piperazin-1-yl) methanone,
N-(4-(3-(1-(7-fluoroquinolin-4-yl) piperazine-4-carbonyl))piperidin-1-ylsulfonyl)phenyl) acetamide,
(R)—N-(4-(3-(1-(7-fluoroquinolin-4-yl) piperazin-4-carbonyl))piperidin-1-ylsulfonyl)phenyl) acetamide,
(S)—N-(4-(3-(1-(7-fluoroquinolin-4-yl) piperazin-4-carbonyl))piperidin-1-ylsulfonyl)phenyl) acetamide,
(R)-(1-((4-(dimethylamino)phenyl) sulfonyl)piperidin-3-yl) (4-(quinolin-4-yl) piperazin-1-yl) methanone,
(S)-(1-((4-(dimethylamino)phenyl) sulfonyl)piperidin-3-yl) (4-(quinolin-4-yl) piperazin-1-yl) methanone,
(4-(7-fluoroquinolin-4-yl) piperazin-1-yl) (1-(4-nitrophenylsulfonyl)piperidin-3-yl) methanone,
(4-(7-fluoroquinolin-4-yl) piperazin-1-yl) (1-(3-nitrophenylsulfonyl)piperidin-3-yl) methanone,
(1-(4-(diethylamino)phenyl) sulfonyl)piperidin-3-yl) (4-(7-fluoroquinolin-4-yl) piperazin-1-yl) methanone,
(4-(7-fluoroquinolin-4-yl) piperazin-1-yl) (1-(4-methoxyphenylsulfonyl)piperidin-3-yl) methanone, 1-(4-(3-(1-fluoroquinolin-4-yl) piperazine-4-carbonyl)piperidin-1-ylsulfonyl)phenyl) ethanone,
(4-(7-fluoroquinolin-4-yl) pyrezin-1-yl) (1-(4-phenylbenzenesulfonyl)piperidin-3-yl) methanone,
(1-(4-bromophenylsulfonyl)piperidin-3-yl) (4-7-fluoroquinolin-4-yl) piperazin-1-yl) methanone,
(R)-(1-(4-bromophenylsulfonyl)piperidin-3-yl) (4-7-fluoroquinolin-4-yl) piperazin-1-yl) methanone,
(4-(7-fluoroquinolin-4-yl) piperazin-1-yl) (1-(3-methoxyphenylsulfonyl)piperidin-3-yl) methanone,
(R)—N-(3-(3-(1-(7-fluoroquinolin-4-yl) piperazin-4-carbonyl))piperidin-1-ylsulfonyl)phenyl) acetamide,
(R)-(4-(7-fluoroquinolin-4-yl) piperazin-1-yl) (1-(3-nitrophenylsulfonyl)piperidin-3-yl) methanone,
(R)-(1-((3-(dimethylamino)phenyl) sulfonyl)piperidin-3-yl) (4-(quinolin-4-yl) piperazin-1-yl) methanone,
(1-(3-bromophenylsulfonyl)piperidin-3-yl) (4-7-fluoroquinolin-4-yl) piperazin-1-yl) methanone,
N-(4-(3-(1-(2-(trifluoromethyl)quinolin-4-yl) piperazin-4-carbonyl)piperidin-1-ylsulfonyl)phenyl) acetamide,
(1-(phenylsulfonyl)piperidin-3-yl) (4-(2-(trifluoromethyl)quinolin-4-yl) piperazin-1-yl) methanone,
(1-tosylpiperidin-3-yl) (4-(2-(trifluoromethyl)quinolin-4-yl) piperazin-1-yl) methanone,
(1-(4-fluorophenylsulfonyl)piperidin-3-yl) (4-(2-(trifluoromethyl)quinolin-4-yl) piperazin-1-yl) methanone,
(1-(4-(dimethylamino)phenylsulfonyl)piperidin-3-yl) (4-(2-(trifluoromethyl)quinolin-4-yl) piperazin-1-yl) methanone,
(1-(4-hydroxyphenylsulfonyl)piperidin-3-yl) (4-(2-(trifluoromethyl)quinolin-4-yl) piperazin-1-yl) methanone,
(R)-(1-(4-hydroxyphenylsulfonyl)piperidin-3-yl) (4-(2-(trifluoromethyl)quinolin-4-yl) piperazin-1-yl) methanone,
(S)-(1-(4-hydroxyphenylsulfonyl)piperidin-3-yl) (4-(2-(trifluoromethyl)quinolin-4-yl) piperazin-1-yl) methanone,
(1-(4-(trifluoromethyl)phenylsulfonyl)piperidin-3-yl) (4-(2-(trifluoromethyl)quinolin-4-yl)piperazin-1-yl)methanone,
(1-(3-fluorophenylsulfonyl)piperidin-3-yl) (4-(2-(trifluoromethyl)quinolin-4-yl) piperazin-1-yl) methanone,
(1-(pearlfluorophenylsulfonyl)piperidin-3-yl) (4-(2-(trifluoromethyl)quinolin-4-yl) piperazin-1-yl) methanone,
(1-(phenylsulfonyl)piperidin-3-yl) (4-(quinolin-4-yl) piperazin-1-yl) methanone,
(1-(4-fluorophenyl)piperidin-3-yl) (4-(quinolin-4-yl) piperazin-1-yl) methanone,
(1-((4-hydroxyphenyl) sulfonyl)piperidin-3-yl) (4-(quinolin-4-yl) piperazin-1-yl) methanone,
(1-(4-(dimethylamino)phenylsulfonyl)piperidin-3-yl) (4-(quinolin-4-yl) piperazin-1-yl) methanone,
N-(4-((3-(4-(quinolin-4-yl) piperazine-1-carbonyl)piperidin-1-yl) sulfonyl)phenyl) acetamide,
(R)-(1-(4-(dimethylamino)phenylsulfonyl)piperidin-3-yl) (4-(quinolin-4-yl) piperazin-1-yl) methanone,
(S)-(1-(4-(dimethylamino)phenylsulfonyl)piperidin-3-yl) (4-(quinolin-4-yl) piperazin-1-yl) methanone, (1-(4-nitrophenylsulfonyl)piperidin-3-yl) (4-(quinolin-4-yl) piperazin-1-yl) methanone,
(1-(3-nitrophenylsulfonyl)piperidin-3-yl) (4-(quinolin-4-yl) piperazin-1-yl) methanone,
(1-(4-(diethylamino)phenylsulfonyl)piperidin-3-yl) (4-(quinolin-4-yl) piperazin-1-yl) methanone,
(4-(quinolin-4-yl) pyrezin-1-yl) (1-(4-phenylbenzenesulfonyl)piperidin-3-yl) methanone,
(1-(4-bromophenylphenylsulfonyl)piperidin-3-yl) (4-(quinolin-4-yl) piperazin-1-yl) methanone,
(1-(3-Methoxyphenylphenylsulfonyl)piperidine-3-yl) (4-(quinolin-4-yl) piperazin-1-yl) methanone,
N-(4-(3-(1-(7-methoxyquinolin-4-yl) piperazin-4-carbonyl))piperidin-1-ylsulfonyl)phenyl) acetamide,
(4-(7-methoxyquinolin-4-yl) piperazin-1-yl) (1-tosylpiperidin-3-yl) methanone,
(1-(4-fluorophenyl) sulfonyl)piperidin-3-yl) (4-(7-methoxyquinolin-4-yl) piperazin-1-yl) methanone,
(1-(4-(dimethylamino)phenylsulfonyl)piperidin-3-yl) (4-(7-methoxyquinolin-4-yl) piperazin-1-yl) methanone,
(1-(4-hydroxyphenylsulfonyl)piperidin-3-yl) (4-(7-methoxyquinolin-4-yl) piperazin-1-yl) methanone,
(4-(7-chloroquinolin-4-yl) piperazin-1-yl) (1-(3-hydroxyphenylsulfonyl)piperidin-3-yl) methanone,
(1-(3-hydroxyphenylsulfonyl)piperidin-3-yl) (4-(2-methylquinolin-4-yl) piperazin-1-yl) methanone,
(4-(7-fluoroquinolin-4-yl) (1-(3-hydroxyphenylsulfonyl)piperidin-3-yl) methanone,
(1-(3-hydroxyphenylsulfonyl)piperidin-3-yl) (4-(quinolin-4-yl) piperazin-1-yl) methanone,
(1-((4-aminophenyl) sulfonyl)piperidin-3-yl) (4-(2-methylquinolin-4-yl) piperazin-1-yl) methanone,
(1-((4-aminophenyl) sulfonyl)piperidin-3-yl) (4-(quinolin-4-yl) piperazin-1-yl) methanone,
4-(3-(1-(7-chloroquinolin-4-yl) piperazin-1-carbonyl)piperidin-1-yl) sulfonyl)benzoic acid,
4-(3-(1-7-chloroquinolin-4-yl) piperazine-4-carbonyl)piperidin-1-ylsulfonyl)-N,N-dimethylbenzamide,
4-(3-(1-(2-methylquinolin-4-yl) piperazine-4-carbonyl)piperidin-1-ylsulfonyl)benzoic acid,
N,N-dimethyl-4-(3-(1-(2-methylquinolin-4-yl) piperazin-4-carbonyl)piperidin-1-ylsulfonyl)benzamide,
(4-(2-methylquinolin-4-yl) piperazin-1-yl) (1-((4-(pyridin-4-yl)phenyl) sulfonyl)piperidin-3-yl) methanone,
(4-(2-methylquinolin-4-yl) piperazin-1-yl) (1-((4-(pyrimidin-5-yl)phenyl) sulfonyl)piperidin-3-yl) methanone,
(1-((4-(2-methylpyrimidin-5-yl)phenyl) sulfonyl)piperidin-4-yl) (4-(2-methylquinolin-4-yl)phenyl) piperazin-1-yl) methanone,
(4-(2-methylquinolin-4-yl) piperazin-1-yl) (1-((4-(pyridin-3-yl)phenyl) sulfonyl)piperidin-3-yl) methanone,
(4-(7-fluoroquinolin-4-yl) piperazin-1-yl) (1-(4-(pyridin-4-)phenylsulfonyl)piperidin-3-yl) methanone,
(R)-(4-(7-fluoroquinolin-4-yl) piperazin-1-yl) (1-(4-(pyridin-4-yl)phenylsulfonyl)piperidin-3-yl) methanone,
(4-(7-fluoroquinolin-4-yl) piperazin-1-yl) (1-(4-(pyridin-3-)phenylsulfonyl)piperidin-3-yl) methanone,
(4-(7-fluoroquinolin-4-yl) piperazin-1-yl) (1-(3-(pyridin-4-yl)phenylsulfonyl)piperidin-3-yl) methanone,
(4-(7-fluoroquinolin-4-yl) piperazin-1-yl) (1-(3-(pyridin-3-yl)phenylsulfonyl)piperidin-3-yl) methanone,
(4-(7-fluoroquinolin-4-yl) piperazin-1-yl) (1-(4-(pyrimidine-5-)phenylsulfonyl)piperidin-3-yl) methanone,
(4-(7-fluoroquinolin-4-yl) piperazin-1-yl) (1-(3-(pyrimidine-5-)phenylsulfonyl)piperidin-3-yl) methanone,
(1-(4-(pyridin-4-yl)phenylsulfonyl)piperidin-3-yl) (4-(quinolin-4-yl) piperazin-1-yl) methanone,
(1-(4-(pyridin-3-yl)phenylsulfonyl)piperidin-3-yl) (4-(quinolin-4-yl) piperazin-1-yl) methanone,
(1-(4-(2-methylpyrimidin-5-yl)phenylsulfonyl)piperidin-3-yl) (4-(quinolin-4-yl) piperazin-1-yl) methanone,
N-(4-((3-(4-(7-chloroquinolin-4-yl) piperazin-1-carbonyl) piperidin-1-yl) sulfonyl)phenyl) acetamide and (4-(7-chloroquinolin-4-yl) piperazin-1-yl) (1-((4-nitrophenyl) sulfonyl)-piperidin-3-yl) methanone.

In one aspect of the present invention, it may be understood that any of the compounds of Formula (I) provided herein contain one or more chiral centers and thus exist in two or more stereoisomeric forms. Racemates of these isomers, individual isomers and mixtures concentrated in one enantiomer, diastereomers having two chiral centers, and mixtures partially concentrated in specific diastereomers are included within the scope of the present invention. Those skilled in the art will understand that the present invention includes all individual stereoisomers (e.g., enantiomers), racemic mixtures or partially resolved mixtures of the compounds of Formula (I) and, as appropriate, individual tautomers.

In one embodiment of the present invention, the present invention provides compounds comprising various stereoisomeric purities, ie, diastereomeric or enantiomeric purities, with various "ee" or "de". In some embodiments, the compound of Formula (I) has an enantiomeric purity of at least 60% ee (e.g., 60%, 65%, 70%, 75%, 80%, 85%, 90%, 91%, 92%, 93%, 94%, 95%, 96%, 97%, 98%, 99%, 99.5%, 99.9% ee, or a range between these enumerated values). In some embodiments, the compound of Formula (I) has greater than 95% ee and up to 99.9% ee up to enantiomeric purity. In some embodiments, a compound of Formula (I) (e.g., as described herein) has a diastereomeric purity of at least 60% de. (e.g., 60%, 65%, 70%, 75%, 80%, 85%, 90%, 91%, 92%, 93%, 94%, 95%, 96%, 97%, 98%, 99%, 99.5%, 99.9% de, or a range between these enumerated values) In some embodiments, the compound of Formula I (e.g., as described herein) has a diastereomeric purity of greater than 99.9% de.

In the present invention, the term 'enantiomeric excess' or 'ee' refers to how much of one enantiomer is present compared to another component. In a mixture of R and S enantiomers, it is defined as the percentage of enantiomeric excess, where R and S represent the molar or weight ratio of each of the enantiomers in the mixture and R+S=1. According to the knowledge of the optical rotation of chiral substances, the percent enantiomeric excess is defined as ([a] obs/[a] max)*100, where [a] obs is the optical rotation of the enantiomer mixture and [a] max is the optical rotation of the pure enantiomer.

In the present invention, the term 'diastereomeric excess' or 'de' refers to how much one diastereomer exists compared to another component, and is defined similarly to the case of enantiomeric excess above. Thus, for a mixture of diastereomers D1 and D2, it is defined as the percentage of diastereomeric excess, where D1 and D2 are moles or weight ratios of each of the diastereomers in the mixture, and D1+D2=1.

In one embodiment of the present invention, the racemate may be used as it is or resolved into each individual isomer. Decomposition may give stereochemically pure compounds or concentrated mixtures of one or more isomers. Isomer separation methods are known in the art and include physical methods such as chromatography using chiral adsorbents. Each isomer can be prepared in chiral form from a chiral precursor. Alternatively, diastereomeric salts such as individual enantiomers such as 10-camphorsulfonic acid, camphoric acid, alpha-bromocamphoric acid, tartaric acid, diacetyltartaric acid, malic acid, pyrrolidone-5-carboxylic acid are formed together with chiral acids, and the salts are fractionally crystallized, liberate one or both of the degraded bases, optionally by repeating the above process the individual isomers can be chemically separated from the mixture, and it is thus possible to obtain substantially either or both of these stereoisomers free, ie in the form, for example, having an optical purity of at least 91%, 92%, 93%, 94%, 95%, 96%, 97%, 98%, 99% or 99.5% by weight. Alternatively, as is known to those skilled in the art, the chiral auxiliary is chemically removed to give the pure enantiomer, then racemates can be covalently linked to chiral compounds (supplementary) to generate diastereomers that can be separated by chromatography or fractional crystallization.

In one aspect of the present invention, the compound of Formula (I) provided by the present invention includes a salt form thereof, and the salt may preferably be in the form of a pharmaceutically acceptable salt.

In the present invention, the pharmaceutically acceptable salt means a group of compounds represented by the Formula (I), which is pharmaceutically acceptable and has a desired pharmacological activity as defined above.

Examples of such salts include, but are not limited to, acid addition salts formed with inorganic acids [for example, hydrochloric acid, hydrobromic acid, sulfuric acid, phosphoric acid, nitric acid, etc.], and salts formed with acetic acid, oxalic acid, tartaric acid, succinic acid, malic acid, fumaric acid, maleic acid, ascorbic acid, benzoic acid, tannic acid, pamoic acid, alginic acid, polyglutamic acid, naphthalene sulfonic acid, naphthalene disulfonic acid, and organic acids such as poly-galacturonic acid. The compounds may also be administered in the form of pharmaceutically acceptable quaternary salts known to those skilled in the art, in particular including chloride, bromide, iodide, —O-alkyl, toluenesulfonate, methylsulfonate, sulfonate, phosphate, or carboxylate (e.g., benzoate, succinate, acetate, glycorate, maleate, malate, fumarate, citrate, tartrate, ascorbate, cinnamoate, mandeloate and diphenylacetate).

On the other hand, the present invention also provides, for synthesizing the intermediate of Formula (I), a method for preparing a novel quinoline compound according to the present invention, comprising (a) reacting a compound of Formula (i) with piperidine to prepare a compound of Formula (ii); (b) reacting a compound of Formula (ii) with a compound of Formula (iii) to prepare a compound of Formula (iv); and (c) reacting a compound of Formula (iv) with trifluoroacetic acid (TFA) to prepare a compound of Formula (v) and reacting it with Formula (vi);

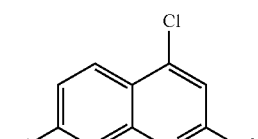

<Formula i>

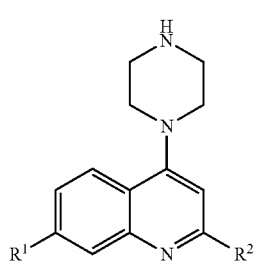

<Formula ii>

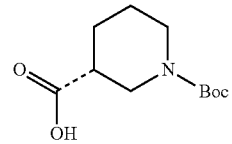

<Formula iii>

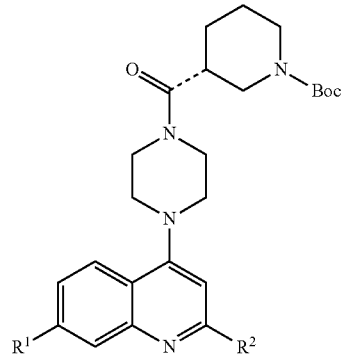

<Formula iv>

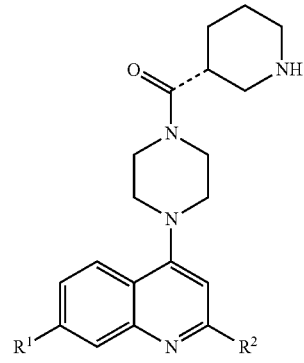

<Formula v>

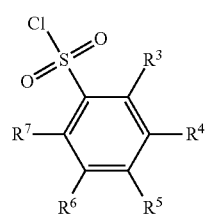

<Formula vi>

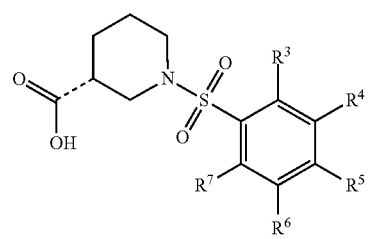

<Formula vii> in the above Formula, $R^1$ to $R^7$ are as defined in claim 1 above.

In the present invention, the preparation method can be summarized in Reaction Formula 1-1 and Reaction Formula 2 below.

[Reaction Formula 1-1]

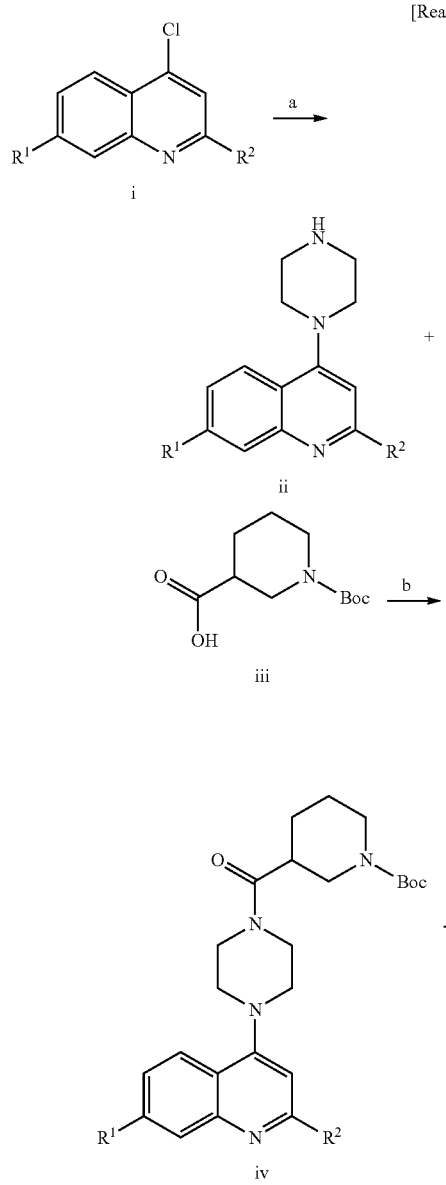

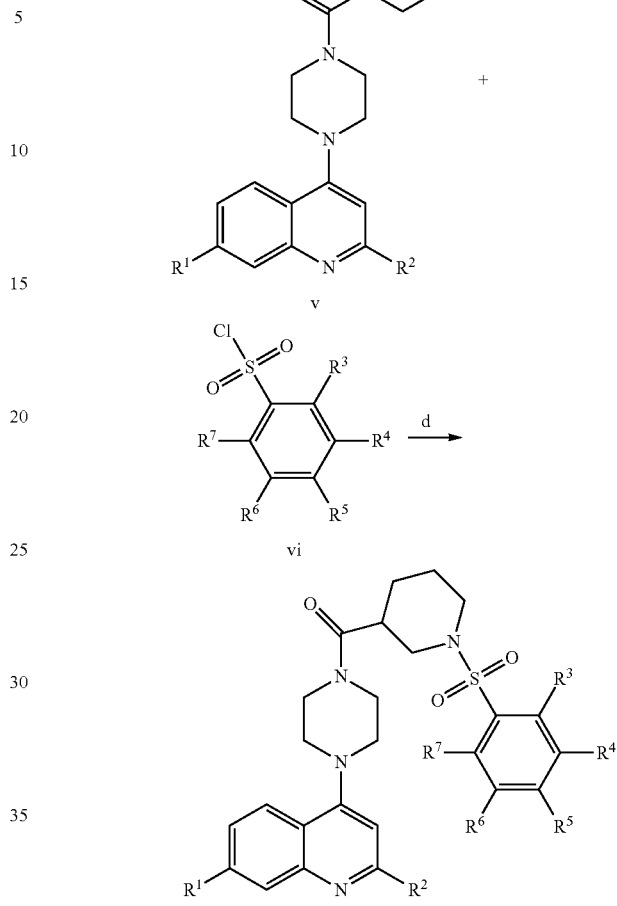

Reaction conditions, a) EtOH, 80-90° C., 12-24 hr. b) HATU, DIEA, DMF, rt, 2-4 hr. c) TFA, DCM, 20-40° C., 1-3 hr. d) TEA or DIEA, DCM, rt, 2-12 hr.

Reaction conditions, a) EtOH, 80-90° C., 12-24 hr. b) HATU, DIEA, DMF, rt, 2-4 hr. c) TFA, DCM, 20-40° C., 1-3 hr. d) TEA or DIEA, DCM, rt, 2-12 hr.

An example of a method for preparing the compound of Formula (I) according to Reaction Formula 1-1 is specifically presented in the examples of the present invention.

[Reaction Formula 2]

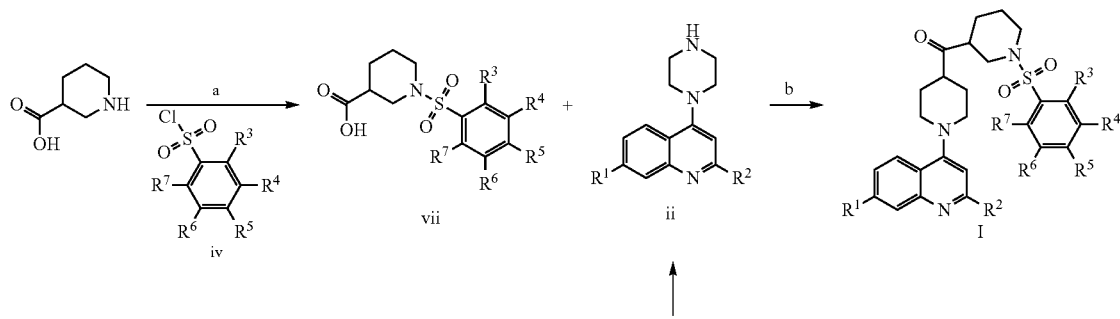

-continued

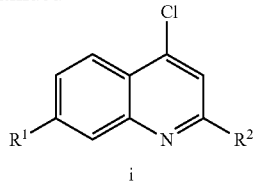

i

Reaction conditions, a) TEA or DIEA, DCM, rt, 2-12 hr. b) EDC, HOBT, DIEA, DMF, rt, 2-4 hr.

Reaction conditions, a) TEA or DIEA, DCM, rt, 2-12 hr. b) EDC, HOBT, DIEA, DMF, rt, 2-4 hr.

An example of a method for preparing the compound of Formula (I) according to Reaction Formula 2 is specifically presented in the examples of the present invention.

Specifically, in step a) in Reaction Formula 1-1, intermediate compound No. 2 was prepared through the reaction of piperazine with chloro at the 4-position of the quinoline substituted with $R^1$ and $R^2$ in an ethanol solvent. Step b) in Reaction Formula 1 uses 1-[Bis(dimethylamino)methylene]-1H-1,2,3-triazolo[4,5-b]pyridinium 3-oxide hexafluorophosphate (hereinafter HATU) to form an amide bond, an amide bond was formed using compound 2 synthesized or commercially available in step a) and 1-(tert-butoxycarbonyl) piperidine-3-carboxylic acid, or (R)-1-(tert-butoxycarbonyl)piperidine-3-carboxylic acid, or(S)-1-(tert-butoxycarbonyl)piperidine-3-carboxylic acid. In Reaction Formula 1, step c) was performed using trifluoroacetic acid (TFA) in dichloromethane (hereinafter DCM) solvent to remove tert-butyloxycarbonyl (tert-Butyloxycarbonyl, hereinafter Boc). Step d) in Reaction Formula 1-1 is a method of synthesizing the compound of Formula I through a substitution reaction of sulfonyl chloride and piperidine.

After forming a sulfonamide compound (Formula viii) by reacting with sulfonyl chloride (Formula iv) and 1-(tert-butoxycarbonyl)piperidine-3-carboxylic acid, or (R)-1-(tert-butoxycarbonyl)piperidine-3-carboxylic acid, or(S)-1-(tert-butoxycarbonyl) piperidine-3-carboxylic acid in a dichloromethane (DCM) solvent in step a) of Reaction Formula 2, the target compound, Formula (I), was synthesized through the amide coupling reaction with Formula ii. For the amide coupling reaction used in this case, 1-Ethyl-3-(3-dimethylaminopropyl) carbodiimide (hereinafter EDC) and Hydroxybenzotriazole (hereinafter HOBT) were used.

In addition, the target compound corresponding to Reaction Formula (I) could be prepared through the following Reaction Formula 1-2, 1-3, 1-4, and 1-5, and examples of the preparing method are specifically presented in the examples of the present invention.

[Reaction Formula 1-2]

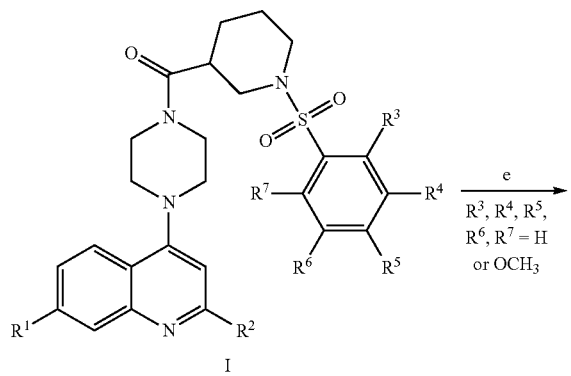

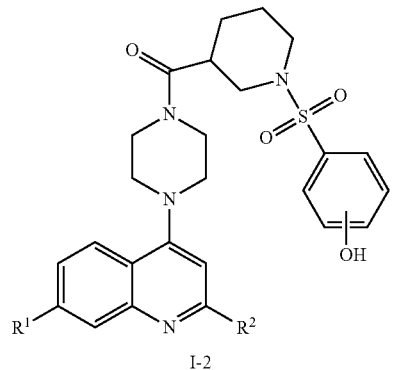

Reaction conditions, e) BBr3/DCM, 70° C.-rt, 3-5 hr.

Reaction conditions, e) BBr3/DCM, 70° C.-rt, 3-5 hr.

Specifically, in step e) of Reaction Formula 1-2, when $R^3$, $R^4$, $R^5$, $R^6$, $R^7$ are hydrogen or a methoxy group, the substituted methoxy group was converted to a hydroxyl group using Boron tribromide (BBr3).

[Reaction Formula 1-3]

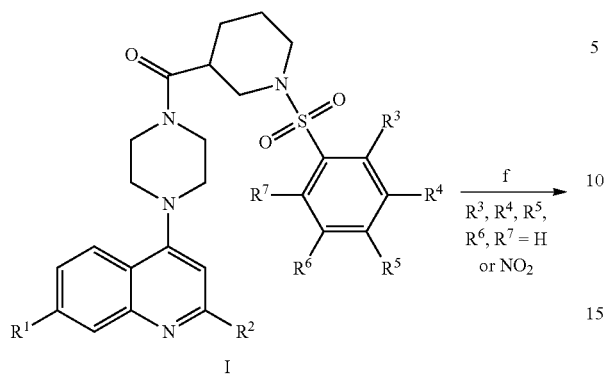

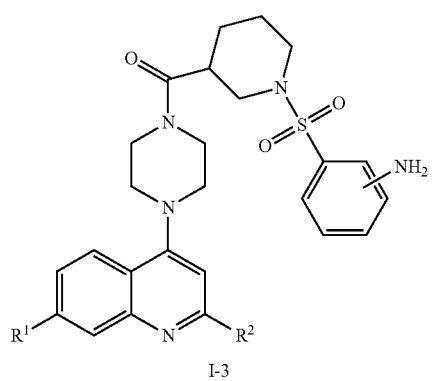

Reaction conditions, f) Pd/C, MeOH, rt, 3-5 hr.

Specifically, in step f) of Reaction Formula 1-3, when $R^3$, $R^4$, $R^5$, $R^6$, $R^7$ are hydrogen or a nitro group, the hydrogenation reaction using a palladium catalyst converted the nitro group into an amine group.

[Reaction Formula 1-4]

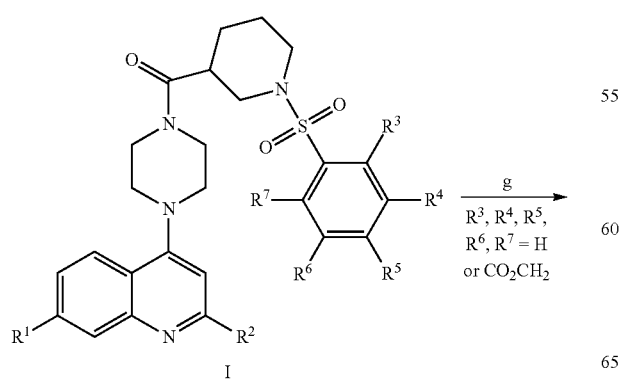

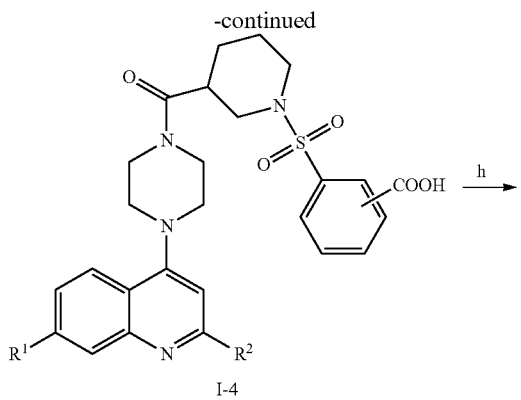

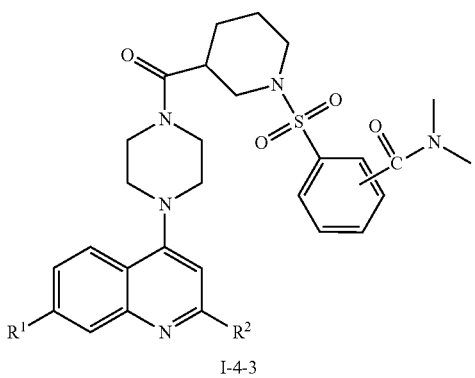

Reaction conditions, g) LiOH, MeOH, 70° C., 1-2 hr. h) Dimethylamine, DIEA, HATU, DMF, rt, 3-6 hr.

Specifically, in the Reaction Formula 1-4, when $R^3$, $R^4$, $R^5$, $R^6$, $R^7$ are hydrogen or methyl ester, the ester is hydrolyzed in step g) to prepare a carboxyl acid compound, and in step h) the carboxylic acid to prepare an amide compound through a coupling reaction.

[Reaction Formula 1-5]

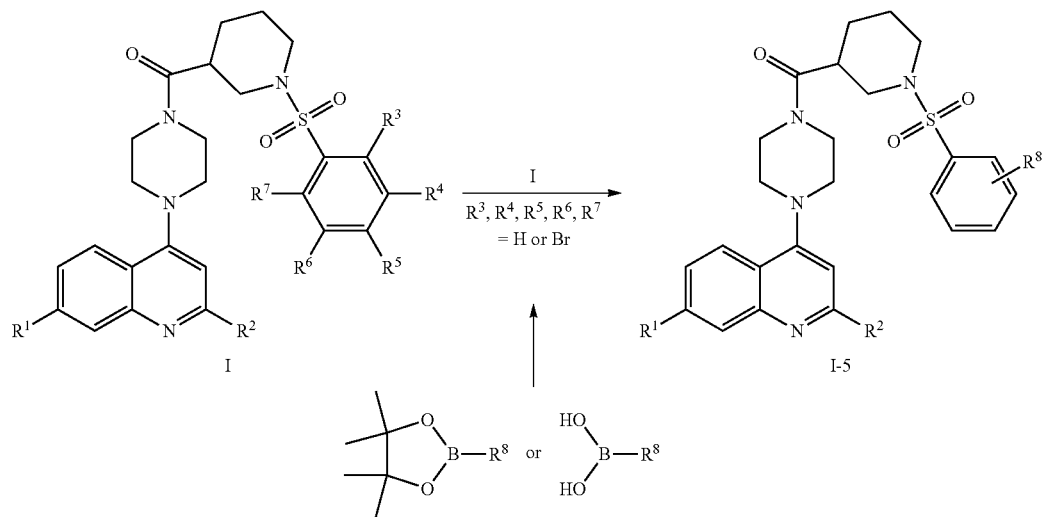

Reaction conditions, i)Pd(dppf)Cl₂, Na₂CO₃, 70 - 100° C., 4-12 hr.

Specifically, when $R^3$, $R^4$, $R^5$, $R^6$, $R^7$ are hydrogen or bromo (Br) in step i) of Reaction Formula 1-4, 1,1'-bis (diphenylphosphino) ferrocene]dichloropalladium (II) (hereinafter, Pd (dppf) Cl₂) was reacted with a reagent in the form of dioxaboronlan or boronic acid to undergo carbon-carbon bonding to synthesize a compound (Formula 1-5).

The Formula 1-5 is a compound included in the definition of Formula 1, the $R^8$ in Formula 1-5 belongs to $R^3$, $R^4$, $R^5$, $R^6$, and $R^7$ as defined in Formula 1, preferably there are unsubstituted or substituted phenyl, and unsubstituted or substituted heteroaryl at the $R^5$ position, preferably there are unsubstituted phenyl and substituted heteroaryl with a hexagonal ring. More preferably, there are unsubstituted phenyl, unsubstituted pyridine, unsubstituted pyrimidine, and alkyl-substituted pyrimidine.

For the reagents used in the Reaction Formula 1-1, 1-2, 1-3, 1-4, 1-5, and Reaction Formula 2, commercially available reagents were used and, if necessary, synthesized and used. As the solvent used in the Reaction Formula 1 and 2, a commercially available solvent was used, and it is not particularly limited as long as it dissolves the starting material and does not inhibit the reaction, for example, tetrahydrofuran, an ether solvent such as 1,2-dimethoxyethane, diethyl ether or dioxane; aromatic hydrocarbon solvents such as benzene, toluene or xylene; amide solvents such as N,N-dimethylformamide, N,N-dimethylacetamide or N-methylpyrrolidone; organic solvents such as dimethyl sulfoxide; alcohol solvents such as methanol, ethanol, propanol, n-butanol or t-butanol; or a mixture thereof or a mixed solvent of the solvent and water may be used. Preferably, a mixed solvent of ethanol or tetrahydrofuran (THF) and water may be used, but is not limited thereto.

The present invention also provides, as a novel compound, a composition for preventing, improving or treating a metabolic disease comprising a quinolone compound represented by the following Formula (I), a racemic compound, a diastereomer, a geometric isomer, a stereoisomer, a hydrate, or a pharmaceutically acceptable salt thereof as an active ingredient:

<Formula I>

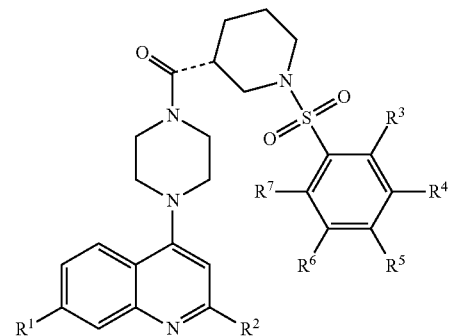

wherein $R^1$ and $R^2$ are each independently selected from the group consisting of hydrogen, halo, haloalkane, hydroxy, carboxyl, carbonyl, amino, amide, cyano, nitro, alkyl, alkenyl, alkynyl and alkoxy, wherein $R^3$, $R^4$, $R^5$, $R^6$ and $R^7$ are each independently selected from the group consisting of hydrogen, halo, haloalkane, hydroxy, carboxyl, carbonyl, amino, amide, sulfonyl, cyano, nitro, alkyl, alkenyl, alkynyl, alkoxy, phenoxy, substituted or unsubstituted phenyl, and substituted or unsubstituted heteroaryl.

In the present invention, the term 'pharmaceutically acceptable' means that it is useful for preparing a generally safe, non-toxic, and biologically desirable pharmaceutical composition, and is useful not only for veterinary use but also for human pharmaceutical use.

In the present invention, the pharmaceutically acceptable salt means a salt of the compound represented by Formula 1 (in particular, the most preferred example is a compound of Formula 1-1 or Formula 1-2), which is pharmaceutically acceptable and has a desired pharmacological activity as defined above. Examples of such salts include, but are not limited to, acid addition salts formed with inorganic acids (e.g., hydrochloric acid, hydrobromic acid, sulfuric acid, phosphoric acid, nitric acid, etc.).], and salts formed with organic acids such as acetic acid, oxalic acid, tartari acid, succinic acid, malic acid, fumaric acid, maleic acid, ascorbic acid, benzoic acid, tannic acid, pamoic acid, alginic acid, polyglutamic acid, naphthalene sulfonic acid, naphthalene naphthalene disulfonic acid, and poly-galacturonic acid. The compounds may also be administered in the form of pharmaceutically acceptable quaternary salts known to those skilled in the art, in particular chloride, bromide, iodide, —O-alkyl, toluenesulfonate, methylsulfonate, sulfonate, phosphate, or carboxylates (e.g., benzoates, succinates, acetates, glycorates, maleates, malates, fumarates, citrates, tartrates, ascorbates, cinnamoates, mandelo ate and diphenylacetate) are included.

The present inventors was confirmed that the compound represented by the Formula (I) has superior CYP4A inhibitory effects than HET0016 (N-hydroxy-N'-(4-butyl-2-methylphenyl)-formamidine), which is known as a cytochrome P450 4A (CYP4A)-specific inhibitor, and it can exhibit remarkably a preventive, therapeutic or ameliorating effect on metabolic diseases, for example, diabetes and fatty liver disease.

Specifically, the present inventors confirmed that inhibition of cytochrome P450 4A (CYP4A) is a potent therapeutic target for hepatic insulin resistance and apoptosis induced by ER stress through previous studies (Korean Patent Registration 10-1235811). In the mammalian liver, the cytochrome P450 enzyme family (CYP450s) is mainly localized in the ER membrane. The present inventors have been confirmed that CYP4A inhibitors suppress the stress of the endoplasmic reticulum, reduce the blood insulin concentration, and it can be used as a pharmaceutical composition for preventing or treating obesity-derived diabetes and fatty liver by showing a mechanism for inhibiting apoptosis of liver cells through the previous study.

Accordingly, the present invention provides a pharmaceutical composition for preventing or treating metabolic diseases, comprising the compound of Formula (I) or a pharmaceutically acceptable salt thereof as an active ingredient.

In the present invention, the treatment may mean, unless otherwise stated, reversing, alleviating, inhibiting the progression of, or preventing the disease or condition to which the term applies, or one or more symptoms of the disease or condition.

Metabolic disease (or metabolic syndrome) refers to a group of diseases in which various metabolic abnormalities occur in combination, including obesity, type 2 diabetes caused by insulin resistance, and risk factors for various metabolic-related cardiovascular diseases. This is a useful concept that can encompass and explain insulin resistance and its related complex and various metabolic abnormalities and clinical features. In the present invention, it refers to a disease or syndrome in which risk factors such as obesity, diabetes, fatty liver disease, etc. increase together.

In the present invention, the term 'metabolic disease' may include, but is not limited to, diabetes or fatty liver disease.

In the present invention, "diabetes" is a chronic disease characterized by abnormal glucose metabolism. The diabetes is either a result of an absolute deficiency in the production of insulin, the most important hormone that regulates blood glucose levels (insulin-dependent diabetes mellitus or type 1 diabetes), or is caused by a result of a decrease in the action of insulin in a target organ (non-insulin-dependent diabetes mellitus) or type 2 diabetes).

Preferably, diabetes in the present invention refers to non-insulin-dependent diabetes mellitus (type 2 diabetes). The non-insulin-dependent diabetes mellitus generally exhibits abnormalities in glucose metabolism and lipid metabolism. That is, in the case of the non-insulin-dependent diabetes mellitus, insulin secretion is delayed or a sufficient amount is not secreted after food intake, so glucose production in the liver does not decrease, and the utilization of blood sugar by peripheral tissues such as muscle, liver, and fat does not increase. The postprandial hyperglycemia caused by this always stimulates insulin secretion, resulting in chronic hyperinsulinemia. If this condition continues, the beta cells can no longer maintain the increased rate of insulin secretion, ultimately resulting in insulin resistance. Persistent insulin resistance leads to problems with insulin production, leading to hypoinsulinemia. In particular, a decrease in the ratio of insulin to glucagon increases hepatic gluconeogenesis.

In addition, an increase in blood free fatty acids has been suggested as a cause of insulin resistance. An increase in free fatty acids in the blood increases the blood glucose level by inhibiting glucose utilization by insulin in peripheral tissues and interfering with gluconeogenesis in liver tissues. In the non-insulin-dependent diabetes mellitus, not only an increase in free fatty acids in the blood but also an increase in blood cholesterol and triglycerides and a decrease in HDL-cholesterol appear. The incidence of such dyslipidemia is 2 to 4 times higher than that of normal people.

Meanwhile, studies related to diabetes and diabetic complications have reported that diabetes is closely related to oxidative stress. Chronic hyperglycemia seen in diabetes increases the production of free radicals by various pathways such as auto-oxidation of glucose and protein glycation, and oxidative stress is increased by these highly reactive substances. Moreover, the expression and activity of antioxidant enzymes are insufficient to defend against oxidative stress induced by hyperglycemia, and the antioxidant enzyme activity is abnormally increased, and the balance maintained between these enzymes is broken.

In one embodiment of the present invention, it was confirmed that the compounds of the present invention can alleviate oxidative stress caused by diabetes and high blood sugar. That is, the compounds exhibited the effect of promoting blood glucose absorption into hepatocytes, and it was confirmed that there is an effect of suppressing the generation of reactive oxygen species (ROS) and removing ROS due to endoplasmic reticulum stress.

Meanwhile, in the present invention, the term 'fatty liver disease' may refer to a group of diseases encompassing all aspects of the disease from fatty liver to steatohepatitis to fatty liver-associated cirrhosis.

The above-mentioned 'fatty liver' is caused by the accumulation of fat in the liver due to excessive fat or alcohol intake, increased fat synthesis in the liver, excretion of triglycerides, and decreased burning, in general, fatty liver is defined when the proportion of fat accumulated in the liver is more than 5%. Most of the fat accumulated in the fatty liver is triglycerides.

Fatty liver can be divided into alcoholic fat caused by excessive drinking and non-alcoholic fatty liver caused by liver and obesity, diabetes, hyperlipidemia, or drugs. Alcoholic fatty liver occurs because excessive alcohol intake promotes fat synthesis in the liver and prevents normal energy metabolism. On the other hand, nonalcoholic fatty liver occurs more frequently in people suffering from obesity, insulin intolerance, and diabetes. This phenomenon suggests that nonalcoholic fatty liver may be caused by an increase in the concentration of free fatty acids in the blood due to insulin resistance or excessive lipolysis (ABMayerson et al., Diabetes, 51:797-802 (2002); K F Petersen et al., Diabetes, 54:603-608 (2005)).

In the present invention, the fatty liver may be any one or more selected from the group consisting of alcoholic fatty liver, non-alcoholic fatty liver, nutritive fatty liver, starvation fatty liver, obese fatty liver, and diabetic fatty liver, preferably, it may be non-alcoholic fatty liver, obese fatty liver, or diabetic fatty liver, and most preferably, it may be diabetic fatty liver, but is not limited thereto.

In the present invention, the term 'steatohepatitis' refers to a case of inflammatory findings or fibrotic lesions accompanied by hepatocyte damage (balloon degeneration) while showing fat deposition in the liver. It is used to distinguish it from 'fatty liver', which is a case in which fat deposition in the liver is shown but liver cell damage (balloon degeneration) and fibrosis are not found.

In the present invention, the term 'fatty liver-associated cirrhosis' refers to liver cirrhosis accompanied by histological findings of fatty liver or steatohepatitis, or cirrhosis occurring in a patient with fatty liver or steatohepatitis histologically proven in the past.

In one preferred embodiment (embodiment), fatty liver disease of the present invention means 'non-alcoholic fatty liver disease'. The non-alcoholic fatty liver disease is meant to include non-alcoholic fatty liver, non-alcoholic steatohepatitis, and non-alcoholic fatty liver-associated cirrhosis, and if it is known in the art as the disease group, the type is not limited thereto.

In addition, in the pharmaceutical composition according to the present invention, the quinolone compound represented by Formula (I), a racemic compound, a diastereomer, a geometric isomer, a stereoisomer, a hydrate or a pharmaceutically acceptable salt thereof may be administered in various oral and parenteral Formulations during clinical administration. In the case of Formulation, it can be prepared using commonly used diluents or excipients such as fillers, extenders, binders, wetting agents, disintegrants, and surfactants.

Solid preparations for oral administration include tablets, patients, powders, granules, capsules, troches, etc., such a solid preparation may be prepared by mixing one or more compounds of Formula 1 or a pharmaceutically acceptable salt thereof of the present invention with at least one excipient, for example, starch, calcium carbonate, sucrose or lactose or gelatin etc. In addition to simple excipients, lubricants such as magnesium stearate, talc and the like may also be used. Liquid Formulations for oral administration include suspensions, oral solutions, emulsions, or syrup, in addition to water and liquid paraffin, which are commonly used simple diluents, various excipients, for example, wetting agents, sweetening agents, fragrances, preservatives, and the like may be included.

Agents for parenteral administration include sterile aqueous solutions, non-aqueous solutions, suspension solutions, emulsions, lyophilized Formulations, and suppositories. Non-aqueous solvents and suspensions may include propylene glycol, polyethylene glycol, vegetable oils such as olive oil, and injectable esters such as ethyl oleate. As the base of the suppository, witepsol, macrogol, tween 61, cacao butter, laurin fat, glycerol, gelatin, etc. may be used.

In addition, the dosage for the human body of the quinolone compound represented by the above Formula (I), a racemic compound, a diastereomer, a geometric isomer, a stereoisomer, a hydrate, or a pharmaceutically acceptable salt thereof may vary depending on the patient's age, weight, sex, dosage form, health status and disease degree, based on an adult patient weighing 70 kg, it is generally 0.01 to 1000 mg/day (day), preferably 0.1 to 500 mg/day (day), in addition, according to the judgment of the doctor or pharmacist, divided administration may be administered once or several times a day at regular time intervals.

The pharmaceutical composition of the present invention may be used alone or in combination with methods using surgery, hormone therapy, chemotherapy, and biological response modifiers.

According to an embodiment of the present invention, it was confirmed that the above-described compound of Formula (I) exhibits an effect of inhibiting the accumulation of fat in liver cells, thereby exhibiting a preventive or therapeutic effect of fatty liver. In addition, it was confirmed that the compound of Formula (I) exhibits the ability to inhibit active oxygen by endoplasmic reticulum stress, thereby preventing or treating steatohepatitis.

On the other hand, the present invention provides a food composition for preventing or improving metabolic diseases comprising the compound of Formula (I) or a salt thereof as an active ingredient.

In the food composition according to the present invention, the quinolone compound represented by the above Formula (I), a racemic compound, a diastereomer, a geometric isomer, a stereoisomer, a hydrate or a salt thereof may be provided in the form (type) of various food compositions such as functional food, nutritional supplement, health food and food additives.

Food compositions of this type can be prepared in various forms according to conventional methods known in the art. Although not limited thereto, for example, as a health food, the compound is prepared (added) in the form of tea, juice, and drink and provided in a liquefied manner so that it can be consumed, or it can be provided by granulation, encapsulation and powdering.

For example, food is not limited to, but it can prepared by adding the compound to beverages (including tea, juices and drinks, and alcoholic beverages), fruits and their processed foods (e.g., canned fruit, canned fruit, jam, marmalade, etc.), fish, meat and their processing Food (e.g., ham, sausage corned beef, etc.), breads and noodles (e.g., udon, soba, ramen, spaghetti, macaroni, etc.), fruit juice, various drinks, cookies, syrup, dairy products (e.g., butter, cheese, etc.), edible vegetable oils and fats, margarine, vegetable protein, retort food, frozen food, various seasonings (e.g., soybean paste, soy sauce, sauce, etc.).

On the other hand, the compound according to the present invention can be Formulated in various forms depending on the purpose. Formulation examples for the composition of the present invention are exemplified below.

Formulation Example 1: Preparation of a pharmaceutical Formulation

1. Preparation of powder 2 g of a compound of Formula (I) according to the present invention 1 g of lactose The above ingredients were mixed and filled in an airtight cloth to prepare a powder.

2. Preparation of tablets 100 mg of a compound of Formula (I) according to the present invention 100 mg of Corn Starch 100 mg of Lactose 2 mg of Magnesium stearate After mixing the above ingredients, tablets were prepared by tableting according to a conventional method for manufacturing tablets.

3. Preparation of capsules
100 mg of a compound of Formula (I) according to the present invention
100 mg of Corn Starch
100 mg of Lactose
2 mg of Magnesium stearate After mixing the above ingredients, the capsules were prepared by filling in gelatin capsules according to a conventional manufacturing method of capsules.

4. Preparation of pills
1 g of a compound of Formula (I) according to the present invention
1.5 g lactose
1 g of glycerin
0.5 g of xylitol After mixing the above components, it was prepared so as to be 4 g per ring according to a conventional method.

5. Preparation of granules
150 mg of a compound of Formula (I) according to the present invention
100 mg of Glucose
750 mg of Starch After mixing the above components, 100 mg of 30% ethanol was added and dried at 60° C. to form granules, and then filled in a bag.

The present invention provides the use of a quinolone compound represented by the following Formula (I), a racemic compound, a diastereomer, a geometric isomer, a stereoisomer, a hydrate, or a pharmaceutically acceptable salt thereof for preparing an agents for the prevention or treatment of metabolic diseases.

The present invention provides the method of treating a metabolic disease comprising administering to a subject in need thereof an effective amount of a composition comprising a quinolone compound represented by the Formula (I), a racemic compound, a diastereomer, a geometric isomer, a stereoisomer, a hydrate, or a pharmaceutically acceptable salt thereof as an active ingredient.

The 'effective amount' of the present invention refers to an amount that, when administered to an individual, exhibits an effect of improving, treating, preventing, detecting, diagnosing, or inhibiting or reducing a metabolic disease. The 'subject' may be an animal, preferably an animal, including a mammal, particularly a human, and may be a cell, tissue, organ, or the like derived from an animal. The subject may be a patient in need of the effect.

The 'treatment' of the present invention refers to improving a metabolic disease or symptom of a metabolic disease comprehensively, which may include curing, substantially preventing, or improving the condition of a metabolic disease, including, but not limited to, alleviating, curing or preventing one or most symptoms resulting from a metabolic disease.

In the present invention, the term 'comprising' is used synonymously with 'comprising' or 'characterized', and in the composition or method, additional component elements or method steps not mentioned are not excluded. The term 'consisting of' means excluding additional elements, steps, or ingredients not otherwise specified. The term 'essentially consisting of' means, in the scope of the composition or method, including the described component elements or steps as well as the component elements or steps that do not substantially affect the basic properties thereof.

Effects of the Invention

The compound disclosed in the present invention has a remarkable CYP4A inhibitory effect, since it exhibits activities such as promoting glucose absorption into hepatocytes, inhibition of fat accumulation in liver cells, inhibition of reactive oxygen species by endoplasmic reticulum stress, treatment of steatohepatitis etc., it can be very usefully used in the development of therapeutic agents for metabolic diseases such as diabetes and fatty liver.

MODE FOR CARRYING OUT INVENTION

Figure 1:
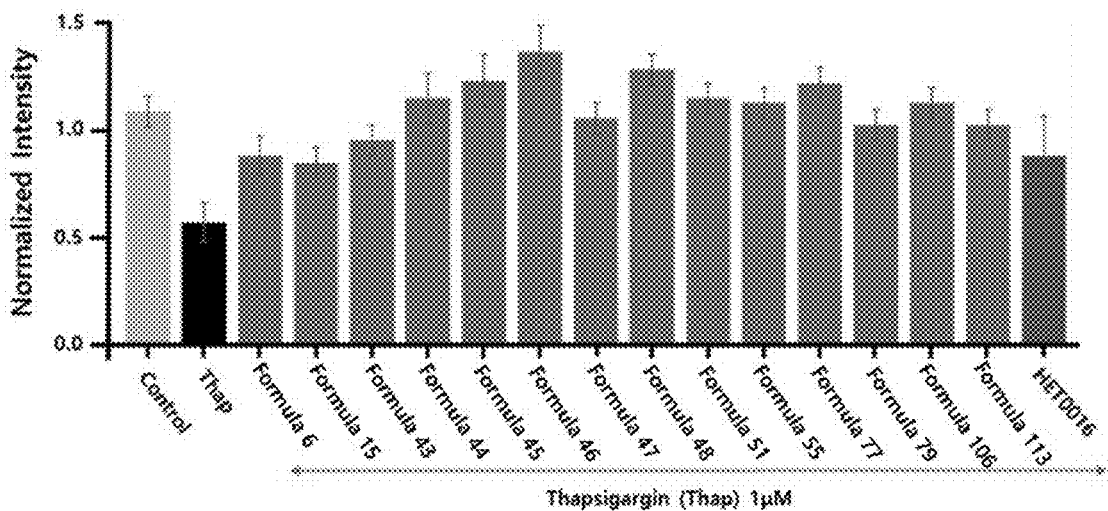
FIG. 1 shows the results of the compound of the present invention promoting glucose uptake in liver cells treated with thapsigargin to induce endoplasmic reticulum stress.

Hereinafter, the present invention will be described in detail.

However, the following examples are only illustrative of the present invention, and the content of the present invention is not limited to the following examples.

The present inventors confirmed the compound using the following analytical equipment to confirm the synthesized compound.

For NMR (Nuclear Magnetic Resonance), a Bruker Avance III 400 MHZ spectrometer, Bruker Avance Neo 400 MHz spectrometer, or A ZKNJ BIXI-1 300 MHZ spectrometer was used. Agilent 1260 series LC/Mass system or Waters Acquity UPLC system with diode-array detector (DAD) or photo-diode array detector (PDA) was used to confirm the molecular weight of the compound, and molecular weight was measured through a mass detector composed of an electrospray ionization source. In addition, chiral HPLC was used to measure the e.e (enantiomeric excess) of chiral compounds, and the instrument used at this time was an Agilent 1200 series or Waters-TharSFC, and the column used was a chiralpak or chiralcel column.

Example 1: Synthesis of Quinoline-Based Precursor (Intermediate) Material

In the present invention, the following precursor preparation method was synthesized by the synthesis method of Reaction Formula 1-1 and Reaction Formula 2 below.

(1) Synthesis of (4-(7-chloroquinolin-4-yl) piperazin-1-yl) (piperidin-3-yl) methanone (Intermediate 1)

(1-1) Synthesis of 7-chloro-4-(piperazin-1-yl)quinoline 7-chloro-4-(piperazin-1-yl)quinoline

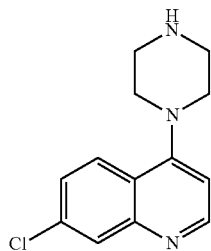 [SMILES: Clc1ccc2c(N3CCNCC3)ccnc2c1]

According to Reaction Formula 1, 4,7-dichloroquinoline (5.0 g, 25.25 mmol) and piperazine (10.0 g, 116 mmole) were added to ethanol (250 ml) and stirred under reflux for 12 hours. After cooling the mixture to room temperature, a saturated aqueous sodium hydrocarbon solution (sat. $NaHCO_3$, 100 ml) was added, and dichloromethane (DCM, dichloromethane, 60 ml×3) was added and extracted to separate the organic layer, and the organic layer was removed from water using $Na_2SO_4$ (sodium bicarbonate, sodium hydrogen carbonate), filtered, and then concentrated under reduced pressure. Purification by silica gel column chromatography using dichloromethane and methanol (MeOH, 1-10%) as a developing solvent was used to obtain the target compound 7-chloro-4-(piperazin-1-yl)quinoline (Intermediate 1-1, 4, 94 g) were obtained as a white solid.

White solid (80%), 1H NMR (400 MHZ, $CDCl_3$) δ 8.72 (d, J=5.0 Hz, 1H), 8.04 (d, J=2.0 Hz, 1H), 7.96 (d, J=9.0 Hz, 1H), 7.42 (dd, J=9.0, 2.1 Hz, 1H), 6.84 (d, J=5.0 Hz, 1H), 3.49 (s, 1H), 3.18 (m, 8H).

(1-2) Synthesis of tert-butyl 3-(4-(7-chloroquinolin-4-yl) piperazine-1-carbonyl)piperidine-1-carboxylate tert-butyl 3-(4-(7-chloroquinolin-4-yl) piperazine-1-carbonyl)piperidine-1-carboxylate

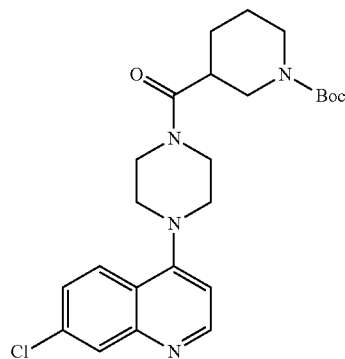 [SMILES: CC(C)(C)OC(=O)N1CCCC(C(=O)N2CCN(c3ccnc4cc(Cl)ccc34)CC2)C1]

After dissolving 1-(tert-butoxycarbonyl)piperidine-3-carboxylic acid (2.33 g, 10.2 mmol) and N,N-diisopropylethylamine (DIEA) (3.28 g, 25.4 mmol) in dimethylformamide (DMF, 30 ml), 1-[Bis(dimethylamino)methylene]-1H-1,2,3-triazolo[4,5-b]pyridinium 3-oxide hexafluorophosphate (HATU) (4.83 g, 12.7 mmol) was added and stirred at room temperature for 20 minutes, 7-Chloro-4-(piperazin-1-yl)quinoline (2.10 g, 8.47 mmol) was added, and the reaction solution was stirred at room temperature for 2 hours. After adding water (150 ml) to the reaction solution, extraction was performed using ethyl acetate (EtOAc) (30 ml×3) to separate the organic layer, the organic layer was removed from water using $Na_2SO_4$, filtered and concentrated under reduced pressure. The compound was purified using silica gel chromatography to obtain the target compound, Intermediate 1-2 (3.87 g) as a yellow solid.

1H MNR: (300 MHZ, $CDCl_3$): δ 8.75 (d, J=4.8 Hz, 1H), 8.07 (d, J=1.8 Hz, 1H), 7.96 (d, J=9.0 Hz, 1H), 7.47 (dd, J=9.0, 1.8 Hz, 1H), 6.85 (d, J=4.8 Hz, 1H), 4.25-4.06 (m, 2H), 3.90-3.79 (m, 4H), 3.26-3.20 (m, 4H), 2.96-2.68 (m, 4H), 1.95-1.91 (m, 1H), 1.81-1.73 (m, 2H), 1.47 (s, 9H).

(1-3) Synthesis of (4-(7-chloroquinolin-4-yl) piperazin-1-yl) (piperidin-3-yl) methanone (4-(7-chloroquinolin-4-yl) piperazin-1-yl) (piperidin-3-yl) methanone

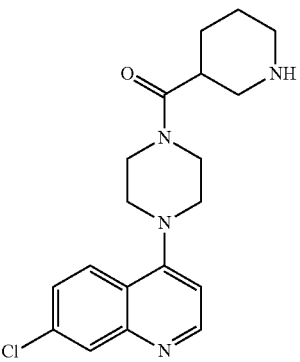 [SMILES: O=C(C1CCCNC1)N1CCN(c2ccnc3cc(Cl)ccc23)CC1]

Tert-butyl 3-(4-(7-chloroquinolin-4-yl) piperazine-1-carbonyl)piperidine-1-carboxylate (Intermediate 1-2, 2.00 g, 4.36 mmol) was dissolved in dichloromethane (10 ml), followed by trifluoroacetic acid (TFA) (4 ml) was added and stirred at 30° C. for 1 hour. After concentrating the reaction solution, it is diluted in dichloromethane (10 ml), and after adding a saturated aqueous sodium hydrogen carbonate solution (20 ml), it is extracted three times using a dichloromethane:methanol=10:1 mixed solvent (20 ml). The organic layer was dried over $Na_2SO_4$, filtered and concentrated under reduced pressure to obtain a yellow solid, and then recrystallized using ethyl acetate (EtOAc) and n-hexane (n-hexane) to obtain the target compound, Intermediate 1-3 (1.55 g) as a yellow solid.

1H MNR: (400 MHZ, $CDCl_3$): δ 8.76 (d, J=5.2 Hz, 1H), 8.07 (d, J=2.4 Hz, 1H), 7.95 (d, J=9.2 Hz, 1H), 7.47 (dd, J=9.6, 2.4 Hz, 1H), 6.85 (d, J=4.8 Hz, 1H), 3.90-3.82 (m, 4H), 3.49-3.41 (br s, 1H), 3.22-3.13 (m, 6H), 3.07-3.02 (m, 1H), 2.99-2.94 (m, 1H), 2.85-2.79 (m, 1H), 1.96-1.92 (m, 1H), 1.85-1.69 (m, 3H). LC-MS (ESI): m/z 359.3 [M+H]$^+$; Purity: 100% @254 nm, 100% @214 nm.

(2) Synthesis of (4-(2-methylquimolin-4-yl) pyrezin-1-yl) (piperidin-3-yl) methanone (Intermediate 2)

(2-1) Synthesis of 2-methyl-4-(piperazin-1-yl)quinoline 2-methyl-4-(piperazin-1-yl)quinoline

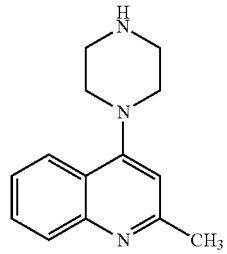 [SMILES: Cc1cc(N2CCNCC2)c2ccccc2n1]

Except for using 4-chloro-2-methylquinoline (3.0 g, 16.9 mmol) instead of 4,7-dichloroquinoline, the target compound (2-1, 3.1 g) was obtained as a white solid in the same manner as in the synthesis of Intermediate 1 (1-1).

White solid (86%), 1H NMR (400 MHZ, CDCl$_3$) δ 7.97 (d, J=8.6 Hz, 2H), 7.62 (ddd, J=8.4, 6.9, 1.4 Hz, 1H), 7.42 (ddd, J=8.1, 6.9, 1.1 Hz, 1H), 6.74 (s, 1H), 3.49 (s, 2H), 3.25-3.09 (m, 8H), 2.68 (s, 3H). LC-MS (ESI): Rt=0.93 min, m/z 228.2 [M+H]$^+$; purity: 100% @ 254 nm, 100% @ 214 nm.

(2-2) Synthesis of tert-butyl 3-(1-(2-methylquinolin-4-yl) piperazine-4-carbonyl)piperidine-1-carboxylate tert-butyl 3-(1-(2-methylquinolin-4-yl) piperazine-4-carbonyl)piperidine-1-carboxylate

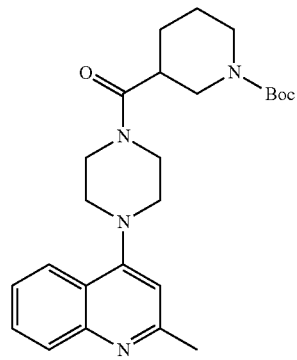 [SMILES: Cc1cc(N2CCN(C(=O)C3CCCN(C(=O)OC(C)(C)C)C3)CC2)c2ccccc2n1]

Except for adding 2-methyl-4-(piperazin-1-yl)quinoline (2.50 g, 11.0 mmol) instead of 7-chloro-4-(piperazin-1-yl)quinoline, the target compound (2-2, 4.8 g) was obtained as a yellow solid in the same manner as in the synthesis of Intermediate 1 (1-2).

LC-MS (ESI): Rt=1.56 min, m/z 439.5 [M+H]$^+$; purity: 100% @ 254 nm, 100% @ 214 nm.

(2-3) Synthesis of (4-(2-methylquimolin-4-yl) pyrezin-1-yl) (piperidin-3-yl) methanone (4-(2-methylquinolin-4-yl) piperazin-1-yl) (piperidin-3-yl) methanone

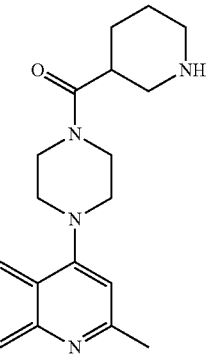

Except for adding tert-butyl 3-(4-(7-chloroquinolin-4-yl) piperazine-1-carbonyl)piperidine-1-carboxylate instead of tert-butyl 3-(1-(2-methylquinoline-4)-yl) piperazine-4-carbonyl)piperidine-1-carboxylate (4.83 g, 11.0 mmol), the target compound (2-3, 3.66 g) was obtained as a yellow solid in the same manner as in the synthesis of Intermediate 1 (1-3).

LC-MS (ESI): Rt=1.22 min, m/z 339.4 [M+H]$^+$; purity: 100% @ 254 nm, 100% @ 214 nm.

(3) Synthesis of (R)-(4-(2-methylquimolin-4-yl) pyrezin-1-yl) (piperidin-3-yl) methanone (Intermediate 3)

(3-1) Synthesis of (R)-tert-butyl 3-(1-(2-methylquinolin-4-yl) piperazine-4-carbonyl)piperidine-1-carboxylate (R)-tert-butyl 3-(4-(2-methylquinolin-4-yl) piperazine-1-carbonyl)piperidine-1-carboxylate

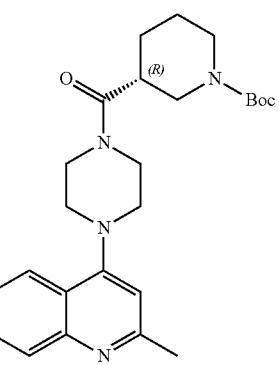

Except for using (R)-1-(tert-butoxycarbonyl)piperidine-3-carboxylic acid (111 mg, 0.48 mmol) instead of 1-(tert-butoxycarbonyl)piperidine-3-carboxylic acid, the synthesis was carried out in the same manner as in the synthesis of tert-butyl 3-(1-(2-methylquinolin-4-yl) piperazine-4-carbonyl)piperidine-1-carboxylate (2-2), and the target compound (3-1, 190 mg) was obtained as a white solid.

LC-MS (ESI): Rt=1.55 min, m/z 439.4 [M+H]$^+$; purity: 100% @ 254 nm, 100% @ 214 nm.

(3-2) Synthesis of (R)-(4-(2-methylquimolin-4-yl) pyrerazin-1-yl) (piperidin-3-yl) methanone (R)-(4-(2-methylquinolin-4-yl) piperazin-1-yl) (piperidin-3-yl) methanone

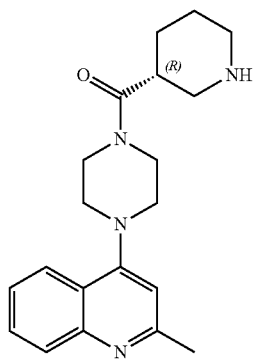

Except for using (R)-tert-butyl 3-(1-(2-methylquinolin-4-yl) piperazine-4-carbonyl)piperidine-1-carboxylate (190 mg, 0.43 mmol) instead of tert-butyl 3-(1-(2-methylquinolin-4-yl) piperazine-4-carbonyl)piperidine-1-carboxylate (2-2), the synthesis was carried out in the same manner as in the synthesis of Intermediate 2-3 to obtain the target compound (3-2, 140 mg) as a white solid.

LC-MS (ESI): Rt=1.32 min, m/z 339.2 [M+H]$^+$; purity: 100% @ 254 nm, 100% @ 214 nm.

(4) Synthesis of(S)-(4-(2-methylquimolin-4-yl) pyrezin-1-yl) (piperidin-3-yl) methanone (Intermediate 4)

(S)-(4-(2-methylquinolin-4-yl) piperazin-1-yl) (piperidin-3-yl) methanone (4-1) Synthesis of(S)-tert-butyl 3-(1-(2-methylquinolin-4-yl) piperazine-4-carbonyl)piperidine-1-carboxylate (S)-tert-butyl 3-(4-(2-methylquinolin-4-yl) piperazine-1-carbonyl)piperidine-1-carboxylate

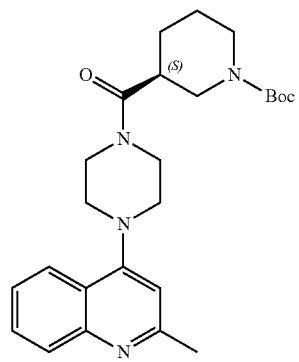

In the same manner as for the synthesis of tert-butyl 3-(1-(2-methylquinolin-4-yl) piperazine-4-carbonyl)piperidine-1-carboxylate (Intermediate 2-2), (S)-1-(tert-butoxycarbonyl) piperidine-3-carboxylic acid (111 mg, 0.48 mmol) was used for synthesis to obtain the target compound (4-1, 180 mg) as a white solid.

LC-MS (ESI): Rt=1.62 min, m/z 439.3 [M+H]$^+$; purity: 100% @ 254 nm, 97.39% @ 214 nm.

(4-2) Synthesis of(S)-(4-(2-methylquimolin-4-yl) piperazin-1-yl) (piperidin-3-yl) methanone (S)-(4-(2-methylquinolin-4-yl) piperazin-1-yl) (piperidin-3-yl) methanone

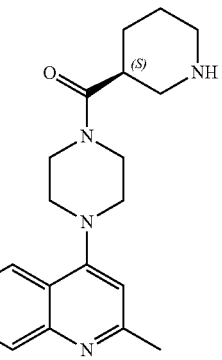

In the same manner as for the synthesis of (4-(2-methylquimolin-4-yl) piperazin-1-yl) (piperidin-3-yl) methanone, the target compound (4-2, 140 mg) was obtained as a pale yellow solid using(S)-tert-butyl 3-(1-(2-methylquinolin-4-yl) piperazine-4-carbonyl)piperidine-1-carboxylate (188 mg, 0.43 mmol) according to the method of Synthesis Method 1.

LC-MS (ESI): Rt=1.28 min, m/z 339.2 [M+H]$^+$; purity: 100% @ 254 nm, 100% @ 214 nm.

(5) synthesis of piperidin-3-yl (4-(2-(trifluoromethyl)quinolin-4-yl) piperazin-1-yl) methanone (Intermediate 5) piperidin-3-yl (4-(2-(trifluoromethyl) quinolin-4-yl) piperazin-1-yl) methanone (5-1) Synthesis of 4-(piperazin-1-yl)-2-(prefluoromethyl)quinoline 4-(piperazin-1-yl)-2-(trifluoromethyl)quinoline

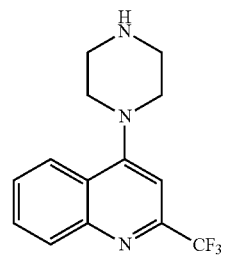

Except for adding 4-chloro-2-(trifluoromethyl)quinoline (3.0 g, 12.9 mmol) instead of 4,7-dichloroquinoline, the target compound (5-1, 3.3 g) was obtained as a yellow solid in the same manner as in the synthesis of Intermediate 1 (1-1).

1H MNR: (300 MHZ, CDCl₃): δ 8.16 (d, J=8.4 Hz, 1H), 8.05 (d, J=8.4 Hz, 1H), 7.76-7.71 (m, 1H), 7.61-7.56 (m, 1H), 7.14 (s, 1H), 3.31-3.28 (m, 4H), 3.21-3.18 (m, 4H). LC-MS (ESI): Rt=1.40 min, m/z 282.2 [M+H]⁺; purity: 100% @ 254 nm, 100% @ 214 nm.

(5-2) Synthesis of tert-butyl 3-(4-(2-(trifluoromethyl)quinolin-4-yl) piperazine-1-carbonyl)piperidine-1-carboxylate tert-butyl 3-(4-(2-(trifluoromethyl)quinolin-4-yl) piperazine-1-carbonyl) piperidine-1-carboxylate

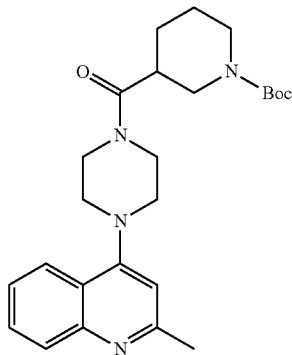 [SMILES: Cc1cc(N2CCN(C(=O)C3CCCN(C(=O)OC(C)(C)C)C3)CC2)c2ccccc2n1]

Except for adding 4-(piperazin-1-yl)-2-(prefluoromethyl) quinoline (2.5 g, 8.90 mmol) instead of 7-chloro-4-(piperazin-1-yl)quinoline, the target compound (5-2, 4.3 g) was obtained as a yellow solid in the same manner as in the synthesis of Intermediate 1 (1-2).

LC-MS (ESI): Rt=1.73 min, m/z 492.5 [M+H]⁺; purity: 100% @ 254 nm, 100% @ 214 nm.

(5-3) Synthesis of piperidin-3-yl (4-(2-(trifluoromethyl)quinolin-4-yl) piperazin-1-yl) methanone piperidin-3-yl (4-(2-(trifluoromethyl)quinolin-4-yl) piperazin-1-yl) methanone

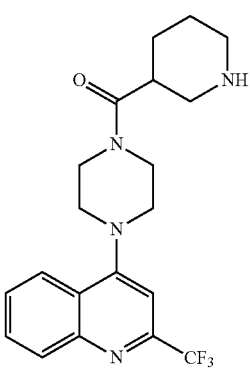 [SMILES: O=C(C1CCCNC1)N1CCN(c2cc(C(F)(F)F)nc3ccccc23)CC1]

Except for adding tert-butyl 3-(4-(2-(trifluoro methyl) quinolin-4-yl) piperazine-1-carbonyl)piperidine-1-carboxylate (4.35 g, 8.83 mmol) instead of tert-butyl 3-(4-(7-chloroquinolin-4-yl) piperazine-1-carbonyl)piperidine-1-carboxylate, the target compound (5-3, 3.3 g) was obtained as a yellow solid in the same manner as in the synthesis of Intermediate 1 (1-3).

LC-MS (ESI): Rt=1.39 min, m/z 393.4 [M+H]⁺; purity: 100% @ 254 nm, 100% @ 214 nm.

(6) Synthesis of (R)-piperidin-3-yl (4-(2-(trifluoromethyl)quinolin-4-yl) piperazin-1-yl) methanone (Intermediate 6)

(R)-piperidin-3-yl (4-(2-(trifluoromethyl)quinolin-4-yl) piperazin-1-yl) methanone (6-1) Synthesis of (R)-tert-butyl 3-(4-(2-(trifluoromethyl)quinolin-4-yl) piperazine-1-carbonyl)piperidine-1-carboxylate (R)-tert-butyl 3-(4-(2-(trifluoromethyl)quinolin-4-yl) piperazine-1-carbonyl)piperidine-1-carboxylate

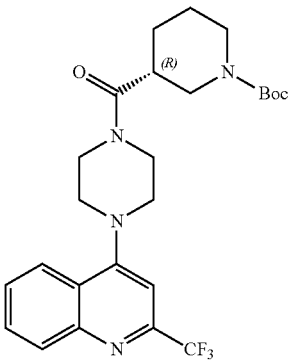

In the same manner as in the synthesis method of tert-butyl 3-(4-(2-(trifluoromethyl)quinolin-4-yl) piperazine-1-carbonyl)piperidine-1-carboxylate in (5-2) above, synthesis was carried out using (R)-1-(tert-butoxycarbonyl)piperidine-3-carboxylic acid (134 mg, 0.58 mmol) to obtain the target compound (6-1, 250 mg) as a white solid.

LC-MS (ESI): Rt=1.81 min, m/z 493.3 [M+H]⁺; purity: 100% @ 254 nm, 100% @ 214 nm.

(6-2) Synthesis of (R)-piperidin-3-yl (4-(2-(trifluoromethyl)quinolin-4-yl) piperazin-1-yl) methanone (R)-piperidin-3-yl (4-(2-(trifluoromethyl)quinolin-4-yl) piperazin-1-yl) methanone

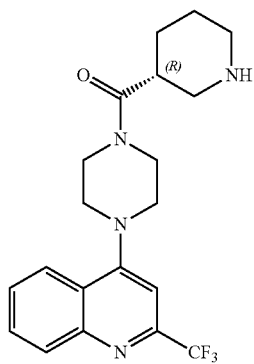

In the same manner as for the synthesis of piperidin-3-yl (4-(2-(trifluoromethyl)quinolin-4-yl) piperazin-1-yl) methanone in (5-3) above, the target compound (6-2, 200 mg) was obtained as a yellow solid using (R)-tert-butyl tert-butyl 3-(4-(2-(trifluoromethyl)quinolin-4-yl) piperazine-1-carbonyl)piperidine-1-carboxylate (260 mg, 0.52 mmol) according to the method of Synthesis Method 1.

LC-MS (ESI): Rt=1.55 min, m/z 393.3 [M+H]$^+$; purity: 100% @ 254 nm, 100% @ 214 nm.

(7) Synthesis of (S)-piperidin-3-yl (4-(2-(trifluoromethyl)quinolin-4-yl) piperazin-1-yl) methanone (Intermediate 7)

(S)-piperidin-3-yl (4-(2-(trifluoromethyl)quinolin-4-yl) piperazin-1-yl) methanone

(7-1) Synthesis of (S)-tert-butyl 3-(4-(2-(trifluoromethyl)quinolin-4-yl) piperazine-1-carbonyl)piperidine-1-carboxylate (S)-tert-butyl 3-(4-(2-(trifluoromethyl)quinolin-4-yl) piperazine-1-carbonyl) piperidine-1-carboxylate

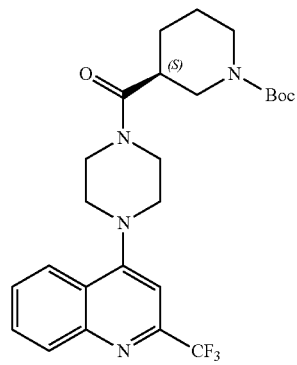

In the same manner as in the synthesis method of tert-butyl 3-(4-(2-(trifluoromethyl)quinolin-4-yl) piperazine-1-carbonyl)piperidine-1-carboxylate in (5-2) above, synthesis was carried out using (S)-1-(tert-butoxycarbonyl)piperidine-3-carboxylic acid (134 mg, 0.58 mmol) to obtain the target compound (7-1, 250 mg) as a white solid.

LC-MS (ESI): Rt=1.80 min, m/z 493.3 [M+H]+; purity: 100% @ 254 nm, 97.39% @ 214 nm.

(7-2) Synthesis of (S)-piperidin-3-yl (4-(2-(trifluoromethyl)quinolin-4-yl)piperazin-1-yl)methanone (S)-piperidin-3-yl (4-(2-(trifluoromethyl)quinolin-4-yl) piperazin-1-yl) methanone

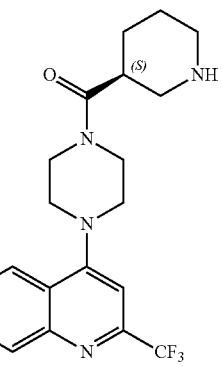

In the same manner as in the synthesis method of tert-butyl 3-(4-(2-(trifluoromethyl)quinolin-4-yl) piperazine-1-carbonyl)piperidine-1-carboxylate in (5-3) above, the target compound (7-2, 200 mg) was obtained as a white solid using (S)-tert-butyl tert-butyl 3-(4-(2-(trifluoromethyl)quinolin-4-yl) piperazine-1-carbonyl) piperidine-1-carboxylate (260 mg, 0.52 mmol) according to the method of Synthesis Method 1.

LC-MS (ESI): Rt=1.56 min, m/z 393.3 [M+H]$^+$; purity: 100% @ 254 nm, 100% @ 214 nm.

(8) Synthesis of (4-(7-fluoroquinolin-4-yl) piperazin-1-yl) (piperidin-3-yl) methanone (Intermediate 8)

(4-(7-fluoroquinolin-4-yl) piperazin-1-yl) (piperidin-3-yl) methanone

(8-1) Synthesis of 7-fluoro-4-(piperazin-1-yl)quinoline 7-fluoro-4-(piperazin-1-yl)quinoline

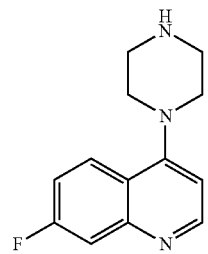 [SMILES: Fc1ccc2c(N3CCNCC3)ccnc2c1]

Except for adding 4-chloro-7-fluoroquinoline (4.0 g, 22.0 mmol) instead of 4,7-dichloroquinoline, the target compound (8-1, 4.5 g) was obtained as a white solid in the same manner as in the synthesis of Intermediate 1 (1-1).

¹HNMR (400 MHZ, DMSO-d$_6$): δ 8.82 (d, J=6.9 Hz, 1H), 8.36-8.81 (m, 1H), 8.04-8.00 (m, 1H), 7.67-7.61 (m, 1H), 7.34 (d, J=6.6 Hz, 1H), 4.03-3.90 (m, 4H), 3.59-3.38 (m, 4H). Rt=1.12 min, m/z 232.2 [M+H]⁺. purity: 100% @ 254 nm, 100.0% @ 214 nm.

(8-2) Synthesis of tert-butyl 3-(4-(7-fluoroquinolin-4-yl) piperazine-1-carbonyl)piperidine-1-carboxylate tert-butyl 3-(4-(7-fluoroquinolin-4-yl) piperazine-1-carbonyl)piperidine-1-carboxylate

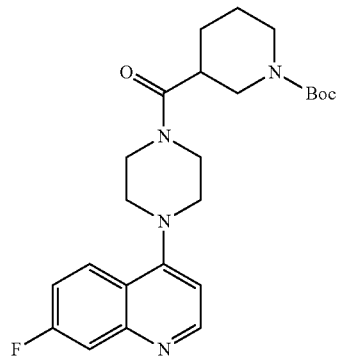 [SMILES: CC(C)(C)OC(=O)N1CCCC(C(=O)N2CCN(c3ccnc4cc(F)ccc34)CC2)C1]

Except for adding 7-fluoro-4-(piperazin-1-yl)quinoline (1.5 g, 5.60 mmole) instead of 7-chloro-4-(piperazin-1-yl) quinoline, the target compound (8-2, 2.4 g) was obtained as a dark yellow solid in the same manner as in the synthesis of Intermediate 1 (1-2).

LC-MS (ESI): Rt=1.33 min, m/z 443.4 [M+H]⁺; purity: 100% @ 254 nm, 100% @ 214 nm.

(8-3) Synthesis of (4-(7-fluoroquinolin-4-yl) piperazin-1-yl) (piperidin-3-yl) methanone (4-(7-fluoroquinolin-4-yl) piperazin-1-yl) (piperidin-3-yl) methanone

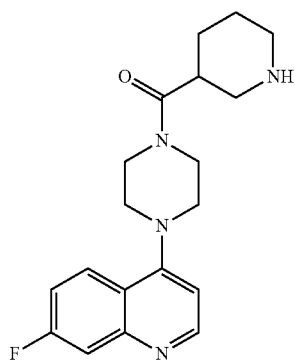 [SMILES: O=C(C1CCCNC1)N1CCN(c2ccnc3cc(F)ccc23)CC1]

Except for adding tert-butyl 3-(4-(7-fluoroquinoline-4-yl) piperazine-1-carbonyl)piperidine-1-carboxylate (2.48 g, 5.60 mmol) instead of tert-butyl 3-(4-(7-chloroquinolin-4-yl) piperazine-1-carbonyl)piperidine-1-carboxylate, the target compound (8-3, 1.6 g) was obtained as a yellow solid in the same manner as in the synthesis of Intermediate 1 (1-3).

LC-MS (ESI): Rt=1.04 min, m/z 343.4 [M+H]⁺; purity: 100% @ 254 nm, 100% @ 214 nm.

(9) Synthesis of (R)-(4-(7-fluoroquinolin-4-yl) piperazin-1-yl) (piperidin-3-yl) methanone (Intermediate 9)

(R)-(4-(7-fluoroquinolin-4-yl) piperazin-1-yl) (piperidin-3-yl) methanone (9-1) Synthesis of (R)-tert-butyl 3-(4-(7-fluoroquinolin-4-yl) piperazine-1-carbonyl)piperidine-1-carboxylate (R)-tert-butyl 3-(4-(7-fluoroquinolin-4-yl) piperazine-1-carbonyl)piperidine-1-carboxylate

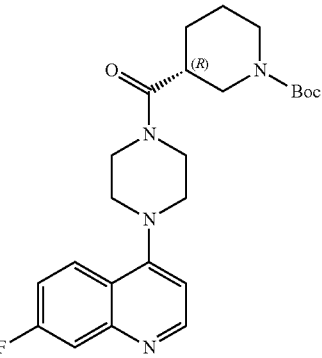

In the same manner as for the synthesis of tert-butyl 3-(4-(7-fluoroquinolin-4-yl) piperazine-1-carbonyl)piperidine-1-carboxylate in (8-2) above, synthesis was carried out using (R)-1-(tert-butoxycarbonyl)piperidine-3-carboxylic acid (297 mg, 1.3 mmol) to obtain the target compound (9-1, 190 mg) as a white solid.

¹HNMR (400 MHZ, CDCl$_3$): δ 8.76-8.74 (m, 1H), 8.05-8.01 (m, 1H), 7.72-7.69 (m, 1H), 7.33-7.27 (m, 1H), 6.84-6.82 (m, 1H), 4.20-4.08 (m, 2H), 3.90-3.84 (m, 4H), 3.25-3.19 (m, 4H), 2.87-2.67 (m, 3H), 1.94-1.91 (m, 1H), 1.84-1.74 (m, 3H), 1.47 (s, 9H). LC-MS (ESI): Rt=1.64 min, m/z 443.6 [M+H]⁺; purity: 100% @ 254 nm, 100% @ 214 nm.

chiral HPLC: Column: Chiralpak IA 5 μm 4.6×250 mm; Mobile Phase: Hex: EtOH=30:70 at 1 mL/min; Temp: 30° C.; Wavelength: 230 nm, Rt=10.321 min, 99.58% ee.

(9-2) Synthesis of (R)-(4-(7-fluoroquinolin-4-yl) piperazin-1-yl) (piperidin-3-yl) methanone (R)-(4-(7-fluoroquinolin-4-yl) piperazin-1-yl) (piperidin-3-yl) methanone

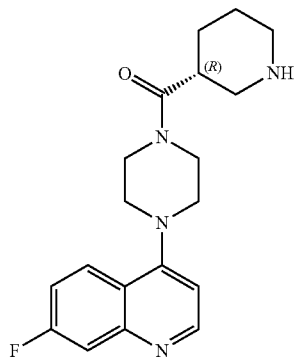

In the same manner as for the synthesis of (4-(7-fluoroquinolin-4-yl) piperazin-1-yl) (piperidin-3-yl) methanone in (8-3) above, the target compound (9-2, 140 mg) was obtained as a white solid using (R)-tert-butyl 3-(4-(7-fluoroquinolin-4-yl) piperazine-4-carbonyl)piperidine-1-carboxylate (400 mg, 0.9 mmol) according to the method of Synthesis Method 1.

$^1$HNMR (400 MHZ, DMSO-$d_6$): δ 8.73-8.67 (m, 2H), 8.36-8.33 (m, 1H), 7.81-7.78 (m, 1H), 7.65-7.60 (m, 1H), 7.18 (d, J=7.2 Hz, 1H), 3.98-3.94 (m, 4H), 3.84-3.76 (m, 4H), 3.23-2.98 (m, 5H), 1.92-1.54 (m, 4H). LC-MS (ESI): Rt=1.30 min, m/z 343.5 [M+H]$^+$; purity: 100% @ 254 nm, 100% @ 214 nm.

(10) Synthesis of(S)-(4-(7-fluoroquinolin-4-yl) piperazin-1-yl) (piperidin-3-yl) methanone (intermediate 10)

(S)-(4-(7-fluoroquinolin-4-yl) piperazin-1-yl) (piperidin-3-yl) methanone

(10-1) Synthesis of(S)-tert-butyl 3-(4-(7-fluoroquinolin-4-yl) piperazine-1-carbonyl)piperidine-1-carboxylate (S)-tert-butyl 3-(4-(7-fluoroquinolin-4-yl) piperazine-1-carbonyl)piperidine-1-carboxylate

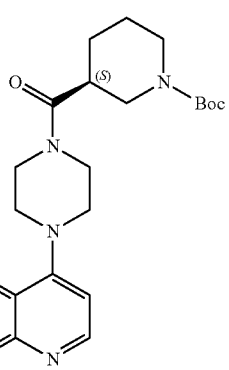

In the same manner as for the synthesis of tert-butyl 3-(4-(7-fluoroquinolin-4-yl) piperazine-1-carbonyl)piperidine-1-carboxylate in (8-2) above, synthesis was carried out using(S)-1-(tert-butoxycarbonyl)piperidine-3-carboxylic acid (297 mg, 1.3 mmol) to obtain the target compound (10-1, 180 mg) as a white solid.

$^1$HNMR (400 MHZ, CDCl$_3$): δ 8.75 (d, J=4.8 Hz, 1H), 8.05-8.01 (m, 1H), 7.72-7.69 (m, 1H), 7.33-7.28 (m, 1H), 6.83 (d, J=4.8 Hz, 1H), 4.21-4.06 (m, 2H), 3.99-3.81 (m, 4H), 3.25-3.19 (m, 4H), 2.98-2.68 (m, 3H), 2, 0.04-1.95 (m, 1H), 1.91-1.74 (m, 3H), 1.47 (s, 9H). LC-MS (ESI): Rt=1.57 min, m/z 443.5 [M+H]$^+$; purity: 100% @ 254 nm, 97.39% @ 214 nm.

(10-2) Synthesis of(S)-(4-(7-fluoroquinolin-4-yl) piperazin-1-yl) (piperidin-3-yl) methanone (S)-(4-(7-fluoroquinolin-4-yl) piperazin-1-yl) (piperidin-3-yl) methanone In the same manner as for the synthesis of (4-(7-fluoroquinolin-4-yl) piperazin-1-yl) (piperidin-3-yl) methanone in (8-3) above, synthesis was carried out using(S)-tert-butyl 3-(4-(7-fluoroquinolin-4-yl) piperazine-4-carbonyl)piperidine-1-carboxylate (380 mg, 0.86 mmol) to obtain the target compound (10-2, 140 mg) as a white solid.

$^1$HNMR (400 MHZ, CDCl$_3$): δ 8.73-8.71 (m, 2H), 8.37-8.33 (m, 1H), 7.81-7.78 (m, 1H), 7.65-7.60 (m, 1H), 7.19 (d, J=6.8 Hz, 1H), 4.00-3.77 (m, 8H), 3.24-2.94 (m, 5H), 1.96-1.59 (m, 4H). LC-MS (ESI): Rt=1.38 min, m/z 343.5 [M+H]$^+$; purity: 98% @ 254 nm, 100% @ 214 nm.

(11) synthesis of piperidin-3-yl (4-(quinolin-4-yl) piperazin-1-yl) methanone (intermediate 11) piperidin-3-yl (4-(quinolin-4-yl) piperazin-1-yl) methanone

(11-1) Synthesis of tert-butyl 3-(4-(quinolin-4-yl) piperazine-1-carbonyl)piperidine-1-carboxylate tert-butyl 3-(4-(quinolin-4-yl) piperazine-1-carbonyl)piperidine-1-carboxylate

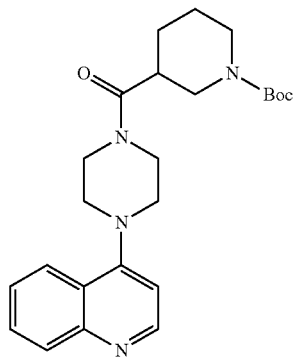 [SMILES: CC(C)(C)OC(=O)N1CCCC(C(=O)N2CCN(c3ccnc4ccccc34)CC2)C1]

Except for adding 4-(piperazin-1-yl)quinoline di-HCl salt (1.50 g, 5.24 mmol) instead of 7-chloro-4-(piperazin-1-yl) quinoline, the target compound (11-1, 2.1 g) was obtained as a dark yellow solid in the same manner as in the synthesis of Intermediate 1 (1-2).

LC-MS (ESI): Rt=1.31 min, m/z 425.4 [M+H]$^+$; purity: 100% @ 254 nm, 95.1% @ 214 nm.

(11-2) Synthesis of piperidin-3-yl (4-(quinolin-4-yl) piperazin-1-yl) methanone piperidin-3-yl (4-(quinolin-4-yl) piperazin-1-yl) methanone

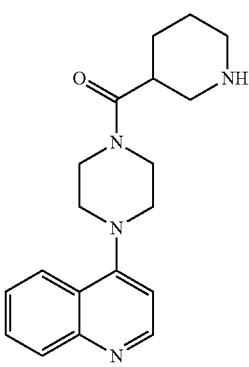 [SMILES: O=C(C1CCCNC1)N1CCN(c2ccnc3ccccc23)CC1]

Except for adding tert-butyl 3-(4-(quinolin-4-yl) piperazine-1-carbonyl)piperidine-1-carboxylate (2.2 g, 5.18 mmol) instead of tert-butyl 3-(4-(7-chloroquinolin-4-yl) piperazine-1-carbonyl)piperidine-1-carboxylate, the target compound (11-2, 1.6 g) was obtained as a yellow solid in the same manner as in the synthesis of Intermediate 1 (1-3).

$^1$H MNR (400 MHZ, CDCl$_3$): δ 8.76 (d, J=4.8 Hz, 1H), 8.08 (d, J=8.4 Hz, 1H), 8.02 (d, J=8.8 Hz, 1H), 7.71-7.67 (m, 1H), 7.55-7.51 (m, 1H), 6.85 (d, J=5.2 Hz, 1H), 3.91-3.83 (m, 4H), 3.24-3.17 (m, 5H), 3.13-3.09 (m, 2H), 3.04-2.98 (m, 1H), 2.95-2.88 (m, 1H), 2.81-2.75 (m, 1H), 1.95-1.92 (m, 1H), 1.82-1.75 (m, 1H), 1.72-1.65 (m, 0.1H). LC-MS (ESI): Rt=1.00 min, m/z 325.3 [M+H]$^+$; purity: 100% @ 254 nm, 100% @ 214 nm.

(12) Synthesis of (R)-piperidin-3-yl (4-(quinolin-4-yl) piperazin-1-yl) methanone (Intermediate 12)

(R)-piperidin-3-yl (4-(quinolin-4-yl) piperazin-1-yl) methanone

(12-1) Synthesis of (R)-tert-butyl 3-(4-(quinolin-4-yl) piperazine-1-carbonyl)piperidine-1-carboxylate (R)-tert-butyl 3-(4-(quinolin-4-yl) piperazine-1-carbonyl)piperidine-1-carboxylate

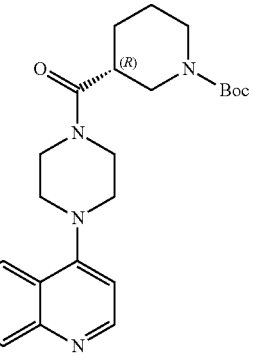

In the same manner as in the synthesis method of tert-butyl 3-(4-(quinolin-4-yl) piperazine-1-carbonyl)piperidine-1-carboxylate in (11-1) above, synthesis was carried out using (R)-1-(tert-butoxycarbonyl)piperidine-3-carboxylic acid (500 mg, 2.2 mmol) to obtain the target compound (12-1, 400 mg) as a white solid.

$^1$HNMR (400 MHZ, CDCl$_3$): δ 8.76 (d, J=4.8 Hz, 1H), 8.09 (d, J=8.4 Hz, 1H), 8.03 (d, J=8.4 Hz, 1H), 7.69 (t, J=8.0 Hz, 1H), 7.53 (t, J=8.0 Hz, 1H), 6.86 (d, J=5.2 Hz, 1H), 4.27-4.05 (m, 2H), 3.92-3.83 (m, 4H), 3.31-3.21 (m, 4H), 2.94-2.65 (m, 3H), 1.95-1.92 (m, 1H), 1.84-1.73 (m, 3H), 1.47 (s, 9H). LC-MS (ESI): Rt=1.28 min, m/z 425.4 [M+H]$^+$; purity: 100% @ 254 nm, 95.1% @ 214 nm.

(12-2) Synthesis (R)-piperidin-3-yl (4-(quinolin-4-yl) piperazin-1-yl) methanone (R)-piperidin-3-yl (4-(quinolin-4-yl) piperazin-1-yl) methanone

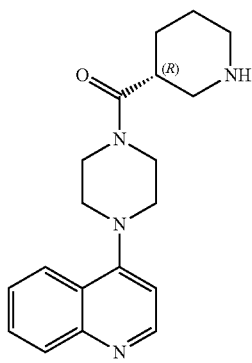

In the same manner as in the synthesis method of (11-2) piperidin-3-yl (4-(quinolin-4-yl) piperazin-1-yl) methanone, the target compound (12-2, 280 mg) was obtained as a yellow solid using (R)-tert-butyl 3-(4-(quinolin-4-yl) piperazine-1-carbonyl)piperidine-1-carboxylate (600 mg, 1.41 mmol) according to the method of Synthesis Method 1.

LC-MS (ESI): Rt=0.28 min, m/z 325.3 [M+H]⁺; purity: 100% @ 254 nm, 100% @ 214 nm.

(13) Synthesis of(S)-piperidin-3-yl (4-(quinolin-4-yl) piperazin-1-yl) methanone (Intermediate 13)

(S)-piperidin-3-yl (4-(quinolin-4-yl) piperazin-1-yl) methanone

(13-1) Synthesis of(S)-tert-butyl 3-(4-(quinolin-4-yl) piperazine-1-carbonyl)piperidine-1-carboxylate (S)-tert-butyl 3-(4-(quinolin-4-yl) piperazine-1-carbonyl)piperidine-1-carboxylate

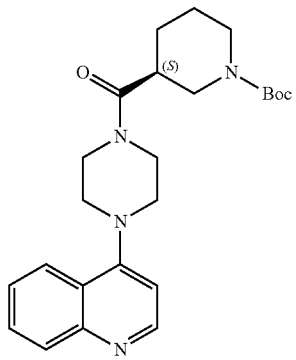

In the same manner as in the synthesis method of tert-butyl 3-(4-(quinolin-4-yl) piperazine-1-carbonyl)piperidine-1-carboxylate in (11-1) above, synthesis was carried out using(S)-1-(tert-butoxycarbonyl)piperidine-3-carboxylic acid (500 mg, 2.2 mmol) to obtain the target compound (13-1, 380 mg) as a yellow solid.

¹HNMR (400 MHZ, CDCl₃): 1HNMR (400 MHZ, CDCl₃): δ 8.76 (d, J=4.8 Hz, 1H), 8.10-8.02 (m, 2H), 7.69 (t, J=7.2 Hz, 1H), 7.53 (t, J=8.0 Hz, 1H), 6.86 (d, J=5.2 Hz, 1H), 4.25-4.11 (m, 2H), 3.91-3.80 (m, 4H), 3.62-3.21 (m, 4H), 2.94-2.84 (m, 1H), 2.68-2.63 (m, 2H), 1.97-1.92 (m, 1H), 1.88-1.73 (m, 3H), 1.47 (s, 9H). LC-MS (ESI): Rt=1.27 min, m/z 425.4 [M+H]⁺; purity: 100% @ 254 nm, 95.1% @ 214 nm.

(13-2) Synthesis of(S)-piperidin-3-yl (4-(quinolin-4-yl) piperazin-1-yl) methanone (S)-piperidin-3-yl (4-(quinolin-4-yl) piperazin-1-yl) methanone

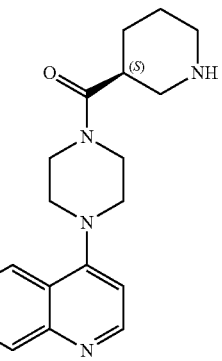

In the same manner as in the synthesis method of piperidin-3-yl (4-(quinolin-4-yl) piperazin-1-yl) methanone in (11-2) above, the target compound (13-2, 250 mg) was obtained as a yellow solid using(S)-tert-butyl 3-(4-(quinolin-4-yl) piperazine-1-carbonyl)piperidine-1-carboxylate (600 mg, 1.41 mmol) according to the method of Synthesis Method 1.

LC-MS (ESI): Rt=0.28 min, m/z 325.3 [M+H]⁺; purity: 100% @ 254 nm, 99.5% @ 214 nm.

(14) Synthesis of (4-(7-methoxyquinolin-4-yl) piperazin-1-yl) (piperidin-3-yl) methanone (Intermediate 14)

(4-(7-methoxyquinolin-4-yl) piperazin-1-yl) (piperidin-3-yl) methanone

(14-1) Synthesis of 7-methoxy-4-(piperazin-1-yl)quinoline 7-methoxy-4-(piperazin-1-yl)quinoline

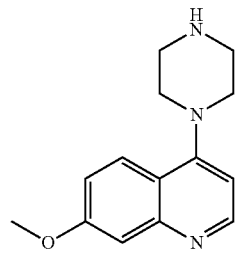 [SMILES: COc1ccc2c(N3CCNCC3)ccnc2c1]

Except for adding 4-chloro-2-methoxyquinoline (3.00 g, 15.5 mmol) instead of 4,7-dichloroquinoline, the target compound (14-1, 3.1 g) was obtained as a yellow solid in the same manner as in the synthesis of Intermediate 1 (1-1).

1H MNR: (400 MHZ, CDCl$_3$): δ 8.68 (d, J=6.8 Hz, 1H), 7.94 (d, J=12.4 Hz, 1H), 7.40 (d, J=3.2 Hz, 1H), 7.15 (dd, J=12.0, 3.6 Hz, 1H), 6.76 (d, J=6.8 Hz, 1H), 3.97 (s, 3H), 3.19-3.18 (m, 8H), 1.87 (s, 1H). LC-MS (ESI): Rt=1.213 min, m/z 224.1 [M+H]$^+$; purity: 100% @ 254 nm, 97% @ 214 nm.

(14-2) Synthesis of tert-butyl 3-(4-(7-methoxyquinolin-4-yl) piperazine-1-carbonyl)piperidine-1-carboxylate tert-butyl 3-(4-(7-methoxyquinolin-4-yl) piperazine-1-carbonyl)piperidine-1-carboxylate

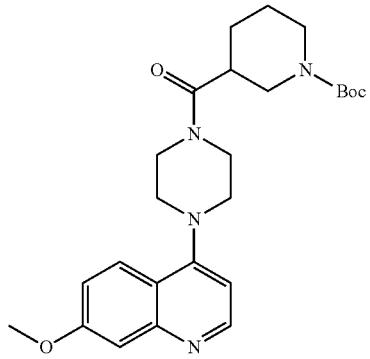 [SMILES: COc1ccc2c(N3CCN(C(=O)C4CCCN(C(=O)OC(C)(C)C)C4)CC3)ccnc2c1]

Except for adding 7-methoxy-4-(piperazin-1-yl)quinoline (1.50 g, 6.17 mmol) instead of 7-chloro-4-(piperazin-1-yl) quinoline, the target compound (14-2, 2.7 g) was obtained as a dark yellow solid in the same manner as in the synthesis of Intermediate 1 (1-2).

LC-MS (ESI): Rt=1.61 min, m/z 455.4 [M+H]$^+$; purity: 100% @ 254 nm, 93% @ 214 nm.

(14-3) Synthesis of (4-(7-methoxyquinolin-4-yl) piperazin-1-yl) (piperidin-3-yl) methanone (4-(7-methoxyquinolin-4-yl) piperazin-1-yl) (piperidin-3-yl) methanone

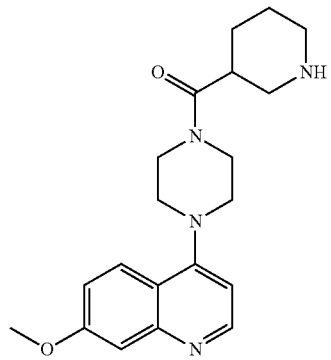 [SMILES: COc1ccc2c(N3CCN(C(=O)C4CCCNC4)CC3)ccnc2c1]

Except for adding tert-butyl 3-(4-(7-methoxyquinoline-4-yl) piperazine-1-carbonyl)piperidine-1-carboxylate (2.75 g, 6.04 mmol) instead of Tert-butyl 3-(4-(7-chloroquinolin-4-yl) piperazine-1-carbonyl)piperidine-1-carboxylate, the target compound (14-3, 1.8 g) was obtained as a yellow solid in the same manner as in the synthesis of Intermediate 1 (1-3).

LC-MS (ESI): Rt=1.30 min, m/z 355.4 [M+H]$^+$; purity: 100% @ 254 nm, 100% @ 214 nm.

(15) Synthesis of 1-((4-acetamidophenyl) sulfonyl) piperidine-3-carboxylic acid (Intermediate 15)

1-(4-acetamidophenylsulfonyl)piperidine-3-carboxylic acid

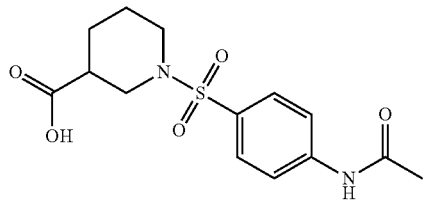 [SMILES: CC(=O)Nc1ccc(S(=O)(=O)N2CCCC(C(=O)O)C2)cc1]

According to Reaction Scheme 2, 4-acetamidobenzenesulfonyl chloride (3.0 g, 12.84 mmol), nipecotic acid (2.5 g, 19.36 mmol), sodium carbonate (51.4 mmol, 4 eq) were added to 60 ml of THF/water (1:1), and stir at room temperature for 12 hours. Then, tetrahydrofuran (THF) was concentrated under reduced pressure, ethyl acetate (50 ml) was added, and 1N hydrochloric acid solution was added to adjust pH to 2. The organic layer was separated, dried over Na$_2$SO, filtered, concentrated under reduced pressure, and purified using column chromatography (MeOH 5%). As a result, Intermediate 15 (2.9 g) was obtained as a white solid.

$^1$H NMR (400 MHZ, MeOH-d4) δ 7.87-7.79 (m, 2H), 7.77-7.71 (m, 2H), 3.71 (d, J=7.8 Hz, 1H), 3.54-3.45 (m, 1H), 2.65-2.53 (m, 2H), 2.47 (td, J=11.2, 3.0 Hz, 1H), 2.18 (d, J=2.2 Hz, 3H), 2.00-1.90 (m, 1H), 1.86-1.79 (m, 1H), 1.63 (ddd, J=9.8, 7.0, 3.4 Hz, 1H), 1.49-1.40 (m, 1H).

(16) Synthesis of 1-((4-nitrophenyl) sulfonyl)piperidine-3-carboxylic acid (Intermediate 16)

1-(4-nitrophenylsulfonyl)piperidine-3-carboxylic acid

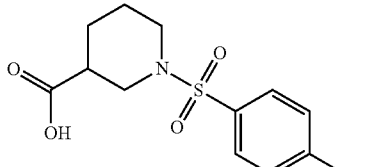

According to Reaction Formula 2, 4-nitrobenzene chloride (2.0 g, 9.02 mmol) was used instead of 4-acetamidobenzenesulfonyl chloride to obtain an intermediate (16, 1.7 g) as a yellow solid by the method of Reaction Formula 2.

$^1$H NMR (400 MHZ, MeOH-d4) δ 8.59-8.53 (m, 2H), 8.24-8.16 (m, 1H), 7.92 (dd, J=8.5, 7.8 Hz, 1H), 3.76 (dd,

J=11.6, 3.8 Hz, 1H), 3.62-3.51 (m, 1H), 2.79-2.71 (m, 1H), 2.62 (dd, J=16.5, 6.2 Hz, 2H), 2.02-1.93 (m, 1H), 1.88-1.80 (m, 1H), 1.74-1.56 (m, 2H), 1.50 (ddd, J=24.4, 10.6, 3.7 Hz, 1H).

Example 2: Synthesis of Quinoline-Based Target Material

The target compound was synthesized according to Reaction Formula 1-1 for the following example compounds.

[Reaction Formula 1-1]

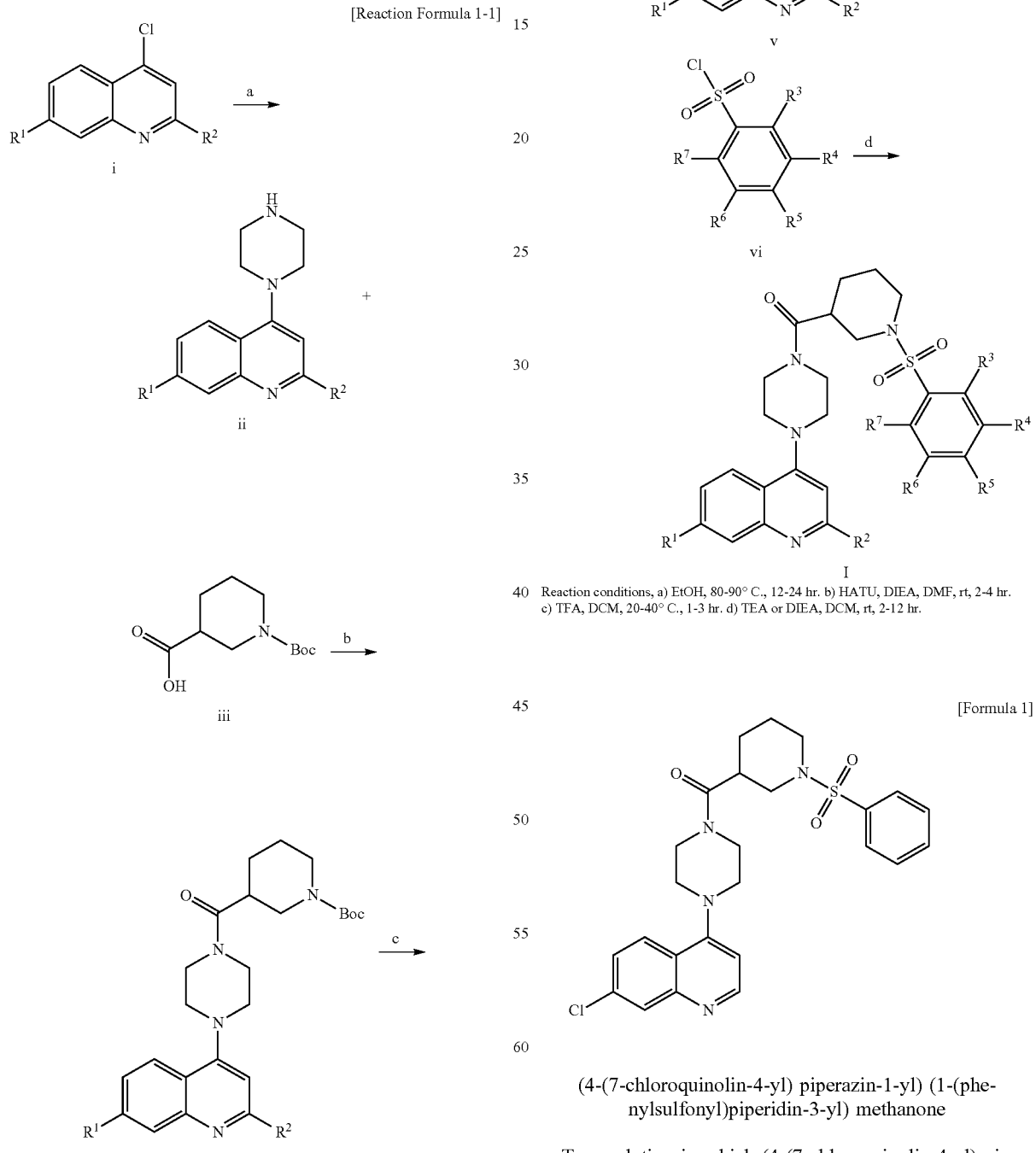

Reaction conditions, a) EtOH, 80-90° C., 12-24 hr. b) HATU, DIEA, DMF, rt, 2-4 hr. c) TFA, DCM, 20-40° C., 1-3 hr. d) TEA or DIEA, DCM, rt, 2-12 hr.

[Formula 1]

(4-(7-chloroquinolin-4-yl) piperazin-1-yl) (1-(phenylsulfonyl)piperidin-3-yl) methanone To a solution in which (4-(7-chloroquinolin-4-yl) piperazin-1-yl) (piperidin-3-yl) methanone (180 mg, 0.50 mmol) and TEA (152 mg, 1.50 mmol) in dichloromethane (DCM, 3 mL) was slowly added benzenesulfonyl chloride (133 mg, 0.75 mmol) diluted in dichloromethane (1 mL) at room temperature for 2 hours stir while. After the mixture was concentrated under reduced pressure, the residue was first purified using C18 chromatography using 40 ~ 90% CH₃CN (acetonitrile) aqueous solution as a developing solvent, followed by ethyl acetate (EtOAc) and n-hexane (n-hexane) to recrystallize, and the target compound (Formula 1, 160 mg) was obtained as a white solid.

$^1$H NMR (400 MHZ, DMSO-d$_6$): δ 8.73 (d, J=5.2 Hz, 1H), 8.12 (d, J=9.2 Hz, 1H), 8.00 (d, J=2.4 Hz, 1H), 7.77-7.73 (m, 3H), 7.70-7.66 (m, 2H), 7.60 (dd, J=8.8, 2.0 Hz, 1H), 7.05 (d, J=5.2 Hz, 1H), 3.79-3.64 (m, 6H), 3.26-3.21 (m, 4H), 2.98-2.92 (m, 1H), 2.33 (t, J=11.6 Hz, 1H), 2.22-2.16 (m, 1H), 1.82-1.73 (m, 2H), 1.66-1.57 (m, 1H), 1.28-1.18 (m, 1H). LC-MS (ESI): Rt=3.906 min, m/z 499.2 [M+H]$^+$; purity: 99.40% @ 254 nm, 99.75% @ 214 nm.

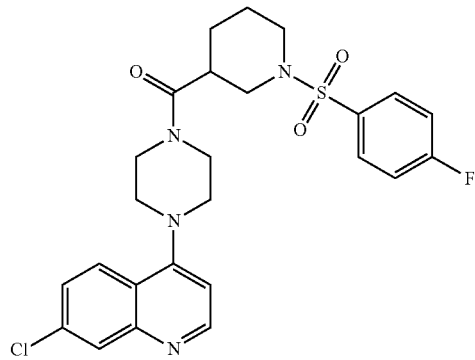

[Formula 3]

(4-(7-chloroquinolin-4-yl) piperazin-1-yl) (1-((4-fluorophenyl) sulfonyl) piperidin-3-yl) methanone Except for using 4-fluorobenzene-1-sulfonyl chloride (65 mg, 0.33 mmol) instead of benzenesulfonyl chloride, Formula 3 (70 mg) was obtained as a white solid in the same manner as in the preparation of the compound of Formula 1 above.

$^1$HNMR (400 MHZ, DMSO-d$_6$): δ 8.74 (d, J=4.8 Hz, 1H), 8.11 (d, J=8.8 Hz, 1H), 8.01 (d, J=2.4 Hz, 1H), 7.85-7.82 (m, 2H), 7.59 (dd, J=8.8, 2.4 Hz, 1H), 7.54-7.50 (m, 2H), 7.04 (d, J=5.2 Hz, 1H), 3.80-3.64 (m, 6H), 3.23-3.13 (m, 4H), 2.99-2.94 (m, 1H), 2.34 (t, J=11.2 Hz, 1H), 2.24-2.18 (m, 1H), 1.82-1.73 (m, 2H), 1.66-1.56 (m, 1H), 1.29-1.93 (m, 1H). LC-MS (ESI): Rt=3.343 min, m/z 517.2 [M+H]$^+$; purity: 99.07% @ 254 nm, 99.67% @ 214 nm.

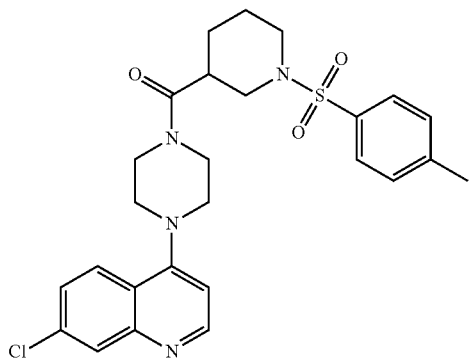

[Formula 2]

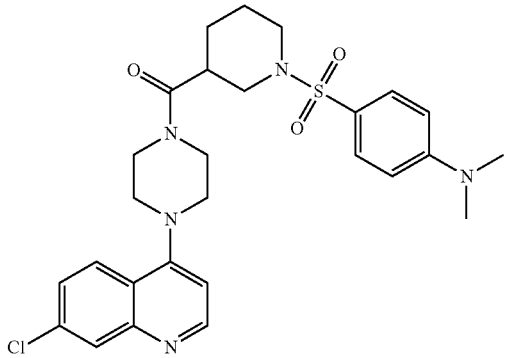

[Formula 4]

(4-(7-chloroquinolin-4-yl) piperazin-1-yl) (1-tosylpiperidin-3-yl) methanone

Except for using 4-methylbenzene-1-sulfonyl chloride (80 mg, 0.42 mmol) instead of benzenesulfonyl chloride, Formula 2 (75 mg) was obtained as a white solid in the same manner as in the preparation of the compound of Formula 1 above.

$^1$H NMR (400 MHZ, CDCl$_3$): δ 8.76 (d, J=4.8 Hz, 1H), 8.08 (d, J=2.4 Hz, 1H), 7.95 (d, J=8.8 Hz, 1H), 7.65 (d, J=8.4 Hz, 2H), 7.48 (dd, J=9.2, 2.4 Hz, 1H), 7.33 (d, J=8.0 Hz, 2H), 7.05 (d, J=5.2 Hz, 1H), 6.86 (d, J=5.2 Hz, 1H), 3.88-3.78 (m, 6H), 3.26-3.18 (m, 4H), 2.95-2.88 (m, 1H), 2.49 (t, J=11.2 Hz, 1H), 2.23 (td, J=13.2, 2.8 Hz, 1H), 1.89-1.82 (m, 2H), 1.80-1.68 (m, 1H), 1.54-1.44 (m, 1H).LC-MS (ESI): Rt=2.390 min, m/z 513.2 [M+H]$^+$; purity: 99.71% @ 254 nm, 99.67% @ 214 nm.

(4-(7-chloroquinolin-4-yl) piperazin-1-yl) (1-((4-(dimethylamino)phenyl) sulfonyl)piperidin-3-yl) methanone Except for using 4-(methylamino)benzene-1-sulfonyl chloride (54 mg, 0.25 mmol) instead of benzenesulfonyl chloride, Formula 4 (70 mg) was obtained as a white solid in the same manner as in the preparation of the compound of Formula 1 above.

$^1$H NMR (400 MHZ, CDCl$_3$): δ 8.76 (d, J=4.4 Hz, 1H), 8.07-8.07 (m, 1H), 7.95 (d, J=8.8 Hz, 1H), 7.60-7.57 (m, 2H), 7.47 (dd, J=8.8, 2.0 Hz, 1H), 6.86 (d, J=4.8 Hz, 1H), 6.69-6.67 (m, 1H), 3.88-3.80 (m, 6H), 3.24-3.18 (m, 4H), 3.05 (s, 6H), 2.95-2.88 (m, 1H), 2.45 (t, J=11.2 Hz, 1H), 2.23-2.17 (m, 1H), 1.87-1.81 (m, 2H), 1.77-1.71 (m, 1H), 1.53-1.42 (m, 1H). LC-MS (ESI): Rt=2.941 min, m/z 542.2 [M+H]⁺; purity: 99.81% @ 254 nm, 99.63% @ 214 nm.

[Formula 5]

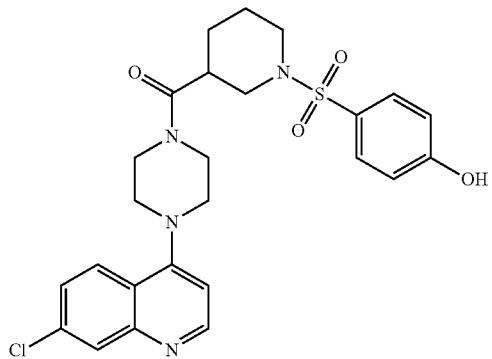

(4-(7-chloroquinolin-4-yl) piperazin-1-yl) (1-((4-hydroxyphenyl) sulfonyl) piperidin-3-yl) methanone Except for using 4-hydroxybenzene-1-sulfonyl chloride (97 mg, 0.50 mmol) instead of benzenesulfonyl chloride, Formula 5 (40 mg) was obtained as a white solid in the same manner as for the preparation of compound of Formula 1 above.

¹H NMR (400 MHZ, DMSO-d₆): 0 10.50 (br, 1H), 8.73 (d, J=5.2 Hz, 1H), 8.10 (d, J=10.4 Hz, 1H), 8.00 (d, J=2.0 Hz, 1H), 7.60-7.54 (m, 3H), 7.03 (d, J=4.8 Hz, 1H), 6.95 (d, J=8.8 Hz, 2H), 3.79-3.72 (m, 4H), 3.61-3.57 (m, 2H), 3.20-3.14 (m, 4H), 2.96-2.90 (m, 1H), 2.28 (t, J=11.6 Hz, 1H), 2.16-2.11 (m, 1H), 1.80-1.72 (m, 2H), 1.65-1.55 (m, 1H), 1.26-1.17 (m, 1H).LC-MS (ESI): Rt=3.217 min, m/z 515.2 [M+H]⁺; purity: 97.98% @ 254 nm, 97.82% @ 214 nm.

[Formula 6]

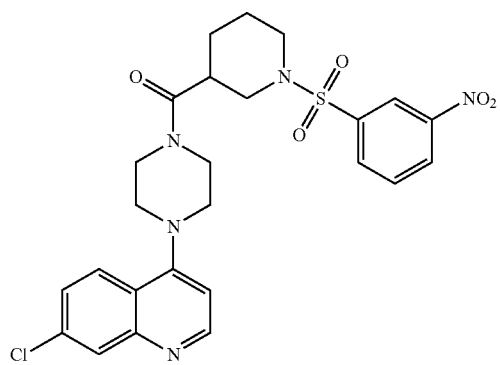

(4-(7-chloroquinolin-4-yl) piperazin-1-yl) (1-((3-nitrophenyl) sulfonyl) piperidin-3-yl) methanone Except for using 3-nitrobenzene-1-sulfonyl chloride (54 mg, 0.25 mmol) instead of benzenesulfonyl chloride, Formula 6 (60 mg) was obtained as a white solid in the same manner as for the preparation of compound of Formula 1 above.

¹H NMR (400 MHZ, DMSO-d₆): δ 8.73 (d, J=5.2 Hz, 1H), 8.58-8.55 (m, 1H), 8.39 (t, J=1.6 Hz, 1H), 8.22-8.20 (m, 1H), 8.11 (d, J=9.2 Hz, 1H), 8.01-7.96 (m, 2H), 7.59 (dd, J=9.2, 2.4 Hz, 1H), 7.04 (d, J=5.2 Hz, 1H), 3.85-3.80 (m, 2H), 3.72-3.71 (m, 4H), 3.22-3.19 (m, 4H), 3.00-2.94 (m, 1H), 2.50-2.46 (m, 1H), 2.41-2.35 (m, 1H), 1.83-1.74 (m, 2H), 1.64-1.61 (m, 1H), 1.32-1.23 (m, 1H).LC-MS (ESI): Rt=3.339 min, m/z 544.1 [M+H]⁺; purity: 99.16% @ 254 nm, 99.19% @ 214 nm.

[Formula 7]

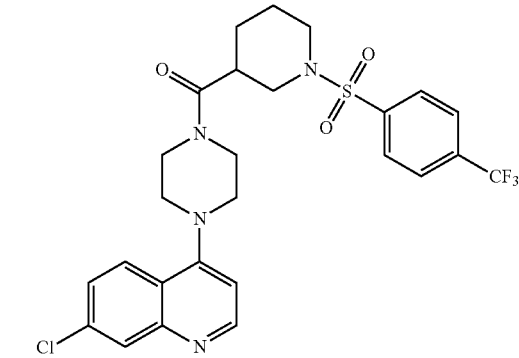

(4-(7-chloroquinolin-4-yl) piperazin-1-yl) (1-((4-(trifluoromethyl)phenyl) sulfonyl)piperidin-3-yl) methanone Except for using 4-(fluoromethyl)benzene-1-sulfonyl chloride (60 mg, 0.25 mmol) instead of benzenesulfonyl chloride, Formula 7 (60 mg) was obtained as a white solid in the same manner as in the preparation of the compound of Formula 1 above.

¹H NMR (400 MHZ, DMSO-d₆): δ 8.74 (d, J=4.8 Hz, 1H), 8.12-8.05 (m, 3H), 8.01-7.97 (m, 3H), 7.60-7.58 (m, 1H), 7.04 (d, J=5.2 Hz, 1H), 3.80-3.67 (m, 6H), 3.26-3.14 (m, 4H), 3.00-2.94 (m, 1H), 2.42 (t, J=10.8 Hz, 1H), 2.32-2.27 (m, 1H), 1.82-1.74 (m, 2H), 1.65-1.62 (m, 1H), 1.32-1.23 (m, 1H).LC-MS (ESI): Rt=4.056 min, m/z 567.2 [M+H]⁺; purity: 97.21% @ 254 nm, 97.88% @ 214 nm.

[Formula 8]

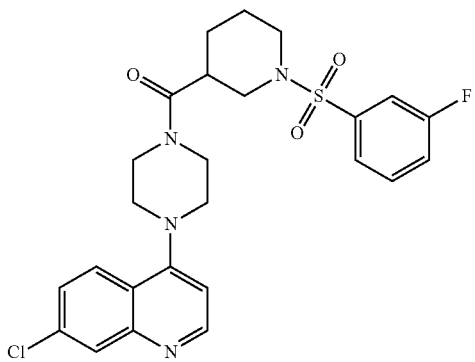

(4-(7-chloroquinolin-4-yl) piperazin-1-yl) (1-((3-fluorophenyl) sulfonyl) piperidin-3-yl) methanone Except for using 3-fluorobenzene-1-sulfonyl chloride (65 mg, 0.33 mmol) instead of benzenesulfonyl chloride, Formula 8 (70 mg) was obtained as a white solid in the same manner as in the preparation of the compound of Formula 1 above.

$^1$H NMR (400 MHZ, DMSO-d$_6$): δ 8.74 (d, J=4.8 Hz, 1H), 8.11 (d, J=9.2 Hz, 1H), 8.01 (d, J=2.4 Hz, 1H), 7.77-7.72 (m, 1H), 7.65-7.57 (m, 4H), 7.04 (d, J=4.8 Hz, 1H), 3.80-3.66 (m, 6H), 3.26-3.14 (m, 4H), 2.99-2.93 (m, 1H), 2.39 (t, J=11.6 Hz, 1H), 2.30-2.24 (m, 1H), 1.82-1.73 (m, 2H), 1.67-1.60 (m, 1H), 1.31-1.20 (m, 1H).LC-MS (ESI): Rt=3.758 min, m/z 517.2 [M+H]$^+$; purity: 99.12% @ 254 nm, 99.26% @ 214 nm.

[Formula 9]

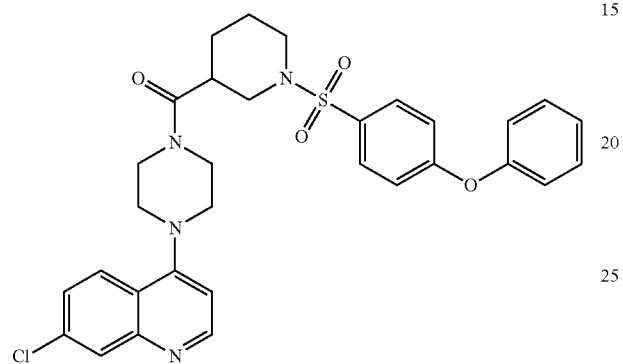

(4-(7-chloroquinolin-4-yl) piperazin-1-yl) (1-((4-phenoxyphenyl) sulfonyl) piperidin-3-yl) methanone Except for using 4-phenoxybenzene-1-sulfonyl chloride (66 mg, 0.25 mmol) instead of benzenesulfonyl chloride, Formula 9 (80 mg) was obtained as a white solid in the same manner as in the preparation of compound of Formula 1 above.

$^1$H NMR (400 MHZ, DMSO-d$_6$): δ 8.73 (d, J=5.2 Hz, 1H), 8.10 (d, J=8.8 Hz, 1H), 8.01-8.00 (m, 1H), 7.76-7.74 (m, 2H), 7.58 (dd, J=8.8, 2.0 Hz, 1H), 7.50-7.46 (m, 2H), 7.30-7.26 (m, 1H), 7.19-7.16 (m, 4H), 7.03 (d, J=4.8 Hz, 1H), 3.78-3.62 (m, 6H), 3.21-3.14 (m, 4H), 2.99-2.93 (m, 1H), 2.34 (t, J=11.6 Hz, 1H), 2.24-2.18 (m, 1H), 1.82-1.74 (m, 2H), 1.67-1.57 (m, 1H), 1.29-1.20 (m, 1H).LC-MS (ESI): Rt=3.939 min, m/z 591.2 [M+H]$^+$; purity: 99.66% @ 254 nm, 99.64% @ 214 nm.

[Formula 10]

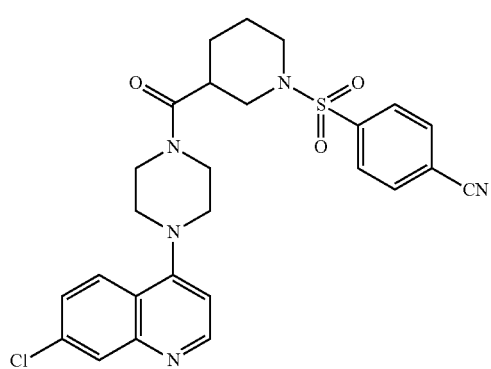

4-(3-(1-(7-chloroquinolin-4-yl) piperazine-4-carbonyl)piperidin-1-ylsulfonyl)benzonitrile Except for using 4-cyanobenzene-1-sulfonyl chloride (50 mg, 0.25 mmol) instead of benzenesulfonyl chloride, Formula 10 (65 mg) was obtained as a white solid in the same manner as in the preparation of compound of Formula 1 above.

$^1$H NMR (400 MHZ, CDCl$_3$): δ 8.77 (d, J=5.2 Hz, 1H), 8.08 (d, J=1.6 Hz, 1H), 7.95 (d, J=8.8 Hz, 1H), 7.89-7.83 (m, 4H), 7.47 (dd, J=8.8, 1.6 Hz, 1H), 6.86 (d, J=5.2 Hz, 1H), 3.91-3.82 (m, 6H), 3.26-3.18 (m, 4H), 2.95-2.89 (m, 1H), 2.59 (t, J=11.2 Hz, 1H), 2.30 (td, J=12.0, 2.0 Hz, 1H), 1.94-1.85 (m, 2H), 1.77-1.73 (m, 1H), 1.59-1.48 (m, 1H). LC-MS (ESI): Rt=3.170 min, m/z 524.2 [M+H]$^+$; purity: 99.73% @ 254 nm, 99.40% @ 214 nm.

[Formula 11]

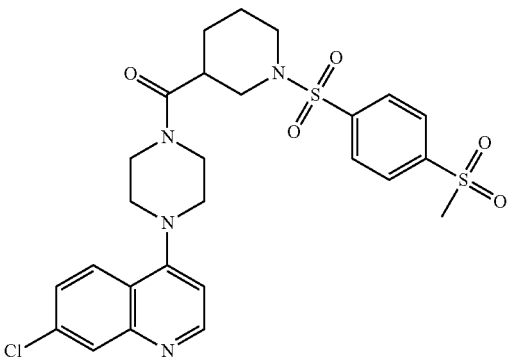

(4-(7-chloroquinolin-4-yl) piperazin-1-yl) (1-(4-(methylsulfonyl)phenylsulfonyl)piperidin-3-yl) methanone Except for using 4-(methylsulfonyl)benzene-1-sulfonyl chloride (63 mg, 0.25 mmol) instead of benzenesulfonyl chloride, Formula 11 (70 mg) was obtained as a white solid in the same manner as in the preparation of the compound of Formula 1.

$^1$H NMR (400 MHZ, CDCl$_3$): δ 8.77 (d, J=4.8 Hz, 1H), 8.14-8.08 (m, 3H), 7.98-7.94 (m, 3H), 7.47 (d, J=8.0 Hz, 1H), 6.86 (d, J=4.8 Hz, 1H), 3.92-3.82 (m, 6H), 3.23-3.18 (m, 4H), 2.94-2.89 (m, 1H), 2.61 (t, J=11.6 Hz, 1H), 2.33 (t, J=10.8 Hz, 1H), 1.94-1.86 (m, 2H), 1.77-1.73 (m, 1H), 1.56-.44 (m, 1H). LC-MS (ESI): Rt=2.987 min, m/z 577.2 [M+H]$^+$; purity: 99.76% @ 254 nm, 98.53% @ 214 nm.

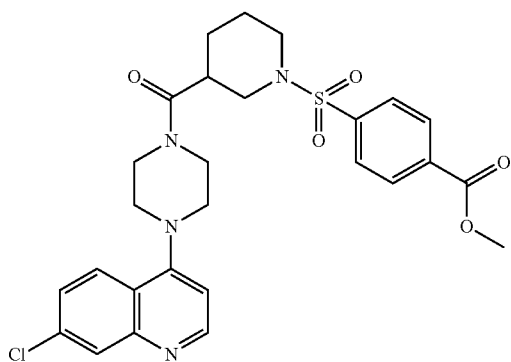

methyl 4-((3-(1-(7-chloroquinolin-4-yl) piperazine-1-carbonyl)piperidin-1-yl) sulfonyl)benzoate Except for using methyl 4-(chlorosulfonyl)benzoate (108 mg, 0.46 mmol) instead of benzenesulfonyl chloride, Formula 12 (90 mg) was obtained as a white solid in the same manner as in the preparation of the compound of Formula 1.

$^1$H NMR (400 MHZ, CDCl$_3$): δ 8.76 (d, J=4.8 Hz, 1H), 8.19 (d, J=8.0 Hz, 2H), 8.08 (s, 1H), 7.95 (d, J=8.8 Hz, 1H), 7.83 (d, J=8.0 Hz, 2H), 7.47 (dd, J=9.2, 1.6 Hz, 1H), 6.86 (d, J=4.8 Hz, 1H), 3.97 (s, 3H), 3.92-3.82 (m, 6H), 3.26-3.18 (m, 4H), 2.94-2.89 (m, 1H), 2.55 (t, J=11.2 Hz, 1H), 2.28 (t, J=12.0 Hz, 1H), 1.92-1.83 (m, 2H), 1.79-1.72 (m, 1H), 1.53-1.44 (m, 1H). LC-MS (ESI): Rt=3.898 min, m/z 557.2 [M+H]$^+$; purity: 98.44% @ 254 nm, 97.77% @ 214 nm.

[Formula 13]

(4-(7-chloroquinolin-4-yl) piperazin-1-yl) (1-(4-phenylbenzenesulfonyl)piperidin-3-yl) methanone Except for using methyl [1,1'-biphenyl]-4-sulfonyl chloride (62 mg, 0.25 mmol) instead of benzenesulfonyl chloride, Formula 13 (70 mg) was obtained as a white solid in the same manner as in the preparation of the compound of Formula 1 above.

$^1$H NMR (400 MHZ, CDCl$_3$): δ 8.76 (d, J=4.8 Hz, 1H), 8.08 (d, J=2.0 Hz, 1H), 7.95 (d, J=8.8 Hz, 1H), 7.82 (d, J=8.4 Hz, 2H), 7.73 (d, J=8.4 Hz, 2H), 7.60 (d, J=8.4 Hz, 2H), 7.51-7.47 (m, 3H), 7.46-7.42 (m, 1H), 6.86 (d, J=5.2 Hz, 1H), 3.93-3.83 (m, 6H), 3.25-3.19 (m, 4H), 2.96-2.91 (m, 1H), 2.58 (t, J=11.2 Hz, 1H), 2.32 (td, J=8.0, 2.4 Hz, 1H), 1.88-1.84 (m, 2H), 1.77-1.73 (m, 1H), 1.53-1.49 (m, 1H). LC-MS (ESI): Rt=3.107 min, m/z 575.1 [M+H]$^+$; purity: 98.55% @ 254 nm, 98.72% @ 214 nm.

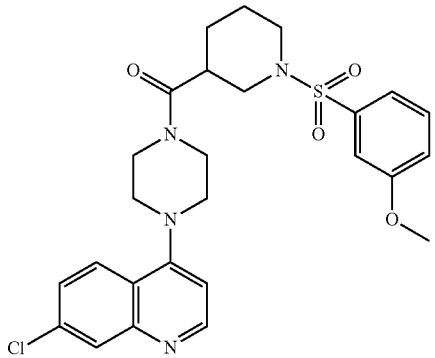

(4-(7-chloroquinolin-4-yl) piperazin-1-yl) (1-(3-methoxyphenyl) sulfonyl)piperidin-3-yl) methanone Except for using 3-methoxybenzene-1-sulfonyl chloride (95 mg, 0.46 mmol) instead of benzenesulfonyl chloride, Formula 14 (50 mg) was obtained as a white solid in the same manner as in the preparation of the compound of Formula 1 above.

LC-MS (ESI): Rt=1.68 min, m/z 529.2 [M+H]$^+$; purity: 100% @ 254 nm, 100% @214 nm.

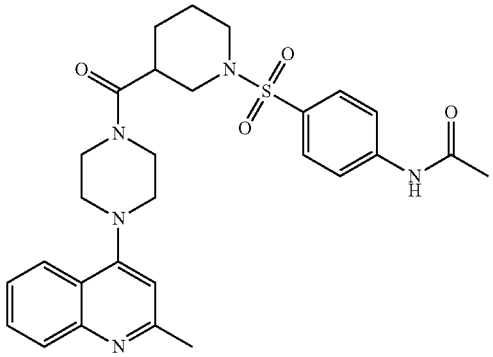

N-(4-(3-(1-(2-methylquinolin-4-yl) piperazine-4-carbonyl)piperidin-1-ylsulfonyl)phenyl) acetamide To a solution in which (4-(2-methylquinolin-4-yl) piperazin-1-yl) (piperidin-3-yl) methanone (180 mg, 0.53 mmol) and TEA (152 mg) in DCM (2 mL) was slowly 4-acetamidobenzene-1-sulfonyl chloride (59 mg, 0.25 mmol) diluted in DCM (1 mL) at room temperature for 2 hours stir while. After the mixture was concentrated under reduced pressure, the residue was first purified using C18 chromatography using 40 ~ 90% CH$_3$CN (acetonitrile) aqueous solution as a developing solvent to obtain the target compound of Formula 15 (70 mg).

$^1$H NMR (400 MHZ, CDCl$_3$): δ 8.04 (d, J=8.4 Hz, 1H), 7.96 (d, J=8.4 Hz, 1H), 7.83 (s, 1H), 7.71-7.64 (m, 5H), 7.47

(t, J=8.0 Hz, 1H), 6.75 (s, 1H), 3.87-3.82 (m, 6H), 3.27-3.21 (m, 4H), 2.93-2.87 (m, 1H), 2.71 (s, 3H), 2.50 (t, J=11.2 Hz, 1H), 2.28-2.24 (m, 1H), 2.22 (s, 3H), 1.90-1.73 (m, 3H), 1.53-1.45 (m, 1H). LC-MS (ESI): Rt=3.394 min, m/z 536.3 [M+H]$^+$; purity: 99.42% @ 254 nm, 99.71% @ 214 nm.

[Formula 16]

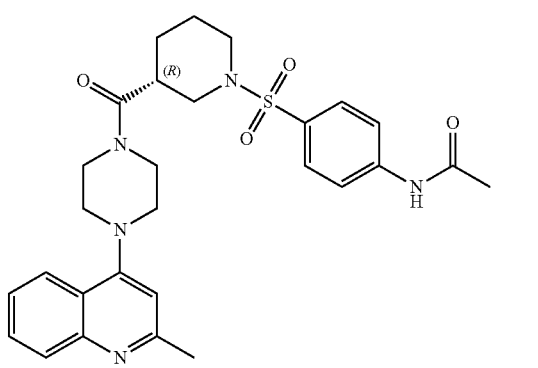

(R)—N-(4-((3-(4-(2-methylquinolin-4-yl) piperazine-1-carbonyl)piperidin-1-yl) sulfonyl)phenyl) acetamide Except for using (R)-(4-(2-methylquinolin-4-yl) piperazin-1-yl) (piperidin-3-yl) methanone (70 mg) instead of (4-(2-methylquinolin-4-yl) piperazin-1-yl) (piperidin-3-yl) methanone, Formula 16 (90 mg) was obtained as a white solid in the same manner as in the preparation of the compound of Formula 15

$^1$H NMR (400 MHZ, CDCl$_3$): δ 8.02-7.95 (m, 2H), 7.84-7.78 (m, 1H), 7.73-7.70 (m, 4H), 7.65 (t, J=7.2 Hz, 1H), 7.47 (t, J=7.2 Hz, 1H), 6.76 (s, 1H), 3.88-3.79 (m, 6H), 3.25-3.18 (m, 4H), 2.95-2.88 (m, 1H), 2.70 (s, 3H), 2.50 (t, J=11.2 Hz, 1H), 2.28-2.24 (m, 1H), 2.22 (s, 3H), 1.91-1.83 (m, 2H), 1.77-1.71 (m, 1H), 1.53-1.44 (m, 1H).LC-MS (ESI): Rt=3.540 min, m/z 536.3 [M+H]$^+$; purity: 96.69% @ 254 nm, 98.68% @ 214 nm.

chiral HPLC: Column: Chiralpak IB 5 μm 4.6×250 mm; Mobile Phase: Hex: EtOH=60:40 at 1 mL/min; Temp: 30° C.; Wavelength: 254 nm, Rt=11.523 min, 99.45% ee

[Formula 17]

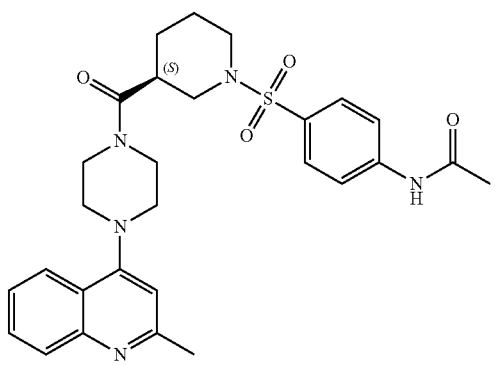

(S)—N-(4-((3-(4-(2-methylquinolin-4-yl) piperazine-1-carbonyl)piperidin-1-yl) sulfonyl)phenyl) acetamide Except for using(S)-(4-(2-methylquinolin-4-yl) piperazin-1-yl) (piperidin-3-yl) methanone (70 mg) instead of (4-(2-methylquinolin-4-yl) piperazin-1-yl) (piperidin-3-yl) methanone, Formula 17 (80 mg) was obtained as a white solid in the same manner as in the preparation of the compound of Formula 15.

$^1$H NMR (400 MHZ, CDCl$_3$): δ 8.01-7.95 (m, 2H), 7.90 (br s, 1H), 7.70-7.67 (m, 4H), 7.65-7.63 (m, 1H), 7.47 (t, J=7.2 Hz, 1H), 6.76 (s, 1H), 3.88-3.83 (m, 6H), 3.29-3.18 (m, 4H), 2.94-2.88 (m, 1H), 2.70 (s, 3H), 2.50 (t, J=11.2 Hz, 1H), 2.28-2.23 (m, 1H), 2.22 (s, 3H), 1.91-1.83 (m, 2H), 1.77-1.73 (m, 1H), 1.53-1.43 (m, 1H).LC-MS (ESI): Rt=3.354 min, m/z 536.3 [M+H]$^+$; purity: 98.62% @ 254 nm, 98.95% @ 214 nm.

chiral HPLC: Column: Chiralpak IB 5 μm 4.6×250 mm; Mobile Phase: Hex: EtOH=60:40 at 1 mL/min; Temp: 30° C.; Wavelength: 254 nm, Rt=9.466 min, 99.16% ee.

[Formula 18]

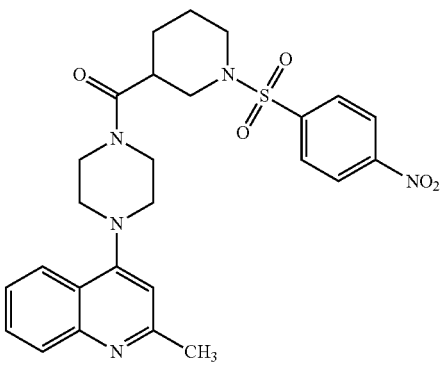

(4-(2-methylquinolin-4-yl) piperazin-1-yl) (1-(4-nitrophenylsulfonyl) piperidin-3-yl) methanone Except for using 4-nitrobenzene-1-sulfonyl chloride instead of 4-acetamidobenzene-1-sulfonyl chloride, Formula 18 was obtained as a white solid in the same manner as in the preparation of the compound of Formula 15.

1H NMR (400 MHZ, CDCl$_3$): δ 8.39 (d, J=8.8 Hz, 2H), 8.02-7.95 (m, 4H), 7.66 (t, J=8.0 Hz, 1H), 7.47 (t, J=8.0 Hz, 1H), 6.75 (s, 1H), 3.95-3.76 (m, 6H), 3.32-3.19 (m, 4H), 2.98-2.91 (m, 1H), 2.70 (s, 3H), 2.61 (t, J=11.2 Hz, 1H), 2.36-2.29 (m, 1H), 1.96-1.87 (m, 2H), 1.82-1.75 (m, 1H), 1.55-1.49 (m, 1H). LC-MS (ESI): Rt=3.153 min, m/z 524.2 [M+H]$^+$; purity: 96.71% @ 254 nm, 97.49% @ 214 nm.

[Formula 19]

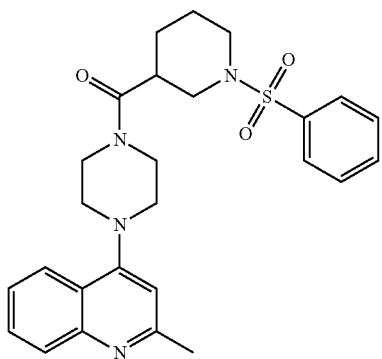

(4-(2-methylquinolin-4-yl) piperazin-1-yl) (1-(phenylsulfonyl)piperidin-3-yl) methanone Except for using benzene-1-sulfonyl chloride instead of 4-acetamidobenzene-1-sulfonyl chloride, Formula 19 (40 mg) was obtained as a white solid in the same manner as for the preparation of the compound of Formula 15.

$^1$H NMR (400 MHZ, CDCl$_3$): δ 8.02-7.95 (m, 2H), 7.77 (d, J=7.6 Hz, 2H), 7.68-7.60 (m, 2H), 7.56-7.53 (m, 2H), 7.46 (t, J=7.6 Hz, 1H), 6.75 (s, 1H), 3.92-3.76 (m, 6H), 3.26-3.18 (m, 4H), 2.96-2.90 (m, 1H), 2.70 (s, 3H), 2.53 (t, J=11.6 Hz, 1H), 2.29-2.22 (m, 1H), 1.91-1.82 (m, 2H), 1.79-1.69 (m, 1H), 1.55-1.44 (m, 1H).LC-MS (ESI): Rt=3.674 min, m/z 479.2 [M+H]$^+$; purity: 95.25% @ 254 nm, 97.43% @ 214 nm.

[Formula 20]

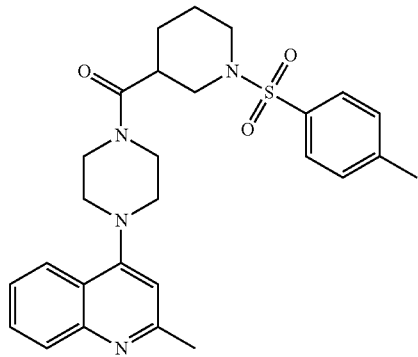

(4-(2-methylquinolin-4-yl) piperazin-1-yl) (1-tosylpiperidin-3-yl) methanone

Except for using 4-methylbenzene-1-sulfonyl chloride instead of 4-acetamidobenzene-1-sulfonyl chloride, Formula 20 (60 mg) was obtained as a white solid in the same manner as for the preparation of compound of Formula 15.

$^1$H NMR (400 MHZ, DMSO-d$_6$): δ 8.02 (d, J=8.0 Hz, 1H), 7.87 (d, J=8.0 Hz, 1H), 7.69-7.63 (m, 3H), 7.52-7.46 (m, 3H), 6.92 (s, 1H), 3.79-3.71 (m, 4H), 3.66-3.61 (m, 2H), 3.20-3.14 (m, 4H), 2.97-2.92 (m, 1H), 2.59 (s, 3H), 2.42 (s, 3H), 2.30 (t, J=11.2 Hz, 1H), 2.18-2.13 (m, 1H), 1.81-1.72 (m, 2H), 1.66-1.57 (m, 1H), 1.26-1.17 (m, 1H).LC-MS (ESI): Rt=4.042 min, m/z 493.3, 3 [M+H]$^+$; purity: 99.79% @ 254 nm, 99.42% @ 214 nm.

[Formula 21]

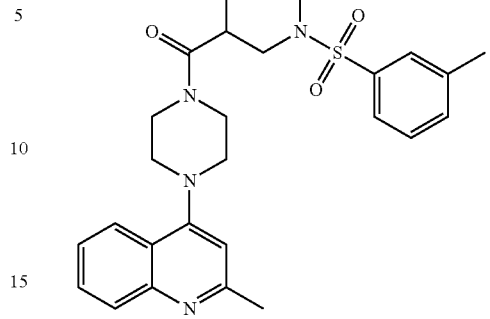

(4-(2-methylquinolin-4-yl) piperazin-1-yl) (1-(m-tolylsulfonyl)piperidin-3-yl) methanone Except for using 3-methylbenzene-1-sulfonyl chloride instead of 4-acetamidobenzene-1-sulfonyl chloride, Formula 21 (40 mg) was obtained as a white solid in the same manner as for the preparation of compound of Formula 15.

$^1$HNMR (400 MHZ, CDCl$_3$): δ 8.02-7.96 (m, 2H), 7.68-7.64 (m, 1H), 7.57-7.56 (m, 2H), 7.47 (t, J=7.2 Hz, 1H), 7.43-7.41 (m, 2H), 6.76 (s, 1H), 3.90-3.80 (m, 6H), 3.31-3.18 (m, 4H), 2.97-2.90 (m, 1H), 2.70 (s, 1H), 2.53 (t, J=11.6 Hz, 1H), 2.44 (s, 3H), 2.29-2.23 (m, 1H), 1.91-1.83 (m, 2H), 1.76-1.69 (m, 1H), 1.55-1.45 (m, 1H).LC-MS (ESI): Rt=4.090 min, m/z 493.2 [M+H]$^+$; purity: 99.75% @ 254 nm, 99.93% @ 214 nm.

[Formula 22]

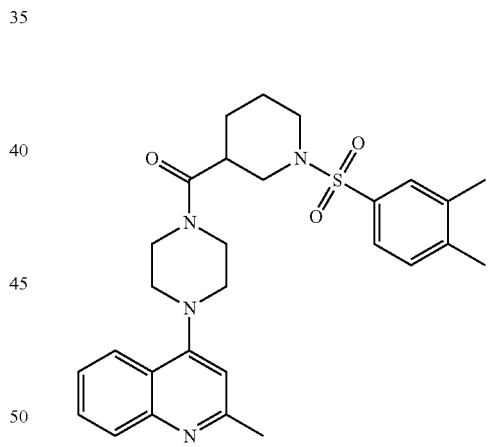

(1-((3,4-dimethylphenyl) sulfonyl)piperidin-3-yl) (4-(2-methylquinolin-4-yl) piperazin-1-yl) methanone Except for using 3,4-dimethylbenzene-1-sulfonyl chloride instead of 4-acetamidobenzene-1-sulfonyl chloride, Formula 22 (60 mg) was obtained as a white solid in the same manner as in the preparation of the compound of Formula 15.

$^1$HNMR (400 MHZ, DMSO-d$_6$): δ 8.01 (d, J=8.0 Hz, 1H), 7.86 (d, J=8.4 Hz, 1H), 7.66 (t, J=8.0 Hz, 1H), 7.52-7.42 (m, 4H), 6.91 (s, 1H), 3.79-3.60 (m, 6H), 3.18-3.10 (m, 4H), 2.95 (t, J=11.2 Hz, 1H), 2.58 (s, 3H), 2.33-2.32 (m, 6H), 2.29-2.27 (m, 1H), 2.19-2.14 (m, 1H), 1.81-1.72 (m, 2H), 1.66-1.57 (m, 1H), 1.26-1.17 (m, 1H).LC-MS (ESI): Rt=3.953 min, m/z 507.2 [M+H]$^+$; purity: 98.99% @ 254 nm, 99.65% @ 214 nm.

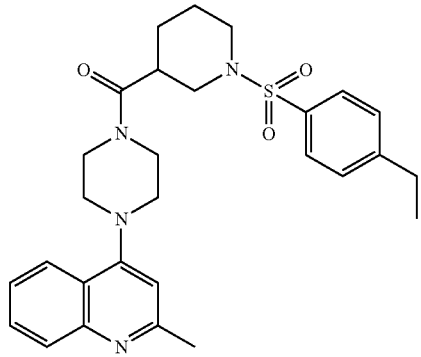

[Formula 23]

(1-(4-ethylphenylsulfonyl)piperidin-3-yl) (4-(2-methylquinolin-4-yl) piperazin-1-yl) methanone Except for using 4-ethylbenzene-1-sulfonyl chloride instead of 4-acetamidobenzene-1-sulfonyl chloride, Formula 23 (70 mg) was obtained as a white solid in the same manner as for the preparation of compound of Formula 15.

$^1$H NMR (400 MHZ, CDCl$_3$): δ 8.01-7.95 (m, 2H), 7.68-7.63 (m, 3H), 7.46 (t, J=7.2 Hz, 1H), 7.35 (d, J=8.0 Hz, 2H), 6.75 (s, 1H), 3.89-3.77 (m, 6H), 3.28-3.17 (m, 4H), 2.95-2.90 (m, 1H), 2.76-2.72 (m, 2H), 2.70 (s, 3H), 2.49 (t, J=11.6 Hz, 1H), 2.22 (t, J=11.6 Hz, 1H), 1.89-1.82 (m, 2H), 1.78-1.68 (m, 1H), 1.53-1.44 (m, 1H), 1.27 (t, J=7.6 Hz, 3H). LC-MS (ESI): Rt=2.547 min, m/z 507.3 [M+H]$^+$; purity: 98.01% @ 254 nm, 97.65% @ 214 nm.

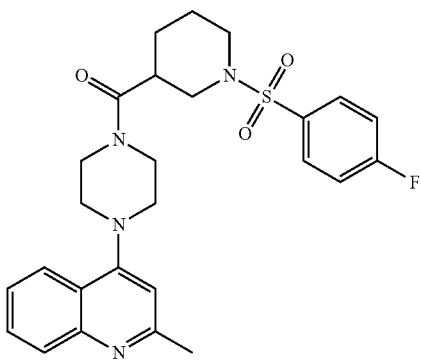

[Formula 24]

(1-((4-fluorophenyl) sulfonyl)piperidin-3-yl) (4-(2-methylquinolin-4-yl) piperazin-1-yl) methanone Except for using 4-fluorobenzene-1-sulfonyl chloride instead of 4-acetamidobenzene-1-sulfonyl chloride, Formula 24 (50 mg) was obtained as a white solid in the same manner as for the preparation of compound of Formula 15.

$^1$HNMR (400 MHZ, DMSO-d$_6$): δ 8.02 (d, J=8.0 Hz, 1H), 7.87-7.82 (m, 3H), 7.68-7.64 (m, 1H), 7.54-7.48 (m, 3H), 6.91 (s, 1H), 3.80-3.64 (m, 6H), 3.22-3.07 (m, 4H), 3.00-2.93 (m, 1H), 2.58 (s, 3H), 2.35 (t, J=11.2 Hz, 1H), 2.24-2.18 (m, 1H), 1.82-1.73 (m, 2H), 1.66-1.57 (m, 1H), 1.30-1.18 (m, 1H).LC-MS (ESI): Rt=3.359 min, m/z 497.2 [M+H]$^+$; purity: 99.62% @ 254 nm, 99.45% @ 214 nm.

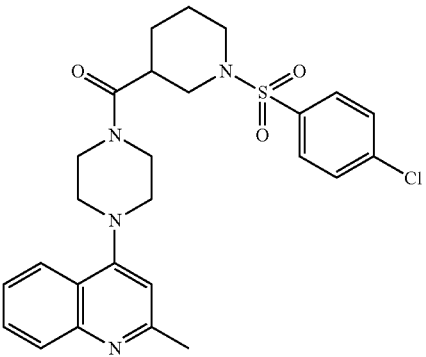

[Formula 25]

(1-(4-chlorophenylsulfonyl)piperidin-3-yl) (4-(2-methylquinolin-4-yl) piperazin-1-yl) methanone Except for using 4-chlorobenzene-1-sulfonyl chloride instead of 4-acetamidobenzene-1-sulfonyl chloride, Formula 25 (75 mg) was obtained as a white solid in the same manner as for the preparation of compound of Formula 15.

$^1$H NMR (400 MHZ, CDCl$_3$): δ 8.00 (d, J=8.4 Hz, 1H), 7.96 (d, J=7.6 Hz, 1H), 7.70 (d, J=8.4 Hz, 2H), 7.65 (t, J=7.2 Hz, 1H), 7.52 (d, J=8.4 Hz, 2H), 7.46 (t, J=8.0 Hz, 1H), 6.75 (s, 1H), 3.89-3.81 (m, 6H), 3.25-3.17 (m, 4H), 2.92-2.89 (m, 1H), 2.70 (s, 3H), 2.53 (t, J=11.2 Hz, 1H), 2.25 (td, J=12.0, 2.4 Hz, 1H), 1.92-1.88 (m, 2H), 1.75-1.72 (m, 1H), 1.51-1.47 (m, 1H). LC-MS (ESI): Rt=4.305 min, m/z 513.2 [M+H]$^+$; purity: 99.71% @ 254 nm, 99.86% @ 214 nm.

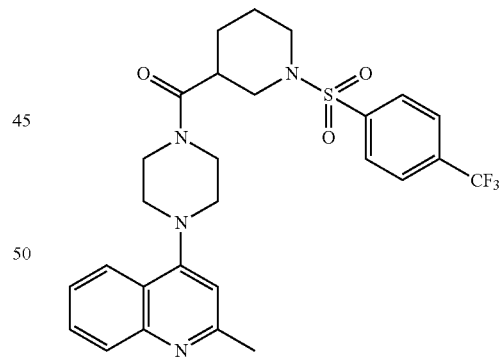

[Formula 26]

(4-(2-methylquinolin-4-yl) piperazin-1-yl) (1-(4-(trifluoromethyl)phenylsulfonyl)piperidin-3-yl) methanone Except for using 4-(trifluoromethyl)benzene-1-sulfonyl chloride instead of 4-acetamidobenzene-1-sulfonyl chloride, Formula 26 (36 mg) was obtained as a white solid in the same manner as for the preparation of compound of Formula 15.

$^1$H NMR (400 MHZ, CDCl$_3$): δ 8.02-7.95 (m, 2H), 7.90 (d, J=8.4 Hz, 2H), 7.81 (d, J=8.0 Hz, 2H), 7.68 (t, J=7.6 Hz,

1H), 7.46 (t, J=7.2 Hz, 1H), 6.75 (s, 1H), 3.92-3.81 (m, 6H), 3.24-3.18 (m, 4H), 2.93 (t, J=11.6 Hz, 1H), 2.70 (s, 3H), 2.56 (t, J=11.6 Hz, 1H), 2.28 (t, J=12.0 Hz, 1H), 1.94-1.85 (m, 2H), 1.71-1.70 (m, 1H), 1.51-1.48 (m, 1H). LC-MS (ESI): Rt=3.948 min, m/z 547.2 [M+H]⁺; purity: 99.85% @ 254 nm, 99.93% @ 214 nm.

[Formula 27]

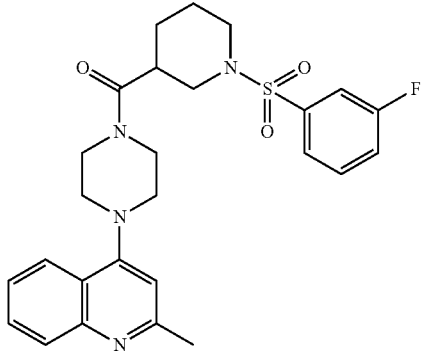

(1-(3-fluorophenylsulfonyl)piperidin-3-yl) (4-(2-methylquinolin-4-yl) piperazin-1-yl) methanone Except for using 3-fluorobenzene-1-sulfonyl chloride instead of 4-acetamidobenzene-1-sulfonyl chloride, Formula 27 (70 mg) was obtained as a white solid in the same manner as in the preparation of the compound of Formula 15.

¹H NMR (400 MHZ, CDCl₃): δ 8.01-7.95 (m, 2H), 7.65 (td, J=7.2, 1.2 Hz, 1H), 7.55-7.54 (m, 2H), 7.49-7.44 (m, 2H), 7.33-7.31 (m, 1H), 6.75 (s, 1H), 3.88-3.76 (m, 6H), 3.29-3.18 (m, 4H), 2.95-2.88 (m, 1H), 2.70 (s, 3H), 2.57 (t, J=11.6 Hz, 1H), 2.31 (td, J=12.0, 2.4 Hz, 1H), 1.88 (t, J=17.2 Hz, 2H), 1.78-1.69 (m, 1H), 1.53-1.43 (m, 1H). LC-MS (ESI): Rt=3.411 min, m/z 497.2 [M+H]⁺; purity: 98.97% @ 254 nm, 98.33% @ 214 nm.

[Formula 28]

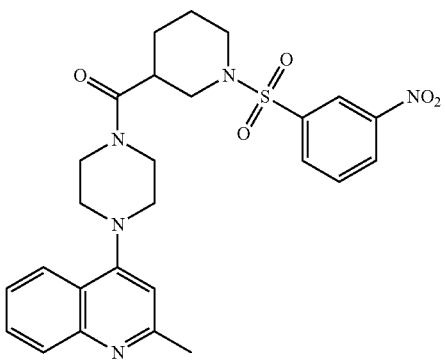

(4-(2-methylquinolin-4-yl) piperazin-1-yl) (1-(3-nitrophenylsulfonyl)piperidin-3-yl) methanone Except for using 3-nitrobenzene-1-sulfonyl chloride instead of 4-acetamidobenzene-1-sulfonyl chloride, Formula 28 (60 mg) was obtained as a white solid in the same manner as in the preparation of the compound of Formula 15.

¹H NMR (400 MHZ, CDCl₃): δ 8.61 (t, J=2.0 Hz, 1H), 8.47 (dd, J=8.0, 1.2 Hz, 1H), 8.09 (d, J=7.6 Hz, 1H), 8.00 (d, J=8.4 Hz, 1H), 7.96 (d, J=8.0 Hz, 1H,), 7.77 (d, J=8.0 Hz, 1H), 7.65 (td, J=8.0, 1.2 Hz, 1H), 7.46 (d, J=8.0 Hz, 1H), 6.75 (s, 1H), 3.95-3.79 (m, 6H), 3.27-3.18 (m, 4H), 2.94 (t, J=2.8 Hz, 1H), 2.64 (s, 3H), 2.61 (t, J=11.2 Hz, 1H), 2.36 (td, J=11.6, 2.8 Hz, 1H), 1.96-1.92 (m, 2H), 1.77-1.74 (m, 1H), 1.47-1.44 (m, 1H). LC-MS (ESI): Rt=3.455 min, m/z 524.2 [M+H]⁺; purity: 97.76% @ 254 nm, 97.60% @ 214 nm.

[Formula 29]

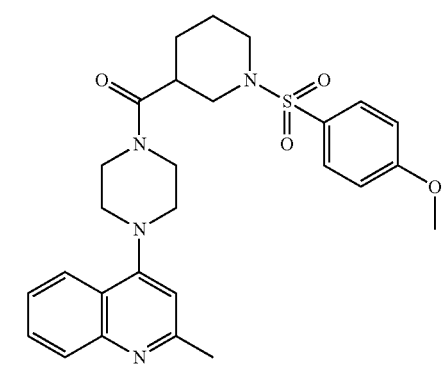

(1-(4-methoxyphenylsulfonyl)piperidin-3-yl) (4-(2-methylquinolin-4-yl)piperazin-1-yl)methanone Except for using 4-methoxybenzene-1-sulfonyl chloride instead of 4-acetamidobenzene-1-sulfonyl chloride, Formula 29 (60 mg) was obtained as a white solid in the same manner as for the preparation of compound of Formula 15.

¹H NMR (400 MHZ, CDCl₃): δ 8.03 (d, J=8.0 Hz, 1H), 7.96 (d, J=8.4 Hz, 1H), 7.70 (d, J=8.8 Hz, 2H), 7.66 (t, J=8.0 Hz, 1H), 7.47 (t, J=8.0 Hz, 1H), 7.00 (t, J=11.6 Hz, 2H), 6.75 (s, 1H), 3.88-3.82 (m, 9H), 3.30-3.18 (m, 4H), 2.93 (t, J=11.2 Hz, 1H), 2.71 (s, 3H), 2.47 (t, J=11.6 Hz, 1H), 2.21 (td, J=12.0, 2.4 Hz, 1H), 1.86 (t, J=14.4 Hz, 2H), 1.78-1.72 (m, 1H), 1.52-1.45 (m, 1H). LC-MS (ESI): Rt=3.664 min, m/z 509.3 [M+H]⁺; purity: 99.71% @ 254 nm, 99.87% @ 214 nm.

[Formula 30]

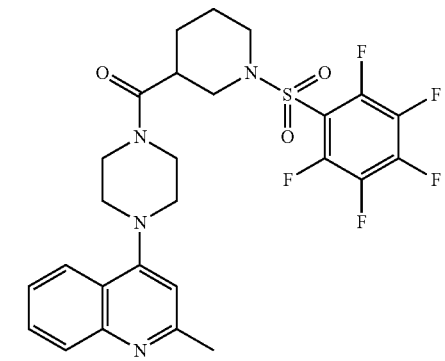

(4-(2-methylquinolin-4-yl) piperazin-1-yl) (1-(perfluorophenylsulfonyl)piperidin-3-yl) methanone Except for using 2,3,4,5,6-pentafluorobenzene-1-sulfonyl chloride instead of 4-acetamidobenzene-1-sulfonyl chloride, Formula 30 (65 mg) was obtained as a white solid in the same manner as for the preparation of compound of Formula 15.

¹H NMR (400 MHZ, CDCl₃): δ 8.01 (d, J=8.4 Hz, 1H), 7.96 (d, J=7.6 Hz, 1H), 7.65 (t, J=8.0 Hz, 1H), 7.46 (t, J=8.4 Hz, 1H), 6.75 (s, 1H), 4.03-3.98 (m, 2H), 3.88-3.80 (m, 4H), 3.29-3.19 (m, 4H), 2.98-2.88 (m, 2H), 2.73-2.67 (m, 4H), 2.01-1.98 (m, 1H), 1.94-1.90 (m, 1H), 1.81-1.65 (m, 2H). LC-MS (ESI): Rt=2.884 min, m/z 569.2 [M+H]⁺; purity: 97.59% @ 254 nm, 98.79% @ 214 nm.

[Formula 31]

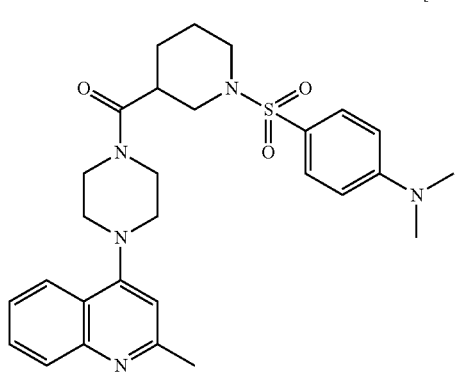

(1-(4-(dimethylamino)phenylsulfonyl)piperidin-3-yl) (4-(2-methylquinolin-4-yl) piperazin-1-yl) methanone Except for using 4-(dimethylamino)benzene-1-sulfonyl chloride instead of 4-acetamidobenzene-1-sulfonyl chloride, Formula 31 (75 mg) was obtained as a white solid in the same manner as in the preparation of the compound of Formula 15, ¹H NMR (400 MHZ, CDCl₃): δ 8.02-7.96 (m, 2H), 7.65 (t, J=8.4 Hz, 1H), 7.59 (d, J=9.2 Hz, 2H), 7.46 (t, J=8.0 Hz, 1H), 6.75 (s, 1H), 6.68 (d, J=8.8 Hz, 2H), 3.85-3.80 (m, 6H), 3.23-3.17 (m, 4H), 3.05 (s, 6H), 2.95-2.89 (m, 1H), 2.70 (s, 3H), 2.44 (t, J=10.4 Hz, 1H), 2.18 (t, J=11.2 Hz, 1H), 1.87-1.81 (m, 2H), 1.73-1.69 (m, 1H), 1.49-1.45 (m, 1H). LC-MS (ESI): Rt=3.160 min, m/z 522.3 [M+H]⁺; purity: 99.81% @ 254 nm, 99.87% @ 214 nm.

[Formula 32]

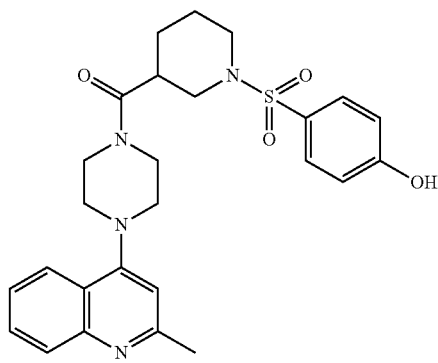

(1-(4-hydroxyphenylsulfonyl)piperidin-3-yl) (4-(2-methylquinolin-4-yl) piperazin-1-yl) methanone Except for using 4-hydroxybenzene-1-sulfonyl chloride instead of 4-acetamidobenzene-1-sulfonyl chloride, Formula 32 (40 mg) was obtained as a white solid in the same manner as for the preparation of compound of Formula 15.

¹H NMR (400 MHZ, DMSO-d₆): 0 10.53 (br s, 1H), 8.01 (d, J=8.4 Hz, 1H), 7.86 (d, J=8.4 Hz, 1H), 7.65 (t, J=7.2 Hz, 1H), 7.57 (d, J=8.8 Hz, 2H), 7.49 (t, J=7.2 Hz, 1H), 6.97 (d, J=8.8 Hz, 2H), 6.91 (s, 1H), 3.78-3.71 (m, 4H), 3.62-3.57 (m, 2H), 3.16-3.06 (m, 4H), 2.93 (t, J=11.2 Hz, 1H), 2.58 (s, 3H), 2.28 (t, J=11.2 Hz, 1H), 2.13 (t, J=10.8 Hz, 1H), 1.81-1.71 (m, 2H), 1.65-1.59 (m, 1H), 1.26-1.14 (m, 1H). LC-MS (ESI): Rt=3.480 min, m/z 495.2 [M+H]⁺; purity: 98.60% @ 254 nm, 98.10% @ 214 nm.

[Formula 33]

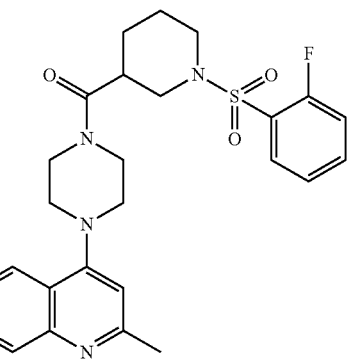

(1-(2-fluorophenylsulfonyl)piperidin-3-yl) (4-(2-methylquinolin-4-yl) piperazin-1-yl) methanone Except for using 2-fluorobenzene-1-sulfonyl chloride instead of 4-acetamidobenzene-1-sulfonyl chloride, Formula 33 (60 mg) was obtained as a white solid in the same manner as in the preparation of the compound of Formula 15

¹H NMR (400 MHZ, CDCl₃): δ 8.00 (d, J=8.4 Hz, 1H), 7.96 (d, J=7.6 Hz, 1H), 7.85 (td, J=7.6, 1.6 Hz, 1H), 7.65 (td, J=8.4, 1.6 Hz, 1H), 7.59-7.57 (m, 1H), 7.46 (t, J=7.2 Hz, 1H), 7.30-7.26 (m, 1H), 7.22 (t, J=8.4 Hz, 1H), 6.75 (s, 1H), 3.97-3.81 (m, 6H), 3.25-3.17 (m, 4H), 2.93-2.89 (m, 1H), 2.78 (t, J=11.2 Hz, 1H), 2.69 (s, 3H), 2.58 (t, J=8.0 Hz, 1H), 1.95-1.92 (m, 1H), 1.87-1.84 (m, 1H), 1.74-1.66 (m, 2H). LC-MS (ESI): Rt=3.766 min, m/z 497.2 [M+H]⁺; purity: 99.72% @ 254 nm, 99.86% @ 214 nm.

[Formula 34]

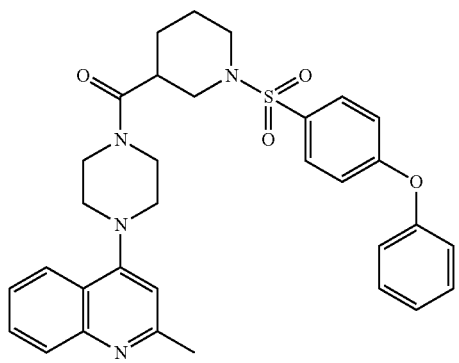

(4-(2-methylquinolin-4-yl) piperazin-1-yl) (1-(4-phenoxyphenylsulfonyl)piperidin-3-yl) methanone Except for using 4-phenoxybenzene-1-sulfonyl chloride instead of 4-acetamidobenzene-1-sulfonyl chloride, Formula 34 (65 mg) was obtained as a white solid in the same manner as in the preparation of the compound of Formula 15.

$^1$H NMR (400 MHZ, CDCl$_3$): δ 8.00 (d, J=8.4 Hz, 1H), 7.96 (d, J=7.6 Hz, 1H), 7.71 (dd, J=6.8, 2.0 Hz, 2H), 7.65 (td, J=8.4, 1.2 Hz, 1H), 7.48-7.40 (m, 3H), 7.26-7.21 (m, 1H), 7.10-7.04 (m, 4H), 6.75 (s, 1H), 3.87-3.83 (m, 6H), 3.24-3.18 (m, 4H), 2.93 (t, J=11.2 Hz, 1H), 2.69 (s, 3H), 2.52 (t, J=11.2 Hz, 1H), 2.27 (td, J=12.0, 2.8 Hz, 1H), 1.87 (t, J=14.4 Hz, 2H), 1.76-1.72 (m, 1H), 1.53-1.49 (m, 1H). LC-MS (ESI): Rt=3.881 min, m/z 571.2 [M+H]$^+$; purity: 97.52% @ 254 nm, 97.59% @ 214 nm.

[Formula 35]

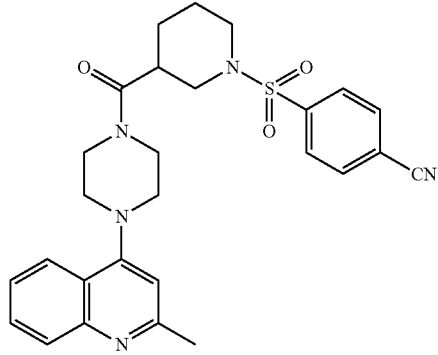

4-(3-(1-(2-methylquinolin-4-yl) piperazine-4-carbonyl)piperidin-1-ylsulfonyl)benzonitrile Except for using 4-cyanobenzene-1-sulfonyl chloride instead of 4-acetamidobenzene-1-sulfonyl chloride, Formula 35 (85 mg) was obtained as a white solid in the same manner as in the preparation of the compound of Formula 15.

$^1$H NMR (400 MHZ, CDCl$_3$): δ 8.00 (d, J=8.4 Hz, 1H), 7.96 (d, J=8.4 Hz, 1H), 7.89-7.83 (m, 4H), 7.66 (td, J=7.2, 1.2 Hz, 1H), 7.46 (t, J=8.0 Hz, 1H), 6.75 (s, 1H), 3.92-3.81 (m, 6H), 3.26-3.18 (m, 4H), 2.93-2.90 (m, 1H), 2.69 (s, 3H), 2.59 (t, J=11.2 Hz, 1H), 2.30 (td, J=9.2, 2.8 Hz, 1H), 1.95-1.85 (m, 2H), 1.76-1.73 (m, 1H), 1.52-1.48 (m, 1H). LC-MS (ESI): Rt=3.490 min, m/z 504.2 [M+H]$^+$; purity: 98.75% @ 254 nm, 99.37% @ 214 nm.

[Formula 36]

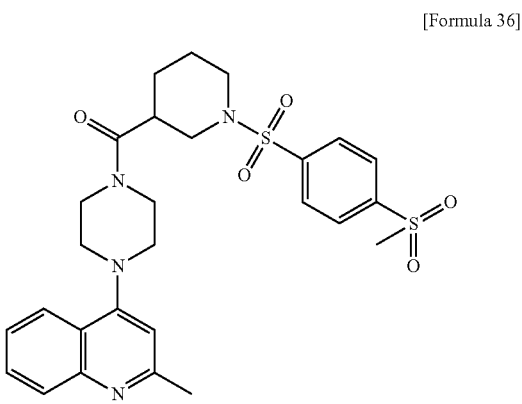 [SMILES: Cc1cc(N2CCN(C(=O)C3CCCN(S(=O)(=O)c4ccc(S(C)(=O)=O)cc4)C3)CC2)c2ccccc2n1]

(4-(2-methylquinolin-4-yl) piperazin-1-yl) (1-(4-(methylsulfonyl)phenylsulfonyl)piperidin-3-yl) methanone Except for using 4-(methylsulfonyl)benzene-1-sulfonyl chloride instead of 4-acetamidobenzene-1-sulfonyl chloride, Formula 36 (50 mg) was obtained as a white solid in the same manner as in the preparation of the compound of Formula 15.

$^1$H NMR (400 MHZ, CDCl$_3$): δ 8.13 (d, J=8.8 Hz, 2H), 8.02-7.95 (m, 4H), 7.65 (td, J=8.4, 1.2 Hz, 1H), 7.46 (t, J=8.0 Hz, 1H), 6.75 (s, 1H), 3.93-3.81 (m, 6H), 3.26-3.18 (m, 4H), 3.12 (s, 3H), 2.93-2.90 (m, 1H), 2.70 (s, 3H), 2.61 (t, J=7.6 Hz, 1H), 2.33 (td, J=8.0, 2.8 Hz, 1H), 1.95-1.86 (m, 2H), 1.76-1.74 (m, 1H), 1.52-1.48 (m, 1H). LC-MS (ESI): Rt=3.589 min, m/z 557.2 [M+H]$^+$; purity: 99.07% @ 254 nm, 99.11% @ 214 nm.

[Formula 37]

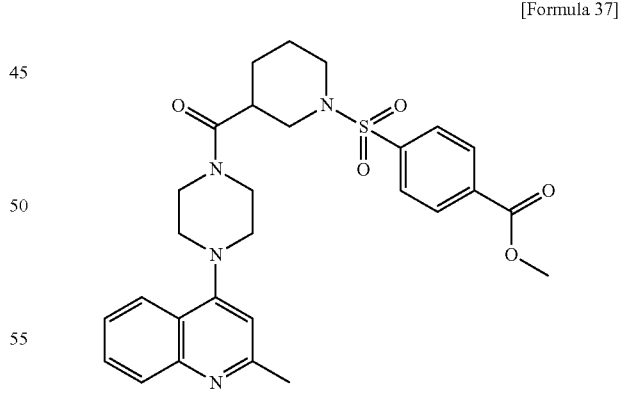

methyl 4-(3-(1-(2-methylquinolin-4-yl) piperazine-4-carbonyl)piperidin-1-ylsulfonyl)benzoate Except for using methyl 4-(chlorosulfonyl)benzoate instead of 4-acetamidobenzene-1-sulfonyl chloride, Formula 37 (230 mg) was obtained as a white solid in the same manner as in the preparation of the compound of Formula 15.

¹H NMR (400 MHZ, CDCl₃): δ 8.19 (d, J=8.4 Hz, 2H), 8.10 (d, J=8.4 Hz, 1H), 7.96 (d, J=8.4 Hz, 1H), 7.84 (d, J=8.4 Hz, 2H), 7.65 (t, J=7.2 Hz, 1H), 7.46 (t, J=7.6 Hz, 1H), 6.75 (s, 1H), 3.97 (s, 3H), 3.93-3.81 (m, 6H), 3.25-3.18 (m, 4H), 2.95-2.89 (m, 1H), 2.70 (s, 3H), 2.56 (t, J=11.2 Hz, 1H), 2.28 (t, J=12.0 Hz, 1H), 1.92-1.80 (m, 2H), 1.75-1.68 (m, 1H), 1.54-1.44 (m, 1H). LC-MS (ESI): Rt=1.62 min, m/z 537.3 [M+H]⁺; purity: 100% @ 254 nm, 87% @ 214 nm.

[Formula 38]

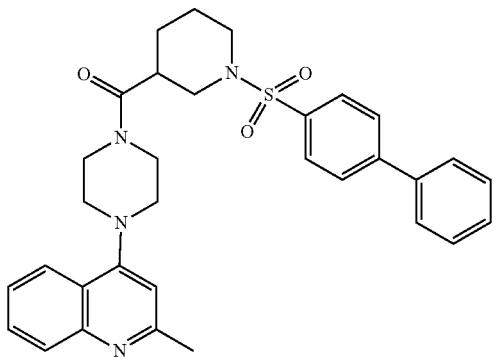

(4-(2-methylquinolin-4-yl) piperazin-1-yl) (1-(4-phenylbenzenesulfonyl)piperidin-3-yl) methanone Except for using methyl [1,1'-biphenyl]-4-sulfonyl chloride instead of 4-acetamidobenzene-1-sulfonyl chloride, Formula 38 (70 mg) was obtained as a white solid in the same manner as in the preparation of the compound of Formula 15.

¹H NMR (400 MHZ, CDCl₃): δ 8.01 (d, J=8.4 Hz, 1H), 7.96 (d, J=8.4 Hz, 1H), 7.83 (d, J=8.4 Hz, 2H), 7.73 (d, J=8.4 Hz, 2H), 7.65 (t, J=7.2 Hz, 1H), 7.60 (d, J=8.4 Hz, 2H), 7.51-7.42 (m, 4H), 6.75 (s, 1H), 3.94-3.81 (m, 6H), 3.25-3.19 (m, 4H), 2.98-2.91 (m, 1H), 2.70 (s, 3H), 2.58 (t, J=11.2 Hz, 1H), 2.32 (td, J=12.0, 2.8 Hz, 1H), 1.92-1.84 (m, 2H), 1.78-1.74 (m, 1H), 1.53-1.49 (m, 1H). LC-MS (ESI): Rt=3.630 min, m/z 555.3 [M+H]⁺; purity: 98.67% @ 254 nm, 98, 0.85% @ 214 nm.

[Formula 39]

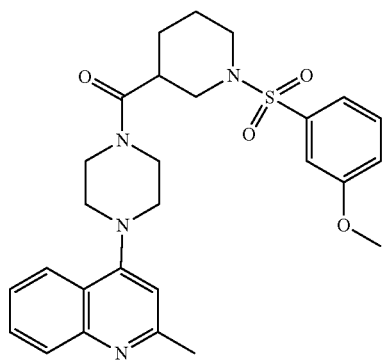

(1-(3-methoxyphenylsulfonyl)piperidin-3-yl) (4-(2-methylquinolin-4-yl) piperazin-1-yl) methanone Except for using 3-methoxybenzene-1-sulfonyl chloride instead of 4-acetamidobenzene-1-sulfonyl chloride, Formula 39 (40 mg) was obtained as a white solid in the same manner as in the preparation of the compound of Formula 15.

¹H NMR (400 MHZ, CDCl₃): δ 8.02-7.95 (m, 2H), 7.66 (t, J=6.8 Hz, 1H), 7.49-7.43 (m, 2H), 7.35-7.33 (m, 1H), 7.29-7.27 (m, 1H), 7.14-7.11 (m, 1H), 6.76 (s, 1H), 3.90-3.80 (m, 9H), 3.30-3.15 (m, 4H), 2.97-2.88 (m, 1H), 2.70 (s, 3H), 2.56 (t, J=11.2 Hz, 1H), 2.33-2.27 (m, 1H), 1.91-1.83 (m, 2H), 1.78-1.69 (m, 1H), 1.53-1.49 (m, 1H. LC-MS (ESI): Rt=3.82 min, m/z 509.2 [M+H]⁺; purity: 100% @ 254 nm, 100% @ 214 nm.

[Formula 40]

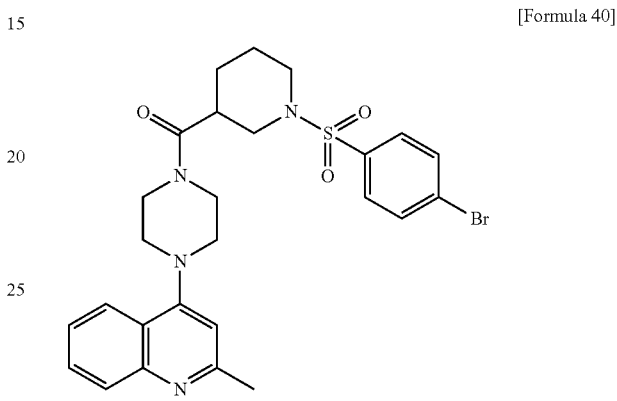

(1-((4-bromophenyl) sulfonyl)piperidin-3-yl) (4-(2-methylquinolin-4-yl) piperazin-1-yl)methanone Except for using 3-bromobenzene-1-sulfonyl chloride instead of 4-acetamidobenzene-1-sulfonyl chloride, Formula 40 (70 mg) was obtained as a white solid in the same manner as in the preparation of the compound of Formula 15.

¹H NMR (400 MHZ, CDCl₃): δ 8.03 (d, J=8.0 Hz, 1H), 7.96 (d, J=8.4 Hz, 1H), 7.69-7.61 (m, 5H), 7.47 (t, J=8.0 Hz, 1H), 6.75 (s, 1H), 3.88-3.82 (m, 6H), 3.30-3.19 (m, 4H), 2.91 (t, J=11.2 Hz, 1H), 2.71 (s, 3H), 2.53 (t, J=11.6 Hz, 1H), 2.26 (t, J=12.0 Hz, 1H), 1.92-1.83 (m, 2H), 1.79-1.75 (m, 1H), 1.55-1.48 (m, 1H). LC-MS (ESI): Rt=3.664 min, m/z 557.1 [M+H]⁺; purity: 99.05% @ 254 nm, 99.53% @ 214 nm.

[Formula 41]

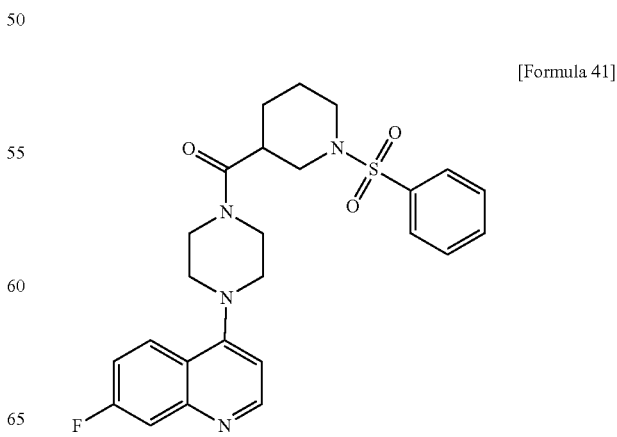

(4-(7-fluoroquinolin-4-yl) piperazin-1-yl) (1-(phenylsulfonyl)piperidin-3-yl) methanone To a solution in which (4-(7-fluoroquinolin-4-yl) piperazin-1-yl) (piperidin-3-yl) methanone (100 mg, 0.29 mmol) and TEA (89 mg) in dichloromethane (3 mL) was slowly benzenesulfonyl chloride (57 mg, 0.32 mmol) diluted in dichloromethane (1 mL) at room temperature for 2 hours stir while. After the mixture was concentrated under reduced pressure, the residue was first purified using C18 chromatography using 40 ~ 90% CH$_3$CN (acetonitrile) aqueous solution as a developing solvent to obtain the target compound of Formula 41 (40 mg).

$^1$HNMR (400 MHZ, DMSO-d$_6$): δ 8.72 (d, J=5.2 Hz, 1H), 8.15 (dd, J=9.2, 6.4 Hz, 1H), 7.77-7.73 (m, 3H), 7.70-7.66 (m, 3H), 7.51-7.46 (m, 1H), 7.00 (d, J=5.2 Hz, 1H), 3.79-3.64 (m, 6H), 3.22-3.14 (m, 4H), 2.98-2.92 (m, 1H), 2.33 (t, J=11.2 Hz, 1H), 2.23-2.16 (m, 1H), 1.82-1.73 (m, 2H), 1.66-1.57 (m, 1H), 1.28-1.18 (m, 1H). MS (ESI): Rt=2.488 min, m/z 483.3 [M+H]$^+$; purity: 99.70% @ 254 nm, 99.63% @ 214 nm.

[Formula 42]

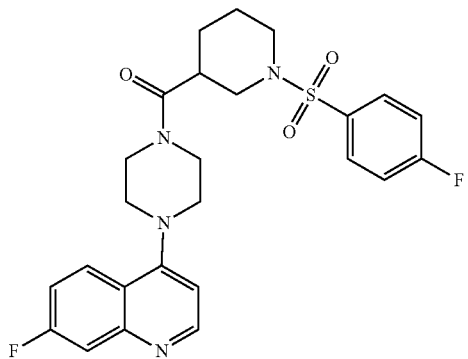

(1-((4-fluorophenyl) sulfonyl)piperidin-3-yl) (4-(7-fluoroquinolin-4-yl) piperazin-1-yl) methanone Except for using 4-fluorobenzene-1-sulfonyl chloride instead of benzenesulfonyl chloride, Formula 42 (55 mg) was obtained as a pale yellow solid in the same manner as in the preparation of the compound of Formula 41.

$^1$HNMR (400 MHz, DMSO-d$_6$): δ 8.73 (d, J=5.2 Hz, 1H), 8.16 (dd, J=9.2, 6.8 Hz, 1H), 7.84 (dd, J=8.8, 5.6 Hz, 2H), 7.69 (dd, J=10.8, 2.4 Hz, 1H), 7.54-7.47 (m, 3H), 7.01 (d, J=5.2 Hz, 1H), 3.80-3.64 (m, 6H), 3.23-3.14 (m, 4H), 2.99-2.94 (m, 1H), 2.37-2.31 (m, 1H), 2.24-2.18 (m, 1H), 1.82-1.73 (m, 2H), 1.67-1.57 (m, 1H), 1.29-1.19 (m, 1H). LC-MS (ESI): Rt=3.720 min, m/z 501.2 [M+H]$^+$; purity: 95.73% @ 254 nm, 96.66% @ 214 nm.

[Formula 43]

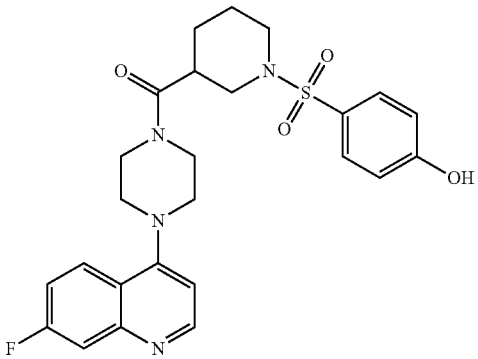

(4-(7-fluoroquinolin-4-yl) piperazin-1-yl) (1-((4-hydroxyphenyl) sulfonyl) piperidin-3-yl) methanone Except for using 4-hydroxybenzene-1-sulfonyl chloride instead of benzenesulfonyl chloride, Formula 43 (60 mg) was obtained as a white solid in the same manner as in the preparation of the compound of Formula 41.

$^1$HNMR (400 MHZ, DMSO-d$_6$): 0 10.56 (br s, 1H), 8.73 (d, J=5.2 Hz, 1H), 8.18-8.14 (m, 1H), 7.71-7.68 (m, 1H), 7.57 (d, J=8.8 Hz, 2H), 7.51-7.46 (m, 1H), 7.01-6.96 (m, 3H), 3.79-3.72 (m, 4H), 3.62-3.57 (m, 2H), 3.21-3.14 (m, 4H), 2.97-2.91 (m, 1H), 2.27 (t, J=11.2 Hz, 1H), 2.15-2.10 (m, 1H), 1.81-1.72 (m, 2H), 1.65-1.56 (m, 1H), 1.26-1.16 (m, 1H). LC-MS (ESI): Rt=3.827 min, m/z 499.2 [M+H]$^+$; purity: 96.36% @ 254 nm, 97.37% @ 214 nm.

[Formula 44]

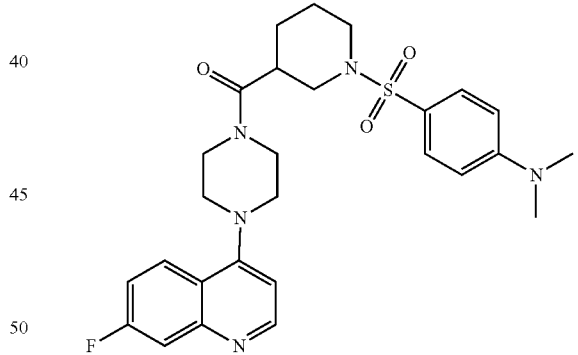

(1-((4-(dimethylamino)phenyl) sulfonyl)piperidin-3-yl) (4-(7-fluoroquinolin-4-yl) piperazin-1-yl) methanone Except for using 4-(dimethylamino)benzene-1-sulfonyl chloride instead of benzenesulfonyl chloride, Formula 44 (85 mg) was obtained as a white solid in the same manner as in the preparation of the compound of Formula 41.

$^1$HNMR (400 MHZ, CDCl$_3$): δ 8.73 (d, J=5.2 Hz, 1H), 8.05-8.01 (m, 1H), 7.71 (dd, J=10.0, 2.8 Hz, 1H), 7.61-7.57 (m, 2H), 7.34-7.29 (m, 1H), 6.84 (d, J=5.2 Hz, 1H), 6.70-6.66 (m, 2H), 3.88-3.80 (m, 6H), 3.27-3.18 (m, 4H), 3.05 (s, 6H), 2.96-2.89 (m, 1H), 2.45 (t, J=11.2 Hz, 1H), 2.23-2.17 (m, 1H), 1.87-1.81 (m, 2H), 1.74-1.71 (m, 1H), 1.53-1.42

(m, 1H). LC-MS (ESI): Rt=3.361 min, m/z 526.3 [M+H]+; purity: 97.03% @ 254 nm, 97.58% @ 214 nm.

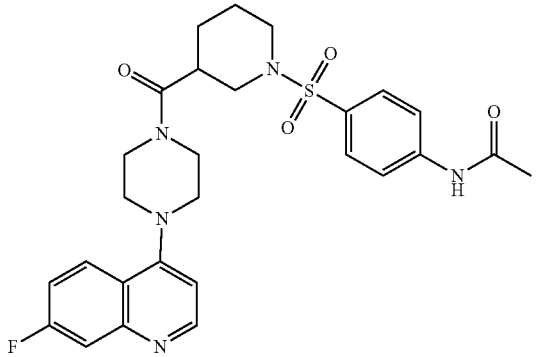

[Formula 45]

N-(4-(3-(1-(7-fluoroquinolin-4-yl) piperazine-4-carbonyl)piperidin-1-ylsulfonyl)phenyl) acetamide Except for using 4-acetamidobenzene-1-sulfonyl chloride instead of benzenesulfonyl chloride, Formula 45 (70 mg) was obtained as a white solid in the same manner as in the preparation of the compound of Formula 41.

$^1$H NMR (400 MHZ, CDCl$_3$): δ 8.76 (d, J=4.8 Hz, 1H), 8.02 (dd, J=9.6, 6.4 Hz, 1H), 7.73-7.70 (m, 6H), 7.31 (td, J=12.0, 2.8 Hz, 1H), 6.84 (d, J=4.8 Hz, 1H), 3.88-3.82 (m, 6H), 3.26-3.18 (m, 4H), 2.90 (t, J=6.8 Hz, 1H), 2.50 (t, J=11.2 Hz, 1H), 2.27-2.24 (m, 1H), 2.22 (s, 3H), 1.86 (t, J=14.4 Hz, 2H), 1.73-1.65 (m, 1H), 1.49-1.45 (m, 1H). LC-MS (ESI): Rt=3.762 min, m/z 540.3 [M+H]+; purity: 96.47% @ 254 nm, 97.20% @ 214 nm.

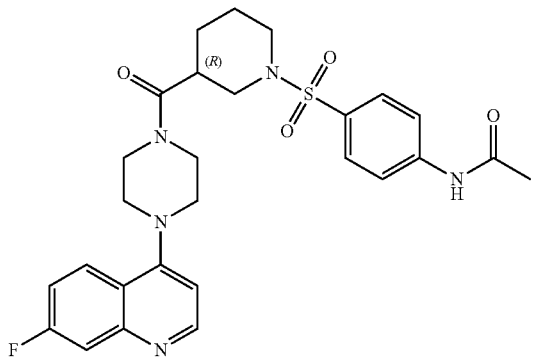

[Formula 46]

(R)—N-(4-(3-(1-(7-fluoroquinolin-4-yl) piperazine-4-carbonyl)piperidin-1-ylsulfonyl)phenyl) acetamide Except for using (R)-(4-(7-fluoroquinolin-4-yl) piperazin-1-yl) (piperidin-3-yl) methanone instead of (4-(7-Fluoroquinolin-4-yl) piperazin-1-yl) (piperidin-3-yl) methanone, Formula 46 (50 mg) was obtained as a white solid in the same manner as in the preparation of the compound of Formula 45.

$^1$HNMR (400 MHZ, DMSO-d$_6$): 0 10.38 (s, 1H), 8.72 (d, J=5.2 Hz, 1H), 8.17-8.13 (m, 1H), 7.83 (d, J=8.8 Hz, 2H), 7.70-7.67 (m, 3H), 7.48 (td, J=8.8, 2.8 Hz, 1H), 7.00 (d, J=4.8 Hz, 1H), 3.78-3.71 (m, 4H), 3.64-3.59 (m, 2H), 3.20-3.14 (m, 4H), 2.92 (t, J=10.8 Hz, 1H), 2.31 (t, J=10.8 Hz, 1H), 2.18 (t, J=12.0 Hz, 1H), 2.09 (s, 3H), 1.80-1.72 (m, 2H), 1.65-1.56 (m, 1H), 1.27-1.17 (m, 1H). LC-MS (ESI): Rt=3.444 min, m/z 540.2 [M+H]+; purity: 96.39% @ 254 nm, 96.69% @ 214 nm.

chiral HPLC: Column: Chiralpak IB 5 μm 4.6×250 mm; Mobile Phase: Hex: EtOH: DEA=50:50:0.2 at 1 mL/min; Temp: 30° C.; Wavelength: 254 nm, Rt=11.232 min, 99.51% ee.

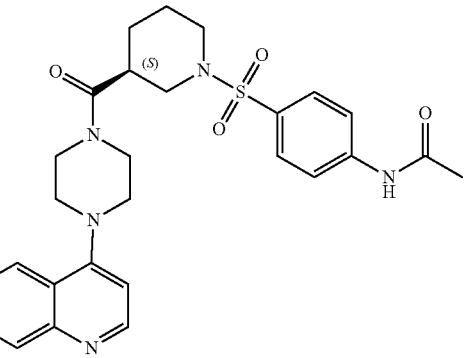

[Formula 47]

(S)—N-(4-(3-(1-(7-fluoroquinolin-4-yl) piperazine-4-carbonyl)piperidin-1-ylsulfonyl)phenyl) acetamide Except for using(S)-(4-(7-fluoroquinolin-4-yl) piperazin-1-yl) (piperidin-3-yl) methanone instead of (4-(7-fluoroquinolin-4-yl) piperazin-1-yl) (piperidin-3-yl) methanone, Formula 47 (60 mg) was obtained as a white solid in the same manner as in the preparation of the compound of Formula 45.

$^1$H NMR (400 MHZ, DMSO-d$_6$): 0 10.39 (s, 1H), 8.72 (d, J=4.8 Hz, 1H), 8.17-8.13 (m, 1H), 7.83 (d, J=9.2 Hz, 2H), 7.70-7.67 (m, 3H), 7.46 (td, J=17.2, 2.8 Hz, 1H), 7.00 (d, J=4.8 Hz, 1H), 3.78-3.71 (m, 4H), 3.64-3.59 (m, 2H), 3.20-3.13 (m, 4H), 2.95-2.90 (m, 1H), 2.30 (t, J=11.6 Hz, 1H), 2.18 (t, J=9.2 Hz, 1H), 2.09 (s, 3H), 1.80-1.72 (m, 2H), 1.65-1.56 (m, 1H), 1.27-1.17 (m, 1H). LC-MS (ESI): Rt=3.431 min, m/z 540.2 [M+H]+; purity: 95.66% @ 254 nm, 96.62% @ 214 nm.

chiral HPLC: Column: Chiralpak IB 5 μm 4.6×250 mm; Mobile Phase: Hex: EtOH: DEA=50:50:0.2 at 1 mL/min; Temp: 30° C.; Wavelength: 254 nm, Rt=8.276 min, 99.32% ee.

[Formula 48]

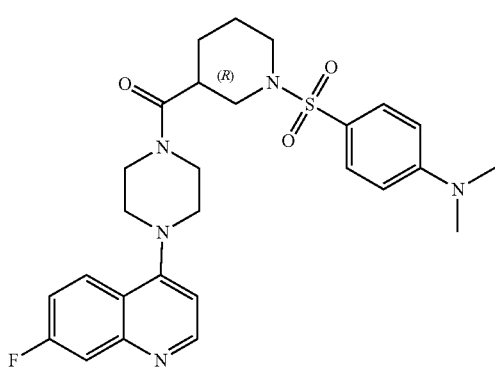

(R)-(1-((4-(dimethylamino)phenyl) sulfonyl)piperidin-3-yl) (4-(quinolin-4-yl) piperazin-1-yl) methanone Except for using (R)-(4-(7-fluoroquinolin-4-yl) piperazin-1-yl) (piperidin-3-yl) methanone instead of (4-(7-Fluoroquinolin-4-yl) piperazin-1-yl) (piperidin-3-yl) methanone, Formula 48 (70 mg) was obtained as a white solid in the same manner as in the preparation of the compound of Formula 44.

$^1$HNMR (400 MHZ, CDCl$_3$): δ 8.76 (d, J=5.2 Hz, 1H), 8.05-8.01 (m, 1H), 7.76-7.73 (m, 1H), 7.59 (d, J=8.8 Hz, 2H), 7.34-7.30 (m, 1H), 6.85 (d, J=4.8 Hz, 1H), 6.68 (d, J=8.8 Hz, 2H), 3.88-3.80 (m, 6H), 3.31-3.21 (m, 4H), 3.05 (s, 6H), 2.95-2.88 (m, 1H), 2.45 (t, J=11.2 Hz, 1H), 2.24-2.18 (m, 1H), 1.87-1.80 (m, 2H), 1.76-1.71 (m, 1H), 1.54-1.46 (m, 1H). LC-MS (ESI): Rt=3.805 min, m/z 526.2 [M+H]$^+$; purity: 96.16% @ 254 nm, 96.82% @ 214 nm.

chiral HPLC: Column: Chiralpak IA 5 μm 4.6×250 mm; Mobile Phase: Hex: EtOH: DEA=30:70:0.2 at 1 mL/min; Temp: 30° C.; Wavelength: 230 nm, Rt=19.532 min, 99.34% ee.

[Formula 49]

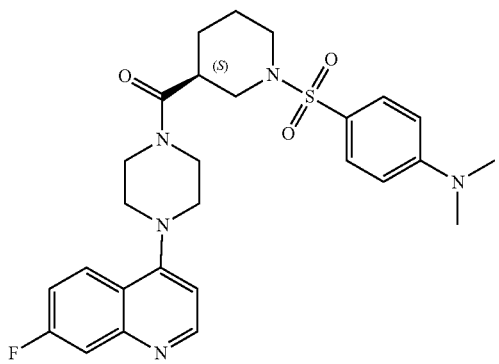

(S)-(1-((4-(dimethylamino)phenyl) sulfonyl)piperidin-3-yl) (4-(quinolin-4-yl) piperazin-1-yl) methanone Except for using(S)-(4-(7-fluoroquinolin-4-yl) piperazin-1-yl) (piperidin-3-yl) methanone instead of (4-(7-Fluoroquinolin-4-yl) piperazin-1-yl) (piperidin-3-yl) methanone, Formula 49 (25 mg) was obtained as a white solid in the same manner as for the preparation of compound of Formula 44.

$^1$HNMR (400 MHZ, CDCl$_3$): δ 8.77 (d, J=4.8 Hz, 1H), 8.05-8.01 (m, 1H), 7.73-7.70 (m, 1H), 7.59 (d, J=9.2 Hz, 2H), 7.34-7.29 (m, 1H), 6.84 (d, J=5.2 Hz, 1H), 6.68 (d, J=8.8 Hz, 2H), 3.88-3.80 (m, 6H), 3.27-3.19 (m, 4H), 3.05 (s, 6H), 2.94-2.88 (m, 1H), 2.45 (t, J=11.2 Hz, 1H), 2.24-2.18 (m, 1H), 1.87-1.80 (m, 2H), 1.74-1.71 (m, 1H), 1.50-1.46 (m, 1H). LC-MS (ESI): Rt=2.928 min., m/z 526.3 [M+H]$^+$; purity: 98.15% @ 254 nm, 99.66% @ 214 nm.

chiral HPLC: Column: Chiralpak IA 5 μm 4.6×250 mm; Mobile Phase: Hex: EtOH: DEA=30:70:0.2 at 1 mL/min; Temp: 30° C.; Wavelength: 230 nm, Rt=13.264 min, 97.81% ee.

[Formula 50]

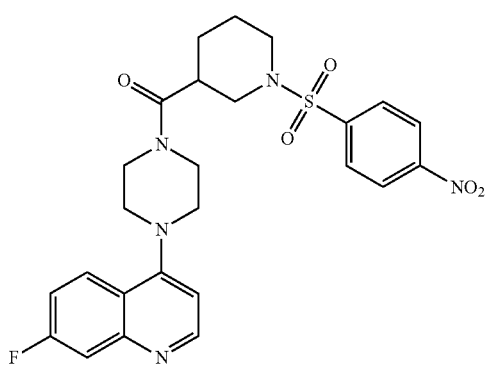

(4-(7-fluoroquinolin-4-yl) piperazin-1-yl) (1-(4-nitrophenylsulfonyl) piperidin-3-yl) methanone Except for using 4-nitrobenzene-1-sulfonyl chloride instead of benzenesulfonyl chloride, Formula 50 (45 mg) was obtained as a pale yellow solid in the same manner as in the preparation of the compound of Formula 41.

$^1$H NMR (400 MHZ, CDCl$_3$): δ 8.77 (d, J=4.0 Hz, 1H), 8.39 (d, J=8.8 Hz, 2H), 8.04-8.01 (m, 1H), 7.95 (d, J=8.4 Hz, 2H), 7.73-7.70 (m, 1H), 7.34-7.29 (m, 1H), 6.84 (d, J=5.2 Hz, 1H), 3.95-3.83 (m, 6H), 3.30-3.09 (m, 4H), 2.99-2.89 (m, 1H), 2.61 (t, J=11.6 Hz, 1H), 2.35-2.29 (m, 1H), 1.92-1.87 (m, 2H), 1.78-1.75 (m, 1H), 1.56-1.49 (m, 1H). LC-MS (ESI): Rt=4.270 min, m/z 528.2 [M+H]$^+$; purity: 92.90% @ 254 nm, 92.33% @ 214 nm.

[Formula 51]

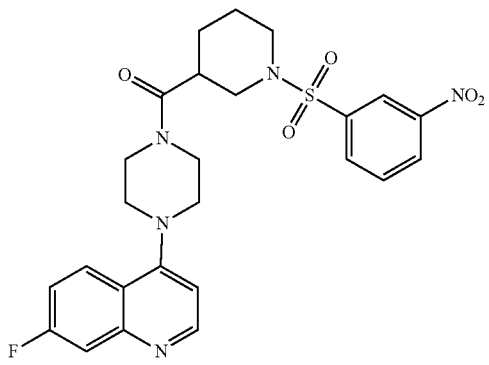

(4-(7-fluoroquinolin-4-yl) piperazin-1-yl) (1-(3-nitrophenylsulfonyl) piperidin-3-yl) methanone Except for using 3-nitrobenzene-1-sulfonyl chloride instead of benzenesulfonyl chloride, Formula 51 (43 mg) was obtained as a pale yellow solid in the same manner as in the preparation of the compound of Formula 41.

$^1$H NMR (400 MHZ, CDCl$_3$): δ 8.77 (d, J=5.2 Hz, 1H), 8.61-8.60 (m, 1H), 8.49-8.46 (m, 1H), 8.09 (d, J=8.0 Hz, 1H), 8.05-8.01 (m, 1H), 7.78 (t, J=8.0 Hz, 1H), 7.73-7.70 (m, 1H), 7.34-7.29 (m, 1H), 6.85 (d, J=5.2 Hz, 1H), 3.95-3.84 (m, 6H), 3.33-3.20 (m, 4H), 2.98-2.90 (m, 1H), 2.61 (t, J=11.6 Hz, 1H), 2.40-2.34 (m, 1H), 1.95-1.88 (m, 2H), 1.82-1.71 (m, 1H), 1.55-1.48 (m, 1H). LC-MS (ESI): Rt=4.026 min, m/z 528.2 [M+H]$^+$; purity: 94.16% @ 254 nm, 95.76% @ 214 nm.

[Formula 52]

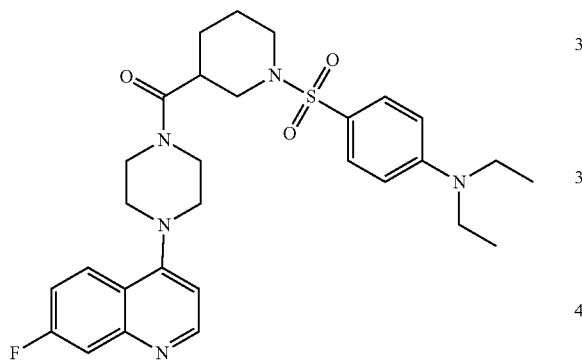

(1-(4-(diethylamino)phenylsulfonyl)piperidin-3-yl) (4-(7-fluoroquinolin-4-yl) piperazin-1-yl) methanone Except for using 4-(diedylamino)benzene-1-sulfonyl chloride instead of benzenesulfonyl chloride, Formula 52 (55 mg) was obtained as a pale yellow solid in the same manner as in the preparation of the compound of Formula 41

$^1$H NMR (400 MHZ, CDCl$_3$): δ 8.76 (d, J=4.8 Hz, 1H), 8.05-8.01 (m, 1H), 7.73-7.70 (m, 1H), 7.54 (d, J=8.8 Hz, 2H), 7.34-7.29 (m, 1H), 6.84 (d, J=4.8 Hz, 1H), 6.63 (d, J=9.2 Hz, 2H), 3.88-3.80 (m, 6H), 3.40 (q, J=7.2 Hz, 4H), 3.27-3.19 (m, 4H), 2.98-2.87 (m, 1H), 2.47 (t, J=11.2 Hz, 1H), 2.24-2.21 (m, 1H), 1.87-1.81 (m, 2H), 1.77-1.71 (m, 1H), 1.54-1.49 (m, 1H), 1.20 (t, J=7.2 Hz, 6H). LC-MS (ESI): Rt=4.211 min, m/z 554.3 [M+H]$^+$; purity: 93.62% @ 254 nm, 93.98% @ 214 nm.

[Formula 53]

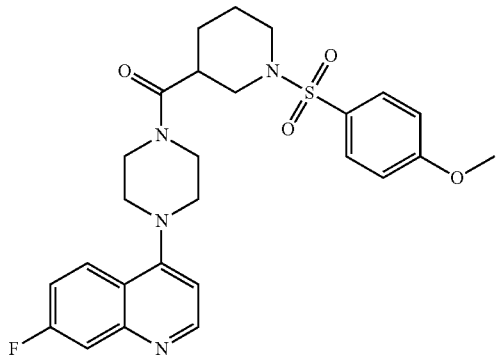

(4-(7-fluoroquinolin-4-yl) piperazin-1-yl) (1-(4-methoxyphenylsulfonyl) piperidin-3-yl) methanone Except for using 4-methoxybenzene-1-sulfonyl chloride instead of benzenesulfonyl chloride, Formula 53 (50 mg) was obtained as a white solid in the same manner as in the preparation of the compound of Formula 41, $^1$H NMR (400 MHZ, CDCl$_3$): δ 8.77 (d, J=4.8 Hz, 1H), 8.05-8.01 (m, 1H), 7.73-7.69 (m, 3H), 7.34-7.29 (m, 1H), 7.00 (d, J=5.2 Hz, 2H), 6.84 (d, J=5.2 Hz, 1H), 3.88-3.82 (m, 9H), 3.27-3.19 (m, 4H), 2.96-2.88 (m, 1H), 2.48 (t, J=11.6 Hz, 1H), 2.26-2.19 (m, 1H), 1.89-1.82 (m, 2H), 1.77-1.72 (m, 1H), 1.50-1.47 (m, 1H). LC-MS (ESI): Rt=3.886 min, m/z 513.2 [M+H]$^+$; purity: 97.96% @ 254 nm, 97.38% @ 214 nm.

[Formula 54]

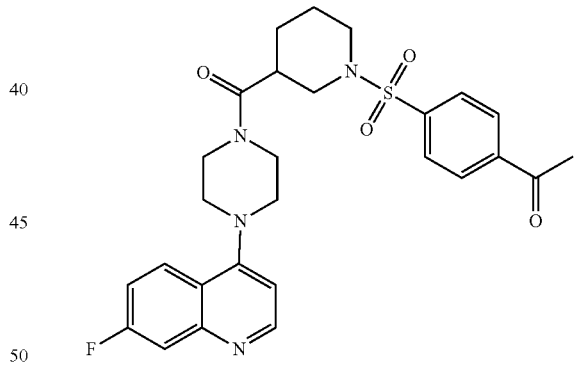

1-(4-(3-(1-(7-fluoroquinolin-4-yl) piperazine-4-carbonyl)piperidin-1-ylsulfonyl)phenyl) ethanone Except for using 4-acetylbenzene-1-sulfonyl chloride instead of benzenesulfonyl chloride, Formula 54 (70 mg) was obtained as a white solid in the same manner as in the preparation of the compound of Formula 41.

$^1$H NMR (400 MHZ, CDCl$_3$): δ 8.77 (d, J=4.8 Hz, 1H), 8.10 (d, J=8.4 Hz, 2H), 8.05-8.01 (m, 1H), 7.86 (d, J=8.8 Hz, 2H), 7.73-7.70 (m, 1H), 7.34-7.29 (m, 1H), 6.84 (d, J=4.8 Hz, 1H), 3.92-3.78 (m, 6H), 3.27-3.19 (m, 4H), 2.96-2.89 (m, 1H), 2.67 (s, 3H), 2.55 (t, J=11.6 Hz, 1H), 2.31-2.25 (m, 1H), 1.93-1.85 (m, 2H), 1.76-1.70 (m, 1H), 1.51-1.45 (m, 1H). LC-MS (ESI): Rt=3.841 min, m/z 525.2 [M+H]$^+$; purity: 98.02% @ 254 nm, 98.99% @ 214 nm.

[Formula 55]

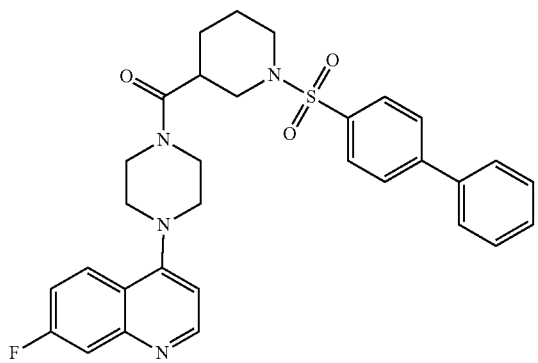

(4-(7-fluoroquinolin-4-yl) piperazin-1-yl) (1-(4-phenylbenzenesulfonyl) piperidin-3-yl) methanone Except for using [1,1'-biphenyl]-4-sulfonyl chloride instead of benzenesulfonyl chloride, Formula 55 (56 mg) was obtained as a white solid in the same manner as in the preparation of the compound of Formula 41.

$^1$H NMR (400 MHZ, CDCl$_3$): δ 8.77 (d, J=4.8 Hz, 1H), 8.05-8.01 (m, 1H), 7.84-7.82 (m, 2H), 7.75-7.70 (m, 3H), 7.62-7.60 (m, 2H), 7.51-7.41 (m, 3H), 7.34-7.29 (m, 1H), 6.84 (d, J=4.8 Hz, 1H), 3.95-3.83 (m, 6H), 3.32-3.20 (m, 4H), 2.98-2.89 (m, 1H), 2.58 (t, J=11.2 Hz, 1H), 2.37-2.28 (m, 1H), 1.92-1.85 (m, 2H), 1.81-1.71 (m, 1H), 1.53-1.48 (m, 1H). LC-MS (ESI): Rt=3.223 min, m/z 559.2 [M+H]$^+$; purity: 98.80% @ 254 nm, 99.17% @ 214 nm.

[Formula 56]

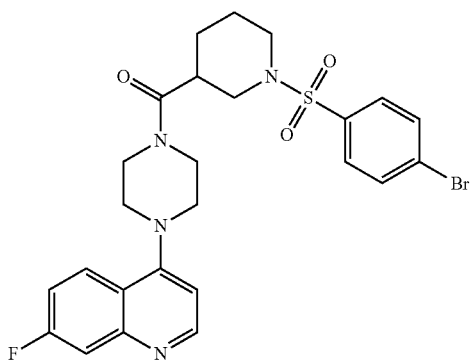

(1-(4-bromophenylsulfonyl)piperidin-3-yl) (4-(7-fluoroquinolin-4-yl)piperazin-1-yl)methanone Except for using 4-bromobenzene-1-sulfonyl chloride instead of benzenesulfonyl chloride, Formula 56 (240 mg) was obtained as a white solid in the same manner as in the preparation of the compound of Formula 55.

$^1$H NMR (400 MHZ, CDCl$_3$): δ 8.77 (d, J=4.8 Hz, 1H), 8.04-8.01 (m, 1H), 7.73-7.62 (m, 5H), 7.34-7.29 (m, 1H), 6.84 (d, J=4.8 Hz, 1H), 3.89-3.82 (m, 6H), 3.31-3.19 (m, 4H), 2.95-2.88 (m, 1H), 2.54 (t, J=11.2 Hz, 1H), 2.30-2.23 (m, 1H), 1.92-1.84 (m, 2H), 1.79-1.69 (m, 1H), 1.51-1.48 (m, 1H). LC-MS (ESI): Rt=3.853 min, m/z 561.1 [M+H]$^+$; purity: 97.13% @ 254 nm, 97.17% @ 214 nm.

[Formula 57]

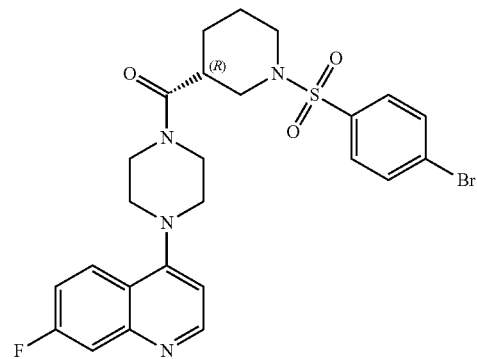

(R)-(1-(4-bromophenylsulfonyl)piperidin-3-yl) (4-(7-fluoroquinolin-4-yl) piperazin-1-yl) methanone Except for using (R)-(4-(7-fluoroquinolin-4-yl) piperazin-1-yl) (piperidin-3-yl) methanone instead of (4-(7-Fluoroquinolin-4-yl) piperazin-1-yl) (piperidin-3-yl) methanone, Formula 57 (250 mg) was obtained as a white solid in the same manner as in the preparation of the compound of Formula 56.

$^1$H NMR (400 MHZ, CDCl$_3$): δ 8.76 (d, J=4.8 Hz, 1H), 8.04-8.01 (m, 1H), 7.73-7.62 (m, 5H), 7.34-7.29 (m, 1H), 6.84 (d, J=5.2 Hz, 1H), 3.89-3.82 (m, 6H), 3.29-3.19 (m, 4H), 2.95-2.89 (m, 1H), 2.54 (t, J=11.6 Hz, 1H), 2.29-2.23 (m, 1H), 1.92-1.84 (m, 2H), 1.79-1.72 (m, 1H), 1.54-1.46 (m, 1H). LC-MS (ESI): Rt=3.784 min, m/z 561.1 [M+H]$^+$; purity: 98.04% @ 254 nm, 98.84% @ 214 nm.

chiral HPLC: Column: Chiralpak IB 5 μm 4.6×250 mm; Mobile Phase: Hex: EtOH=50:50 at 1 mL/min; Temp: 30° C.; Wavelength: 254 nm, Rt=12.740 min, 99.09% ee.

[Formula 58]

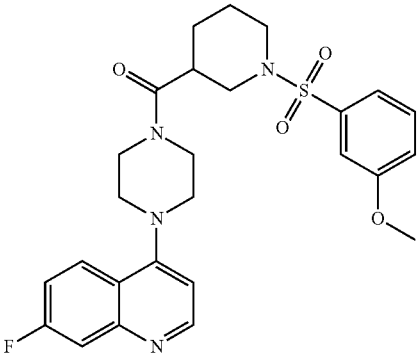

(4-(7-fluoroquinolin-4-yl) piperazin-1-yl) (1-(3-methoxyphenylsulfonyl)piperidin-3-yl) methanone Except for using 3-methoxybenzene-1-sulfonyl chloride instead of benzenesulfonyl chloride, Formula 59 (60 mg) was obtained as a white solid in the same manner as for the preparation of compound of Formula 39.

Rt=3.877 min, m/z 513.2 [M+H]$^+$; purity: 97.65% @ 254 nm, 97.42% @ 214 nm.

[Formula 59]

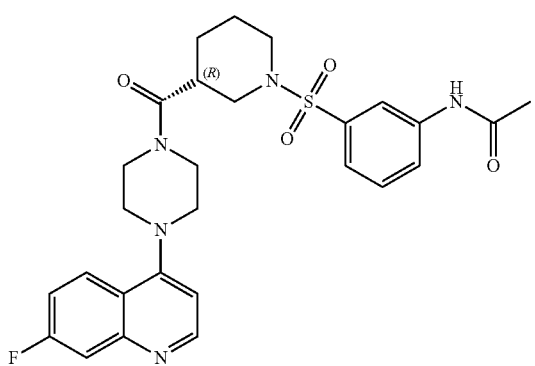

(R)—N-(3-(3-(1-(7-fluoroquinolin-4-yl) piperazine-4-carbonyl)piperidin-1-ylsulfonyl)phenyl) acetamide Except for using 3-acetamidobenzene-1-sulfonyl chloride instead of 4-acetamidobenzene-1-sulfonyl chloride, Formula 59 (45 mg) was obtained as a white solid in the same manner as for the preparation of compound of Formula 46.

$^1$H NMR (400 MHZ, CDCl$_3$): δ 8.76 (d, J=4.8 Hz, 1H), 8.05-8.01 (m, 1H), 7.89-7.88 (m, 1H), 7.83 (s, 1H), 7.72-7.69 (m, 1H), 7.60 (s, 1H), 7.50-7.48 (m, 2H), 7.34-7.29 (m, 1H), 6.85 (d, J=4.8 Hz, 1H), 3.90-3.84 (m, 6H), 3.27-3.18 (m, 4H), 2.94-2.88 (m, 1H), 2.57 (t, J=11.2 Hz, 1H), 2.36-2.29 (m, 1H), 2.21 (s, 3H), 1.91-1.82 (m, 2H), 1.74-1.69 (m, 1H), 1.54-1.48 (m, 1H). LC-MS (ESI): Rt=3.582 min, m/z 540.2 [M+H]$^+$; purity: 99.32% @ 254 nm, 99.50% @ 214 nm.

Chiral HPLC: Column: Chiralpak IG 5 μm 4.6×250 mm; Mobile Phase: Hex: EtOH=40:60 at 1 mL/min; Temp: 30° C.; Wavelength: 254 nm, Rt=22.440 min, 99.43% ee.

[Formula 60]

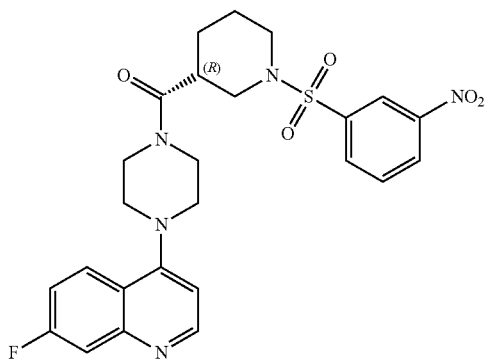

(R)-(4-(7-fluoroquinolin-4-yl) piperazin-1-yl) (1-(3-nitrophenylsulfonyl)piperidin-3-yl) methanone Except for using 3-nitrobenzene-1-sulfonyl chloride instead of 4-nitrobenzene-1-sulfonyl chloride, Formula 60 (170 mg) was obtained as a white solid in the same manner as for the preparation of compound of Formula 46.

$^1$H NMR (400 MHZ, CDCl$_3$): δ 8.77 (d, J=5.2 Hz, 1H), 8.62-8.61 (m, 1H), 8.49-8.46 (m, 1H), 8.11-8.09 (m, 1H), 8.05-8.01 (m, 1H), 7.78 (t, J=8.0 Hz, 1H), 7.73-7.70 (m, 1H), 7.34-7.29 (m, 1H), 6.85 (d, J=5.2 Hz, 1H), 3.95-3.84 (m, 6H), 3.32-3.20 (m, 4H), 2.98-2.91 (m, 1H), 2.61 (t, J=11.2 Hz, 1H), 2.40-2.34 (m, 1H), 1.95-1.88 (m, 2H), 1.81-1.70 (m, 1H), 1.57-1.49 (m, 1H). LC-MS (ESI): Rt=3.315 min, m/z 528.2 [M+H]$^+$; purity: 96.67% @ 254 nm, 97.00% @ 214 nm.

[Formula 61]

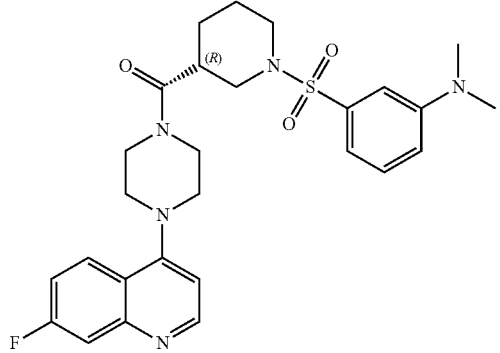

(R)-(1-(3-(dimethylamino)phenylsulfonyl)piperidin-3-yl) (4-(7-fluoroquinolin-4-yl) piperazin-1-yl) methanone Except for using 3-(dimethylamino)benzene-1-sulfonyl chloride instead of 4-(dimethylamino)benzene-1-sulfonyl chloride, Formula 61 (20 mg) was obtained as a white solid in the same manner as for the preparation of compound of Formula 48.

$^1$H NMR (400 MHZ, CDCl$_3$): δ 8.76 (d, J=4.8 Hz, 1H), 8.05-8.01 (m, 1H), 7.72-7.69 (m, 1H), 7.37-7.29 (m, 2H), 7.05-7.00 (m, 2H), 6.88-6.83 (m, 2H), 3.89-3.75 (m, 6H), 3.29-3.18 (m, 4H), 3.01 (s, 6H), 2.94-2.87 (m, 1H), 2.56 (t, J=10.8 Hz, 1H), 2.35-2.28 (m, 1H), 1.90-1.82 (m, 2H), 1.78-1.70 (m, 1H), 1.56-1.46 (m, 1H). LC-MS (ESI): Rt=3.737 min, m/z 526.2 [M+H]$^+$; purity: 98.59% @ 254 nm, 98.90% @ 214 nm.

[Formula 62]

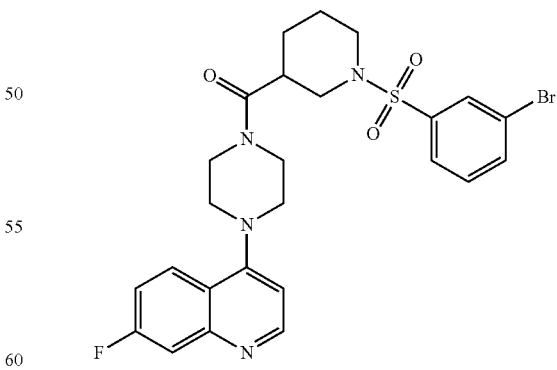

(1-(3-bromophenylsulfonyl)piperidin-3-yl) (4-(7-fluoroquinolin-4-yl) piperazin-1-yl) methanone Except for using 3-bromobenzene-1-sulfonyl chloride instead of benzenesulfonyl chloride, Formula 62 (470 mg)

was obtained as a white solid in the same manner as in the preparation of the compound of Formula 55.

¹H NMR (400 MHZ, CDCl₃): δ 8.79-8.77 (m, 1H), 8.05-8.01 (m, 1H), 7.93-7.89 (m, 1H), 7.75-7.69 (m, 3H), 7.43 (t, J=8.0 Hz, 1H), 7.34-7.29 (m, 1H), 6.85 (d, J=5.2 Hz, 1H), 3.89-3.80 (m, 6H), 3.33-3.20 (m, 4H), 2.95-2.89 (m, 1H), 2.59 (t, J=10.8 Hz, 1H), 2.37-2.30 (m, 1H), 1.93-1.85 (m, 2H), 1.79-1.72 (m, 1H), 1.58-1.51 (m, 1H). LC-MS (ESI): Rt=3.711 min, m/z 561.1 [M+H]⁺; purity: 97.20% @ 254 nm, 97.94% @ 214 nm.

[Formula 63]

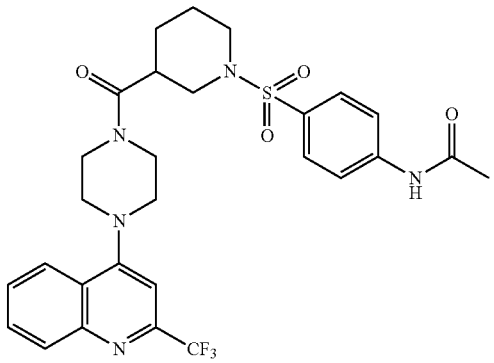

N-(4-(3-(1-(2-(trifluoromethyl)quinolin-4-yl) piperazine-4-carbonyl)piperidin-1-ylsulfonyl)phenyl) acetamide Except for using piperidin-3-yl (4-(2-(trifluoromethyl)quinolin-4-yl) piperazin-1-yl) methanone instead of (4-(2-methylquinolin-4-yl) piperazin-1-yl) (piperidin-3-yl) methanone, Formula 63 (60 mg) was obtained as a white solid in the same manner as in the preparation method of the compound of Formula 15.

¹HNMR (400 MHZ, CDCl₃): δ 8.20 (d, J=8.4 Hz, 1H), 8.05 (d, J=8.4 Hz, 1H), 7.78 (td, J=7.2, 1.2 Hz, 1H), 7.73-7.67 (m, 4H), 7.64 (t, J=7.2 Hz, 1H), 7.57 (s, 1H), 7.16 (s, 1H), 3.93-3.85 (m, 6H), 3.36-3.27 (m, 4H), 2.91-2.88 (m, 1H), 2.51 (t, J=11.2 Hz, 1H), 2.29-2.25 (m, 1H), 2.22 (s, 3H), 1.87 (t, J=16.8 Hz, 2H), 1.75-1.71 (m, 1H), 1.54-1.46 (m, 1H).LC-MS (ESI): Rt=3.953 min, m/z 590.2 [M+H]⁺; purity: 99.95% @ 254 nm, 99.88% @ 214 nm.

[Formula 64]

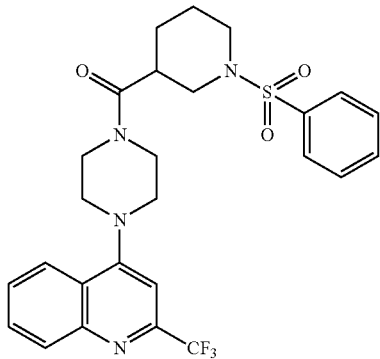

(1-(phenylsulfonyl)piperidin-3-yl) (4-(2-(trifluoromethyl)quinolin-4-yl)piperazin-1-yl)methanone Except for using benzenesulfonyl chloride instead of 4-acetamidobenzene-1-sulfonyl chloride, Formula 64 (65 mg) was obtained as a white solid in the same manner as in the preparation method of the compound of Formula 63.

¹HNMR (400 MHZ, CDCl₃): δ 8.20 (d, J=8.4 Hz, 1H), 8.05 (d, J=8.4 Hz, 1H), 7.80-7.76 (m, 3H), 7.64 (dd, J=7.2, 1.2 Hz, 2H), 7.56-7.52 (m, 2H), 7.16 (s, 1H), 3.92-3.85 (m, 6H), 3.37-3.27 (m, 4H), 2.93-2.90 (m, 1H), 2.52 (t, J=11.2 Hz, 1H), 2.26 (td, J=9.6, 2.8 Hz, 1H), 1.87 (t, J=16.8 Hz, 2H), 1.75-1.72 (m, 1H), 1.54-1.46 (m, 1H).LC-MS (ESI): Rt=3.585 min, m/z 533.2 [M+H]⁺; purity: 99.35% @ 254 nm, 99.87% @ 214 nm.

[Formula 65]

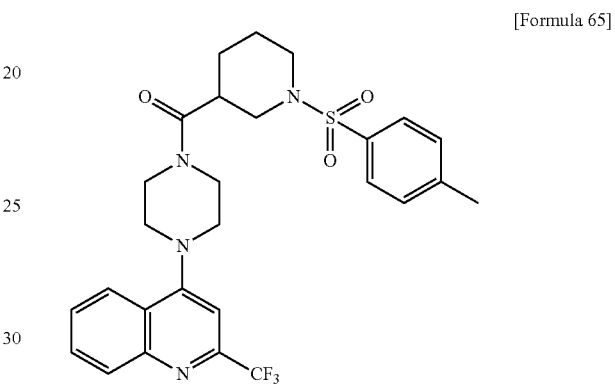

(1-tosylpiperidin-3-yl) (4-(2-(trifluoromethyl)quinolin-4-yl) piperazin-1-yl) methanone Except for using 4-methylbenzene-1-sulfonyl chloride instead of 4-acetamidobenzene-1-sulfonyl chloride, Formula 65 (60 mg) was obtained as a white solid in the same manner as for the preparation of compound of Formula 63.

¹HNMR (400 MHZ, CDCl₃): δ 8.20 (d, J=8.8 Hz, 1H), 8.05 (d, J=8.0 Hz, 1H), 7.78 (td, J=8.4, 1.6 Hz, 1H), 7.66-7.62 (m, 3H), 7.33 (d, J=8.0 Hz, 2H), 7.15 (s, 1H), 3.93-3.85 (m, 6H), 3.36-3.27 (m, 4H), 2.92-2.89 (m, 1H), 2.49 (t, J=11.6 Hz, 1H), 2.44 (s, 3H), 2.23 (td, J=9.2, 2.8 Hz, 1H), 1.86 (t, J=16.4 Hz, 2H), 1.75-1.71 (m, 1H), 1.51-1.47 (m, 1H).LC-MS (ESI): Rt=4.039 min, m/z 547.2 [M+H]⁺; purity: 99.62% @ 254 nm, 99.65% @ 214 nm.

[Formula 66]

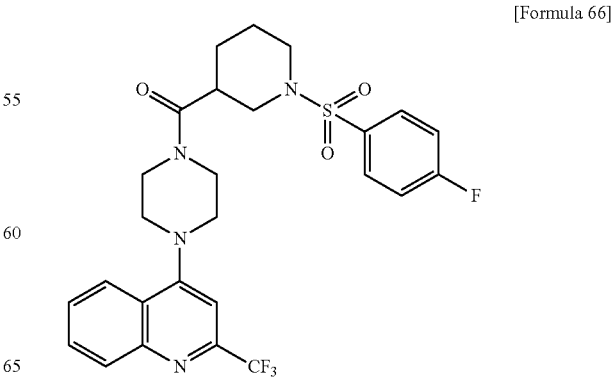

(1-(4-fluorophenylsulfonyl)piperidin-3-yl) (4-(2-(trifluoromethyl)quinolin-4-yl) piperazin-1-yl) methanone Except for using 4-fluorobenzene-1-sulfonyl chloride instead of 4-acetamidobenzene-1-sulfonyl chloride, Formula 65 (70 mg) was obtained as a white solid in the same manner as in the method for preparing compound of Formula 63.

$^1$HNMR (400 MHZ, CDCl$_3$): δ 8.20 (d, J=8.4 Hz, 1H), 8.05 (d, J=8.0 Hz, 1H), 7.80-7.76 (m, 3H), 7.64 (t, J=7.2 Hz, 1H), 7.22 (d, J=8.8 Hz, 2H), 7.16 (s, 1H), 3.93-3.85 (m, 6H), 3.37-3.27 (m, 4H), 2.93-2.90 (m, 1H), 2.53 (t, J=11.6 Hz, 1H), 2.26 (td, J=12.0, 2.8 Hz, 1H), 1.88 (t, J=16.8 Hz, 2H), 1.77-1.73 (m, 1H), 1.52-1.48 (m, 1H). LC-MS (ESI): Rt=3.699 min, m/z 551.2 [M+H]$^+$; purity: 99.51% @ 254 nm, 99.57% @ 214 nm.

[Formula 67]

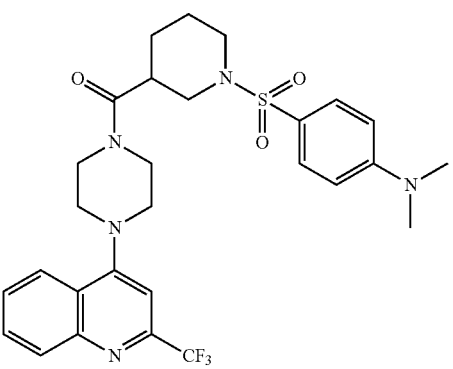

(1-(4-(dimethylamino)phenylsulfonyl)piperidin-3-yl) (4-(2-(trifluoromethyl)quinolin-4-yl) piperazin-1-yl) methanone Except for using 4-(dimethylamino)benzene-1-sulfonyl chloride instead of 4-acetamidobenzene-1-sulfonyl chloride, Formula 67 (70 mg) was obtained as a white solid in the same manner as for the preparation of compound of Formula 63.

$^1$H NMR (400 MHZ, CDCl$_3$): δ 8.20 (d, J=8.4 Hz, 1H), 8.05 (d, J=7.6 Hz, 1H), 7.78 (t, J=8.8 Hz, 1H), 7.64 (t, J=8.0 Hz, 1H), 7.59 (t, J=8.8 Hz, 2H), 7.15 (s, 1H), 6.68 (d, J=8.8 Hz, 2H), 3.93-3.80 (m, 6H), 3.38-3.26 (m, 4H), 3.05 (s, 6H), 2.95-2.88 (m, 1H), 2.45 (t, J=11.6 Hz, 1H), 2.21 (td, J=12.4, 2.4 Hz, 1H), 1.88-1.80 (m, 2H), 1.77-1.67 (m, 1H), 1.53-1.43 (m, 1H). LC-MS (ESI): Rt=3.825 min, m/z 576.3 [M+H]$^+$; purity: 98.55% @ 254 nm, 99.53% @ 214 nm.

[Formula 68]

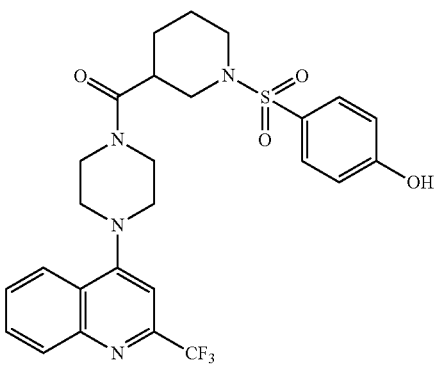

(1-(4-hydroxyphenylsulfonyl)piperidin-3-yl) (4-(2-(trifluoromethyl) quinolin-4-yl) piperazin-1-yl) methanone Except for using 4-hydroxybenzene-1-sulfonyl chloride instead of 4-acetamidobenzene-1-sulfonyl chloride, Formula 68 (58 mg) was obtained as a white solid in the same manner as in the preparation of the compound of Formula 63.

$^1$HNMR (400 MHZ, DMSO-d$_6$): 0 10.54 (s, 1H), 8.16 (d, J=8.0 Hz, 1H), 8.09 (d, J=8.0 Hz, 1H), 7.86 (t, J=8.0 Hz, 1H), 7.72 (t, J=7.2 Hz, 1H), 7.57 (t, J=8.8 Hz, 2H), 7.29 (s, 1H), 6.97 (d, J=8.8 Hz, 2H), 3.81-3.74 (m, 4H), 3.62-3.57 (m, 2H), 3.32-3.21 (m, 4H), 2.94 (t, J=11.2 Hz, 1H), 2.27 (t, J=10.8 Hz, 1H), 2.12 (t, J=11.6 Hz, 1H), 1.82-1.72 (m, 2H), 1.65-1.55 (m, 1H), 1.26-117 (m, 1H).LC-MS (ESI): Rt=3.614 min, m/z 549.2 [M+H]$^+$; purity: 99.76% @ 254 nm, 99.77% @ 214 nm.

[Formula 69]

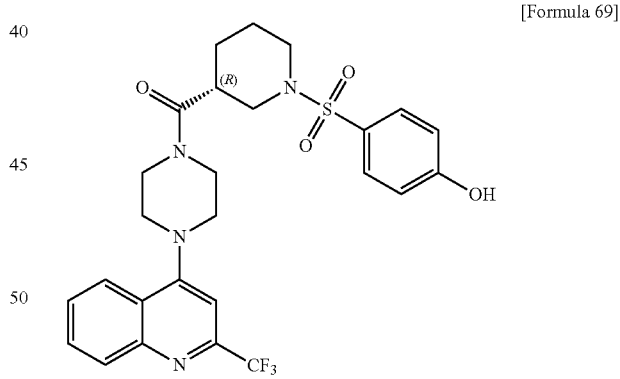

(R)-(1-(4-hydroxyphenylsulfonyl)piperidin-3-yl) (4-(2-(trifluoromethyl) quinolin-4-yl) piperazin-1-yl) methanone Except for using (R)-piperidin-3-yl (4-(2-(trifluoromethyl)quinolin-4-yl) piperazin-1-yl) methanone instead of piperidin-3-yl (4-(2-(trifluoromethyl)quinolin-4-yl) piperazin-1-yl) methanone, Formula 69 (70 mg) was obtained as a white solid in the same manner as in the preparation of the compound of Formula 68.

$^1$HNMR (400 MHZ, DMSO-d$_6$): 0 10.54 (br s, 1H), 8.16 (d, J=8.0 Hz, 1H), 8.09 (d, J=8.0 Hz, 1H), 7.86 (t, J=8.0 Hz,

1H), 7.72 (t, J=7.2 Hz, 1H), 7.57 (t, J=8.8 Hz, 2H), 7.29 (s, 1H), 6.97 (d, J=8.8 Hz, 2H), 3.81-3.74 (m, 4H), 3.62-3.57 (m, 2H), 3.32-3.21 (m, 4H), 2.94 (t, J=11.2 Hz, 1H), 2.27 (t, J=10.8 Hz, 1H), 2.12 (t, J=11.6 Hz, 1H), 1.82-1.72 (m, 2H), 1.65-1.55 (m, 1H), 1.26-117 (m, 1H). LC-MS (ESI): Rt=4.086 min., m/z 549.2 [M+H]⁺; purity: 98.91% @ 254 nm, 99.74% @ 214 nm.

chiral HPLC: Column: Chiralpak IA 5 μm 4.6×250 mm; Mobile Phase: Hex: EtOH=70:30 at 1 mL/min; Temp: 30° C.; Wavelength: 254 nm, Rt=8.171 min, 98.96% ee.

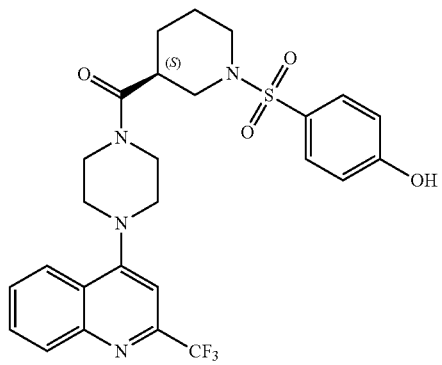

[Formula 70]

(S)-(1-(4-hydroxyphenylsulfonyl)piperidin-3-yl) (4-(2-(trifluoromethyl) quinolin-4-yl) piperazin-1-yl) methanone Except for using(S)-piperidin-3-yl (4-(2-(trifluoromethyl) quinolin-4-yl) piperazin-1-yl) methanone instead of Piperidin-3-yl (4-(2-(trifluoromethyl)quinolin-4-yl) piperazin-1-yl) methanone, Formula 70 (80 mg) was obtained as a white solid in the same manner as in the preparation method of the compound of Formula 68.

¹HNMR (400 MHZ, DMSO-d₆): δ 10.54 (br s, 1H), 8.16 (d, J=8.0 Hz, 1H), 8.09 (d, J=8.0 Hz, 1H), 7.86 (t, J=8.0 Hz, 1H), 7.72 (t, J=7.2 Hz, 1H), 7.57 (t, J=8.8 Hz, 2H), 7.29 (s, 1H), 6.97 (d, J=8.8 Hz, 2H), 3.81-3.74 (m, 4H), 3.62-3.57 (m, 2H), 3.32-3.21 (m, 4H), 2.94 (t, J=11.2 Hz, 1H), 2.27 (t, J=10.8 Hz, 1H), 2.12 (t, J=11.6 Hz, 1H), 1.82-1.72 (m, 2H), 1.65-1.55 (m, 1H), 1.26-117 (m, 1H). LC-MS (ESI): Rt=4.087 min, m/z 549.2 [M+H]⁺; purity: 99.19% @ 254 nm, 99.70% @ 214 nm.

chiral HPLC: Column: Chiralpak IA 5 μm 4.6×250 mm; Mobile Phase: Hex: EtOH=70:30 at 1 mL/min; Temp: 30° C.; Wavelength: 254 nm, Rt=11.178 min, 99.24% ee.

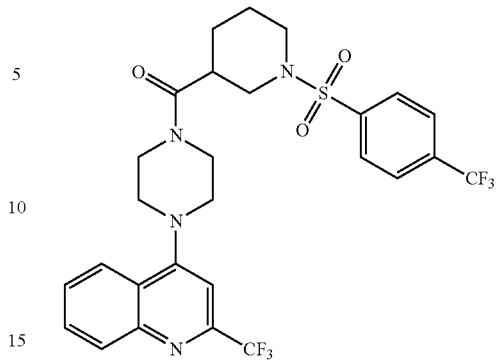

[Formula 71]

(1-(4-(trifluoromethyl)phenylsulfonyl)piperidin-3-yl) (4-(2-(trifluoromethyl)quinolin-4-yl) piperazin-1-yl) methanone Except for using 4-(trifluoromethyl)benzene-1-sulfonyl chloride instead of 4-acetamidobenzene-1-sulfonyl chloride, Formula 71 (80 mg) was obtained as a white solid in the same manner as for the preparation of compound of Formula 63.

¹H NMR (400 MHZ, DMSO-d₆): δ 8.17 (d, J=8.4 Hz, 1H), 8.11-8.05 (m, 3H), 7.98 (d, J=8.0 Hz, 1H), 7.86 (t, J=7.6 Hz, 1H), 7.73 (t, J=7.2 Hz, 1H), 7.29 (s, 1H), 3.82-3.68 (m, 6H), 3.40-3.34 (m, 2H), 3.30-3.23 (m, 2H), 2.99-2.94 (m, 1H), 2.43 (t, J=11.2 Hz, 1H), 2.30 (t, J=11.6 Hz, 2H), 1.84-1.73 (m, 2H), 1.68-1.62 (m, 1H), 1.33-1.23 (m, 1H). LC-MS (ESI): Rt=3.908 min, m/z 601.2 [M+H]⁺; purity: 98.95% @ 254 nm, 99.27% @ 214 nm.

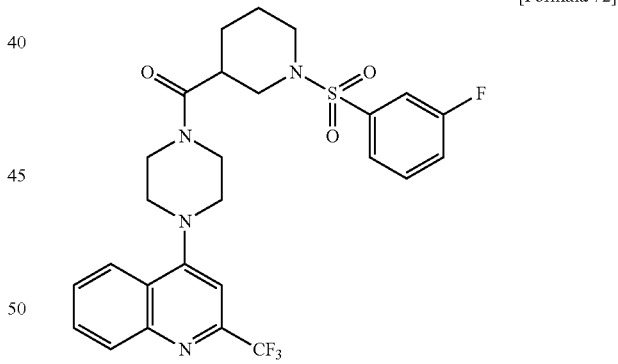

[Formula 72]

(1-(3-fluorophenylsulfonyl)piperidin-3-yl) (4-(2-(trifluoromethyl)quinolin-4-yl) piperazin-1-yl) methanone Except for using 3-fluorobenzene-1-sulfonyl chloride instead of 4-acetamidobenzene-1-sulfonyl chloride, Formula 72 (70 mg) was obtained as a white solid in the same manner as in the preparation of the compound of Formula 63.

¹H NMR (400 MHZ, CDCl₃): δ 8.20 (d, J=8.0 Hz, 1H), 8.05 (d, J=8.0 Hz, 1H), 7.78 (t, J=8.0 Hz, 1H), 7.64 (t, J=8.0 Hz, 1H), 7.57-7.53 (m, 2H), 7.48 (d, J=8.0 Hz, 1H), 7.34-7.30 (m, 1H), 7.16 (s, 1H), 3.94-3.85 (m, 6H), 3.37-3.28 (m,

4H), 2.93-2.90 (m, 1H), 2.57 (t, J=11.6 Hz, 1H), 2.31 (td, J=12.0, 2.4 Hz, 2H), 1.89 (t, J=16.0 Hz, 1H), 1.76-1.73 (m, 1H), 1.54-1.50 (m, 1H).LC-MS (ESI): Rt=4.094 min, m/z 551.2 [M+H]+; purity: 99.24% @ 254 nm, 99.61% @ 214 nm.

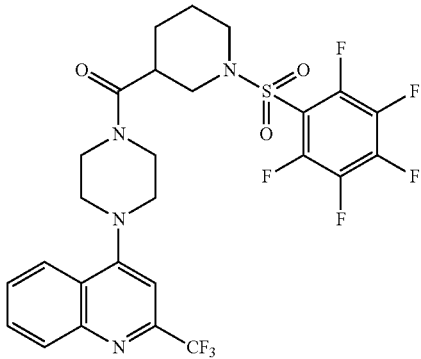

[Formula 73]

(1-(perfluorophenylsulfonyl)piperidin-3-yl) (4-(2-(trifluoromethyl)quinolin-4-yl) piperazin-1-yl) methanon Except for using 2,3,4,5,6-pentafluorobenzene-1-sulfonyl chloride instead of 4-acetamidobenzene-1-sulfonyl chloride, Formula 73 (80 mg) was obtained as a white solid in the same manner as in the preparation method of the compound of Formula 63.

1H NMR (400 MHZ, CDCl3): δ 8.20 (d, J=8.0 Hz, 1H), 8.05 (d, J=8.4 Hz, 1H), 1H), 7.79 (td, J=7.2, 1.2 Hz, 1H), 7.64 (td, J=7.2, 1.2 Hz, 1H), 7.16 (s, 1H), 4.03-3.86 (m, 6H), 3.37-3.28 (m, 4H), 2.95-2.92 (m, 2H), 2.70 (t, J=12.0 Hz, 1H), 2.02-1.91 (m, 2H), 1.78-1.69 (m, 2H). LC-MS (ESI): Rt=4.091 min, m/z 623.2 [M+H]+; purity: 98.56% @ 254 nm, 99.48% @ 214 nm.

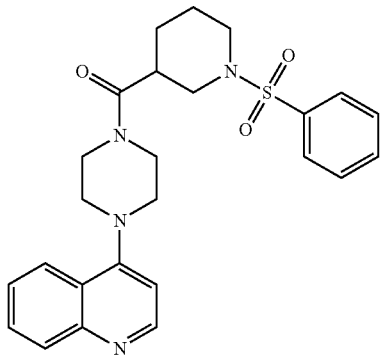

[Formula 74]

(1-(phenylsulfonyl)piperidin-3-yl) (4-(quinolin-4-yl) piperazin-1-yl) methanone

Except for using piperidin-3-yl (4-(quinolin-4-yl) piperazin-1-yl) methanone instead of (4-(7-Chloroquinolin-4-yl) piperazin-1-yl) (piperidin-3-yl) methanone, Formula 74 (60 mg) was obtained as a white solid in the same manner as in the preparation of the compound of Formula 15.

1H NMR (400 MHZ, CDCl3): δ 8.77 (d, J=4.8 Hz, 1H), 8.10 (d, J=8.4 Hz, 1H), 8.03 (d, J=8.4 Hz, 1H), 7.78-7.76 (m, 2H), 7.72-7.70 (m, 1H), 7.63-7.60 (m, 1H), 7.56-7.52 (m, 3H), 6.87 (d, J=4.8 Hz, 1H), 3.91-3.84 (m, 6H), 3.29-3.21 (m, 4H), 2.96-2.90 (m, 1H), 2.53 (t, J=11.2 Hz, 1H), 2.26 (td, J=12.0, 2.8 Hz, 1H), 1.91-1.83 (m, 2H), 1.79-1.72 (m, 1H), 1.55-1.48 (m, 1H). LC-MS (ESI): Rt=3.559 min, m/z 465.2 [M+H]+; purity: 99.70% @ 254 nm, 99.13% @ 214 nm.

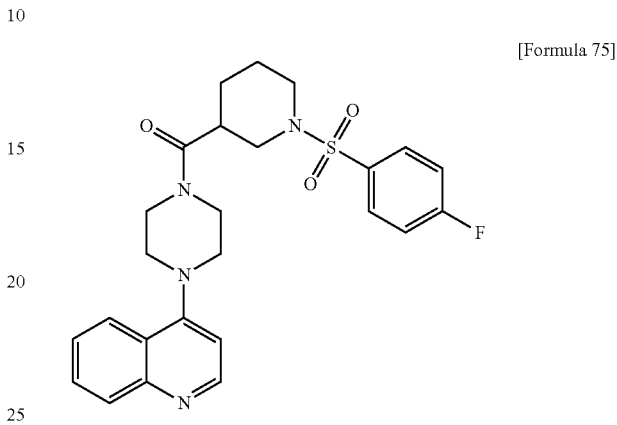

[Formula 75]

(1-(4-fluorophenylsulfonyl)piperidin-3-yl) (4-(quinolin-4-yl) piperazin-1-yl) methanone Except for using 4-fluorobenzene-1-sulfonyl-chloride instead of benzenesulfonyl chloride, Formula 75 (55 mg) was obtained as a white solid in the same manner as in the preparation of the compound of Formula 74.

1H NMR (400 MHZ, CDCl3): δ 8.77 (d, J=4.8 Hz, 1H), 8.11 (d, J=8.4 Hz, 1H), 8.02 (d, J=8.4 Hz, 1H), 7.80-7.77 (m, 2H), 7.73-7.69 (m, 1H), 7.56-7.52 (m, 1H), 7.25-7.20 (m, 2H), 6.87 (d, J=4.8 Hz, 1H), 3.90-3.84 (m, 6H), 3.30-3.22 (m, 4H), 2.96-2.90 (m, 1H), 2.53 (t, J=11.2 Hz, 1H), 2.25 (td, J=12.0, 2.8 Hz, 1H), 1.92-1.84 (m, 3H), 1.55-1.44 (m, 1H). LC-MS (ESI): Rt=3.726 min, m/z 483.2 [M+H]+; purity: 99.23% @ 254 nm, 98.58% @ 214 nm.

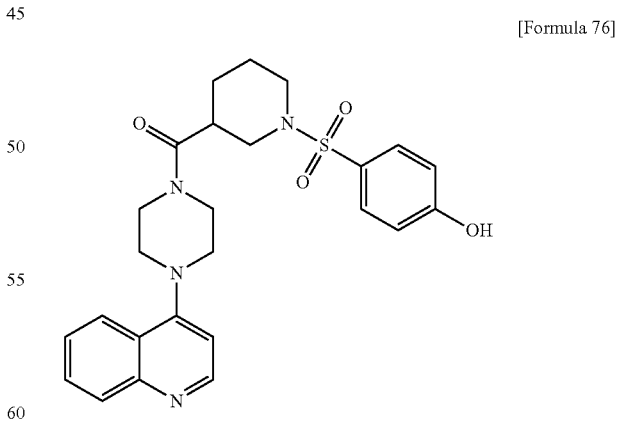

[Formula 76]

(1-((4-hydroxyphenyl) sulfonyl)piperidin-3-yl) (4-(quinolin-4-yl) piperazin-1-yl) methanone Except for using 4-hydroxybenzene-1-sulfonyl-chloride instead of benzenesulfonyl chloride, Formula 76 (52 mg)

was obtained as a white solid in the same manner as for the preparation of compound of Formula 74.

$^1$H NMR (400 MHZ, DMSO-d$_6$): δ 10.54 (s, 1H), 8.71 (d, J=4.4 Hz, 1H), 8.08 (d, J=8.0 Hz, 1H), 7.97 (d, J=8.0 Hz, 1H), 7.72 (t, J=7.6 Hz, 1H), 7.58-7.56 (m, 3H), 7.01-6.97 (m, 3H), 3.80-3.74 (m, 4H), 3.60-3.58 (m, 2H), 3.19-3.13 (m, 4H), 2.96-2.91 (m, 1H), 2.28 (t, J=11.2 Hz, 1H), 2.17-2.11 (m, 1H), 1.81-1.72 (m, 2H), 1.65-1.59 (m, 1H), 1.27-1.80 (m, 1H). LC-MS (ESI): Rt=3.316 min, m/z 481.2 [M+H]$^+$; purity: 95.16% @ 254 nm, 95.01% @ 214 nm.

was obtained as a white solid in the same manner as in the preparation of the compound of Formula 74.

$^1$H NMR (400 MHZ, CDCl$_3$): δ 8.77 (d, J=4.8 Hz, 1H), 8.09 (d, J=8.4 Hz, 1H), 8.02 (d, J=8.0 Hz, 1H), 7.91 (br s, 1H), 7.72-7.68 (m, 5H), 7.54 (t, J=7.6 Hz, 1H), 6.87 (d, J=4.8 Hz, 1H), 3.88-3.82 (m, 6H), 3.28-3.20 (m, 4H), 2.95-2.89 (m, 1H), 2.50 (t, J=11.2 Hz, 1H), 2.27-2.24 (m, 1H), 2.22 (s, 3H), 1.91-1.83 (m, 2H), 1.77-1.74 (m 1H), 1.52-1.42 (m, 1H). LC-MS (ESI): Rt=3.270 min, m/z 522.2 [M+H]$^+$; purity: 98.70% @ 254 nm, 99.08% @ 214 nm.

[Formula 77]

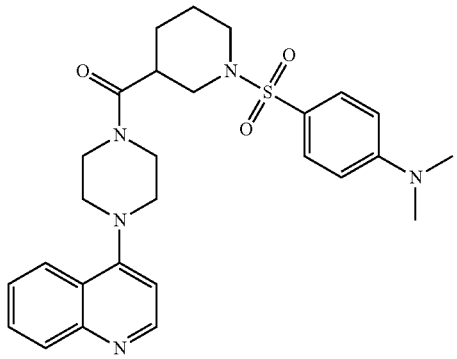

(1-(4-(dimethylamino)phenylsulfonyl)piperidin-3-yl) (4-(quinolin-4-yl) piperazin-1-yl) methanone Except for using 4-(dimethylamino)benzene-1-sulfonyl-chloride instead of benzenesulfonyl chloride, Formula 77 (60 mg) was obtained as a white solid in the same manner as in the preparation of the compound of Formula 74.

$^1$H NMR (400 MHZ, CDCl$_3$): δ 8.77 (d, J=5.2 Hz, 1H), 8.09 (d, J=8.4 Hz, 1H), 8.03 (d, J=8.0 Hz, 1H), 7.70 (t, J=7.6 Hz, 1H), 7.59 (d, J=9.2 Hz, 2H), 7.54 (t, J=8.0 Hz, 1H), 6.87 (d, J=5.2 Hz, 1H), 6.68 (d, J=8.8 Hz, 2H), 3.89-3.81 (m, 6H), 3.27-3.20 (m, 4H), 3.05 (s, 6H), 2.92 (t, J=11.2 Hz, 1H), 2.45 (t, J=11.2 Hz, 1H), 2.21 (t, J=11.6 Hz, 1H), 1.88-1.81 (m, 2H), 1.76-1.73 (m, 1H), 1.52-1.42 (m, 1H). LC-MS (ESI): Rt=2.971 min, m/z 508.3 [M+H]$^+$; purity: 98.74% @ 254 nm, 98.82% @ 214 nm.

[Formula 78]

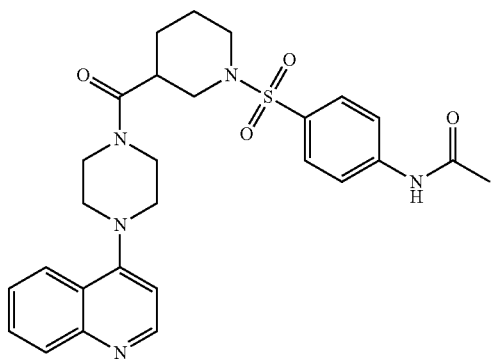

N-(4-((3-(4-(quinolin-4-yl) piperazine-1-carbonyl) piperidin-1-yl) sulfonyl)phenyl) acetamide Except for using 4-acetamidobenzene-1-sulfonyl-chloride instead of benzenesulfonyl chloride, Formula 78 (50 mg)

[Formula 79]

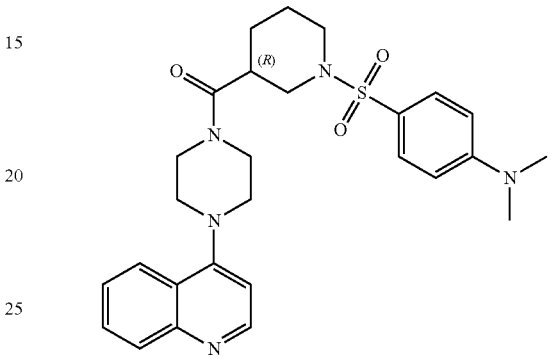

(R)-(1-(4-(dimethylamino)phenylsulfonyl)piperidin-3-yl) (4-(quinolin-4-yl)piperazin-1-yl)methanone Except for using (R)-piperidin-3-yl (4-(quinolin-4-yl) piperazin-1-yl) methanone instead of piperidin-3-yl (4-(quinolin-4-yl) piperazin-1-yl) methanone, Formula 79 (40 mg) was obtained as a white solid in the same manner as in the preparation of the compound of Formula 78.

$^1$HNMR (400 MHZ, DMSO-d$_6$): δ 8.71 (d, J=4.8 Hz, 1H), 8.08 (d, J=8.4 Hz, 1H), 7.96 (d, J=8.4 Hz, 1H), 7.72 (t, J=7.2 Hz, 1H), 7.57 (t, J=7.2 Hz, 1H), 7.50 (d, J=8.8 Hz, 2H), 7.00 (d, J=4.8 Hz, 1H), 6.82 (d, J=8.8 Hz, 2H), 3.79-3.69 (m, 4H), 3.61-3.54 (m, 2H), 3.18-3.13 (m, 4H), 3.02 (s, 6H), 2.97-2.89 (m, 1H), 2.24 (t, J=11.2 Hz, 1H), 2.12-2.07 (m, 1H), 1.80-1.72 (m, 2H), 1.63-1.54 (m, 1H), 1.25-1.10 (m, 1H). LC-MS (ESI): Rt=3.475 min., m/z 508.2 [M+H]$^+$; purity: 97.01% @ 254 nm, 96.50% @ 214 nm.

chiral HPLC: Column: Chiralpak IA 5 μm 4.6×250 mm; Mobile Phase: Hex: EtOH: DEA=40:60:0.2 at 1 mL/min; Temp: 30° C.; Wavelength: 254 nm, Rt=19.497 min, 98.57% ee.

[Formula 80]

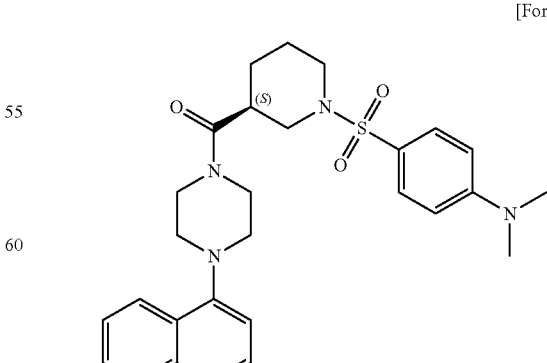

(S)-(1-(4-(dimethylamino)phenylsulfonyl)piperidin-3-yl) (4-(quinolin-4-yl)piperazin-1-yl)methanone Except for using(S)-piperidin-3-yl (4-(quinolin-4-yl) piperazin-1-yl) methanone instead of piperidin-3-yl (4-(quinolin-4-yl) piperazin-1-yl) methanone, Formula 80 (42 mg) was obtained as a white solid in the same manner as in the preparation of the compound of Formula 78.

$^1$HNMR (400 MHZ, DMSO-d$_6$): δ 8.71 (d, J=4.8 Hz, 1H), 8.08 (d, J=8.4 Hz, 1H), 7.96 (d, J=8.4 Hz, 1H), 7.72 (t, J=7.2 Hz, 1H), 7.57 (t, J=7.2 Hz, 1H), 7.50 (d, J=8.8 Hz, 2H), 7.00 (d, J=4.8 Hz, 1H), 6.82 (d, J=8.8 Hz, 2H), 3.79-3.69 (m, 4H), 3.61-3.55 (m, 2H), 3.18-3.13 (m, 4H), 3.02 (s, 6H), 2.96-2.90 (m, 1H), 2.24 (t, J=11.2 Hz, 1H), 2.12-2.07 (m, 1H), 1.80-1.72 (m, 2H), 1.65-1.59 (m, 1H), 1.25-1.15 (m, 1H). LC-MS (ESI): Rt=3.489 min., m/z 508.2 [M+H]$^+$; purity: 99.43% @ 254 nm, 99.17% @ 214 nm.

chiral HPLC: Column: Chiralpak IA 5 μm 4.6×250 mm; Mobile Phase: Hex: EtOH: DEA=40:60:0.2 at 1 mL/min; Temp: 30° C.; Wavelength: 254 nm, Rt=15.070 min, 99.52% ee.

[Formula 81]

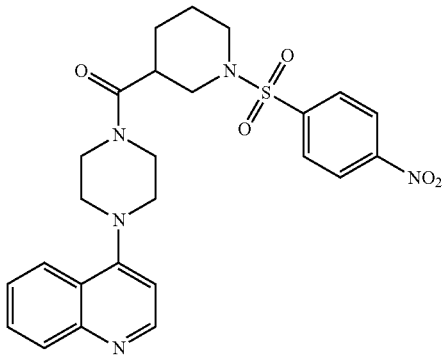

(1-(4-nitrophenylsulfonyl)piperidin-3-yl) (4-(quinolin-4-yl) piperazin-1-yl) methanone Except for using 4-nitrobenzene-1-sulfonyl-chloride instead of benzenesulfonyl chloride, Formula 81 was obtained as a white solid in the same manner as in the preparation of the compound of Formula 74.

$^1$H NMR (400 MHZ, CDCl$_3$): δ 8.78 (d, J=4.8 Hz, 1H), 8.39 (d, J=8.8 Hz, 2H), 8.10 (d, J=8.4 Hz, 1H), 8.02 (d, J=8.4 Hz, 1H), 7.96 (d, J=9.2 Hz, 2H), 7.70 (t, J=6.8 Hz, 1H), 7.54 (t, J=7.2 Hz, 1H), 6.87 (d, J=4.8 Hz, 1H), 3.95-3.83 (m, 6H), 3.30-3.21 (m, 4H), 2.98-2.91 (m, 1H), 2.61 (t, J=11.6 Hz, 1H), 2.35-2.29 (m, 1H), 1.96-1.87 (m, 2H), 1.81-1.75 (m, 1H), 1.56-1.49 (m, 1H). LC-MS (ESI): Rt=3.734 min, m/z 510.2 [M+H]$^+$; purity: 97.44% @ 254 nm, 98.65% @ 214 nm.

[Formula 82]

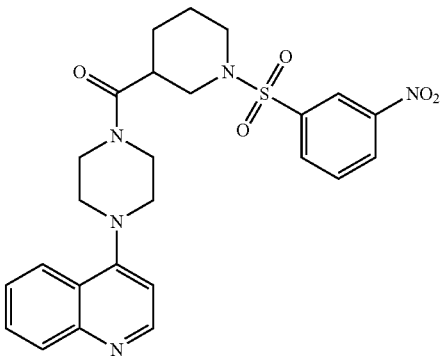

(1-(3-nitrophenylsulfonyl)piperidin-3-yl) (4-(quinolin-4-yl) piperazin-1-yl) methanone Except for using 3-nitrobenzene-1-sulfonyl-chloride instead of benzenesulfonyl chloride, Formula 82 (56 mg) was obtained as a white solid in the same manner as for the preparation of the compound of Formula 74.

$^1$H NMR (400 MHZ, CDCl$_3$): δ 8.78 (d, J=5.2 Hz, 1H), 8.61 (s, 1H), 8.47 (d, J=8.4 Hz, 1H), 8.09 (d, J=8.0 Hz, 2H), 8.03 (d, J=8.4 Hz, 1H), 7.78 (t, J=8.0 Hz, 1H), 7.70 (t, J=8.0 Hz, 1H), 7.54 (t, J=8.0 Hz, 1H), 6.87 (d, J=4.8 Hz, 1H), 3.95-3.79 (m, 6H), 3.33-3.21 (m, 4H), 2.98-2.92 (m, 1H), 2.61 (t, J=11.6 Hz, 1H), 2.40-2.33 (m, 1H), 1.96-1.88 (m, 2H), 1.82-1.76 (m, 1H), 1.58-1.48 (m, 1H). LC-MS (ESI): Rt=4.003 min, m/z 510.2 [M+H]$^+$; purity: 99.46% @ 254 nm, 98.15% @ 214 nm.

[Formula 83]

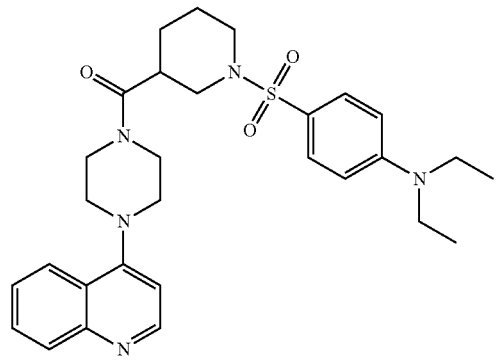

(1-(4-(diethylamino)phenylsulfonyl)piperidin-3-yl) (4-(quinolin-4-yl)piperazin-1-yl)methanone Except for using 4-(diedylamino)benzene-1-sulfonyl chloride instead of benzenesulfonyl chloride, Formula 83 (35 mg) was obtained as a white solid in the same manner as in the preparation method of the compound of Formula 74.

$^1$H NMR (400 MHZ, CDCl$_3$): δ 8.78 (br s, 1H), 8.12-8.08 (m, 1H), 8.02 (d, J=8.0 Hz, 1H), 7.70 (t, J=7.2 Hz, 1H), 7.56-7.52 (m, 3H), 6.87 (d, J=4.8 Hz, 1H), 6.63 (d, J=9.2 Hz, 2H), 3.89-3.80 (m, 6H), 3.40 (q, J=7.2 Hz, 4H), 3.33-3.16 (m, 4H), 2.97-2.88 (m, 1H), 2.48 (t, J=11.6 Hz, 1H), 2.27-2.21 (m, 1H), 1.88-1.81 (m, 2H), 1.76-1.68 (m, 1H), 1.52-1.47 (m, 1H), 1.20 (t, J=6.8 Hz, 6H). LC-MS (ESI): Rt=3.827 min, m/z 536.3 [M+H]+; purity: 94.48% @ 254 nm, 98.15% @ 214 nm.

[Formula 84]

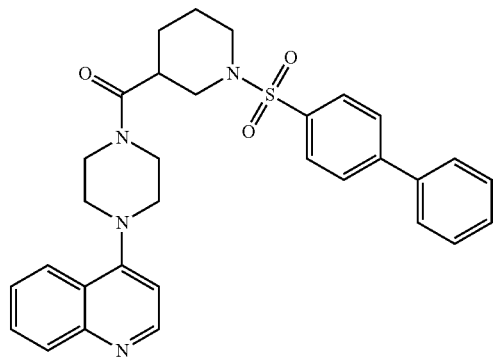

(4-(quinolin-4-yl) piperazin-1-yl) (1-(4-phenylbenzenesulfonyl)piperidin-3-yl) methanone Except for using [1,1'-biphenyl]-4-sulfonyl chloride instead of benzenesulfonyl chloride, Formula 84 (68 mg) was obtained as a white solid in the same manner as for the preparation of the compound of Formula 74.
$^1$H NMR (400 MHZ, CDCl$_3$): δ 8.78 (d, J=4.8 Hz, 1H), 8.10 (d, J=8.4 Hz, 1H), 8.02 (d, J=8.4 Hz, 1H), 7.84-7.82 (m, 2H), 7.75-7.68 (m, 3H), 7.62-7.60 (m, 2H), 7.56-7.41 (m, 4H), 6.87 (d, J=4.8 Hz, 1H), 3.95-3.82 (m, 6H), 3.33-3.21 (m, 4H), 2.99-2.91 (m, 1H), 2.58 (t, J=11.6 Hz, 1H), 2.35-2.29 (m, 1H), 1.93-1.85 (m, 2H), 1.82-1.75 (m, 1H), 1.56-1.47 (m, 1H). LC-MS (ESI): Rt=2.923 min, m/z 541.2 [M+H]+; purity: 99.46% @ 254 nm, 99.22% @ 214 nm.

[Formula 85]

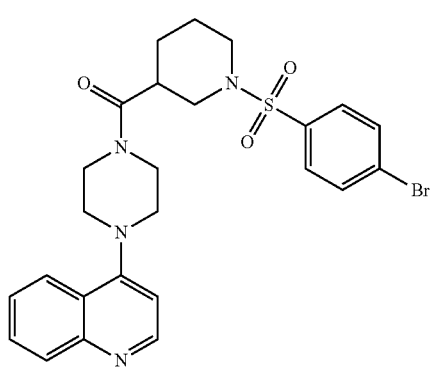

(1-(4-bromophenylsulfonyl)piperidin-3-yl) (4-(quinolin-4-yl) piperazin-1-yl) methanone Except for using 4-bromobenzene-1-sulfonyl-chloride instead of benzenesulfonyl chloride, Formula 85 (280 mg) was obtained as a white solid in the same manner as in the preparation method of the compound of Formula 74.
$^1$H NMR (400 MHZ, CDCl$_3$): δ 8.78 (d, J=4.8 Hz, 1H), 8.09 (d, J=8.8 Hz, 1H), 8.02 (d, J=8.0 Hz, 1H), 7.72-7.62 (m, 5H), 7.54 (t, J=7.6 Hz, 1H), 6.87 (d, J=5.2 Hz, 1H), 3.89-3.79 (m, 6H), 3.33-3.21 (m, 4H), 2.95-2.88 (m, 1H), 2.54 (t, J=11.2 Hz, 1H), 2.30-2.23 (m, 1H), 1.93-1.84 (m, 2H), 1.80-1.71 (m, 1H), 1.52-1.46 (m, 1H). LC-MS (ESI): Rt=8.996 min, m/z 543.1 [M+H]+; purity: 97.53% @ 254 nm, 97.39% @ 214 nm.

[Formula 86]

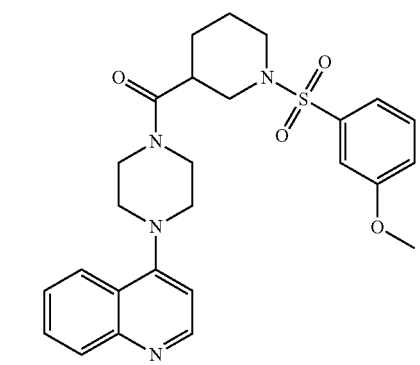

(1-(3-methoxyphenylsulfonyl)piperidin-3-yl) (4-(quinolin-4-yl) piperazin-1-yl) methanone Except for using 3-methoxybenzene-1-sulfonyl chloride instead of benzenesulfonyl chloride, Formula 86 (40 mg) was obtained as a white solid in the same manner as for the preparation of the compound of Formula 74.
Rt=3.734 min, m/z 495.2 [M+H]+; purity: 98.35% @ 254 nm, 98.12% @ 214 nm.

[Formula 87]

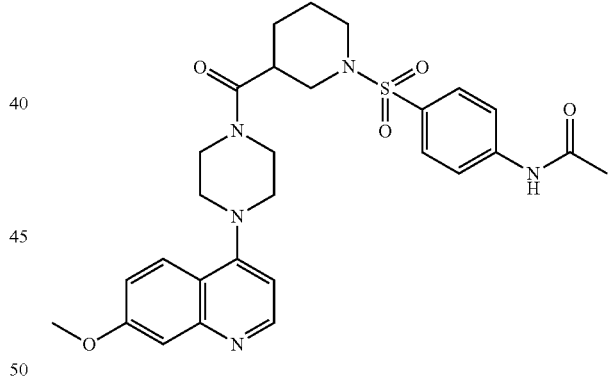

N-(4-(3-(1-(7-methoxyquinolin-4-yl) piperazine-4-carbonyl)piperidin-1-ylsulfonyl)phenyl) acetamide Except for using (4-(7-methoxyquinolin-4-yl) piperazin-1-yl) (piperidin-3-yl) methanone instead of (4-(2-methylquinolin-4-yl) piperazin-1-yl) (piperidin-3-yl) methanone, Formula 87 (70 mg) was obtained as a white solid in the same manner as in the preparation of the compound of Formula 15.
$^1$H NMR (400 MHZ, CDCl$_3$): δ 8.68 (d, J=5.2 Hz, 1H), 7.90 (d, J=11.2 Hz, 1H), 7.70 (s, 5H), 7.41 (d, J=2.4 Hz, 1H), 7.17 (dd, J=11.2, 2.4 Hz, 1H), 6.76 (d, J=4.8 Hz, 1H), 3.95 (s, 3H), 3.87-3.82 (m, 6H), 3.25-3.18 (m, 4H), 2.90-2.87 (m, 1H), 2.49 (t, J=11.2 Hz, 1H), 2.27-2.24 (m, 1H), 2.22 (s, 3H), 1.90-1.82 (m, 2H), 1.73-1.70 (m, 1H), 1.49-1.45 (m, 1H). LC-MS (ESI): Rt=3.647 min, m/z 552.2 [M+H]+; purity: 99.61% @ 254 nm, 98.55% @ 214 nm.

[Formula 88]

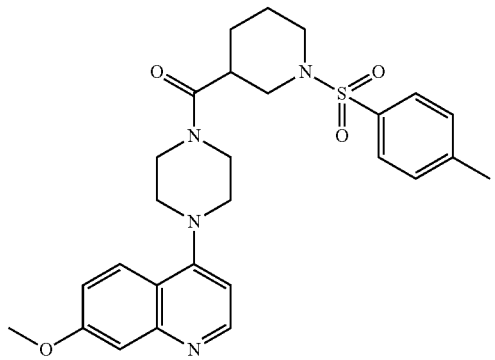

(4-(7-methoxyquinolin-4-yl) piperazin-1-yl) (1-tosylpiperidin-3-yl) methanone

Except for using 4-methylbenzene-1-sulfonyl chloride instead of 4-acetamidobenzene-1-sulfonyl chloride, Formula 88 (70 mg) was obtained as a white solid in the same manner as in the preparation of the compound of Formula 87.

$^1$H NMR (400 MHZ, CDCl$_3$): δ 8.68 (d, J=5.2 Hz, 1H), 7.90 (d, J=9.2 Hz, 1H), 7.64 (d, J=8.0 Hz, 2H), 7.40 (d, J=6.4 Hz, 1H), 7.32 (d, J=8.0 Hz, 2H), 7.17 (dd, J=9.2, 2.0 Hz, 1H), 6.75 (d, J=5.2 Hz, 1H), 3.95 (s, 3H), 3.87-3.82 (m, 6H), 3.26-3.17 (m, 4H), 2.91-2.89 (m, 1H), 2.50-2.45 (m, 1H), 2.43 (s, 3H), 2.22 (t, J=9.2 Hz, 1H), 1.89-1.81 (m, 2H), 1.74-1.71 (m, 1H), 1.49-1.45 (m, 1H). LC-MS (ESI): Rt=3.102 min, m/z 509.3 [M+H]+; purity: 98.47% @ 254 nm, 98.37% @ 214 nm.

[Formula 89]

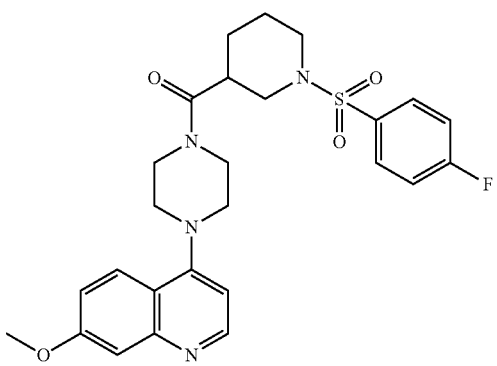

(1-(4-fluorophenylsulfonyl)piperidin-3-yl) (4-(7-methoxyquinolin-4-yl) piperazin-1-yl) methanone Except for using 4-fluorobenzene-1-sulfonyl chloride instead of 4-acetamidobenzene-1-sulfonyl chloride, Formula 89 (65 mg) was obtained as a white solid in the same manner as in the preparation of the compound of Formula 87.

$^1$H NMR (400 MHZ, CDCl$_3$): δ 8.68 (d, J=4.8 Hz, 1H), 7.90 (d, J=8.0 Hz, 1H), 7.80-7.76 (m, 2H), 7.41 (d, J=3.0 Hz, 1H), 7.24-7.16 (m, 3H), 6.75 (d, J=4.8 Hz, 1H), 3.95 (s, 3H), 3.88-3.80 (m, 6H), 3.25-3.17 (m, 4H), 2.92-2.89 (m, 1H), 2.52 (t, J=11.2 Hz, 1H), 2.25 (td, J=12.0, 2.8 Hz, 1H), 1.92-1.83 (m, 2H), 1.75-1.72 (m, 1H), 1.51-1.46 (m, 1H). LC-MS (ESI): Rt=3.923 min, m/z 513.2 [M+H]+; purity: 99.40% @ 254 nm, 99.61% @ 214 nm.

[Formula 90]

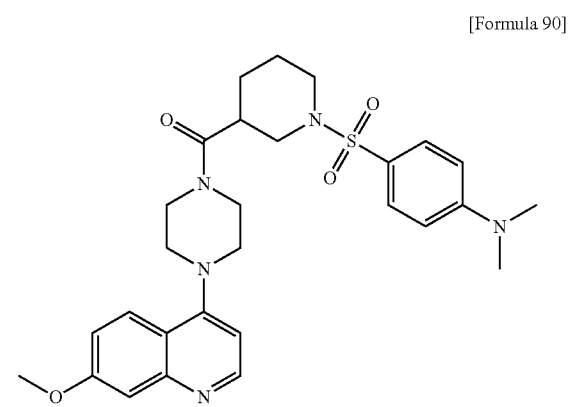

(1-(4-(dimethylamino)phenylsulfonyl)piperidin-3-yl) (4-(7-methoxyquinolin-4-yl) piperazin-1-yl) methanone Except for using 4-(dimethylamino)benzene-1-sulfonyl chloride instead of 4-acetamidobenzene-1-sulfonyl chloride, Formula 90 (55 mg) was obtained as a white solid in the same manner as in the preparation method of the compound of Formula 87.

$^1$H NMR (400 MHZ, CDCl$_3$): δ 8.68 (d, J=4.8 Hz, 1H), 7.90 (d, J=9.2 Hz, 1H), 7.59 (d, J=8.8 Hz, 2H), 7.42 (d, J=3.0 Hz, 1H), 7.17 (dd, J=9.2, 2.8 Hz, 1H), 6.75 (d, J=5.2 Hz, 1H), 6.68 (d, J=9.2 Hz, 2H), 3.95 (s, 3H), 3.85-3.82 (m, 6H), 3.23-3.17 (m, 4H), 3.04 (s, 6H), 2.91-2.88 (m, 1H), 2.45 (t, J=11.2 Hz, 1H), 2.21-2.18 (m, 1H), 1.86-1.80 (m, 2H), 1.74-1.73 (m, 1H), 1.49-1.45 (m, 1H). LC-MS (ESI): Rt=4.023 min, m/z 538.3 [M+H]+; purity: 99.35% @ 254 nm, 99.15% @ 214 nm.

[Formula 91]

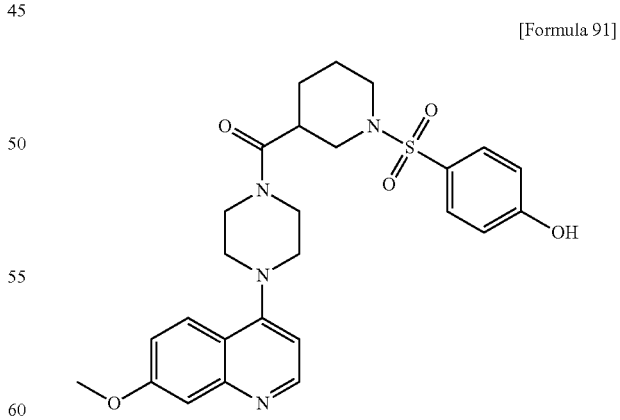

(1-(4-hydroxyphenylsulfonyl)piperidin-3-yl) (4-(7-methoxyquinolin-4-yl)piperazin-1-yl)methanone Except for using 4-hydroxybenzene-1-sulfonyl chloride instead of 4-acetamidobenzene-1-sulfonyl chloride, Formula 90 (78 mg) was obtained as a white solid in the same manner as in the preparation of the compound of Formula 87, $^{1}$H NMR (400 MHZ, DMSO-$d_6$): 0 10.32 (br s, 1H), 8.62 (d, J=5.2 Hz, 1H), 7.97 (d, J=9.2 Hz, 1H), 7.57 (d, J=9.2 Hz, 2H), 7.34 (d, J=2.4 Hz, 1H), 7.20 (dd, J=9.2, 2.4 Hz, 1H), 6.97 (d, J=9.2 Hz, 2H), 6.87 (d, J=4.8 Hz, 1H), 3.90 (s, 3H), 3.77-3.70 (m, 4H), 3.61-3.56 (m, 2H), 3.17-3.09 (m, 4H), 2.95-2.90 (m, 1H), 2.27 (t, J=11.2 Hz, 1H), 2.12 (t, J=10.0 Hz, 1H), 1.80-1.74 (m, 2H), 1.65-1.57 (m, 1H), 1.25-1.17 (m, 1H). LC-MS (ESI): Rt=3.671 min, m/z 511.2 [M+H]$^+$; purity: 96.38% @ 254 nm, 96.15% @ 214 nm.

The target compound was synthesized according to Reaction Formula 1-2 for the following example compounds.

[Reaction Formula 1-2]

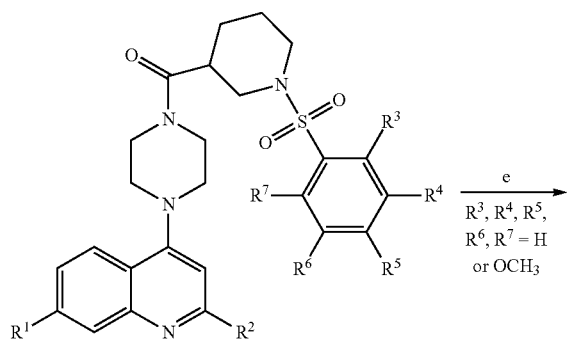

I-2
Reaction conditions, e) BBr3/DCM, 70° C.-rt, 3-5 hr.

[Formula 92]

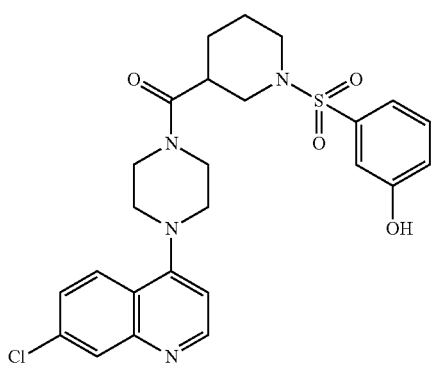

(4-(7-chloroquinolin-4-yl) piperazin-1-yl) (1-(3-hydroxyphenylsulfonyl)piperidin-3-yl) methanone A solution of (4-(7-chloroquinolin-4-yl) piperazin-1-yl) (1-((3-methoxyphenyl) sulfonyl)piperidin-3-yl) methanone (120 mg, 0.23 mmol) in DCM (15 mL) was cooled to −70° C. under a nitrogen atmosphere. BBr3 solution (17% in DCM, 1.0 g, 0.68 mmol) was added dropwise. The mixture was stirred at −70° C. for 30 min. After stirring at room temperature overnight, the mixture was poured into aqueous NaHCO$_3$ solution (20 mL) and extracted with DCM (10 mL×3). The combined organic phases were washed with water (30 mL×2), brine (50 mL), dried over Na$_2$SO$_4$ and concentrated. The residue was purified by C18 chromatography using 30-80% CH$_3$CN aqueous solution as a developing solvent to obtain the compound of Formula 92 (75 mg) as a white solid.

$^{1}$H NMR (400 MHZ, DMSO-$d_6$): 0 10.22 (s, 1H), 8.73 (d, J=5.2 Hz, 1H), 8.10 (d, J=9.2 Hz, 1H), 8.00 (d, J=2.4 Hz, 1H), 7.58 (dd, J=8.8, 2.4 Hz, 1H), 7.48-7.44 (m, 1H), 7.15 (d, J=7.6 Hz, 1H), 7.10-7.09 (m, 2H), 7.03 (d, J=5.2 Hz, 1H), 3.78-3.72 (m, 4H), 3.63-3.60 (m, 2H), 3.22-3.14 (m, 4H), 2.97-2.91 (m, 1H), 2.35 (t, J=11.2 Hz, 1H), 2.20 (td, J=10.0, 2.4 Hz, 1H), 1.81-1.72 (m, 2H), 1.62-1.59 (m, 1H), 1.25-1.21 (m, 1H). LC-MS (ESI): Rt=3.814 min, m/z 515.1 [M+H]$^+$; purity: 99.21% @ 254 nm, 98.97% @ 214 nm.

[Formula 93]

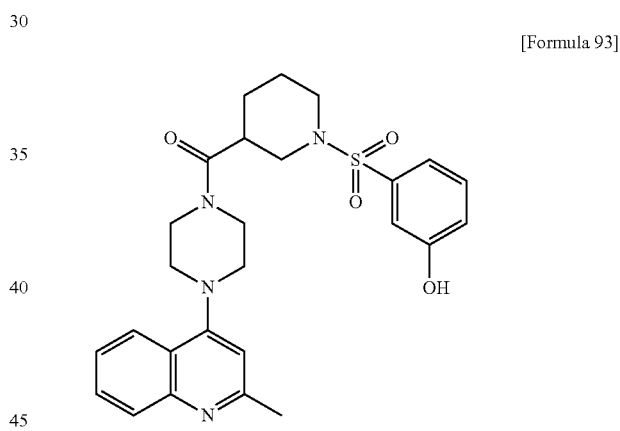

(1-(3-hydroxyphenylsulfonyl)piperidin-3-yl) (4-(2-methylquinolin-4-yl) piperazin-1-yl) methanone Except for using (1-(3-methoxyphenylsulfonyl)piperidin-3-yl) (4-(2-methylquinolin-4-yl) piperazin-1-yl) methanone instead of (4-(7-chloroquinolin-4-yl) piperazin-1-yl) (1-((3-methoxyphenyl) sulfonyl)piperidin-3-yl) methanone, Formula 93 (35 mg) was obtained as a white solid in the same manner as in the preparation of the compound of Formula 92.

$^{1}$H NMR (400 MHZ, DMSO-$d_6$): 0 10.12 (s, 1H), 8.02 (d, J=8.4 Hz, 1H), 7.86 (d, J=8.0 Hz, 1H), 7.66 (t, J=8.0 Hz, 1H), 7.51-7.44 (m, 2H), 7.15 (d, J=7.6 Hz, 1H), 7.10-7.08 (m, 2H), 6.92 (s, 1H), 3.78-3.60 (m, 6H), 3.19-3.13 (m, 4H), 2.96-2.90 (m, 1H), 2.58 (s, 3H), 2.36 (t, J=11.2 Hz, 1H), 2.20 (t, J=12.0 Hz, 1H), 1.82-1.72 (m, 2H), 1.62-1.59 (m, 1H), 1.29-1.20 (m, 1H). LC-MS (ESI): Rt=2.518 min, m/z 495.2 [M+H]$^+$; purity: 97.51% @ 254 nm, 98.12% @ 214 nm.

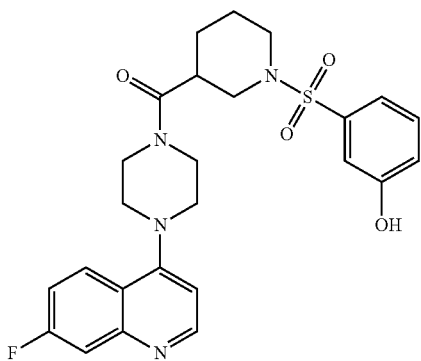

(4-(7-fluoroquinolin-4-yl) piperazin-1-yl) (1-(3-hydroxyphenylsulfonyl)piperidin-3-yl) methanone Except for using (4-(7-fluoroquinolin-4-yl) piperazin-1-yl) (1-(3-methoxyphenylsulfonyl)piperidin-3-yl) methanone instead of (4-(7-chloroquinolin-4-yl) piperazin-1-yl) (1-((3-methoxyphenyl) sulfonyl)piperidin-3-yl) methanone, Formula 94 (30 mg) was obtained as a white solid in the same manner as in the preparation of the compound of Formula 92.

Rt=2.321 min, m/z 499.2 [M+H]$^+$; purity: 98.20% @ 254 nm, 98.22% @ 214 nm.

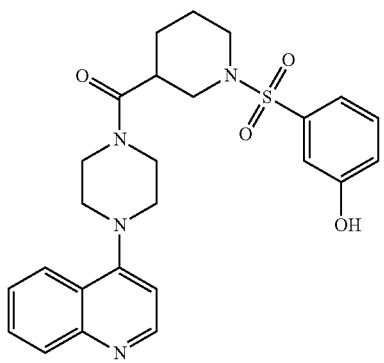

(1-(3-hydroxyphenylsulfonyl)piperidin-3-yl) (4-(quinolin-4-yl) piperazin-1-yl) methanone Except for using (1-(3-methoxyphenylphenylsulfonyl)piperidin-3-yl) (4-(quinolin-4-yl) piperazin-1-yl) methanone instead of (4-(7-chloroquinolin-4-yl) piperazin-1-yl) (1-((3-methoxyphenyl) sulfonyl)piperidin-3-yl) methanone, Formula 95 (25 mg) was obtained as a white solid in the same manner as in the preparation of the compound of Formula 92.

Rt=2.241 min, m/z 481.2 [M+H]$^+$; purity: 98.11% @ 254 nm, 98.18% @ 214 nm.

The target compound was synthesized according to Reaction Formula 1-3 for the following example compounds.

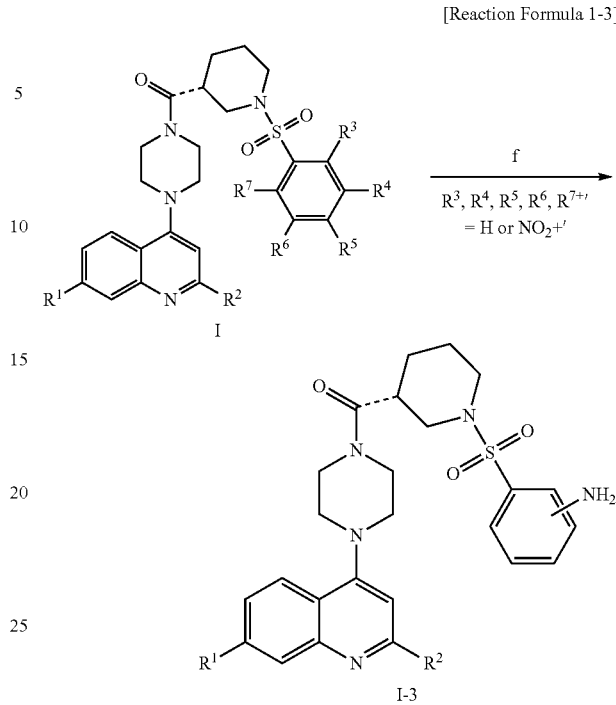

Reaction conditions, f) Pd/C, MeOH, rt, 3-5 hr.

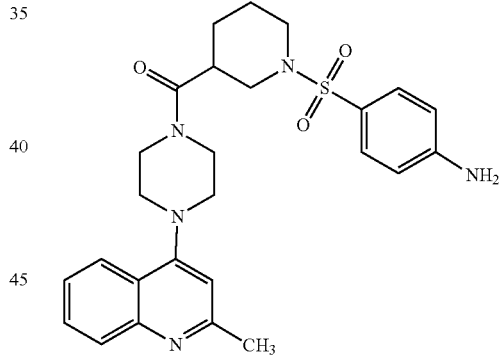

(1-(4-aminophenylsulfonyl)piperidin-3-yl) (4-(2-methylquinolin-4-yl) piperazin-1-yl) methanone According to Reaction Formula 1-3, (4-(2-methylquinolin-4-yl) piperazin-1-yl) (1-((4-nitrophenyl))piperidin-3-yl) methanone (0.48 g, 0.92 mmol, 1 eq) and Pd/C (30 mg, 0.28 mmol, 0.3 eq) is added. Then, the mixture was stirred under hydrogen for 5 hours. After that, it was filtered through Celite to remove Pd/C, and the filtrate was concentrated under reduced pressure. Then the residue was purified by C18 chromatography using 42 to 90% CH$_3$CN aqueous solution as an eluent as a developing solvent to obtain the compound of Formula 96 (0.32 g) as a white solid.

$^1$H NMR (400 MHZ, CDCl$_3$): δ 8.02-7.95 (m, 2H), 7.66 (t, J=7.2 Hz, 1H), 7.54 (d, J=8.4 Hz, 2H), 7.47 (t, J=7.6 Hz, 1H), 6.75 (s, 1H), 6.69 (d, J=8.8 Hz, 2H), 4.14 (s, 2H), 3.96-3.73 (m, 6H), 3.30-3.11 (m, 4H), 2.95-2.87 (m, 1H), 2.70 (s, 1H), 2.48 (t, J=11.2 Hz, 1H), 2.26-2.18 (m, 1H), 1.89-1.81 (m, 2H), 1.76-1.73 (m, 1H), 1.54-1.47 (m, 1H). LC-MS (ESI): Rt=3.502 min, m/z 494.2 [M+H]⁺; purity: 97.48% @ 254 nm, 96.45% @ 214 nm.

[Formula 97]

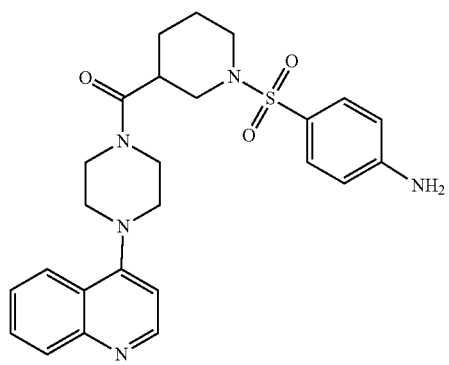

(1-(4-aminophenylsulfonyl)piperidin-3-yl) (4-(quinolin-4-yl) piperazin-1-yl) methanone Except for using (1-(4-nitrophenylsulfonyl)piperidin-3-yl) (4-(quinolin-4-yl) piperazin-1-yl) methanone instead of (4-(2-methylquinolin-4-yl) piperazin-1-yl) (1-((4-nitrophenyl))piperidin-3-yl) methanone, Formula 97 (100 mg) was obtained as a white solid in the same manner as in the preparation of the compound of Formula 94.

¹H NMR (400 MHZ, DMSO-$d_6$): δ 8.71 (d, J=4.8 Hz, 1H), 8.08 (d, J=8.4 Hz, 1H), 7.96 (d, J=8.4 Hz, 1H), 7.72 (t, J=7.6 Hz, 1H), 7.57 (t, J=7.6 Hz, 1H), 7.36 (d, J=8.4 Hz, 2H), 7.01 (d, J=5.2 Hz, 1H), 6.66 (d, J=8.4 Hz, 2H), 6.08 (s, 2H), 3.79-3.73 (m, 4H), 3.58-3.53 (m, 2H), 3.19-3.13 (m, 4H), 2.96-2.87 (m, 1H), 2.26 (t, J=11.2 Hz, 1H), 2.14-2.07 (m, 1H), 1.81-1.71 (m, 2H), 1.65-1.58 (m, 1H), 1.27-1.20 (m, 1H). LC-MS (ESI): Rt=3.923 min, m/z 480.1 [M+H]⁺; purity: 97.44% @ 254 nm, 98.04% @ 214 nm.

The target compound was synthesized according to Reaction Formula 1-4 for the following example compounds.

[Reaction Formula 1-4]

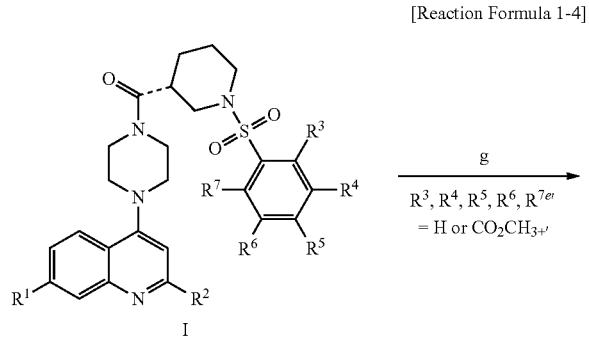

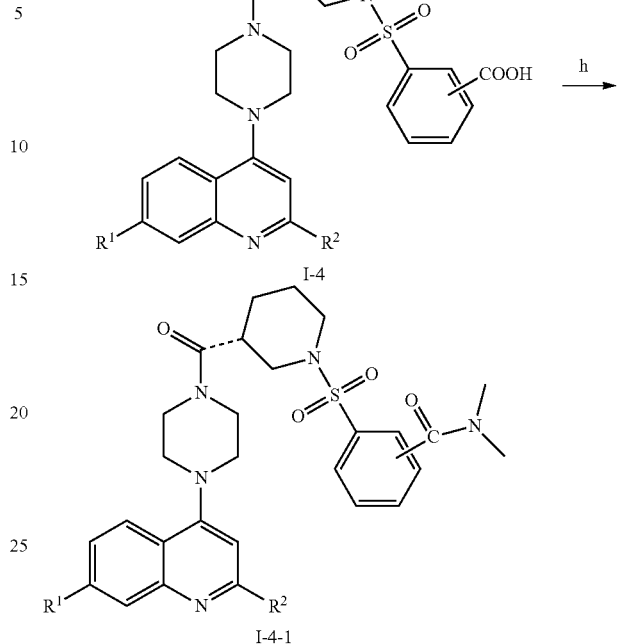

Reaction conditions, g) LiOH, MeOH, 70° C., 1-2 hr. h) Dimethylamine, DIEA, HATU, DMF, rt, 3-6 hr.

[Formula 98]

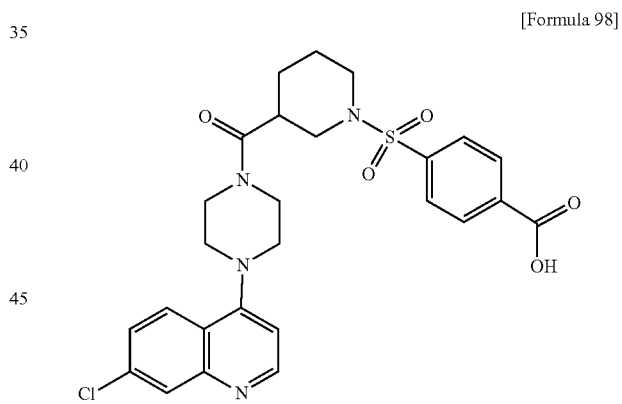

4-((3-(1-(7-chloroquinolin-4-yl) piperazine-1-carbonyl) piperidin-1-yl) sulfonyl)benzoic acid According to Reaction Formula 1-4, after dissolving methyl 4-((3-(4-(7-chloroquinolin-4-yl) piperazine-1-carbonyl)piperidin-1-yl) sulfonyl)benzoate (130 mg, 0.23 mmol) in MeOH (3 mL), LiOH·H₂O (12 mg, 0.28 mmol) was added. After stirring at 70° C. for 1 h, the mixture was concentrated. The residue was diluted with water (5 mL) and 5% aqueous HCl solution was added to pH=4-5. The mixture was extracted with DCM (10 mL×3). The combined organic phases were washed with brine (5 mL), dried over Na₂SO₄, filtered and concentrated to obtain a white solid. The obtained white solid was recrystallized using ethyl acetate (EtOAc) and n-hexane to obtain the compound of Formula 98 (95 mg) as a white solid.

¹H NMR (400 MHZ, DMSO-$d_6$): δ 8.73 (d, J=5.2 Hz, 1H), 8.18 (d, J=8.4 Hz, 2H), 8.11 (d, J=9.2 Hz, 1H), 8.01 (d,

J=2.0 Hz, 1H), 7.87 (d, J=8.8 Hz, 2H), 7.59 (dd, J=8.4, 1.6 Hz, 1H), 7.04 (d, J=4.8 Hz, 1H), 3.79-3.65 (m, 6H), 3.22-3.14 (m, 4H), 2.97-2.92 (m, 1H), 2.38 (t, J=11.2 Hz, 1H), 2.26 (t, J=10.0 Hz, 1H), 1.82-1.73 (m, 2H), 1.66-1.60 (m, 1H), 1.29-1.23 (m, 1H). LC-MS (ESI): Rt=1.32 min, m/z 543.3 [M+H]⁺; purity: 83% @ 254 nm, 92% @ 214 nm.

[Formula 99]

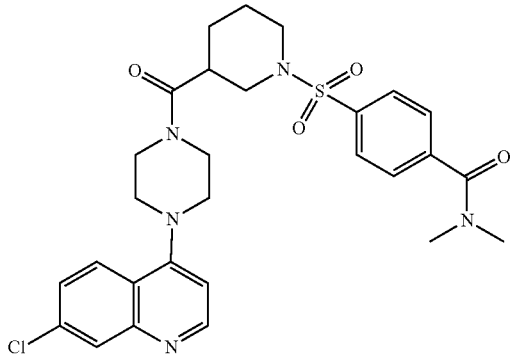

4-(3-(1-(7-chloroquinolin-4-yl) piperazine-4-carbonyl)piperidin-1-ylsulfonyl)-N,N-dimethylbenzamide After dissolving 4-((3-(4-(7-chloroquinolin-4-yl) piperazin-1-carbonyl)piperidin-1-yl) sulfonyl)benzoic acid (80 mg, 0.15 mmol), DIEA (95 mg, 0.74 mmol) and HATU (67 mg, 0.18 mmol) in DMF (5 mL), Dimethyl amine hydrochloride (24 mg, 0.29 mmol) was added. The mixture was stirred at room temperature for 5 hours. The mixture was diluted with water (20 mL) and extracted with DCM (10 mL×3). The combined organic phases were washed with brine (5 mL), dried over Na₂SO₄, filtered and concentrated. The residue was purified by C18 chromatography using 30-80% CH₃CN aqueous solution to obtain the compound of Formula 99 (60 mg) as a white solid.

¹H NMR (400 MHZ, DMSO-d₆): δ 8.73 (d, J=5.2 Hz, 1H), 8.10 (d, J=9.2 Hz, 1H), 8.00 (d, J=2.4 Hz, 1H), 7.80 (d, J=8.4 Hz, 2H), 7.67 (d, J=7.6 Hz, 2H), 7.58 (dd, J=8.8, 2.0 Hz, 1H), 7.03 (d, J=5.2 Hz, 1H), 3.79-3.65 (m, 6H), 3.22-3.14 (m, 4H), 3.01 (s, 3H), 2.95-2.92 (m, 1H), 2.89 (s, 3H), 2.40 (t, J=11.2 Hz, 1H), 2.28-2.23 (m, 1H), 1.82-1.73 (m, 2H), 1.64-1.61 (m, 1H), 1.28-1.26 (m, 1H). LC-MS (ESI): Rt=2.623 min, m/z 570.2 [M+H]⁺; purity: 99.23% @ 254 nm, 99.38% @ 214 nm.

[Formula 100]

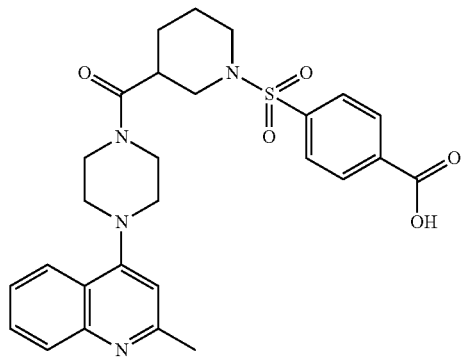

4-(3-(1-(2-methylquinolin-4-yl) piperazine-4-carbonyl)piperidin-1-ylsulfonyl)benzoic acid Except for using methyl 4-((3-(4-(2-methylquinolin-4-yl) piperazin-1-carbonyl)piperidin-1-yl) sulfonyl)benzoate (230 mg, 0.43 mmol) instead of 4-((3-(4-(7-chloroquinolin-4-yl) piperazine-1-carbonyl)piperidin-1-yl) sulfonyl)benzoate, Formula 100 (200 mg) was obtained as a white solid in the same manner as in the preparation of the compound of Formula 98.

¹H NMR (400 MHZ, DMSO-d₆): δ 8.18 (d, J=8.4 Hz, 2H), 8.01 (d, J=8.0 Hz, 1H), 7.88-7.85 (m, 3H), 7.66 (t, J=7.2 Hz, 2H), 7.49 (t, J=7.2 Hz, 2H), 6.91 (s, 1H), 3.78-3.65 (m, 6H), 3.19-3.11 (m, 4H), 2.99-2.93 (m, 1H), 2.58 (s, 3H), 2.39 (t, J=11.6 Hz, 1H), 2.26 (t, J=12.0 Hz, 1H), 1.82-1.73 (m, 2H), 1.66-1.57 (m, 1H), 1.29-1.20 (m, 1H). LC-MS (ESI): Rt=1.26 min, m/z 523.3 [M+H]⁺; purity: 100% @ 254 nm, 92% @ 214 nm.

[Formula 101]

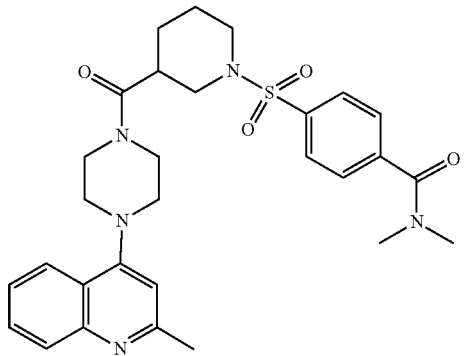

N,N-dimethyl-4-(3-(1-(2-methylquinolin-4-yl) piperazine-4-carbonyl)piperidin-1-ylsulfonyl)benzamide Except for using 4-(3-(1-(2-methylquinolin-4-yl) piperazin-4-carbonyl)piperidin-1-ylsulfonyl)benzoic acid (200 mg, 0.38 mmol) instead of 4-((3-(4-(7-chloroquinolin-4-yl) piperazin-1-carbonyl)piperidin-1-yl) sulfonyl)benzoic acid, Formula 101 (60 mg) was obtained as a white solid in the same manner as for the preparation of compound of Formula 99.

¹H NMR (400 MHZ, DMSO-d₆): δ 8.19 (d, J=8.0 Hz, 1H), 7.97-7.91 (m, 2H), 7.80 (d, J=8.0 Hz, 2H), 7.69-7.66 (m, 3H), 7.14 (s, 1H), 3.84-3.74 (m, 6H), 3.69-3.66 (m, 4H), 3.01 (s, 3H), 2.97-2.91 (m, 1H), 2.89 (s, 3H), 2.70 (s, 3H), 2.38 (t, J=11.2 Hz, 1H), 2.26 (td, J=12.6 Hz, 1H), 1.82-1.74 (m, 2H), 1.63-1.60 (m, 1H), 1.29-1.26 (m, 1H). LC-MS (ESI): Rt=3.606 min, m/z 550.2 [M+H]⁺; purity: 95.46% @ 254 nm, 96.24% @ 214 nm.

The target compound was synthesized according to Reaction Formula 1-5 for the following example compounds.

[Reaction Formula 1-5]

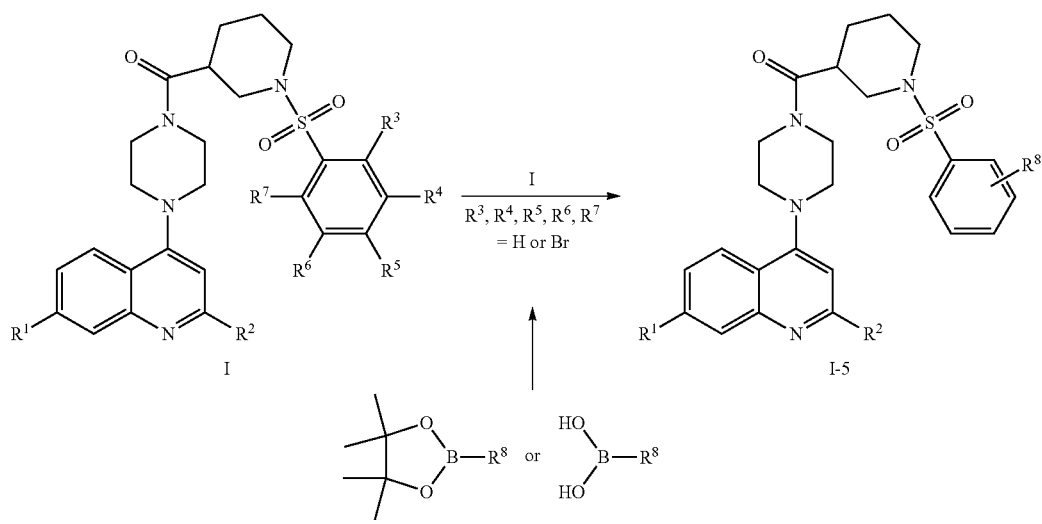

Reaction conditions, i)Pd(dppf)Cl₂, Na₂CO₃, 70 - 100° C., 4-12 hr.

[Formula 102]

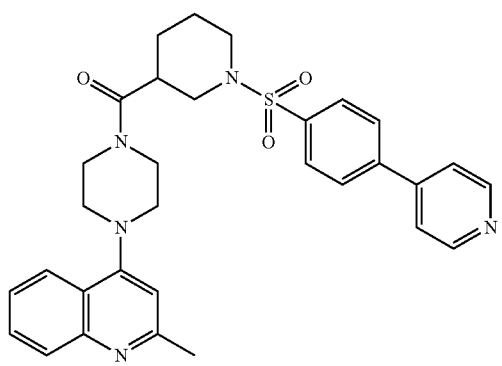

(4-(2-methylquinolin-4-yl) piperazin-1-yl) (1-((4-(pyridin-4-yl)phenyl) sulfonyl)piperidin-3-yl)methanone According to Scheme 1-5, under nitrogen atmosphere, after dissolving (1-((4-bromophenyl) sulfonyl)piperidin-3-yl) (4-(2-methylquinolin-4-yl) piperazin-1-yl) methanone (180 mg, 0.32 mmol) and 4-(4,4,5,5-tetramethyl-1,3,2-dioxaborolan-2-yl) pyridine (79 mg, 0.38 mmol) in 1,4-dioxane (3 mL) solvent, 1,1'-bis(diphenylphosphino) ferrocene]dichloropalladium (II) (23 mg, 0.032 mmol) and sodium carbonate (68 mg, 0.64 mmol) were added at room temperature. After stirring at 100° C. for 20 h, the mixture was concentrated. The residue was extracted with EtOAc (30 mL×3), then the organic layer was washed with water (30 mL×2) and brine (30 mL), dried over Na₂SO₄ and concentrated. The residue was first purified by silica gel chromatography using DCM: MeOH=40:1 to 20:1 as a developing solvent, final purification was performed by C18 chromatography using 20 to 90% CH&CN aqueous solution as a developing solvent to obtain the compound of Formula 102 (130 mg) as a white solid.

¹H NMR (400 MHZ, DMSO-d₆): δ 8.71 (d, J=4.2 Hz, 2H), 8.09 (d, J=8.0 Hz, 2H), 8.00 (d, J=8.0 Hz, 1H), 7.89-7.85 (m, 3H), 7.80 (d, J=5.6 Hz, 2H), 7.65 (t, J=7.2 Hz, 1H), 7.49 (t, J=7.6 Hz, 1H), 6.90 (s, 1H), 3.79-3.68 (m, 6H), 3.22-3.10 (m, 4H), 3.00-2.94 (m, 1H), 2.58 (s, 3H), 2.41 (t, J=11.6 Hz, 1H), 2.27 (t, J=12.8 Hz, 1H), 1.83-1.75 (m, 2H), 1.69-1.63 (m, 1H), 1.31-1.23 (m, 1H). LC-MS (ESI): Rt=3.722 min, m/z 556.2 [M+H]⁺; purity: 97.22% @ 254 nm, 92.02% @ 214 nm.

[Formula 103]

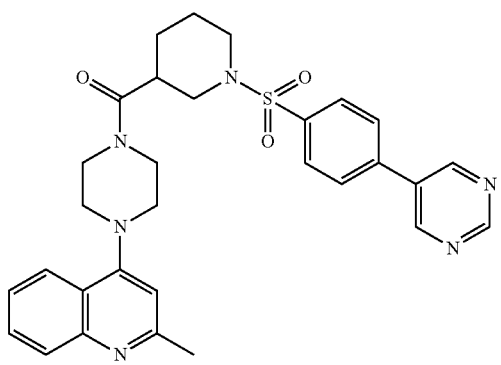

(4-(2-methylquinolin-4-yl) piperazin-1-yl) (1-((4-(pyrimidin-5-yl)phenyl) sulfonyl)piperidin-3-yl) methanone Except for using 5-(4,4,5,5-tetramethyl-dioxaborolan-2-yl)pyrimidine instead of 4-(4,4,5,5-tetramethyl-1,3,2-dioxaborolan-2-yl) pyridine, Formula 103 (120 mg) was obtained as a white solid by the same method as for the synthesis of Formula 102.

¹H NMR (400 MHZ, DMSO-d₆): 0 9.27-9.25 (m, 3H), 8.12 (d, J=8.0 Hz, 2H), 8.01 (d, J=8.4 Hz, 1H), 7.91-7.85 (m, 3H), 7.65 (t, J=8.0 Hz, 1H), 7.49 (t, J=7.6 Hz, 1H), 6.91 (s, 1H), 3.80-3.71 (m, 6H), 3.20-3.11 (m, 4H), 3.02-2.92 (m,

1H), 2.58 (s, 3H), 2.40 (t, J=12.0 Hz, 1H), 2.27 (t, J=9.6 Hz, 1H), 1.84-1.75 (m, 2H), 1.70-1.61 (m, 1H), 1.31-1.23 (m, 1H). LC-MS (ESI): Rt=3.575 min, m/z 557.2 [M+H]$^+$; purity: 99.68% @ 254 nm, 99.50% @ 214 nm.

[Formula 104]

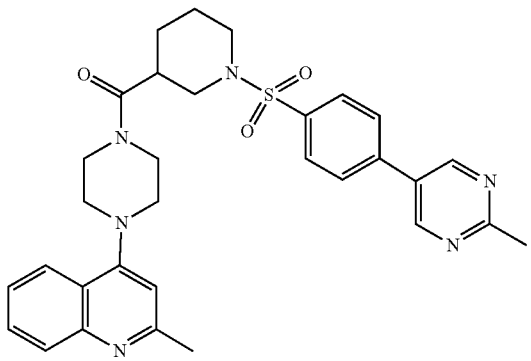

(1-((4-(2-methylpyrimidin-5-yl)phenyl) sulfonyl) piperidin-3-yl) (4-(2-methylquinolin-4-yl) piperazin-1-yl) methanone Except for using 2-methyl-5-(4,4,5,5-tetramethyl-1,3,2-dioxaborolan-2-yl) pyrimidine instead of 5-(4,4,5,5-tetramethyl-1,3,2-dioxaborolan-2-yl) pyridine, Formula 104 (50 mg) was obtained as a white solid in the same manner as for the preparation of compound of Formula 102.

$^1$H NMR (400 MHZ, DMSO-d$_6$): δ 9.12 (s, 2H), 8.08 (d, J=8.4 Hz, 2H), 8.01 (d, J=8.4 Hz, 1H), 7.89-7.85 (m, 3H), 7.65 (t, J=8.0 Hz, 1H), 7.49 (t, J=7.2 Hz, 1H), 6.90 (s, 1H), 3.79-3.67 (m, 6H), 3.21-3.11 (m, 4H), 3.00-2.94 (m, 1H), 2.69 (s, 3H), 2.58 (s, 3H), 2.39 (t, J=11.2 Hz, 1H), 2.26 (t, J=11.6 Hz, 1H), 1.83-1.74 (m, 2H), 1.68-1.63 (m, 1H), 1.29-1.23 (m, 1H). LC-MS (ESI): Rt=3.734 min, m/z 571.3 [M+H]$^+$; purity: 97.75% @ 254 nm, 95.87% @ 214 nm.

[Formula 105]

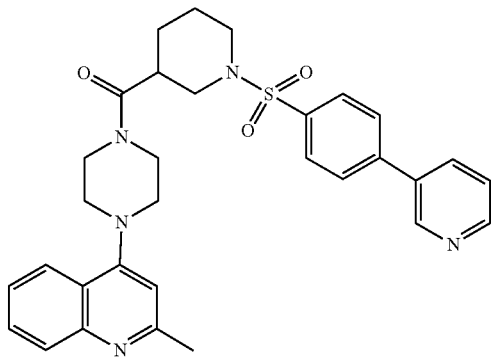

(4-(2-methylquinolin-4-yl) piperazin-1-yl) (1-((4-(pyridin-3-yl)phenyl) sulfonyl)piperidin-3-yl) methanone Except for using 3-(4,4,5,5-tetramethyl-1,3,2-dioxaborolan-2-yl) pyridine instead of 4-(4,4,5,5-tetramethyl-1,3,2-dioxaborolan-2-yl) pyridine, Formula 105 (40 mg) was obtained as a white solid in the same manner as for the preparation of compound of Formula 102.

$^1$H NMR (400 MHZ, DMSO-d$_6$): δ 9.00 (d, J=2.0 Hz, 1H), 8.65 (dd, J=4.8, 1.6 Hz, 1H), 8.20 (d, J=8.4 Hz, 1H), 8.05-8.00 (m, 3H), 7.88-7.86 (m, 3H), 7.65 (t, J=7.2 Hz, 1H), 7.56-7.54 (m, 1H), 7.51 (t, J=7.6 Hz, 1H), 6.90 (s, 1H), 3.80-3.68 (m, 6H), 3.18-3.10 (m, 4H), 3.01-2.95 (m, 1H), 2.58 (s, 3H), 2.40 (t, J=11.6 Hz, 1H), 2.27 (t, J=9.6 Hz, 1H), 1.83-1.75 (m, 2H), 1.69-1.63 (m, 1H), 1.31-1.23 (m, 1H). LC-MS (ESI): Rt=3.355 min, m/z 556.2 [M+H]$^+$; purity: 99.31% @ 254 nm, 98.73% @ 214 nm.

[Formula 106]

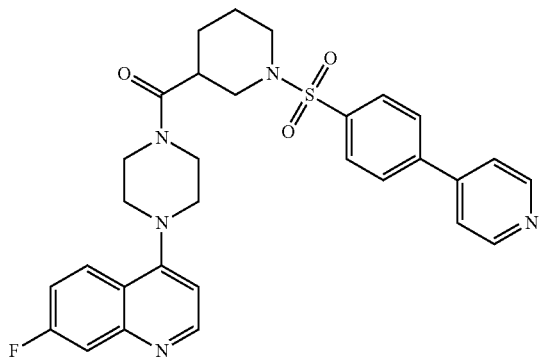

(4-(7-fluoroquinolin-4-yl) piperazin-1-yl) (1-(4-(pyridin-4-yl)phenylsulfonyl) piperidin-3-yl) methanone Except for using (1-(4-bromophenylsulfonyl)piperidin-3-yl) (4-7-fluoroquinolin-4-yl) piperazin-1-yl) methanone (200 mg, 0.36 mmol) instead of (1-((4-Bromophenyl) sulfonyl)piperidin-3-yl) (4-(2-methylquinolin-4-yl) piperazin-1-yl) methanone, Formula 106 (40 mg) was obtained as a white solid in the same manner as for the preparation of compound of Formula 102.

$^1$H NMR (400 MHZ, CDCl$_3$): δ 8.78-8.74 (m, 3H), 8.05-8.01 (m, 1H), 7.90-7.88 (m, 2H), 7.79-7.77 (m, 2H), 7.74-7.71 (m, 1H), 7.52 (d, J=6.0 Hz, 2H), 7.34-7.29 (m, 1H), 6.85 (d, J=5.2 Hz, 1H), 3.95-3.80 (m, 6H), 3.32-3.19 (m, 4H), 3.00-2.91 (m, 1H), 2.56 (t, J=11.2 Hz, 1H), 2.35-2.26 (m, 1H), 1.94-1.86 (m, 2H), 1.81-1.72 (m, 1H), 1.53-1.49 (m, 1H). LC-MS (ESI): Rt=3.592 min, m/z 560.3 [M+H]$^+$; purity: 96.47% @ 254 nm, 92.98% @ 214 nm.

[Formula 107]

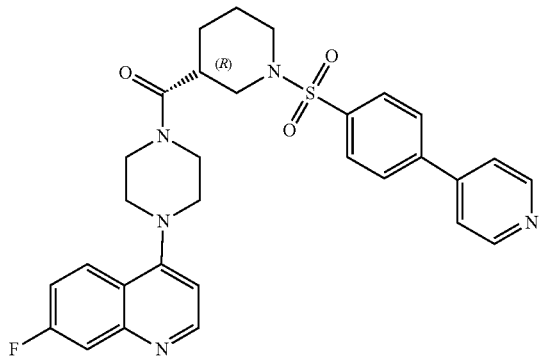

(R)-(4-(7-fluoroquinolin-4-yl) piperazin-1-yl) (1-(4-(pyridin-4-yl)phenylsulfonyl)piperidin-3-yl) methanone Except for using (R)-1-(4-bromophenylsulfonyl)piperidin-3-yl) (4-7-fluoroquinolin-4-yl) piperazin-1-yl) methanone instead of (1-(4-Bromophenylsulfonyl)piperidin-3-yl) (4-7-fluoroquinolin-4-yl) piperazin-1-yl) methanone, Formula 107 (50 mg) was obtained as a white solid in the same manner as for the preparation of compound of Formula 106.

$^1$H NMR (400 MHZ, CDCl$_3$): δ 8.78-8.74 (m, 3H), 8.05-8.01 (m, 1H), 7.90-7.88 (m, 2H), 7.79-7.77 (m, 2H), 7.74-7.71 (m, 1H), 7.53-7.52 (m, 2H), 7.34-7.29 (m, 1H), 6.85 (d, J=5.2 Hz, 1H), 3.95-3.82 (m, 6H), 3.32-3.20 (m, 4H), 2.99-2.92 (m, 1H), 2.58 (t, J=10.8 Hz, 1H), 2.34-2.28 (m, 1H), 1.93-1.86 (m, 2H), 1.79-1.75 (m, 1H), 1.55-1.49 (m, 1H). LC-MS (ESI): Rt=3.513 min, m/z 560, 0.2 [M+H]$^+$; purity: 98.02% @ 254 nm, 95.61% @ 214 nm.

chiral HPLC: Column: Chiralpak IB 5 μm 4.6×250 mm; Mobile Phase: Hex: EtOH=40:60 at 1 mL/min; Temp: 30° C.; Wavelength: 254 nm, Rt=12.689 min, 99.23% ee.

[Formula 108]

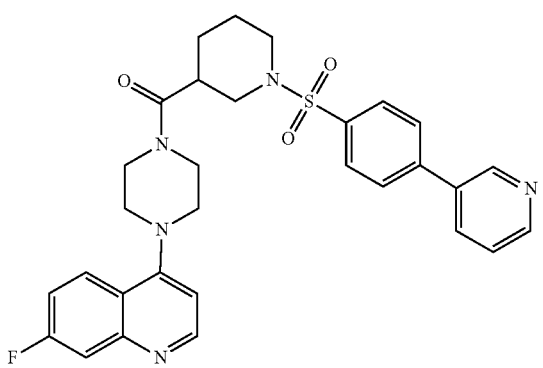

(4-(7-fluoroquinolin-4-yl) piperazin-1-yl) (1-(4-(pyridin-3-yl)phenylsulfonyl)piperidin-3-yl) methanone Except for using 3-(4,4,5,5-tetramethyl-1,3,2-dioxaborolan-2-yl) pyridine instead of (4-(4,4,5,5-tetramethyl-1,3,2-dioxaborolan-2-yl) pyridine, Formula 108 (30 mg) was obtained as a white solid in the same manner as in the preparation of the compound of Formula 106.

$^1$H NMR (400 MHz, CDCl$_3$): δ 8.89-8.88 (m, 1H), 8.77 (d, J=4.8 Hz, 1H), 8.69-8.68 (m, 1H), 8.05-8.01 (m, 1H), 7.93-7.87 (m, 3H), 7.75-7.71 (m, 3H), 7.46-7.42 (m, 1H), 7.34-7.29 (m, 1H), 6.85 (d, J=5.2 Hz, 1H), 3.95-3.80 (m, 6H), 3.33-3.21 (m, 4H), 2.98-2.93 (m, 1H), 2.58 (t, J=11.2 Hz, 1H), 2.35-2.29 (m, 1H), 1.94-1.86 (m, 2H), 1.78-1.75 (m, 1H), 1.56-1.49 (m, 1H). LC-MS (ESI): Rt=3.513 min, m/z 560, 0.2 [M+H]$^+$; purity: 98.31% @ 254 nm, 96.48% @ 214 nm.

[Formula 109]

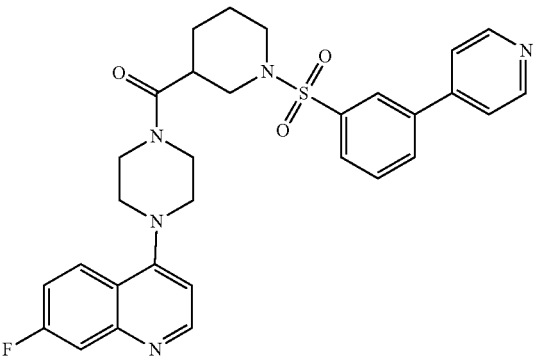

(4-(7-fluoroquinolin-4-yl) piperazin-1-yl) (1-(3-(pyridin-4-yl)phenylsulfonyl)piperidin-3-yl) methanone Except for using (1-(3-bromophenylsulfonyl)piperidin-3-yl) (4-7-fluoroquinolin-4-yl) piperazin-1-yl) methanone instead of (1-(4-Bromophenylsulfonyl)piperidin-3-yl) (4-7-fluoroquinolin-4-yl) piperazin-1-yl) methanone, Formula 109 (25 mg) was obtained as a white solid in the same manner as in the preparation of the compound of Formula 106.

$^1$H NMR (400 MHZ, CDCl$_3$): δ 8.77-8.72 (m, 3H), 8.04-8.01 (m, 2H), 7.88-7.83 (m, 2H), 7.75-7.67 (m, 2H), 7.54-7.53 (m, 2H), 7.34-7.30 (m, 1H), 6.84 (d, J=5.2 Hz, 1H), 3.95-3.83 (m, 6H), 3.30-3.21 (m, 4H), 2.99-2.91 (m, 1H), 2.59 (t, J=10.8 Hz, 1H), 2.36-2.29 (m, 1H), 1.94-1.85 (m, 2H), 1.79-1.74 (m, 1H), 1.52-1.48 (m, 1H). LC-MS (ESI): Rt=3.512 min, m/z 560.3 [M+H]$^+$; purity: 95.67% @ 254 nm, 96.72% @ 214 nm.

[Formula 110]

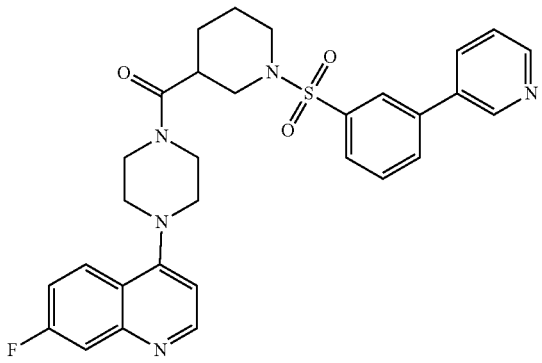

(4-(7-fluoroquinolin-4-yl) piperazin-1-yl) (1-(3-(pyridin-3-yl)phenylsulfonyl)piperidin-3-yl) methanone Except for using 3-(4,4,5,5-tetramethyl-1,3,2-dioxaborolan-2-yl) pyridine instead of (4-(4,4,5,5-tetramethyl-1,3,2-dioxaborolan-2-yl) pyridine, Formula 110 (20 mg) was obtained as a white solid in the same manner as in the preparation of the compound of Formula 109, $^1$H NMR (400 MHZ, CDCl$_3$): δ 8.88-8.87 (m, 1H), 8.77 (d, J=4.8 Hz, 1H), 8.68-8.66 (m, 1H), 8.04-8.00 (m, 1H), 7.97-7.94 (m, 1H), 7.93-7.90 (m, 1H), 7.84-7.79 (m, 2H), 7.73-7.65 (m, 2H), 7.44-7.41 (m, 1H), 7.34-7.29 (m, 1H), 6.84 (d, J=5.2 Hz, 1H), 3.94-3.83 (m, 6H), 3.29-3.19 (m, 4H), 2.98-2.91 (m, 1H), 2.59 (t, J=11.2 Hz, 1H), 2.37-2.31 (m, 1H), 1.93-1.85 (m, 2H), 1.81-1.74 (m, 1H), 1.54-1.50 (m, 1H). LC-MS (ESI): Rt=3.520 min, m/z 560.2 [M+H]$^+$; purity: 98.73% @ 254 nm, 98.60% @ 214 nm.

instead of (1-(4-Bromophenylsulfonyl)piperidin-3-yl) (4-7-fluoroquinolin-4-yl) piperazin-1-yl) methanone, Formula 112 (50 mg) was obtained as a white solid in the same manner as in the preparation of the compound of Formula 109.

LC-MS (ESI): Rt=3.783 min, m/z 561.2 [M+H]$^+$; purity: 95.88% @ 254 nm, 96.03% @ 214 nm.

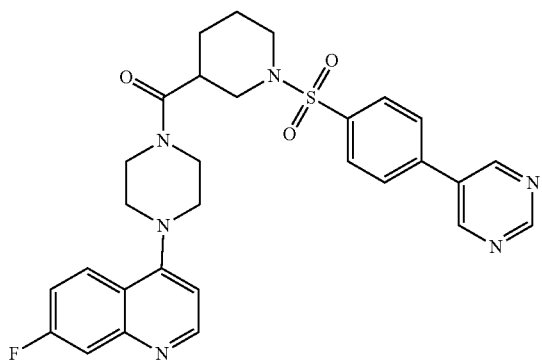

[Formula 111]

(4-(7-fluoroquinolin-4-yl) piperazin-1-yl) (1-(4-(pyrimidin-5-yl)phenylsulfonyl)piperidin-3-yl) methanone Except for using 5-(4,4,5,5-tetramethyl-1,3,2-dioxaborolan-2-yl)pyrimidine instead of 4-(4,4,5,5-tetramethyl-1,3,2-dioxaborolan-2-yl) pyridine, Formula 111 (77 mg) was obtained as a white solid in the same manner as in the preparation of the compound of Formula 105.

$^1$H NMR (400 MHZ, CDCl$_3$): δ 9.30 (s, 1H), 9.00 (s, 2H), 8.77 (d, J=4.8 Hz, 1H), 8.03 (dd, J=9.6, 6.0 Hz, 1H), 7.94-7.92 (d, J=8.4 Hz, 2H), 7.76-7.70 (m, 3H), 7.34-7.29 (m, 1H), 6.84 (d, J=5.2 Hz, 1H), 3.95-3.84 (m, 6H), 3.29-3.20 (m, 4H), 2.99-2.93 (m, 1H), 2.59 (t, J=11.2 Hz, 1H), 2.36-2.28 (m, 1H), 1.94-1.87 (m, 2H), 1.82-1.76 (m, 1H), 1.56-1.45 (m, 1H). LC-MS (ESI): Rt=3.790 min, m/z 561.2 [M+H]$^+$; purity: 96.04% @ 254 nm, 97.05% @ 214 nm.

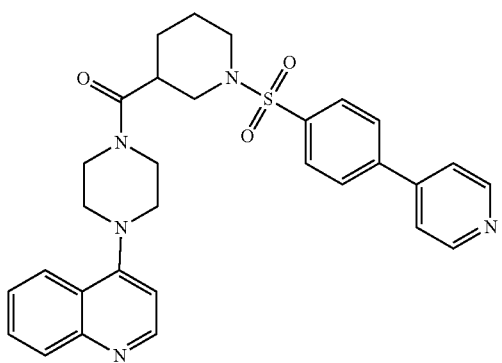

[Formula 113]

(1-(4-(pyridin-4-yl)phenylsulfonyl)piperidin-3-yl) (4-(quinolin-4-yl) piperazin-1-yl) methanone Except for using (1-(4-bromophenylphenylsulfonyl)piperidin-3-yl) (4-(quinolin-4-yl) piperazin-1-yl) methanone (250 mg, 0.46 mmol) instead of (1-((4-Bromophenyl) sulfonyl)piperidin-3-yl) (4-(2-methylquinolin-4-yl) piperazin-1-yl) methanone, Formula 113 (40 mg) was obtained as a white solid in the same manner as for the preparation of compound of Formula 102.

$^1$H NMR (400 MHZ, CDCl$_3$): δ 8.78-8.73 (m, 3H), 8.10 (d, J=8.4 Hz, 1H), 8.02 (d, J=8.4 Hz, 1H), 7.90-7.88 (m, 2H), 7.79-7.77 (m, 2H), 7.72-7.68 (m, 1H), 7.56-7.51 (m, 3H), 6.87 (d, J=4.8 Hz, 1H), 3.95-3.81 (m, 6H), 3.35-3.22 (m, 4H), 3.00-2.92 (m, 1H), 2.58 (t, J=11.2 Hz, 1H), 2.34-2.27 (m, 1H), 1.95-1.86 (m, 2H), 1.82-1.72 (m, 1H), 1.53-1.46 (m, 1H). LC-MS (ESI): Rt=3.900 min, m/z 542, 0.2 [M+H]$^+$; purity: 98.27% @ 254 nm, 97.25% @ 214 nm.

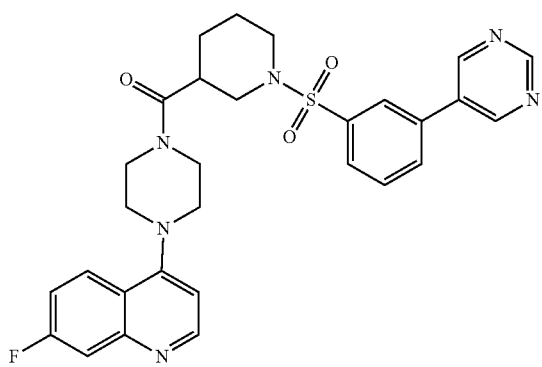

[Formula 112]

(4-(7-fluoroquinolin-4-yl) piperazin-1-yl) (1-(3-(pyrimidin-5-yl)phenylsulfonyl)piperidin-3-yl) methanone Except for using (1-(3-bromophenylsulfonyl)piperidin-3-yl) (4-7-fluoroquinolin-4-yl) piperazin-1-yl) methanone

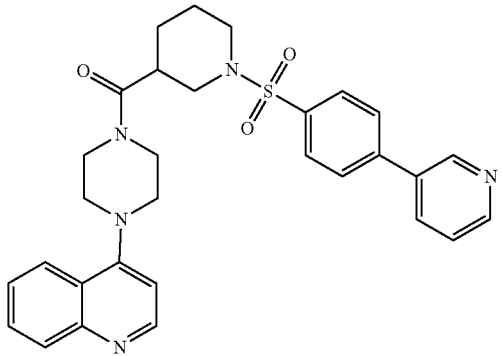

[Formula 114]

(1-(4-(pyridin-3-yl)phenylsulfonyl)piperidin-3-yl) (4-(quinolin-4-yl) piperazin-1-yl) methanone Except for using 3-(4,4,5,5-tetramethyl-1,3,2-dioxaborolan-2-yl) pyridine instead of (4-(4,4,5,5-tetramethyl-1,3,2- dioxaborolan-2-yl) pyridine, Formula 114 (30 mg) was obtained as a white solid in the same manner as in the preparation of the compound of Formula 113.

LC-MS (ESI): Rt=3.881 min, m/z 542, 0.2 [M+H]+; purity: 98.11% @ 254 nm, 98.05% @ 214 nm.

3.21 (m, 4H), 3.01-2.94 (m, 1H), 2.83 (s, 3H), 2.57 (t, J=11.6 Hz, 1H), 2.31-2.28 (m, 1H), 1.94-1.86 (m, 2H), 1.82-1.75 (m, 1H), 1.56-1.45 (m, 1H). LC-MS (ESI): Rt=5.967 min, m/z 557.3 [M+H]+; purity: 93.22% @ 254 nm, 94.98% @ 214 nm.

[Reaction Formula 2]

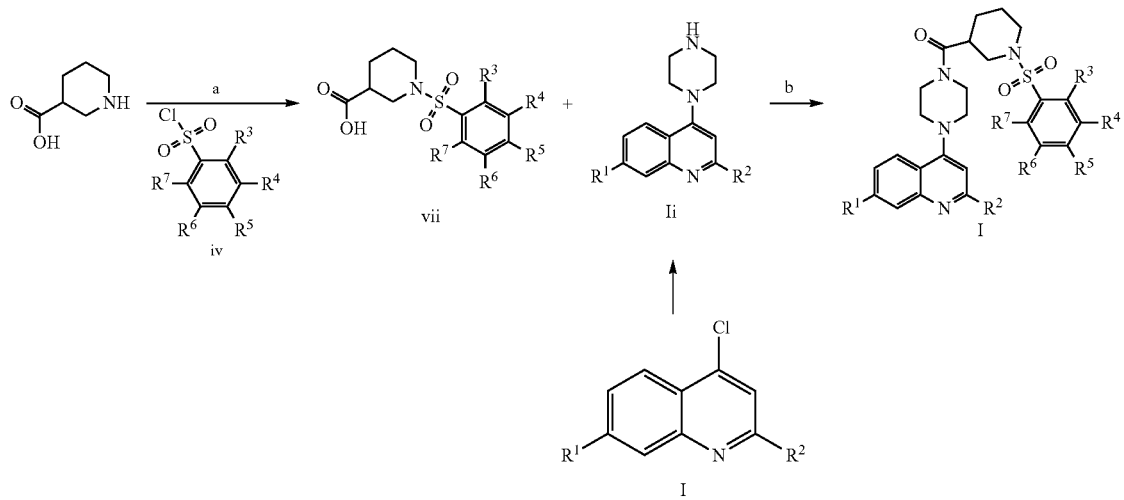

Reaction conditions, a) TEA or DIEA, DCM, rt, 2-12 hr. b) EDC, HOBT, DIEA, DMF, rt, 2-4 hr.

[Formula 115]

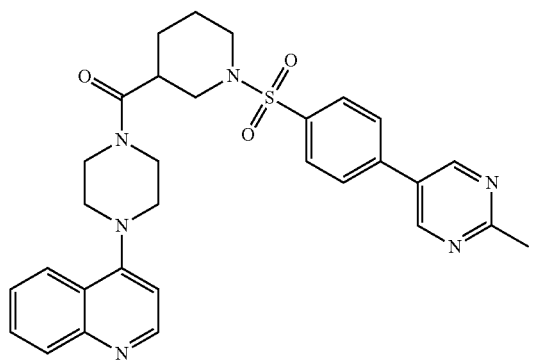

(1-(4-(2-methylpyrimidin-5-yl)phenylsulfonyl)piperidin-3-yl) (4-(quinolin-4-yl) piperazin-1-yl) methanone Except for using (1-(4-bromophenylphenylsulfonyl)piperidin-3-yl) (4-(quinolin-4-yl) piperazin-1-yl) methanone instead of (1-((4-Bromophenyl) sulfonyl)piperidin-3-yl) (4-(2-methylquinolin-4-yl) piperazin-1-yl) methanone, Formula 115 (32 mg) was obtained as a white solid in the same manner as for the preparation of compound of Formula 103.

1H NMR (400 MHZ, CDCl3): δ 8.89 (s, 2H), 8.78 (d, J=4.8 Hz, 1H), 8.10 (d, J=8.4 Hz, 1H), 8.02 (d, J=8.0 Hz, 1H), 7.91-7.89 (m, 2H), 7.74-7.68 (m, 3H), 7.54 (t, J=7.2 Hz, 1H), 6.87 (d, J=4.8 Hz, 1H), 3.95-3.80 (m, 6H), 3.33-

[Formula 116]

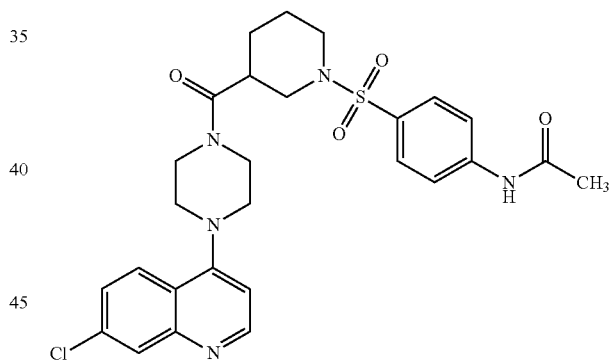

N-(4-(3-(4-(7-chloroquinolin-4-yl) piperazine-1-carbonyl)piperidin-1-ylsulfonyl)phenyl) acetamide According to Reaction Formula 2, 1-((4-acetamidophenyl) sulfonyl)piperidine-3-carboxylic acid (2.0 g, 6.13 mmol) and DIPEA (24.51 mmol) were added to 50 ml of dichloromethane, and stirred at 0° C. for 15 minutes. Thereafter, 1-ethyl-3-(3-dimethylaminopropyl) carbodiimide (EDC) (2.38 g, 15.32 mmol) and hydroxybenzotriazole (HOBT) (2.07 g, 15.32 mmol) were added at 0° C. After 30 minutes, 7-chloro-4-(piperazin-1-yl)quinoline (1.52 g, 6.13 mmol) was added and stirred at room temperature for 12 hours. Into 100 ml of water, dichloromethane (60 ml×3) was added to separate the organic material layer, then dried over Na2SO4, filtered and concentrated under reduced pressure. Purification was performed by column chromatography using methanol (5-10%) and dichloromethane as developing solvents to obtain the target compound, Formula 116 (1.9 g) as a white solid.

$^1$H NMR (400 MHZ, CDCl$_3$): δ 8.74 (d, J=4.8 Hz, 1H), 8.10 (d, J=2.0 Hz, 1H), 7.95 (d, J=8.8 Hz, 1H), 7.70-7.68 (m, 5H), 7.43 (dd, J=9.2, 2.0 Hz, 1H), 6.86 (d, J=4.2 Hz, 1H), 3.87-3.82 (m, 6H), 3.31-3.20 (m, 4H), 2.93-2.87 (m, 1H), 2.50 (t, J=11.6 Hz, 1H), 2.28-2.25 (m, 1H), 2.22 (s, 3H), 1.90-1.82 (m, 2H), 1.78-1.72 (m, 1H), 1.52-1.42 (m, 1H). LC-MS (ESI): Rt=3.967 min, m/z 556.2 [M+H]$^+$; purity: 98.64% @ 254 nm, 98.20% @ 214 nm.

[Formula 117]

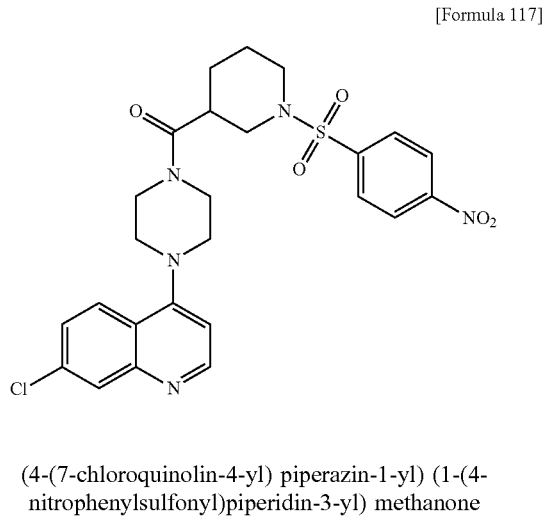

(4-(7-chloroquinolin-4-yl) piperazin-1-yl) (1-(4-nitrophenylsulfonyl)piperidin-3-yl) methanone Except for using 1-((4-nitrophenyl) sulfonyl)piperidine-3-carboxylic acid instead of 1-((4-acetamidophenyl) sulfonyl)piperidine-3-carboxylic acid and, the compound of Formula 117 (120 mg) was obtained as a pale yellow solid in the same manner as in the preparation of the compound of Formula 116.

$^1$H NMR (400 MHZ, DMSO_d$_6$): δ 8.73 (d, J=4.2 Hz, 1H), 8.46 (d, J=8.0 Hz, 2H), 8.10 (d, J=8.8 Hz, 1H), 8.03 (d, J=8.8 Hz, 2H), 8.02-8.00 (m, 1H), 7.58 (dd, J=9.2, 2.4 Hz, 1H), 7.03 (d, J=4.8 Hz, 1H), 3.79-3.68 (m, 6H), 3.25-3.11 (m, 4H), 3.00-2.92 (m, 1H), 2.45-2.42 (m, 1H), 2.33 (t, J=11.6 Hz, 1H), 1.83-1.74 (m, 2H), 1.68-1.57 (m, 1H), 1.29-1.20 (m, 1H). LC-MS (ESI): Rt=3.760 min, m/z 544.2 [M+H]$^+$; purity: 97.70% @ 254 nm, 96.90% @ 214 nm.

Example 3: Selection of Compounds Exhibiting CYP4A Inhibitory Activity

The present inventors selected CYP4A inhibitors through screening of commercially available compounds and novel synthetic compounds, based on the content of the prior invention that compounds exhibiting CYP4A inhibitory activity can exhibit preventive or therapeutic effects on diabetes and fatty liver. A commercially available reagent was used for the reagent used in the experiment, and it was manufactured and used if necessary. The device used for activity measurement was EnVision of PerkinElmer or SpectraMax of MOLECULAR DEVICES.

First, CYP4A bactosome and synthetic compound (5 µM) were mixed in assay buffer (100 mM KPO4, 0.1% BSA, 1 mM DTT) in a 384-well plate (white opaque ploystyrene nontreated flat-bottom well), and then reacted at room temperature for 15 minutes. After adding 5 mM Luciferin-ME and NADPH Regeneration system (10× sol.A, 20× sol.B in assay buffer, Cat. Number: V865B, Promega), leave it at room temperature for 30 minutes to allow the CYP4A reaction to occur sufficiently, by adding the Luciferin Detection reagent, the CYP4A reaction was finished, luminescence reaction was induced, and the reaction was carried out at room temperature for 15 minutes. The degree of inhibition of CYP4A activity was measured by comparing the luminescence values from each well with a microplate reader.

The results are shown in Table 1 below.

TABLE 1

Inhibition of CYP4A of Quinoline Compounds
CYP4A enzyme assay (compound concentration 5 µM)
% Inhibition

| Compound no. | 25% or less | 25%-50% | 50%-75% | 75% or more |
| --- | --- | --- | --- | --- |
| Formula 1 | | | ○ | |
| Formula 2 | | | ○ | |
| Formula 3 | | | ○ | |
| Formula 4 | | | | ○ |
| Formula 5 | | | | ○ |
| Formula 6 | | | | ○ |
| Formula 7 | | | | ○ |
| Formula 8 | | | ○ | |
| Formula 9 | | | ○ | |
| Formula 10 | | | | ○ |
| Formula 11 | | | | ○ |
| Formula 12 | | | ○ | |
| Formula 13 | | | ○ | |
| Formula 14 | | | | ○ |
| Formula 15 | | | | ○ |
| Formula 16 | | | | ○ |
| Formula 17 | | | ○ | |
| Formula 18 | | | | ○ |
| Formula 19 | ○ | | | |
| Formula 20 | ○ | | | |
| Formula 21 | ○ | | | |
| Formula 22 | ○ | | | |
| Formula 23 | ○ | | | |
| Formula 24 | | | ○ | |
| Formula 25 | | | ○ | |
| Formula 26 | | | ○ | |
| Formula 27 | | | ○ | |
| Formula 28 | | | | ○ |
| Formula 29 | | | ○ | |
| Formula 30 | | ○ | | |
| Formula 31 | | | | ○ |
| Formula 32 | | | | ○ |
| Formula 33 | | ○ | | |
| Formula 34 | | ○ | | |
| Formula 35 | | | ○ | |
| Formula 36 | | | ○ | |
| Formula 37 | | | ○ | |
| Formula 38 | | | | ○ |
| Formula 39 | | | ○ | |
| Formula 40 | | ○ | | |
| Formula 41 | | | ○ | |
| Formula 42 | | | | ○ |
| Formula 43 | | | | ○ |
| Formula 44 | | | | ○ |
| Formula 45 | | | | ○ |
| Formula 46 | | | | ○ |
| Formula 47 | | | | ○ |
| Formula 48 | | | | ○ |
| Formula 49 | | | | ○ |
| Formula 50 | | | | ○ |
| Formula 51 | | | | ○ |
| Formula 52 | | | | ○ |
| Formula 53 | | | | ○ |
| Formula 54 | | | | ○ |
| Formula 55 | | | | ○ |
| Formula 56 | | | | ○ |
| Formula 57 | | | | 0 |
| Formula 58 | | | | ○ |
| Formula 59 | | | | ○ |
| Formula 60 | | | | ○ |
| Formula 61 | | | | ○ |
| Formula 62 | | | | ○ |
| Formula 63 | | | ○ | |
| Formula 64 | ○ | | | |

TABLE 1-continued

Inhibition of CYP4A of Quinoline Compounds
CYP4A enzyme assay (compound concentration 5 μM)
% Inhibition

| Compound no. | 25% or less | 25%-50% | 50%-75% | 75% or more |
|---|---|---|---|---|
| Formula 65 | | ○ | | |
| Formula 66 | | ○ | | |
| Formula 67 | | | ○ | |
| Formula 68 | | ○ | | |
| Formula 69 | | ○ | | |
| Formula 70 | | ○ | | |
| Formula 71 | | ○ | | |
| Formula 72 | | ○ | | |
| Formula 73 | | ○ | | |
| Formula 74 | | | ○ | |
| Formula 75 | | | | ○ |
| Formula 76 | | | | ○ |
| Formula 77 | | | | ○ |
| Formula 78 | | | | ○ |
| Formula 79 | | | | ○ |
| Formula 80 | | | | ○ |
| Formula 81 | | | | ○ |
| Formula 82 | | | | ○ |
| Formula 83 | | | | ○ |
| Formula 84 | | | | ○ |
| Formula 85 | | | ○ | |
| Formula 86 | | | | ○ |
| Formula 87 | | | ○ | |
| Formula 88 | | ○ | | |
| Formula 89 | | | | ○ |
| Formula 90 | | | | ○ |
| Formula 91 | | | | ○ |
| Formula 92 | | | | ○ |
| Formula 93 | | | | ○ |
| Formula 94 | | | | ○ |
| Formula 95 | | | | ○ |
| Formula 96 | | ○ | | |
| Formula 97 | | | ○ | |
| Formula 98 | | ○ | | |
| Formula 99 | | | ○ | |
| Formula 100 | ○ | | | |
| Formula 101 | ○ | | | |
| Formula 102 | | | | ○ |
| Formula 103 | | | ○ | |
| Formula 104 | | | | ○ |
| Formula 105 | | | | ○ |
| Formula 106 | | | | ○ |
| Formula 107 | | | | ○ |
| Formula 108 | | | | ○ |
| Formula 109 | | | | ○ |
| Formula 110 | | | | ○ |
| Formula 111 | | | | ○ |
| Formula 112 | | | | ○ |
| Formula 113 | | | | ○ |
| Formula 114 | | | | ○ |
| Formula 115 | | | | ○ |
| Formula 116 | | | | ○ |
| Formula 117 | | | | ○ |
| HET-0016 | | | | ○ |

As a result, as shown in Table 1, it was confirmed that most of the compounds having the structure of Formula (I) provided in the present invention had the inhibitory ability of CYP4A.

Example 4: Confirmation of the Effect of the Compound of the Present Invention on the Induction of ER Stress in Hepatocytes

4-1. Glucose Absorption Promoting Effect

HepG2 cells, a human liver cell line, were cultured in a high-glucose DMEM (Dulbecco's modified Eagle's medium) medium in the presence of 10% fetal bovine serum (FBS), and then glucose uptake experiments were performed as follows.

First, put HepG2 cells in a 96-well plate (black, clear bottom culture plate) at 2 ×10⁴ cells/well and incubate in an incubator for 24 hours. Thapsigargin (1 μM, hereinafter Thap), which induces endoplasmic reticulum stress, and compounds exhibiting excellent CYP4A inhibitory activity among the compounds synthesized in the above Examples were selected, each compound was added (5 μM), and the reaction was put in an incubator for 24 hours.

After that, the experiment is performed using a glucose uptake assay kit (Cat. Number: 600470, Cayman). Dilute 2-NBDG (2-(N-(7-Nitrobenz-2-oxa-1,3-diazol-4-yl) Amino)-2-Deoxyglucose) in a glucose-free culture medium and incubate at 37° C. 1 minute. After washing the wells twice using a phosphate buffered saline (PBS) buffer, fluorescence (Excitation: 485 nm, Emission: 535 nm) was measured with a microplate reader.

As a result, as can be seen in FIG. 1, in the control group treated only with thapsigargin without treatment with the test substance, glucose uptake was decreased compared to the negative control group, but when thapsigargin and the compound of the present invention were treated, glucose absorption was improved to the level of the negative control group, and this effect was confirmed to be equal to or greater than that of HET0016.

4-2. Fat Accumulation Improvement Effect

After culturing HepG2 cells, a human liver cell line, in a high glucose DMEM (Dulbecco's modified Eagle's medium, glucose 25 mM) medium containing 10% fetal bovine serum (FBS), an experiment was conducted to measure fat accumulation in the following way.

First, HepG2 cells were grown to 5×10³ cells/well in a 96-well plate (black, clear bottom culture plate) by the above method, and compounds showing excellent CYP4A inhibitory activity among the compounds synthesized in the above Examples were selected and each compound (5 UM) was added and incubated for 6 hours. Here, after putting thapsigargin inducing endoplasmic reticulum stress, the reaction was put into an incubator at 37° C. for 24 hours. After that, 4% paraformaldehyde was added and reacted at room temperature for 15 minutes to fix, and then Nile-Red solution was added, light was blocked, and reaction was performed at 37° C. for 10 minutes. After the reaction time, fluorescence was measured with a microplate reader (Excitation: 530 nm, Emission: 635 nm).

Figure 2:
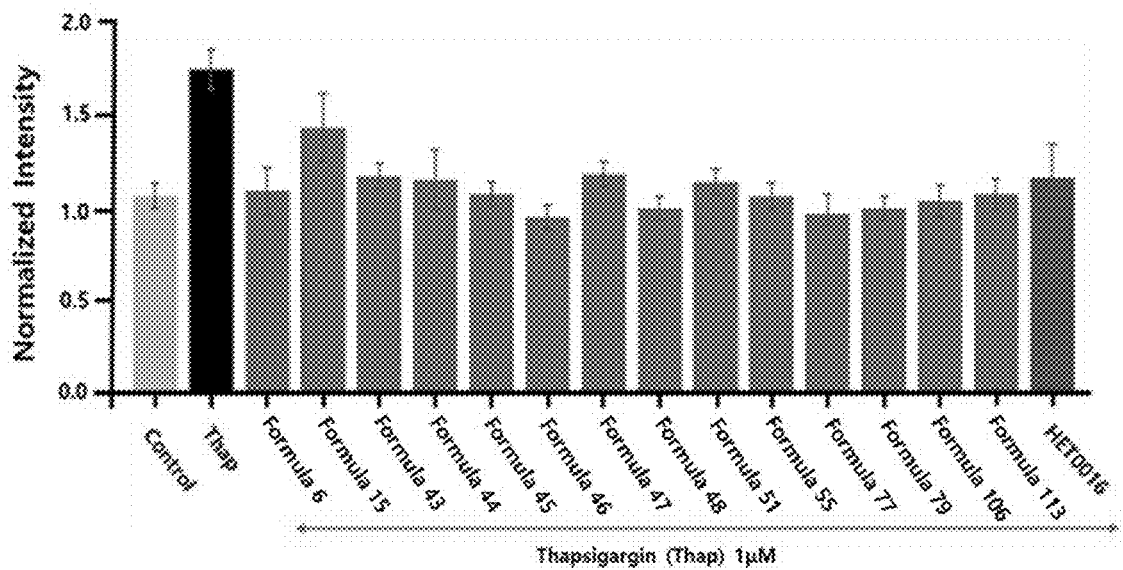
FIG. 2 shows the results of the compound of the present invention inhibiting the accumulation of fat in the liver cells treated with thapsigargin to induce endoplasmic reticulum stress.

As a result, as can be seen in FIG. 2, it was confirmed that a large amount of fat was accumulated in the control cells treated with thapsigargin without the test substance treatment as compared to the negative control group. In contrast, in the test group treated with the effective compound of the present invention, it was found that the accumulation of fat in the liver cells was reduced to HET0016 or more.

4-3. Active Oxygen Scavenging Ability

After culturing HepG2 cells, a human liver cell line, in high glucose concentration DMEM (Dulbecco's modified Eagle's medium, glucose 25 mM) medium with of 10% FBS (fetal bovine serum), an experiment was conducted to measure the ability to remove active oxygen in the following way.

First, HepG2 cells were grown to 1×10⁴ cells/well in a 96-well plate (black, clear bottom culture plate) by the above method, and compounds showing excellent CYP4A inhibitory activity among the compounds synthesized in the above Examples were selected and each compound (5 μM) was added and incubated for 6 hours. Here, thapsigargin inducing endoplasmic reticulum stress was added, and then put into an incubator at 37° C. for 24 hours to react, and then 5 M H₂DCFDA (cell-permeant 2',7'-dichlorodihydrofluorescein diacetate) was added to react for 30 minutes in an incubator at 37° C. Thereafter, after washing with PBS, it was placed in an incubator at 37° C. for 30 minutes and waited for luminescence to occur. Thereafter, fluorescence was measured with a microplate reader (Excitation: 488 nm, Emission: 508 nm).

Figure 3:
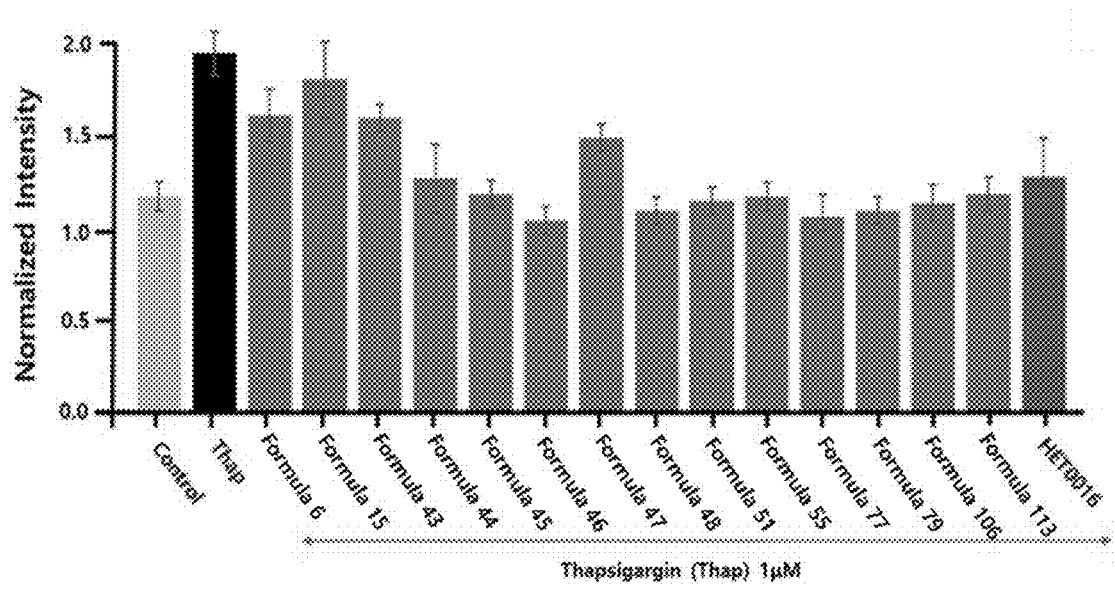
FIG. 3 shows the results of removal of active oxygen from the compound of the present invention in liver cells subjected to endoplasmic reticulum stress by treatment with thapsigargin.

As a result, as can be seen in FIG. 3, it was confirmed that the amount of ROS was rapidly increased in the control group treated only with thapsigargin compared to the negative control group. In contrast, the group treated with the effective compound of the present invention confirmed that the amount of ROS was significantly lowered, and it was confirmed that the occurrence of ROS was reduced to a level similar to that of the negative control group.

Through the results of FIGS. 1, 2 and 3, it was confirmed that the compound of the present invention has the effect of treating/improving diabetes, such as lowering blood sugar by promoting glucose absorption in hepatocytes in the presence of endoplasmic reticulum stress, and it can have an effect on fatty liver disease, such as improving lipid accumulation or oxidative stress in liver cells.

INDUSTRIAL APPLICABILITY

The novel quinoline compound disclosed in the present invention has a remarkable CYP4A inhibitory effect, and it exhibits activities such as promoting glucose absorption into hepatocytes, inhibiting fat accumulation in hepatocytes, inhibiting reactive oxygen species caused by ER stress and treating steatohepatitis, and it can be very usefully used in the development of therapeutics for metabolic diseases such as diabetes, steatohepatitis, and obesity, so it has excellent industrial applicability.

What is claimed is:

1. A quinoline compound represented by the following Formula (I), or a racemate, a diastereomer, a geometric isomer, a stereoisomer, a hydrate or a salt thereof:

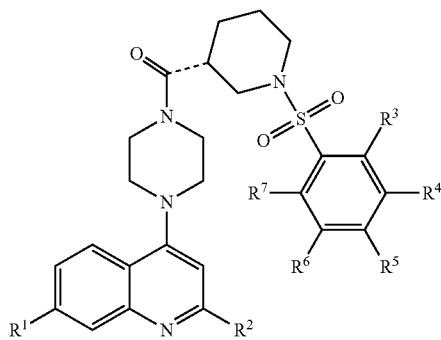

<Formula I> wherein $R^1$ and $R^2$ are each independently selected from the group consisting of hydrogen, halo, $C_1$-$C_6$ haloalkane, hydroxy, carboxyl, substituted or unsubstituted amino, substituted or unsubstituted $C_1$-$C_6$ amide, cyano, nitro, substituted or unsubstituted $C_1$-$C_{10}$ alkyl, substituted or unsubstituted $C_2$-$C_{10}$ alkenyl, substituted or unsubstituted $C_2$-$C_{10}$ alkynyl and substituted or unsubstituted $C_1$-$C_{10}$ alkoxy; and wherein $R^3$, $R^4$, $R^5$, $R^6$ and $R^7$ are each independently selected from the group consisting of hydrogen, halo, $C_1$-$C_6$ haloalkane, hydroxy, carboxyl, carbonyl, $C_1$-$C_6$ alkylcarbonyl, $C_1$-$C_6$ alkoxycarbonyl, dimethylaminocarbonyl, substituted or unsubstituted amino, substituted or unsubstituted $C_1$-$C_6$ amide, sulfonyl, cyano, nitro, substituted or unsubstituted $C_1$-$C_6$ alkyl, substituted or unsubstituted $C_2$-$C_6$ alkenyl, substituted or unsubstituted $C_2$-$C_6$ alkynyl, substituted or unsubstituted $C_1$-$C_6$ alkoxy, substituted or unsubstituted phenoxy, substituted or unsubstituted phenyl, and substituted or unsubstituted $C_3$-$C_{10}$ heteroaryl.

2. The quinoline compound, or a racemate, a diastereomer, a geometric isomer, a stereoisomer, a hydrate or a salt thereof according to claim 1, wherein $R^1$ and $R^2$ are each independently selected from the group consisting of hydrogen, halo, substituted or unsubstituted linear or branched $C_1$-$C_6$ alkyl, $C_1$-$C_6$ haloalkane, and substituted or unsubstituted linear or branched $C_1$-$C_6$ alkoxy.

3. The quinoline compound, or a racemate, a diastereomer, a geometric isomer, a stereoisomer, a hydrate or a salt thereof according to claim 1, wherein $R^1$ and $R^2$ are each independently selected from the group consisting of hydrogen, halo, trifluoromethyl, unsubstituted linear $C_1$-$C_6$ alkyl and unsubstituted linear $C_1$-$C_6$ alkoxy.

4. The quinoline compound, or a racemate, a diastereomer, a geometric isomer, a stereoisomer, a hydrate or a salt thereof according to claim 1, wherein $R^3$, $R^4$, $R^5$, $R^6$ and $R^7$ are each independently selected from the group consisting of hydrogen, halo, trifluoromethyl, hydroxy, carboxyl, $C_1$-$C_6$ alkylcarbonyl, $C_1$-$C_6$ alkoxycarbonyl, dimethylaminocarbonyl, unsubstituted amino, dimethylamino, diethylamino, methylcarbonylamino, sulfonyl, cyano, nitro, unsubstituted linear $C_1$-$C_6$ alkyl, unsubstituted linear $C_1$-$C_6$ alkoxy, substituted or unsubstituted phenoxy, substituted or unsubstituted phenyl, substituted or unsubstituted pyridine, and substituted or unsubstituted pyrimidine.

5. The quinoline compound, or a racemate, a diastereomer, a geometric isomer, a stereoisomer, a hydrate or a salt thereof according to claim 1, wherein the compound is selected from the group consisting of (4-(7-chloroquinolin-4-yl) piperazin-1-yl) (1-(phenylsulfonyl)piperidin-3-yl) methanone, (4-(7-chloroquinolin-4-yl) piperazin-1-yl) (1-tosylpiperidin-3-yl) methanone, (4-(7-chloroquinolin-4-yl) piperazin-1-yl) (1-((4-fluorophenyl) sulfonyl)piperidin-3-yl) methanone, (4-(7-chloroquinolin-4-yl) piperazin-1-yl) (1-((4-(dimethylamino)phenyl) sulfonyl)piperidin-3-yl) methanone, (4-(7-chloroquinolin-4-yl) piperazin-1-yl) (1-((4-hydroxyphenyl) sulfonyl)piperidin-3-yl) methanone, (4-(7-chloroquinolin-4-yl) piperazin-1-yl) (1-((3-nitrophenyl) sulfonyl)piperidin-3-yl) methanone, (4-(7-chloroquinolin-4-yl) piperazin-1-yl) (1-((4-(trifluoromethyl)phenyl) sulfonyl)piperidin-3-yl) methanone, (4-(7-chloroquinolin-4-yl) piperazin-1-yl) (1-((3-fluorophenyl) sulfonyl)piperidin-3-yl) methanone, (4-(7-chloroquinolin-4-yl) piperazin-1-yl) (1-((4-phenoxyphenyl) sulfonyl)piperidin-3-yl) methanone, 4-(3-(1-7-chloroquinolin-4-yl) piperazine-4-carbonyl)piperidin-1-ylsulfonyl)benzonitrile, (4-(7-chloroquinolin-4-yl) piperazin-1-yl) (1-(4-methylsulfonyl)phenylsulfonyl)piperidin-3-yl) methanone, Methyl 4-(3-(1-(7-chloroquinolin-4-yl) piperazine-1-carbonyl)piperidin-1-yl) sulfonyl)benzoate, (4-(7-chloroquinolin-4-yl) piperazin-1-yl) (1-(4-phenylbenzenesulfonyl)piperidin-3-yl) methanone, (4-(7-chloroquinolin-4-yl) piperazin-1-yl) (1-(3-methoxyphenylsulfonyl)piperidin-3-yl) methanone, N-(4-((3-(4-(2-methylquinolin-4-yl) piperazin-1-carbonyl)piperidin-1-yl) sulfonyl)phenyl) acetamide, (R)—N-(4-((3-(4-(2-methylquinolin-4-yl) piperazin-1-carbonyl)piperidin-1-yl) sulfonyl)phenyl) acetamide,
(S)—N-(4-((3-(4-(2-methylquinolin-4-yl) piperazin-1-carbonyl)piperidin-1-yl) sulfonyl)phenyl) acetamide,
(4-(2-methylquinolin-4-yl) piperazin-1-yl) (1-((4-nitrophenyl) sulfonyl)piperidin-3-yl) methanone,
(4-(2-methylquinolin-4-yl) piperazin-1-yl) (1-(phenylsulfonyl)piperidin-3-yl) methanone,
(4-(2-methylquinolin-4-yl) piperazin-1-yl) (1-tosylpiperidin-3-yl) methanone,
(4-(2-methylquinolin-4-yl) piperazin-1-yl) (1-(m-tosylsulfonyl)piperidin-3-yl) methanone,
(1-((3,4-dimethylphenyl) sulfonyl)piperidin-3-yl) (4-(2-methylquinolin-4-yl) piperazin-1-yl) methanone,
(1-(4-ethylphenylsulfonyl)piperidin-3-yl) (4-(2-methylquinolin-4-yl) piperazin-1-yl) methanone,
(1-((4-fluorophenyl) sulfonyl)piperidin-3-yl) (4-(2-methylquinolin-4-yl) piperazin-1-yl) methanone,
(1-((4-chlorophenyl) sulfonyl)piperidin-3-yl) (4-(2-methylquinolin-4-yl) piperazin-1-yl) methanone,
(4-2-methylquinolin-4-yl) piperazin-1-yl) (1-(4-(trifluorophenyl)phenylsulfonyl)piperidin-3-yl) methanone,
(1-(3-fluorophenylsulfonyl)piperidin-3-yl) (4-(2-methylquinolin-4-yl) piperazin-1-yl) methanone,
(4-(2-methylquinolin-4-yl) piperazin-1-yl) (1-(3-nitrophenylsulfonyl)piperidin-3-yl) methanone,
(1-(4-methoxyphenylsulfonyl)piperidin-3-yl) (4-(2-methylquinolin-4-yl) piperazin-1-yl) methanone,
(4-(2-methylquinolin-4-yl) piperazin-1-yl) (1-(pearlfluorophenylsulfonyl)piperidin-3-yl) methanone,
(1-(4-(dimethylamino)phenylsulfonyl)piperidin-3-yl) (4-(2-methylquinolin-4-yl) piperazin-1-yl) methanone,
(1-(4-hydroxyphenylsulfonyl)piperidin-3-yl) (4-(2-methylquinolin-4-yl) piperazin-1-yl) methanone,
(1-(2-fluorophenylsulfonyl)piperidin-3-yl) (4-(2-methylquinolin-4-yl) piperazin-1-yl) methanone,
(4-(2-methylquinolin-4-yl) piperazin-1-yl) (1-(4-phenoxyphenylsulfonyl)piperidin-3-yl) methanone,
4-(3-1-(2-methylquinolin-4-yl) piperazin-4-carbonyl)piperidin-1-ylsulfonyl)benzonitrile,
(4-(2-methylquinolin-4-yl) pyrezin-1-yl) (1-(4-(methylsulfonyl)phenylsulfonyl)piperidin-3-yl) methanone,
methyl 4-(3-(1-(2-methylquinolin-4-yl) piperazine-4-carbonyl)piperidin-1-ylsulfonyl)benzoate,
(4-(2-methylquinolin-4-yl) pyrezin-1-yl) (1-(4-phenylbenzenesulfonyl)piperidin-3-yl) methanone,
(1-(3-methoxyphenylsulfonyl)piperidin-3-yl) (4-(2-methylquinolin-4-yl) piperazin-1-yl) methanone,
(1-((4-bromophenyl) sulfonyl)piperidin-3-yl) (4-(2-methylquinolin-4-yl) piperazin-1-yl) methanone,
(4-(7-fluoroquinolin-4-yl) piperazin-1-yl) (1-(phenylsulfonyl)piperidin-3-yl) methanone,
(1-((4-fluorophenyl) sulfonyl)piperidin-3-yl) (4-(7-fluoroquinolin-4-yl) piperazin-1-yl) methanone,
(4-(7-fluoroquinolin-4-yl) piperazin-1-yl) (1-((4-hydroxyphenyl) sulfonyl)piperidin-3-yl) methanone,
(1-((4-(dimethylamino)phenyl) sulfonyl)piperidin-3-yl) (4-(7-fluoroquinolin-4-yl) piperazin-1-yl) methanone,
N-(4-(3-(1-(7-fluoroquinolin-4-yl) piperazine-4-carbonyl))piperidin-1-ylsulfonyl)phenyl) acetamide,
(R)—N-(4-(3-(1-(7-fluoroquinolin-4-yl) piperazin-4-carbonyl))piperidin-1-ylsulfonyl)phenyl) acetamide,
(S)—N-(4-(3-(1-(7-fluoroquinolin-4-yl) piperazin-4-carbonyl))piperidin-1-ylsulfonyl)phenyl) acetamide,
(R)-(1-((4-(dimethylamino)phenyl) sulfonyl)piperidin-3-yl) (4-(quinolin-4-yl) piperazin-1-yl) methanone,
(S)-(1-((4-(dimethylamino)phenyl) sulfonyl)piperidin-3-yl) (4-(quinolin-4-yl) piperazin-1-yl) methanone,
(4-(7-fluoroquinolin-4-yl) piperazin-1-yl) (1-(4-nitrophenylsulfonyl)piperidin-3-yl) methanone,
(4-(7-fluoroquinolin-4-yl) piperazin-1-yl) (1-(3-nitrophenylsulfonyl)piperidin-3-yl) methanone,
(1-(4-(diethylamino)phenyl) sulfonyl)piperidin-3-yl) (4-(7-fluoroquinolin-4-yl) piperazin-1-yl) methanone,
(4-(7-fluoroquinolin-4-yl) piperazin-1-yl) (1-(4-methoxyphenylsulfonyl)piperidin-3-yl) methanone, 1-(4-(3-(1-(7-fluoroquinolin-4-yl)piperazine-4-piperidin-1-ylsulfonyl)phenyl)ethanone,
(4-(7-fluoroquinolin-4-yl) pyrezin-1-yl) (1-(4-phenylbenzenesulfonyl)piperidin-3-yl) methanone,
(1-(4-bromophenylsulfonyl)piperidin-3-yl) (4-7-fluoroquinolin-4-yl) piperazin-1-yl) methanone,
(R)-(1-(4-bromophenylsulfonyl)piperidin-3-yl) (4-7-fluoroquinolin-4-yl) piperazin-1-yl) methanone,
(4-(7-fluoroquinolin-4-yl) piperazin-1-yl) (1-(3-methoxyphenylsulfonyl)piperidin-3-yl) methanone,
(R)—N-(3-(3-(1-(7-fluoroquinolin-4-yl) piperazin-4-carbonyl))piperidin-1-ylsulfonyl)phenyl) acetamide,
(R)-(4-(7-fluoroquinolin-4-yl) piperazin-1-yl) (1-(3-nitrophenylsulfonyl)piperidin-3-yl) methanone,
(R)-(1-((3-(dimethylamino)phenyl) sulfonyl)piperidin-3-yl) (4-(quinolin-4-yl) piperazin-1-yl) methanone,
(1-(3-bromophenylsulfonyl)piperidin-3-yl) (4-7-fluoroquinolin-4-yl) piperazin-1-yl) methanone,
N-(4-(3-(1-(2-(trifluoromethyl)quinolin-4-yl) piperazin-4-carbonyl)piperidin-1-ylsulfonyl)phenyl) acetamide,
(1-(phenylsulfonyl)piperidin-3-yl) (4-(2-(trifluoromethyl)quinolin-4-yl) piperazin-1-yl) methanone,
(1-tosylpiperidin-3-yl) (4-(2-(trifluoromethyl)quinolin-4-yl) piperazin-1-yl) methanone,
(1-(4-fluorophenylsulfonyl)piperidin-3-yl) (4-(2-(trifluoromethyl)quinolin-4-yl) piperazin-1-yl) methanone,
(1-(4-(dimethylamino)phenylsulfonyl)piperidin-3-yl) (4-(2-(trifluoromethyl)quinolin-4-yl) piperazin-1-yl) methanone,
(1-(4-hydroxyphenylsulfonyl)piperidin-3-yl) (4-(2-(trifluoromethyl)quinolin-4-yl) piperazin-1-yl) methanone,
(R)-(1-(4-hydroxyphenylsulfonyl)piperidin-3-yl) (4-(2-(trifluoromethyl)quinolin-4-yl) piperazin-1-yl) methanone,
(S)-(1-(4-hydroxyphenylsulfonyl)piperidin-3-yl) (4-(2-(trifluoromethyl)quinolin-4-yl) piperazin-1-yl) methanone,
(1-(4-(trifluoromethyl)phenylsulfonyl)piperidin-3-yl) (4-(2-(trifluoromethyl)quinolin-4-yl) piperazin-1-yl) methanone,
(1-(3-fluorophenylsulfonyl)piperidin-3-yl) (4-(2-(trifluoromethyl)quinolin-4-yl) piperazin-1-yl) methanone,
(1-(pearlfluorophenylsulfonyl)piperidin-3-yl) (4-(2-(trifluoromethyl)quinolin-4-yl) piperazin-1-yl) methanone,
(1-(phenylsulfonyl)piperidin-3-yl) (4-(quinolin-4-yl) piperazin-1-yl) methanone,
(1-(4-fluorophenyl)piperidin-3-yl) (4-(quinolin-4-yl) piperazin-1-yl) methanone,
(1-((4-hydroxyphenyl) sulfonyl)piperidin-3-yl) (4-(quinolin-4-yl) piperazin-1-yl) methanone,
(1-(4-(dimethylamino)phenylsulfonyl)piperidin-3-yl) (4-(quinolin-4-yl) piperazin-1-yl) methanone,
N-(4-((3-(4-(quinolin-4-yl) piperazine-1-carbonyl)piperidin-1-yl) sulfonyl)phenyl) acetamide,
(R)-(1-(4-(dimethylamino)phenylsulfonyl)piperidin-3-yl) (4-(quinolin-4-yl) piperazin-1-yl) methanone, (S)-(1-(4-(dimethylamino)phenylsulfonyl)piperidin-3-yl) (4-(quinolin-4-yl) piperazin-1-yl) methanone,
(1-(4-nitrophenylsulfonyl)piperidin-3-yl) (4-(quinolin-4-yl) piperazin-1-yl) methanone,
(1-(3-nitrophenylsulfonyl)piperidin-3-yl) (4-(quinolin-4-yl) piperazin-1-yl) methanone,
(1-(4-(diethylamino)phenylsulfonyl)piperidin-3-yl) (4-(quinolin-4-yl) piperazin-1-yl) methanone,
(4-(quinolin-4-yl) pyrezin-1-yl) (1-(4-phenylbenzenesulfonyl)piperidin-3-yl) methanone,
(1-(4-bromophenylphenylsulfonyl)piperidin-3-yl) (4-(quinolin-4-yl) piperazin-1-yl) methanone,
(1-(3-Methoxyphenylphenylsulfonyl)piperidine-3-yl) (4-(quinolin-4-yl) piperazin-1-yl) methanone,
N-(4-(3-(1-(7-methoxyquinolin-4-yl) piperazin-4-carbonyl))piperidin-1-ylsulfonyl)phenyl) acetamide,
(4-(7-methoxyquinolin-4-yl) piperazin-1-yl) (1-tosylpiperidin-3-yl) methanone,
(1-(4-fluorophenyl) sulfonyl)piperidin-3-yl) (4-(7-methoxyquinolin-4-yl) piperazin-1-yl) methanone,
(1-(4-(dimethylamino)phenylsulfonyl)piperidin-3-yl) (4-(7-methoxyquinolin-4-yl) piperazin-1-yl) methanone,
(1-(4-hydroxyphenylsulfonyl)piperidin-3-yl) (4-(7-methoxyquinolin-4-yl) piperazin-1-yl) methanone,
(4-(7-chloroquinolin-4-yl) piperazin-1-yl) (1-(3-hydroxyphenylsulfonyl)piperidin-3-yl) methanone,
(1-(3-hydroxyphenylsulfonyl)piperidin-3-yl) (4-(2-methylquinolin-4-yl) piperazin-1-yl) methanone,
(4-(7-fluoroquinolin-4-yl) (1-(3-hydroxyphenylsulfonyl) piperidin-3-yl) methanone,
(1-(3-hydroxyphenylsulfonyl)piperidin-3-yl) (4-(quinolin-4-yl) piperazin-1-yl) methanone,
(1-((4-aminophenyl) sulfonyl)piperidin-3-yl) (4-(2-methylquinolin-4-yl) piperazin-1-yl) methanone,
(1-((4-aminophenyl) sulfonyl)piperidin-3-yl) (4-(quinolin-4-yl) piperazin-1-yl) methanone,
4-(3-(1-(7-chloroquinolin-4-yl) piperazin-1-carbonyl)piperidin-1-yl) sulfonyl)benzoic acid,
4-(3-(1-(7-chloroquinolin-4-yl) piperazine-4-carbonyl)piperidin-1-ylsulfonyl)-N,N-dimethylbenzamide,
4-(3-(1-(2-methylquinolin-4-yl) piperazine-4-carbonyl)piperidin-1-ylsulfonyl)benzoic acid,
N,N-dimethyl-4-(3-(1-(2-methylquinolin-4-yl) piperazin-4-carbonyl)piperidin-1-ylsulfonyl)benzamide,
(4-(2-methylquinolin-4-yl) piperazin-1-yl) (1-((4-(pyridin-4-yl)phenyl) sulfonyl)piperidin-3-yl) methanone,
(4-(2-methylquinolin-4-yl) piperazin-1-yl) (1-((4-(pyrimidin-5-yl)phenyl) sulfonyl)piperidin-3-yl) methanone,
(1-((4-(2-methylpyrimidin-5-yl)phenyl) sulfonyl)piperidin-4-yl) (4-(2-methylquinolin-4-yl)phenyl) piperazin-1-yl) methanone,
(4-(2-methylquinolin-4-yl) piperazin-1-yl) (1-((4-(pyridin-3-yl)phenyl) sulfonyl)piperidin-3-yl) methanone,
(4-(7-fluoroquinolin-4-yl) piperazin-1-yl) (1-(4-(pyridin-4-)phenylsulfonyl)piperidin-3-yl) methanone,
(R)-(4-(7-fluoroquinolin-4-yl) piperazin-1-yl) (1-(4-(pyridin-4-yl)phenylsulfonyl)piperidin-3-yl) methanone,
(4-(7-fluoroquinolin-4-yl) piperazin-1-yl) (1-(4-(pyridin-3-)phenylsulfonyl)piperidin-3-yl) methanone,
(4-(7-fluoroquinolin-4-yl) piperazin-1-yl) (1-(3-(pyridin-4-yl)phenylsulfonyl)piperidin-3-yl) methanone,
(4-(7-fluoroquinolin-4-yl) piperazin-1-yl) (1-(3-(pyridin-3-yl)phenylsulfonyl)piperidin-3-yl) methanone,
(4-(7-fluoroquinolin-4-yl) piperazin-1-yl) (1-(4-(pyrimidine-5-)phenylsulfonyl)piperidin-3-yl) methanone,
(4-(7-fluoroquinolin-4-yl) piperazin-1-yl) (1-(3-(pyrimidine-5-)phenylsulfonyl)piperidin-3-yl) methanone,
(1-(4-(pyridin-4-yl)phenylsulfonyl)piperidin-3-yl) (4-(quinolin-4-yl) piperazin-1-yl) methanone,
(1-(4-(pyridin-3-yl)phenylsulfonyl)piperidin-3-yl) (4-(quinolin-4-yl) piperazin-1-yl) methanone,
(1-(4-(2-methylpyrimidin-5-yl)phenylsulfonyl)piperidin-3-yl) (4-(quinolin-4-yl) piperazin-1-yl) methanone,
N-(4-((3-(4-(7-chloroquinolin-4-yl) piperazin-1-carbonyl)piperidin-1-yl) sulfonyl)phenyl) acetamide, and
(4-(7-chloroquinolin-4-yl) piperazin-1-yl) (1-((4-nitrophenyl) sulfonyl)-piperidin-3-yl) methanone.

6. A method for preparing the compound according to claim 1, comprising (a) reacting a compound of Formula (i) with piperidine to prepare a compound of Formula (ii), and reacting a compound of Formula (ii) with a compound of Formula (iii) to prepare a compound of Formula (iv); and (b) reacting a compound of Formula (iv) with trifluoroacetic acid (TFA) to prepare a compound of Formula (v) and reacting it the compound of Formula (v) with a compound Formula (vi) to produce a compound of Formula (I),

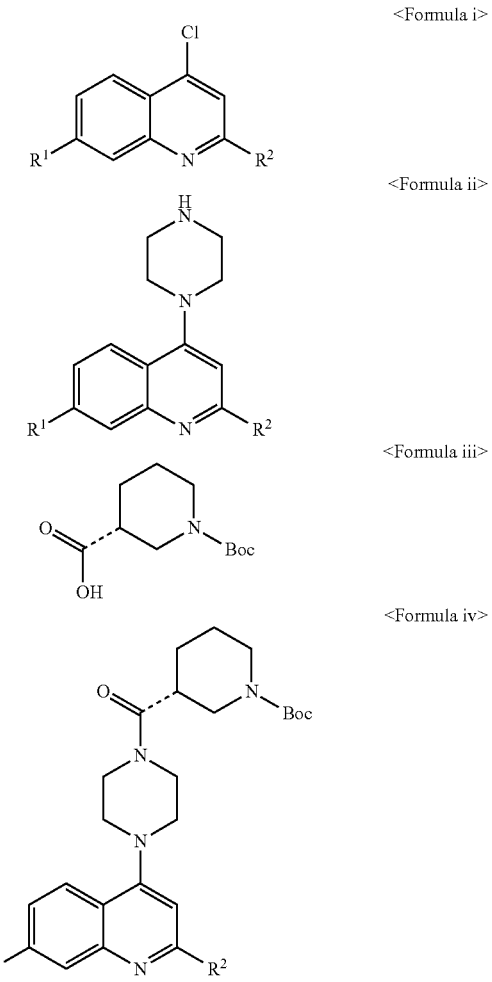

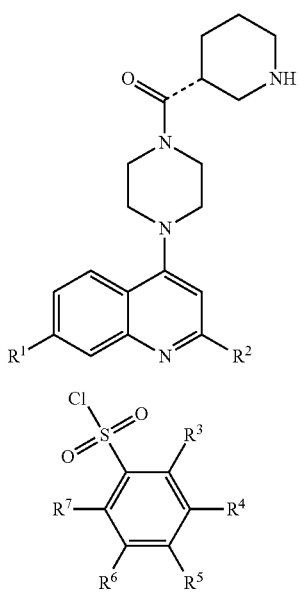

<Formula v>

<Formula vi> wherein, $R^1$ to $R^7$ are as defined in claim 1 above.

7. A pharmaceutical composition for preventing or treating a metabolic disease comprising a quinoline compound represented by the following Formula (I), or a racemate, a diastereomer, a geometric isomer, a stereoisomer, a hydrate, or a pharmaceutically acceptable salt thereof as an active ingredient:

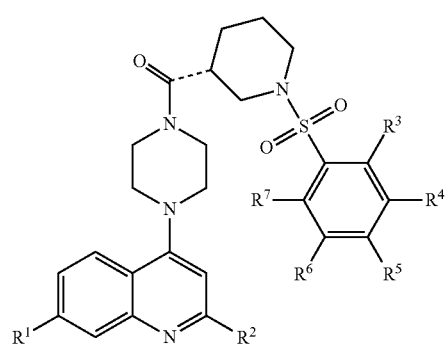

<Formula I> wherein $R^1$ and $R^2$ are each independently selected from the group consisting of hydrogen, halo, $C_1$-$C_6$ haloalkane, hydroxy, carboxyl, substituted or unsubstituted amino, substituted or unsubstituted $C_1$-$C_6$ amide, cyano, nitro, substituted or unsubstituted $C_1$-$C_{10}$ alkyl, substituted or unsubstituted $C_2$-$C_{10}$ alkenyl, substituted or unsubstituted $C_2$-$C_{10}$ alkynyl and substituted or unsubstituted $C_1$-$C_{10}$ alkoxy; and wherein $R^3$, $R^4$, $R^5$, $R^6$ and $R^7$ are each independently selected from the group consisting of hydrogen, halo, $C_1$-$C_6$ haloalkane, hydroxy, carboxyl, $C_1$-$C_6$ alkylcarbonyl, $C_1$-$C_6$ alkoxycarbonyl, dimethylaminocarbonyl, substituted or unsubstituted amino, substituted or unsubstituted $C_1$-$C_6$ amide, sulfonyl, cyano, nitro, substituted or unsubstituted $C_1$-$C_6$ alkyl, substituted or unsubstituted $C_2$-$C_6$ alkenyl, substituted or unsubstituted $C_2$-$C_6$ alkynyl, substituted or unsubstituted $C_1$-$C_6$ alkoxy, substituted or unsubstituted phenoxy, substituted or unsubstituted phenyl, and substituted or unsubstituted $C_3$-$C_{10}$ heteroaryl.

8. The pharmaceutical composition according to claim 7, wherein the metabolic disease is diabetes or fatty liver disease.

9. The pharmaceutical composition according to claim 8, wherein the diabetes is type 2 diabetes.

10. The pharmaceutical composition according to claim 8, wherein the diabetes is derived from obesity.

11. The pharmaceutical composition according to claim 8, wherein the fatty liver disease is selected from the group consisting of fatty liver, steatohepatitis, and fatty liver-associated cirrhosis.

12. A food composition for preventing or improving metabolic diseases comprising a quinoline compound represented by the following Formula (I), or a racemate, a diastereomer, a geometric isomer, a stereoisomer, a hydrate, or a salt thereof as an active ingredient:

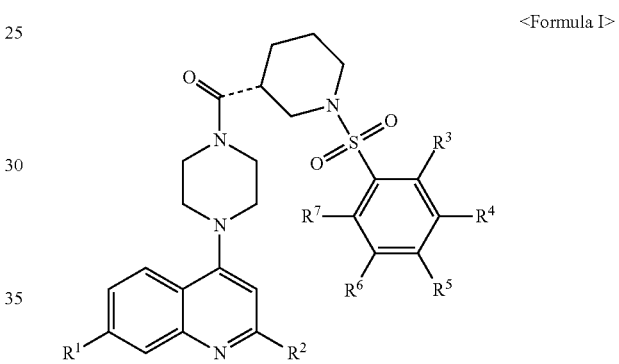

<Formula I> wherein $R^1$ and $R^2$ are each independently selected from the group consisting of hydrogen, halo, $C_1$-$C_6$ haloalkane, hydroxy, carboxyl, substituted or unsubstituted amino, substituted or unsubstituted $C_1$-$C_6$ amide, cyano, nitro, substituted or unsubstituted $C_1$-$C_{10}$ alkyl, substituted or unsubstituted $C_2$-$C_{10}$ alkenyl, substituted or unsubstituted $C_2$-$C_{10}$ alkynyl and substituted or unsubstituted $C_1$-$C_{10}$ alkoxy; and wherein $R^3$, $R^4$, $R^5$, $R^6$ and $R^7$ are each independently selected from the group consisting of hydrogen, halo, $C_1$-$C_6$ haloalkane, hydroxy, carboxyl, $C_1$-$C_6$ alkylcarbonyl, $C_1$-$C_6$ alkoxycarbonyl, dimethylaminocarbonyl, substituted or unsubstituted amino, substituted or unsubstituted $C_1$-$C_6$ amide, sulfonyl, cyano, nitro, substituted or unsubstituted $C_1$-$C_6$ alkyl, substituted or unsubstituted $C_2$-$C_6$ alkenyl, substituted or unsubstituted $C_2$-$C_6$ alkynyl, substituted or unsubstituted $C_1$-$C_6$ alkoxy, substituted or unsubstituted phenoxy, substituted or unsubstituted phenyl, and substituted or unsubstituted $C_3$-$C_{10}$ heteroaryl.

13. A method of treating a metabolic disease comprising administering to a subject in need thereof an effective amount of a composition comprising the compound according to claim 1.

* * * * *